United States Patent
Volin et al.

(10) Patent No.: US 11,624,187 B2
(45) Date of Patent: Apr. 11, 2023

(54) PERGOLA

(71) Applicant: ZHEJIANG ZHENGTE CO., LTD., Linhai (CN)

(72) Inventors: Dee Volin, Gresham, OR (US); Zhou Jian, Linhai (CN)

(73) Assignee: ZHEJIANG ZHENGTE CO., LTD., Linhai (CN)

( * ) Notice: Subject to any disclaimer, the term of this patent is extended or adjusted under 35 U.S.C. 154(b) by 0 days.

(21) Appl. No.: 17/848,318

(22) Filed: Jun. 23, 2022

(65) Prior Publication Data

US 2022/0325521 A1    Oct. 13, 2022

Related U.S. Application Data

(63) Continuation of application No. PCT/US2020/034973, filed on May 28, 2020, which
(Continued)

(51) Int. Cl.
*E04B 7/16* (2006.01)
*E06B 7/086* (2006.01)
(Continued)

(52) U.S. Cl.
CPC ........... *E04B 7/16* (2013.01); *B60J 7/0084* (2013.01); *E04B 7/163* (2013.01); *E04F 10/08* (2013.01); *E04F 10/10* (2013.01); *E06B 7/086* (2013.01)

(58) Field of Classification Search
CPC .......... E04F 10/10; E04F 10/08; E04B 7/163; E04B 7/16; E06B 7/086; E06B 7/084;
(Continued)

(56) References Cited

U.S. PATENT DOCUMENTS 2,791,009 A    5/1957 Wagner
3,571,973 A    3/1971 Roberts
(Continued)

FOREIGN PATENT DOCUMENTS

BE    1019767 A3 * 12/2012 ............... E04B 5/38
BE    1023135 B1 * 11/2016 ............... E03B 3/03
(Continued)

OTHER PUBLICATIONS

Derwent abstract of CN 110306912 A (Year: 2019).

*Primary Examiner* — Brian D Mattei
*Assistant Examiner* — Charissa Ahmad
(74) *Attorney, Agent, or Firm* — One LLP

(57) ABSTRACT

A multi-function leaf-separating-discharging height-and-angle-adjustable louvered pergola comprises: opposing end caps, multi-screen-securing edges, rainwater-and-wind-sealing insulation strips attached to multi-screen-securing louver blades for automatically raising and lowering shade and video projection screens and controlling fruit-drying duration and also functioning as a truck-bed tonneau cover, cradle axels inserted between cradle caps and rotation cradles, stanchions and rotation cradles screwed to first and second leaf-discharging side gutter beams, corner posts, multi-louver-control bar connected to linkage arm, linkage arm connected to worm-gear transmission controlled by multi-screen-raising-lowering multi-louver-control crank, first and second rainwater-channeling-and-leaf-filtering side gutter beams attached to the corner posts, the discrete-leaf-filtering tubes, spouts, corner-post base plates, and height-and-angle-adjustable tube screws screwed into the corner-post base plates.

6 Claims, 100 Drawing Sheets

Related U.S. Application Data is a continuation of application No. 16/736,796, filed on Jan. 7, 2020, now Pat. No. 10,851,544.

(51) Int. Cl.
*B60J 7/00* (2006.01)
*E04F 10/10* (2006.01)
*E04F 10/08* (2006.01)

(58) Field of Classification Search
CPC ... E06B 9/386; E06B 7/08; F24F 13/15; B60J 7/0084
See application file for complete search history.

(56) References Cited

U.S. PATENT DOCUMENTS

| | | | |
|---|---|---|---|
| 3,741,102 A | 6/1973 | Kaiser | |
| 3,884,414 A | 5/1975 | Baer | |
| 4,038,781 A | 8/1977 | Graham | |
| 4,099,346 A | 7/1978 | Isono | |
| 4,518,012 A | 5/1985 | O'Hara | |
| 4,527,355 A | 7/1985 | Numakami et al. | |
| D293,934 S | 1/1988 | Lambert et al. | |
| 4,926,599 A | 5/1990 | Scholz | |
| 5,020,423 A | 6/1991 | Hill | |
| 5,133,398 A | 7/1992 | Yang et al. | |
| 5,267,414 A | 12/1993 | Vaida | |
| 5,306,210 A | 4/1994 | Smit | |
| 5,590,492 A | 1/1997 | Cucciara | |
| 5,669,179 A | 9/1997 | Hanlon | |
| 5,732,507 A | 3/1998 | Edwards | |
| 5,862,633 A | 1/1999 | Ellis | |
| 5,873,202 A | 2/1999 | Parks | |
| 5,921,028 A | 7/1999 | Marocco | |
| 6,202,363 B1 | 3/2001 | Chang | |
| 7,335,096 B2 | 2/2008 | Perez et al. | |
| 7,963,072 B2 * | 6/2011 | Anderson | E04H 1/12 52/79.12 |
| 8,413,389 B2 | 4/2013 | Frigerio | |
| 8,413,705 B2 | 4/2013 | Castel | |
| D687,969 S | 8/2013 | Randol et al. | |
| 8,640,420 B1 * | 2/2014 | Halley | E04F 10/08 52/650.1 |
| 8,978,313 B1 | 3/2015 | Pilla | |
| 9,157,270 B2 | 10/2015 | Hall | |
| 9,587,396 B1 | 3/2017 | Staschiak | |
| 9,644,374 B2 | 5/2017 | Ivic | |
| 10,145,118 B2 * | 12/2018 | Veys | E04F 10/00 |
| 10,392,821 B2 | 8/2019 | Volin | |
| 2004/0148899 A1 | 8/2004 | Pertille | |
| 2013/0291438 A1 | 11/2013 | Selzer | |
| 2014/0170920 A1 | 6/2014 | Manipatruni et al. | |
| 2016/0211793 A1 | 7/2016 | Grimmeisen | |
| 2018/0244137 A1 | 8/2018 | Oliver et al. | |
| 2018/0320374 A1 | 11/2018 | Castel | |
| 2019/0338528 A1 | 11/2019 | Torman | |

FOREIGN PATENT DOCUMENTS

| | | | | |
|---|---|---|---|---|
| BE | 1025403 B1 * | 2/2019 | | E04F 10/00 |
| DE | 102012000580 A1 * | 7/2012 | | E04B 5/38 |
| DE | 102019001178 A1 | 8/2019 | | |
| DE | 102019001620 A1 | 9/2019 | | |
| EP | 2011932 A1 * | 1/2009 | | E04F 10/0607 |
| EP | 2351896 A2 * | 8/2011 | | E04C 3/32 |
| EP | 2431547 A1 | 3/2012 | | |
| EP | 2589720 A1 * | 5/2013 | | E04B 7/163 |
| EP | 2778315 A2 * | 9/2014 | | E04F 10/005 |
| EP | 2687647 A1 | 10/2014 | | |
| EP | 2853647 A1 | 4/2015 | | |
| EP | 3059355 A1 | 8/2016 | | |
| ES | 2534809 T3 * | 4/2015 | | E04B 7/163 |
| ES | 1177733 U | 3/2017 | | |
| FR | 2701977 A1 * | 9/1994 | | E04B 7/163 |
| FR | 2947845 A1 * | 1/2011 | | E04B 7/163 |
| FR | 2948394 A1 * | 1/2011 | | E04B 1/0046 |
| FR | 3042802 A1 * | 4/2017 | | E03B 3/03 |
| FR | 3078089 A1 * | 8/2019 | | E04F 10/08 |
| GB | 2595295 A * | 11/2021 | | E04B 1/34315 |
| WO | WO 2007/045933 A1 | 4/2007 | | |
| WO | WO-2014136095 A1 * | 9/2014 | | E04B 7/163 |
| WO | WO-2015104675 A1 * | 7/2015 | | E04D 13/064 |

* cited by examiner

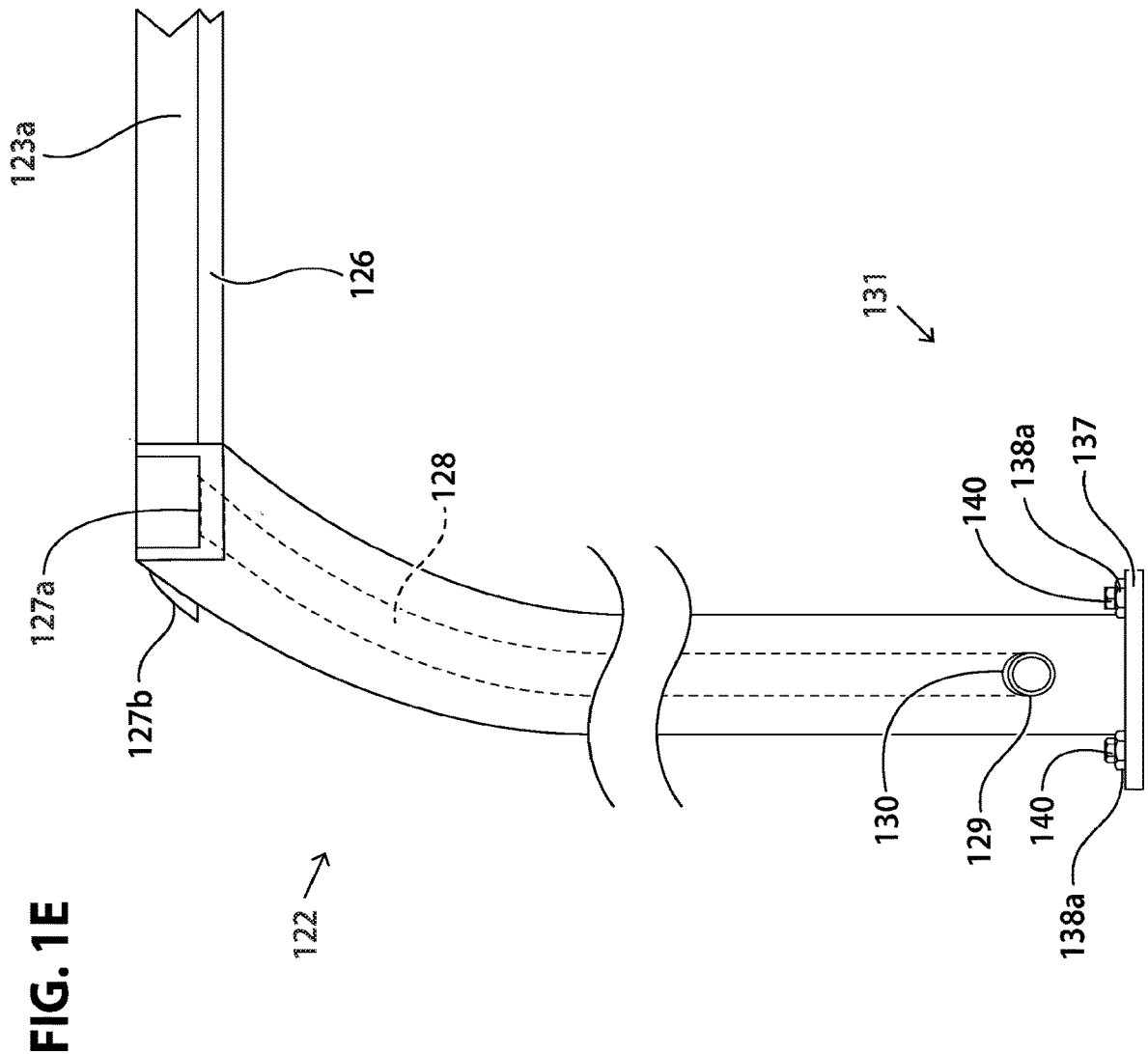

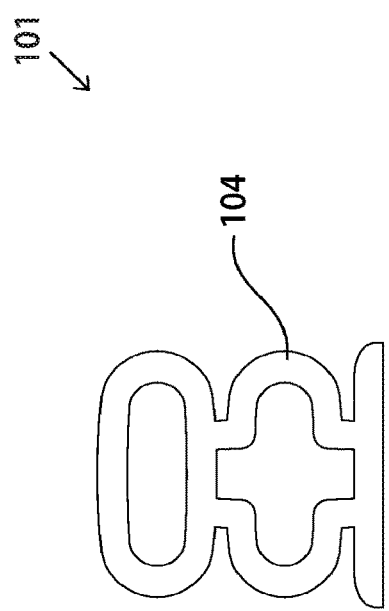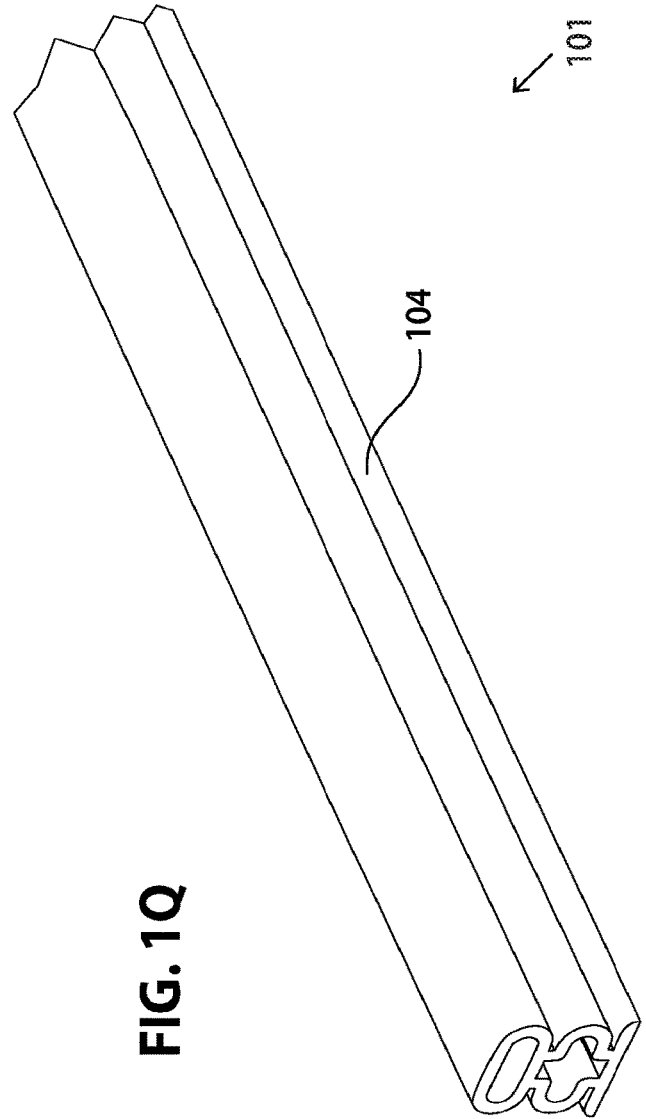
FIG. 1P
FIG. 1Q

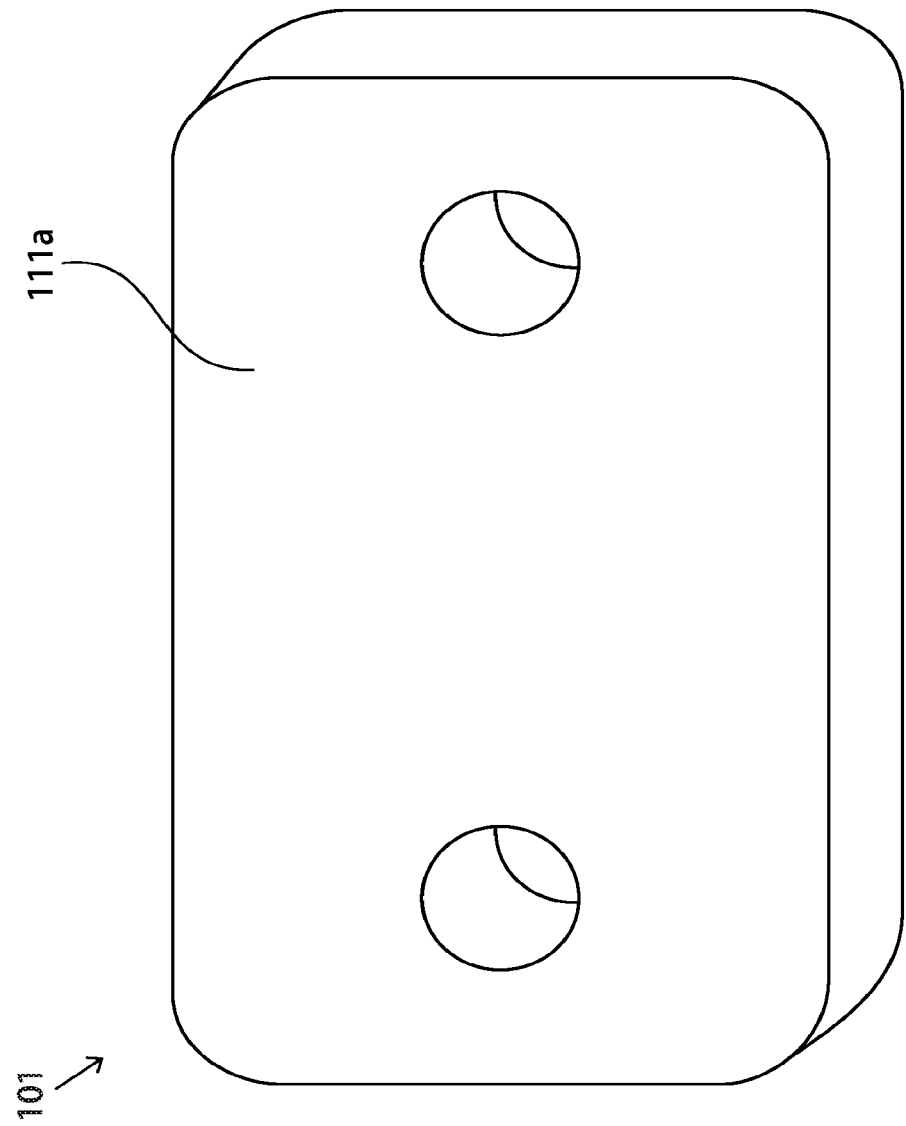

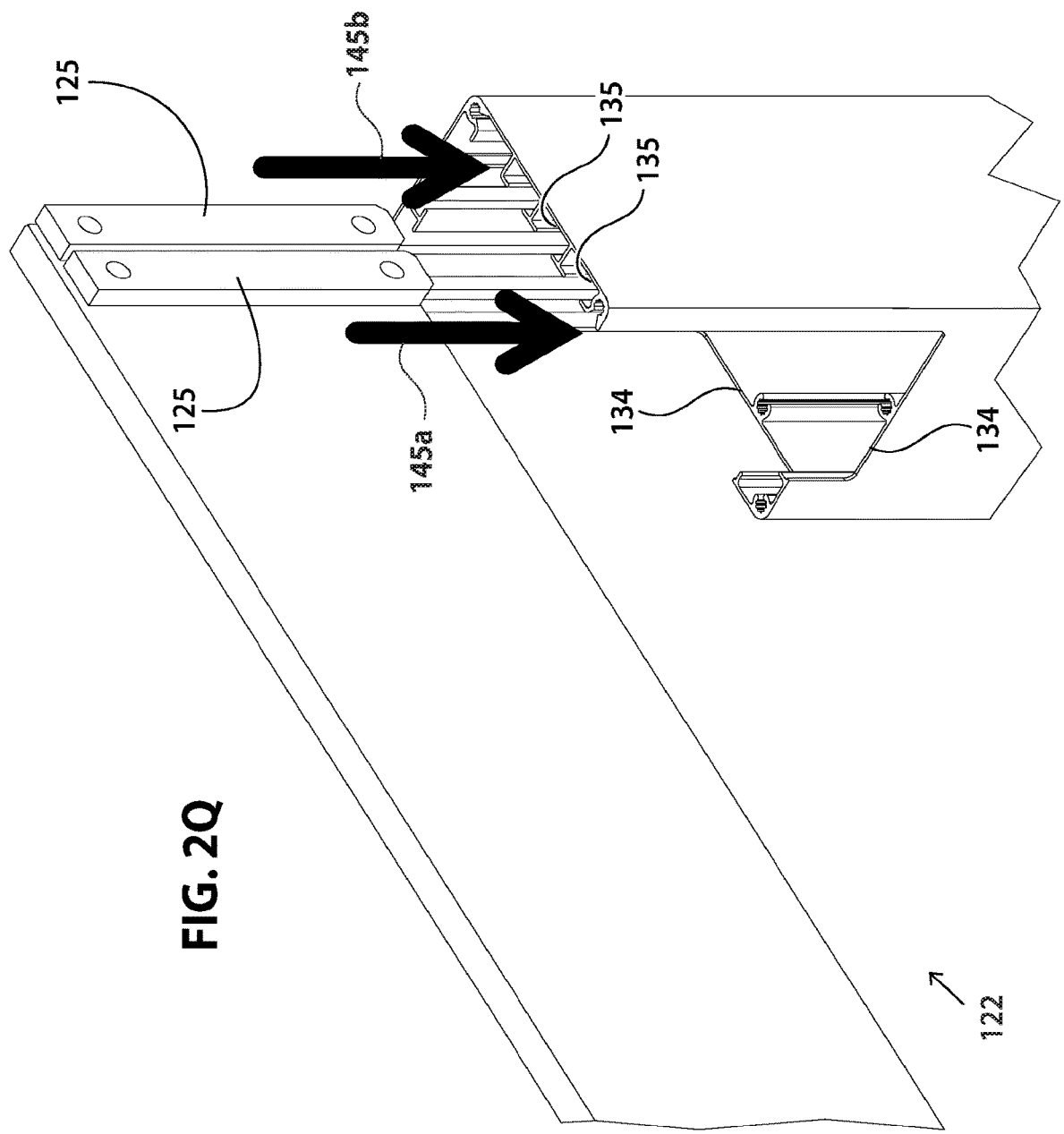

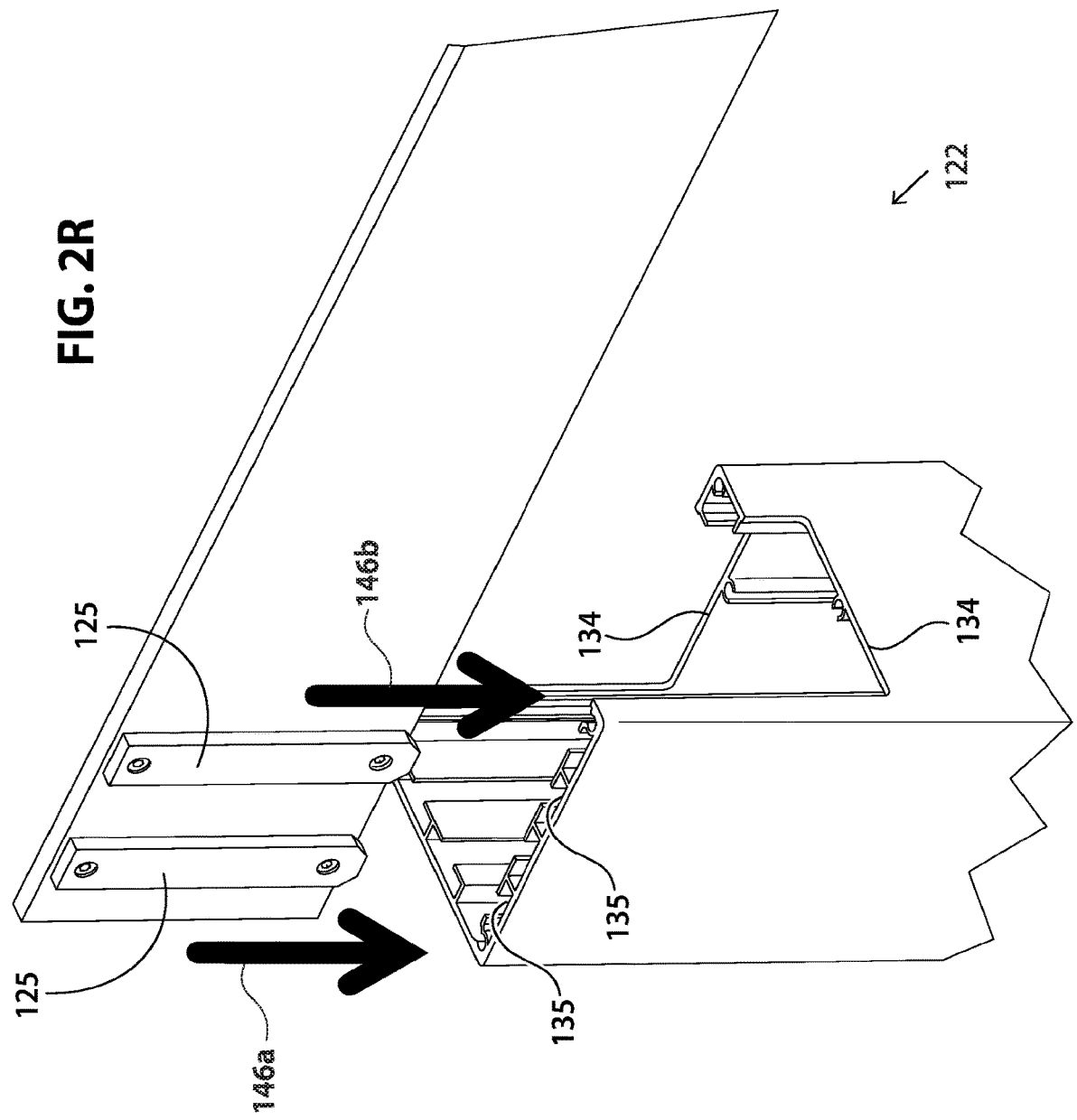

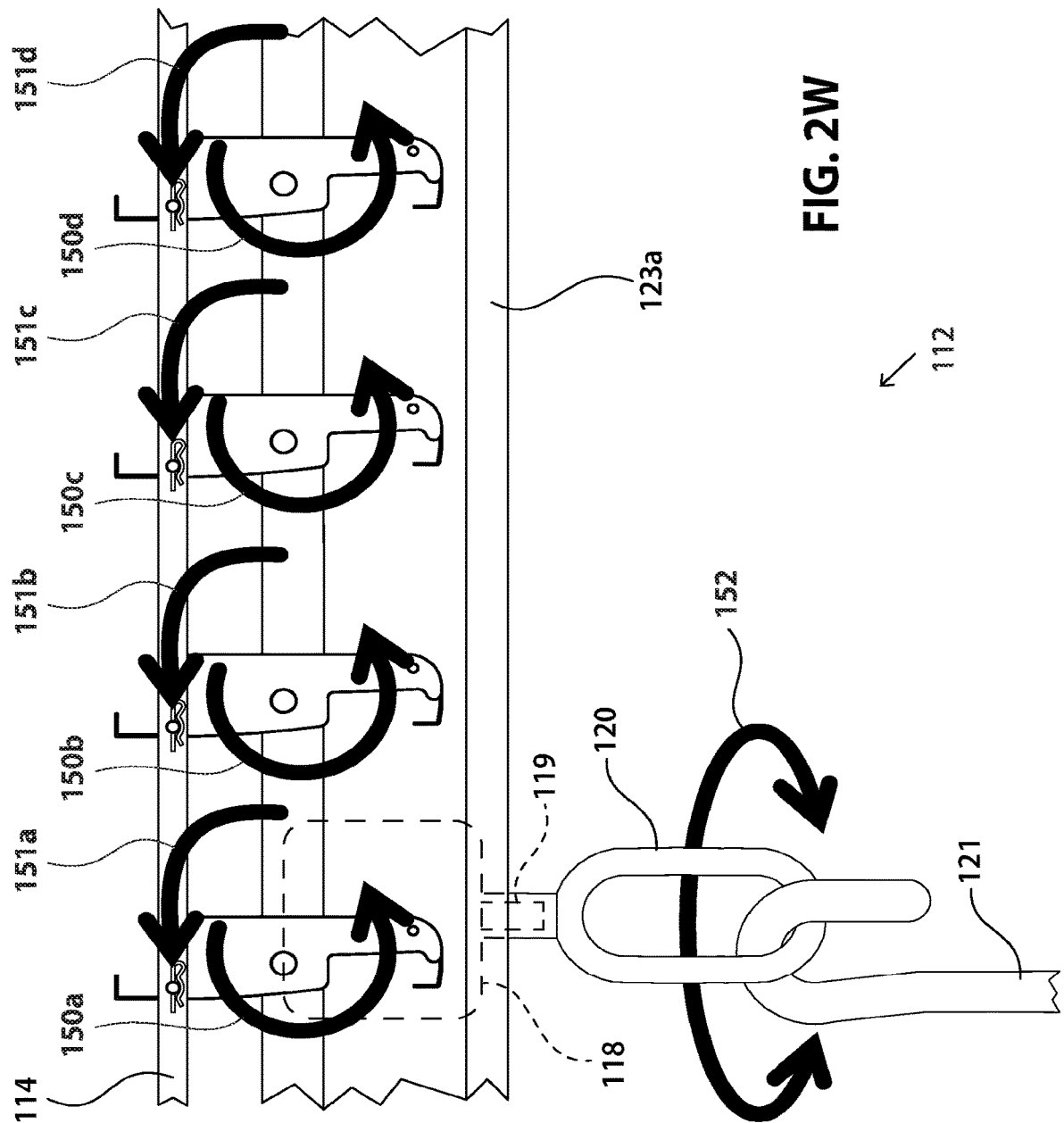

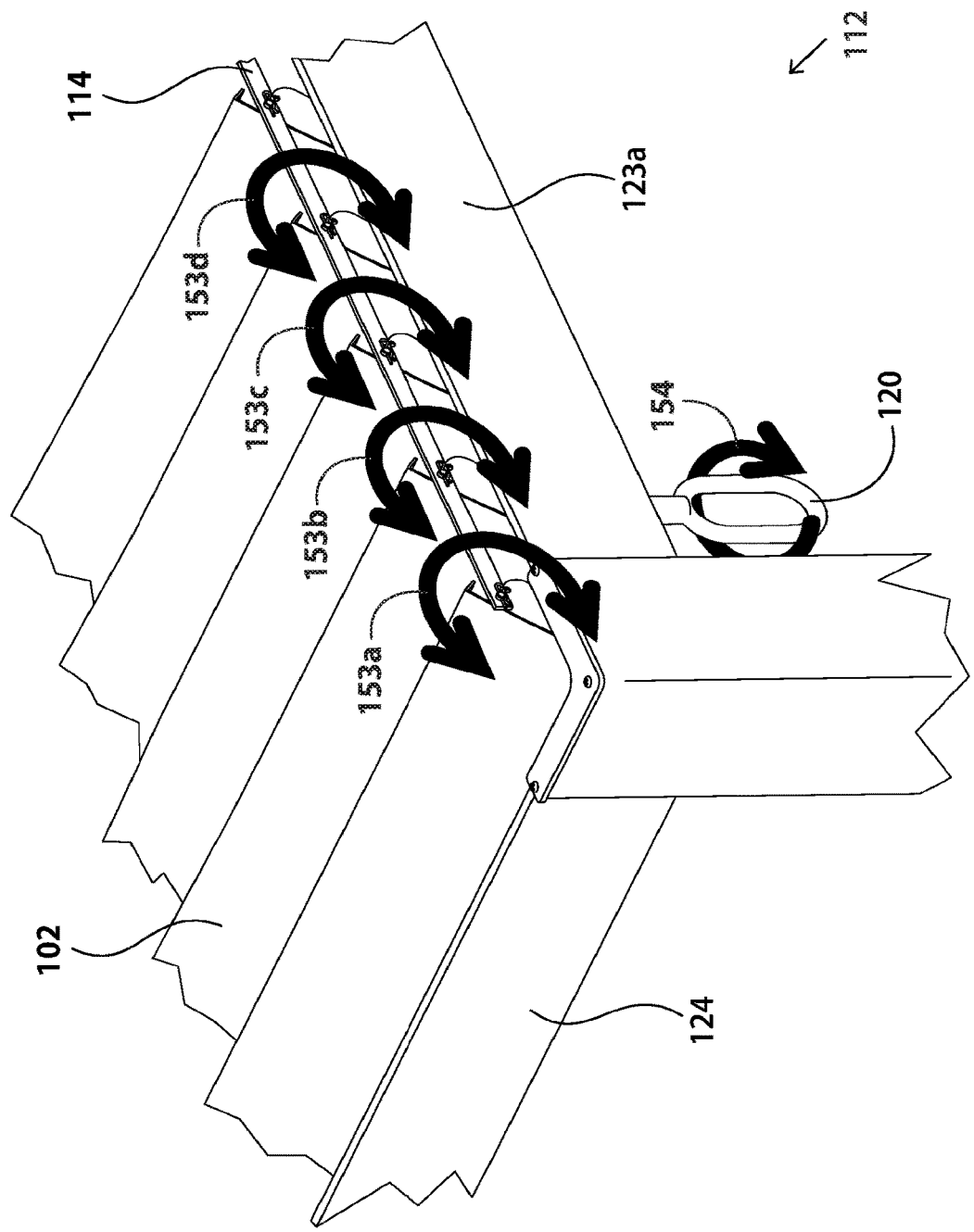

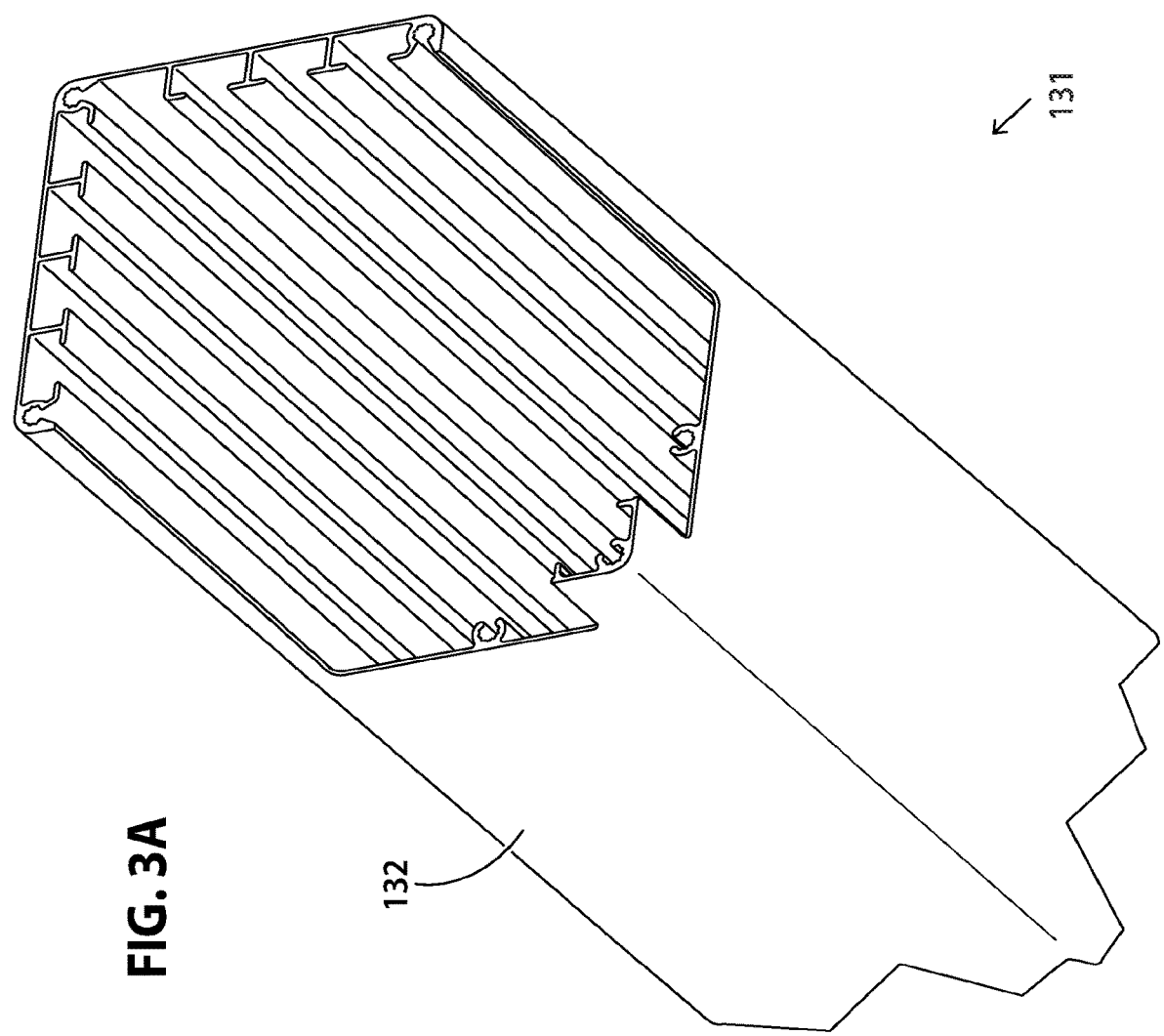

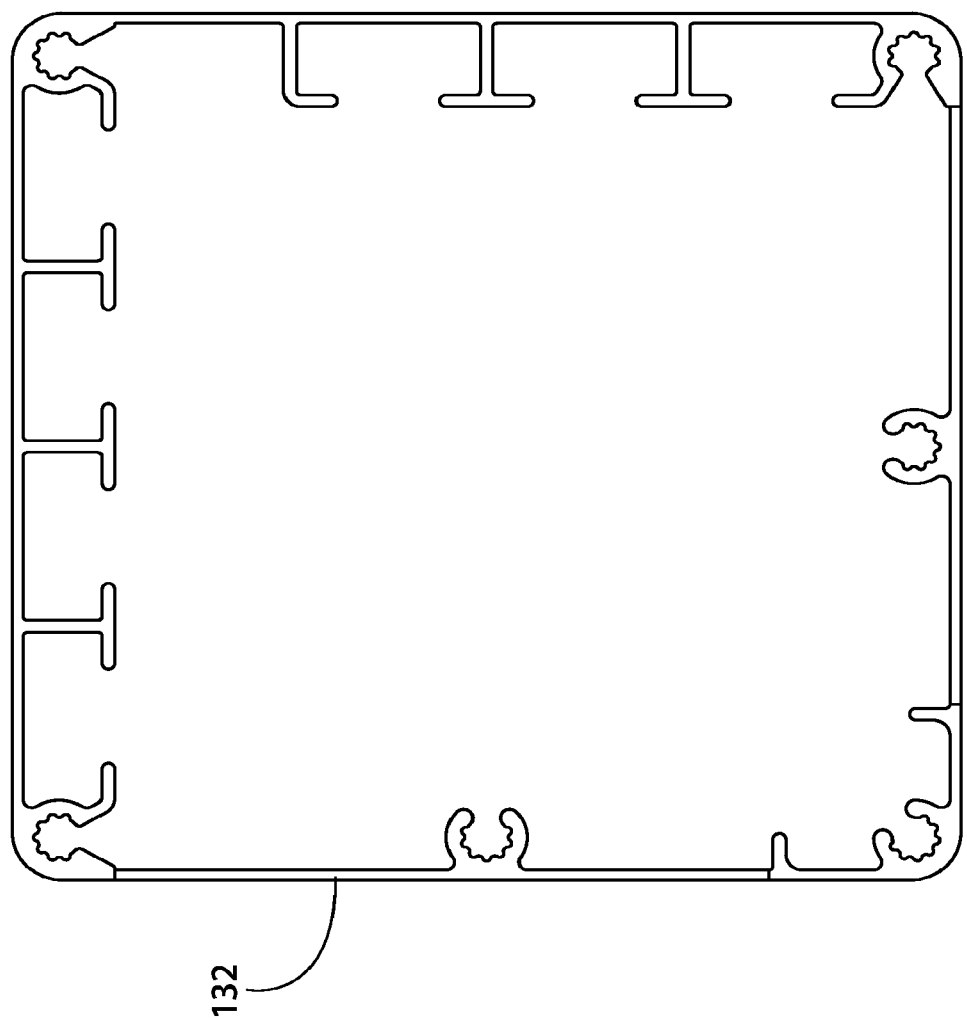

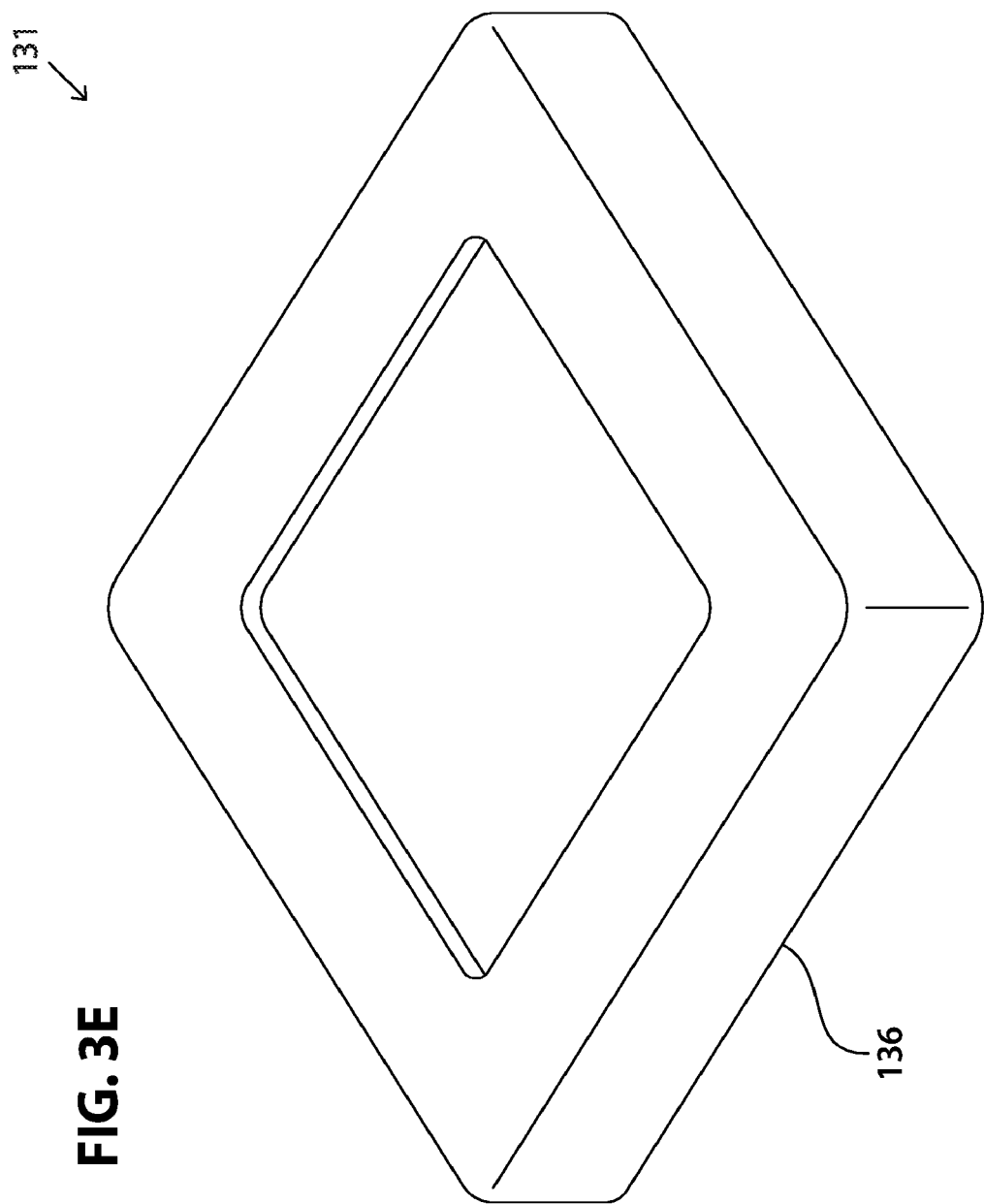

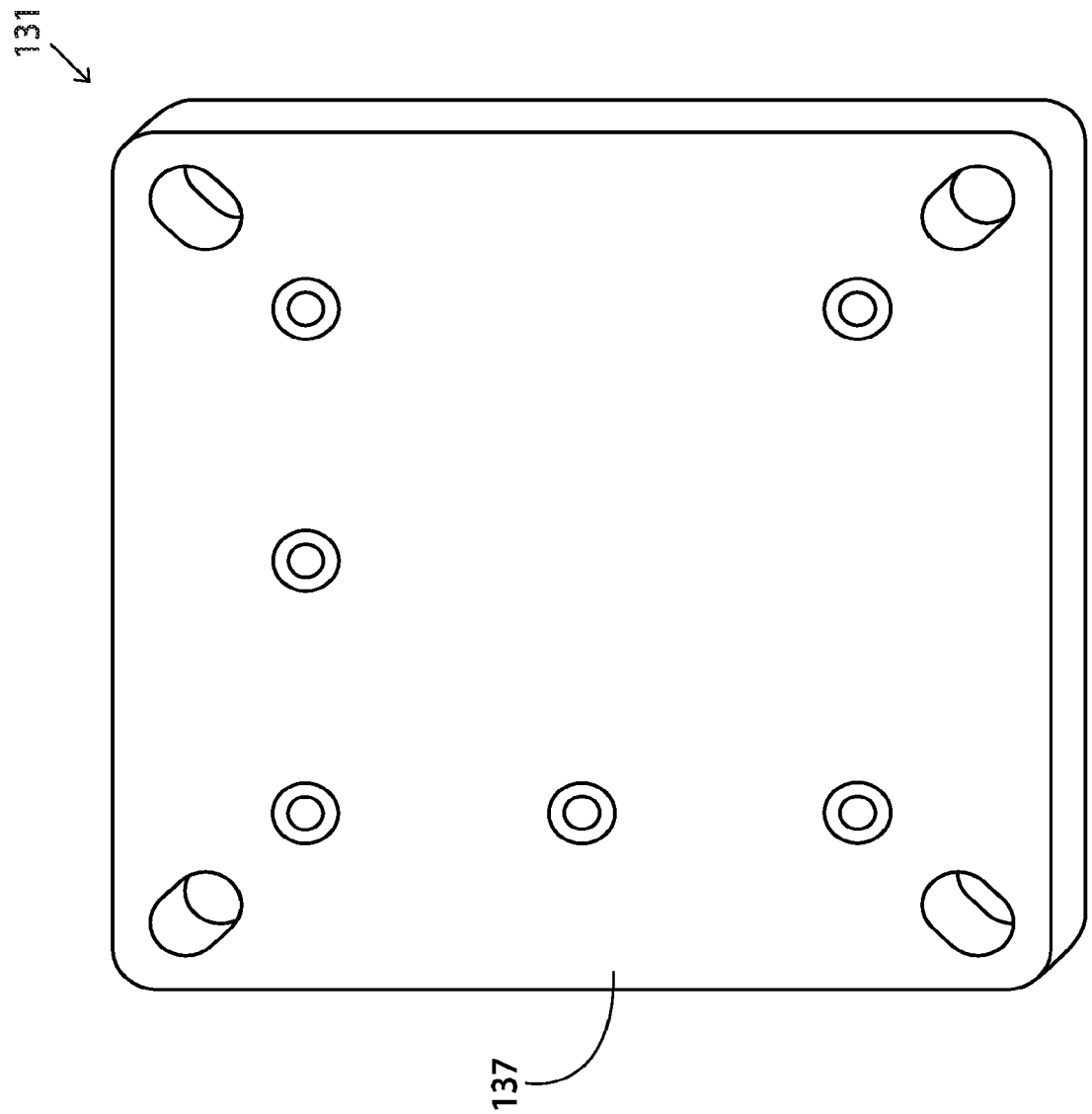

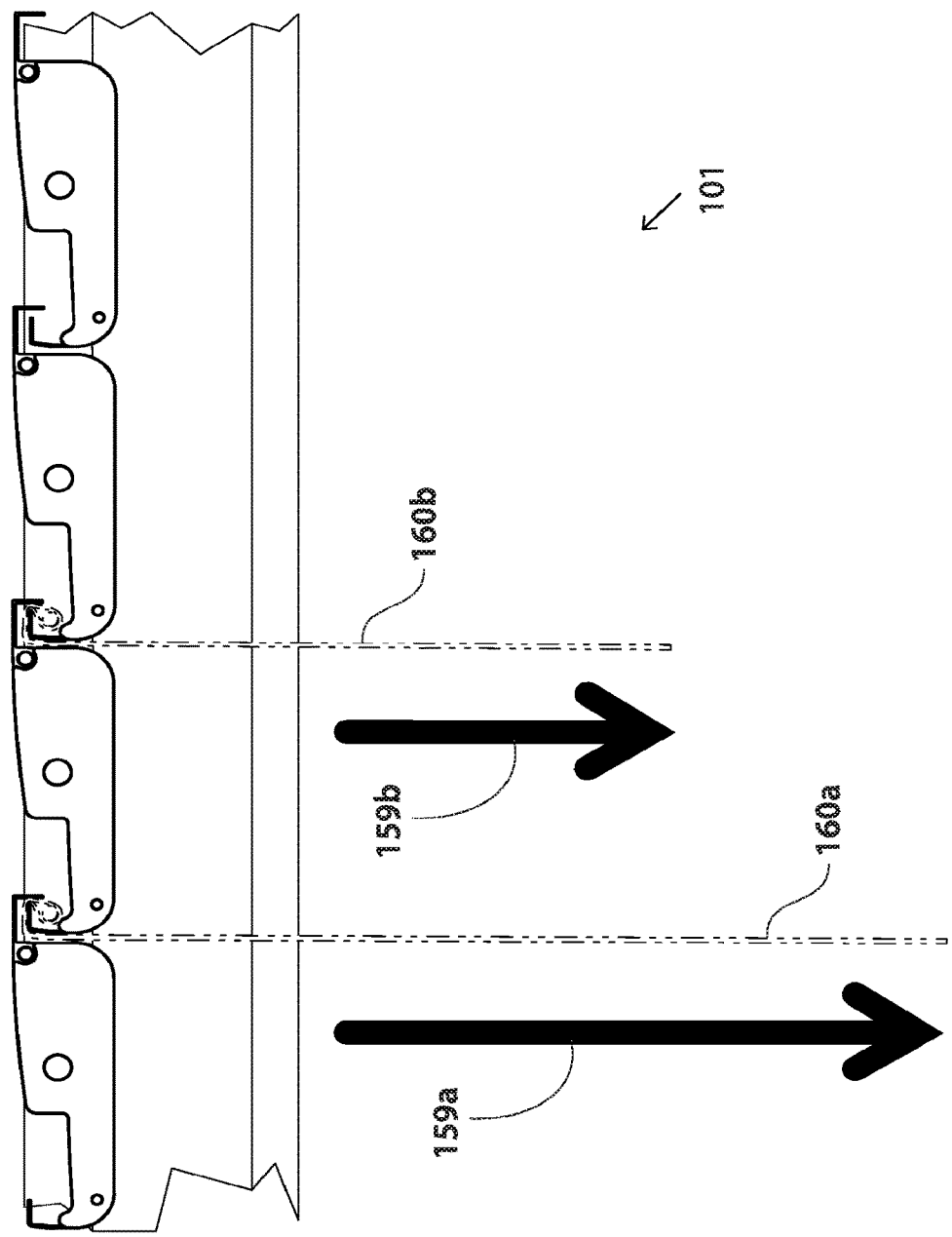

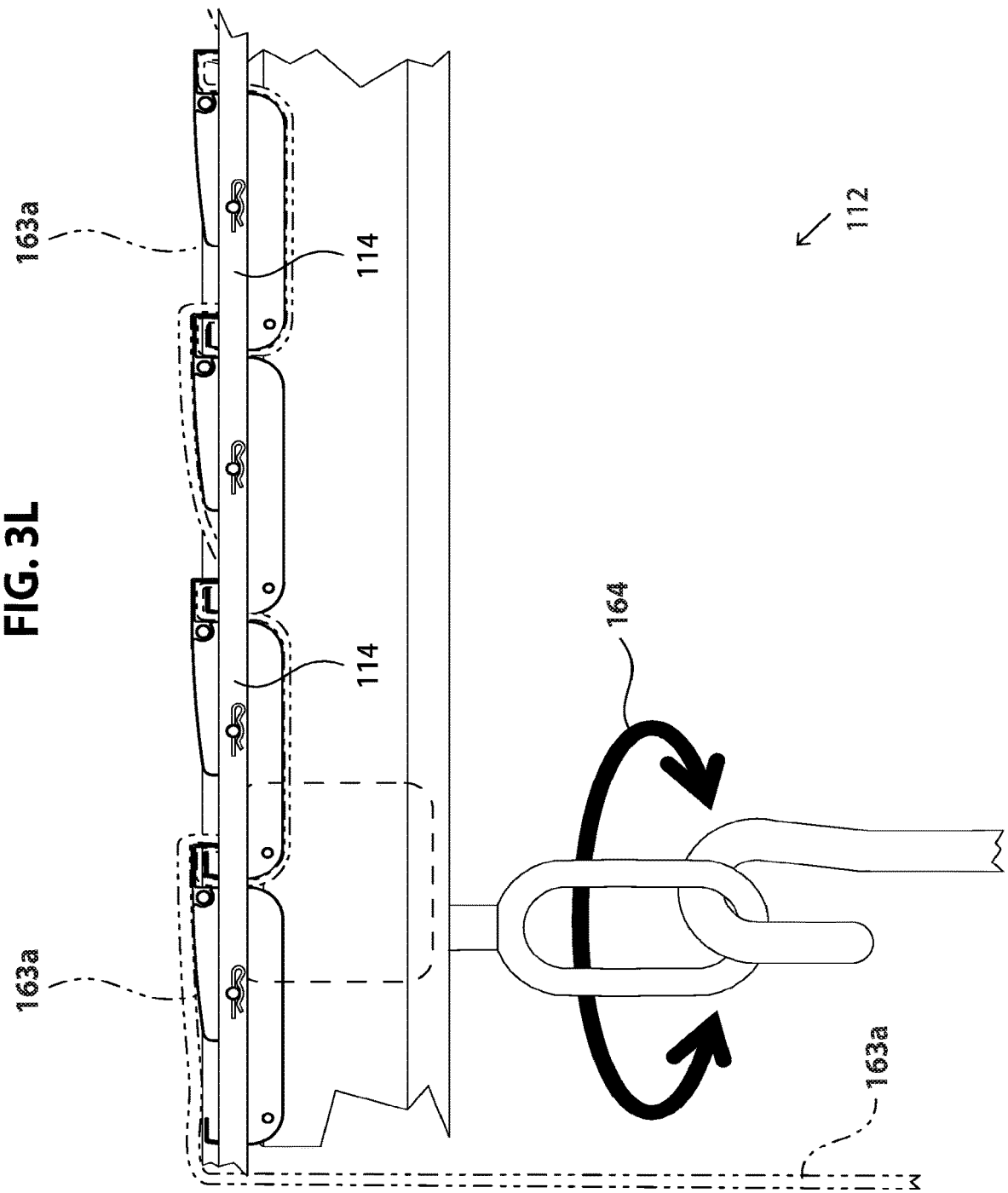

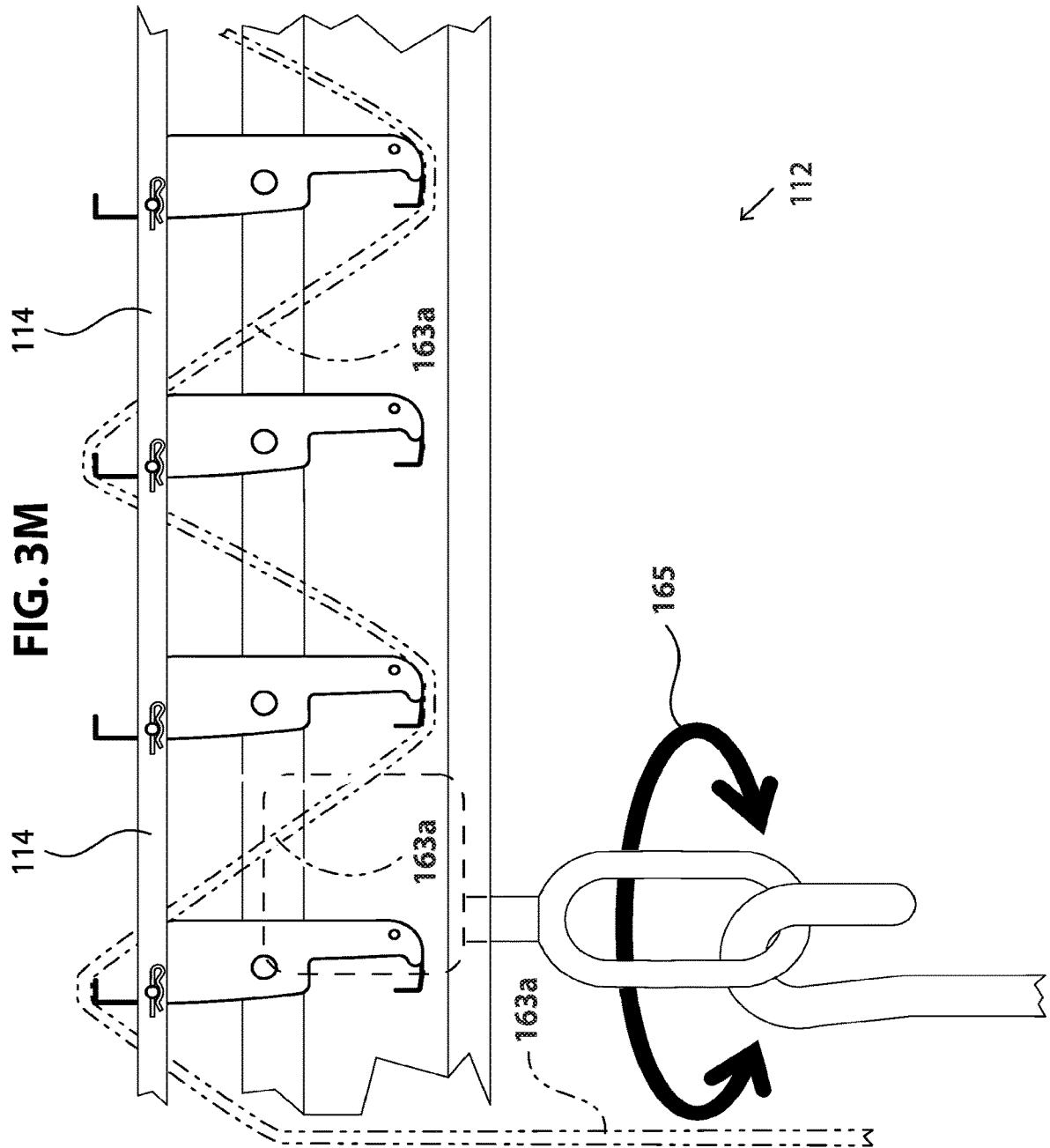

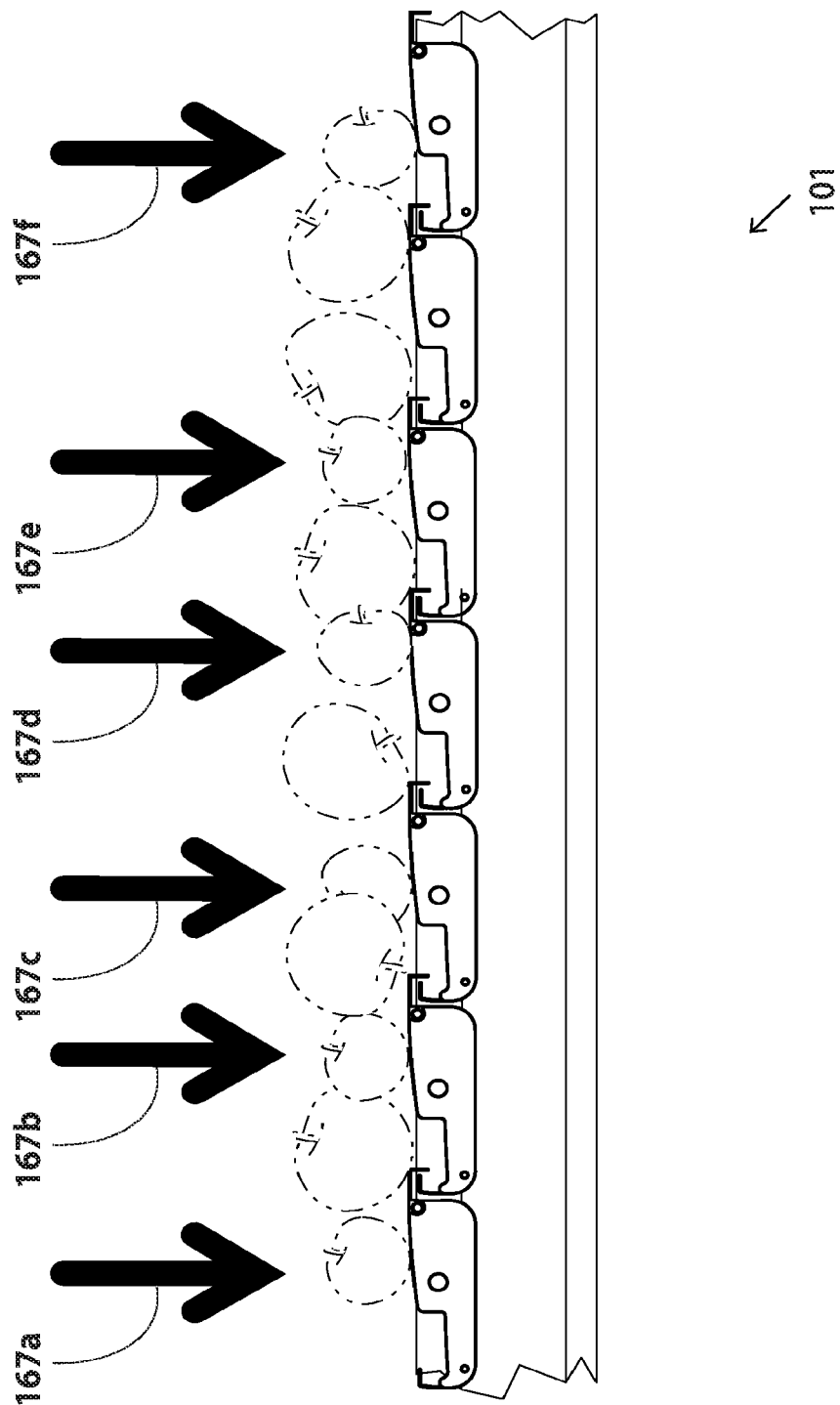

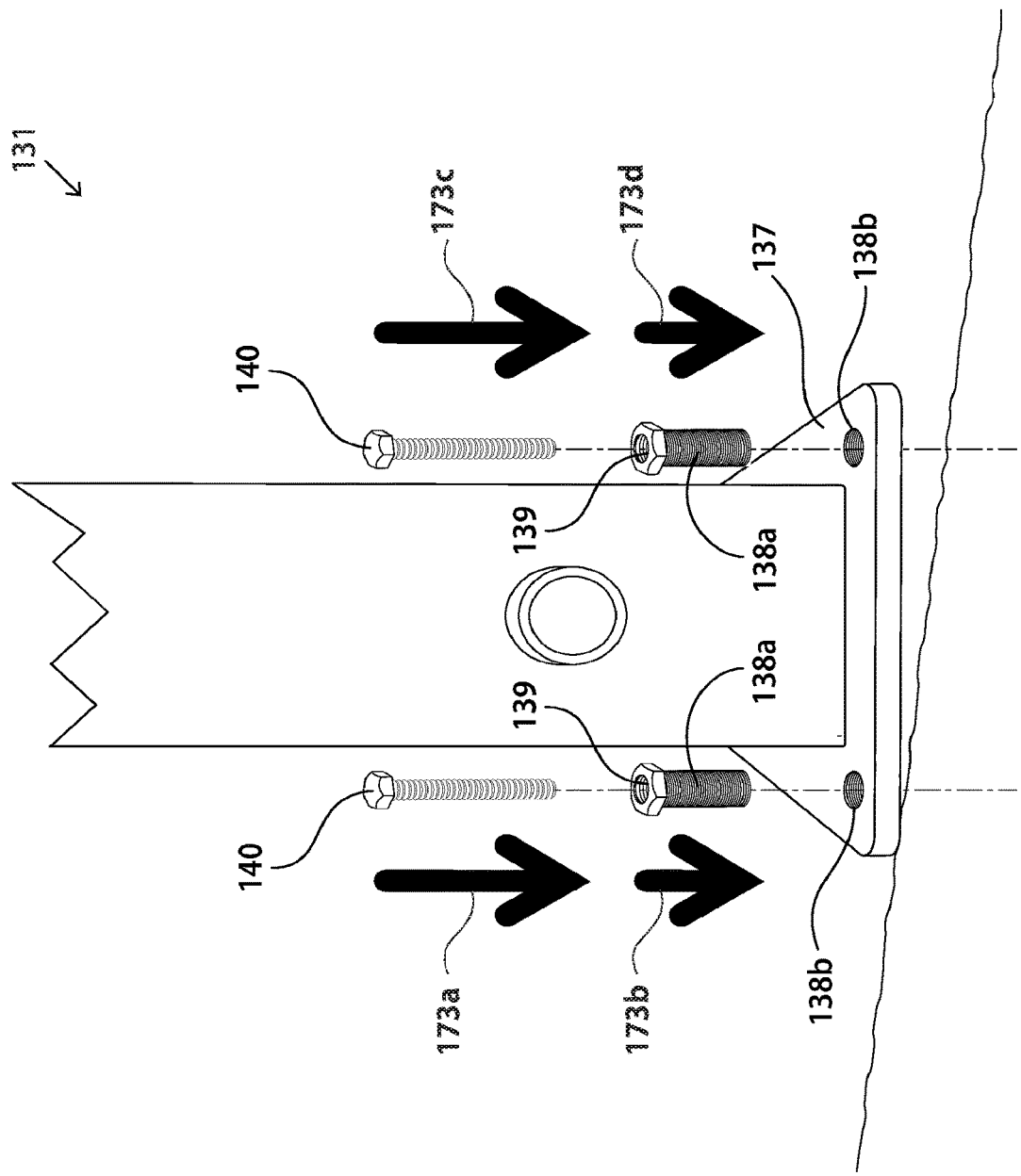

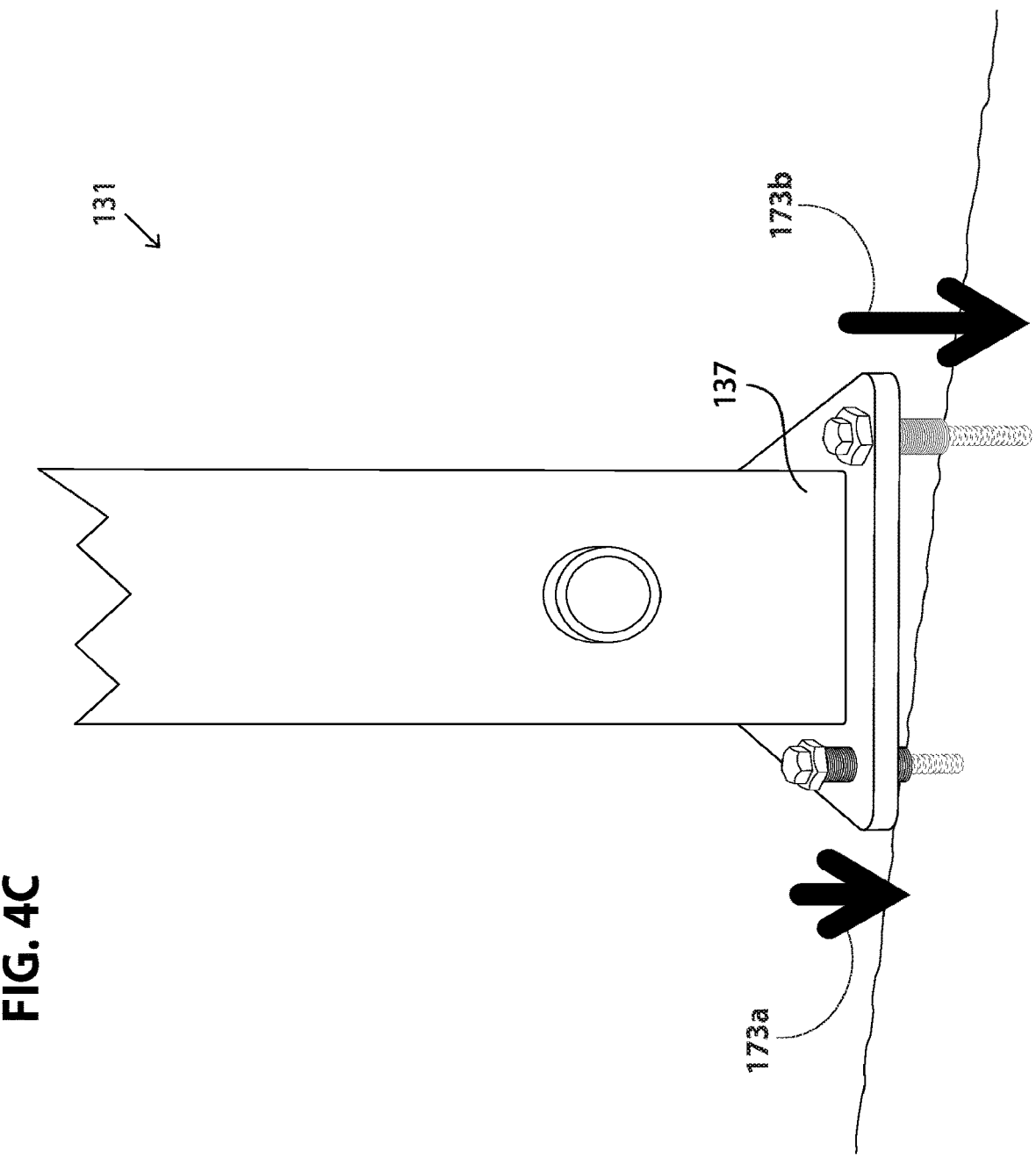

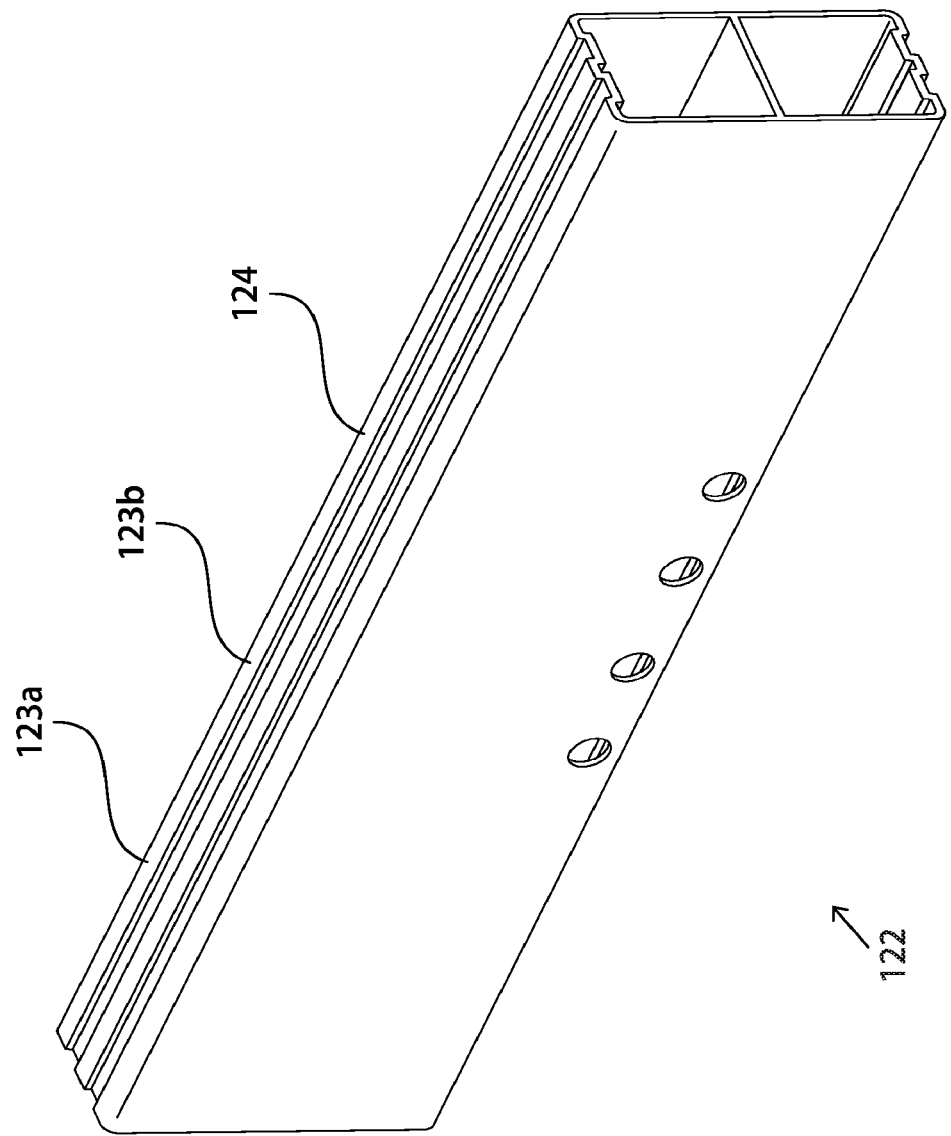

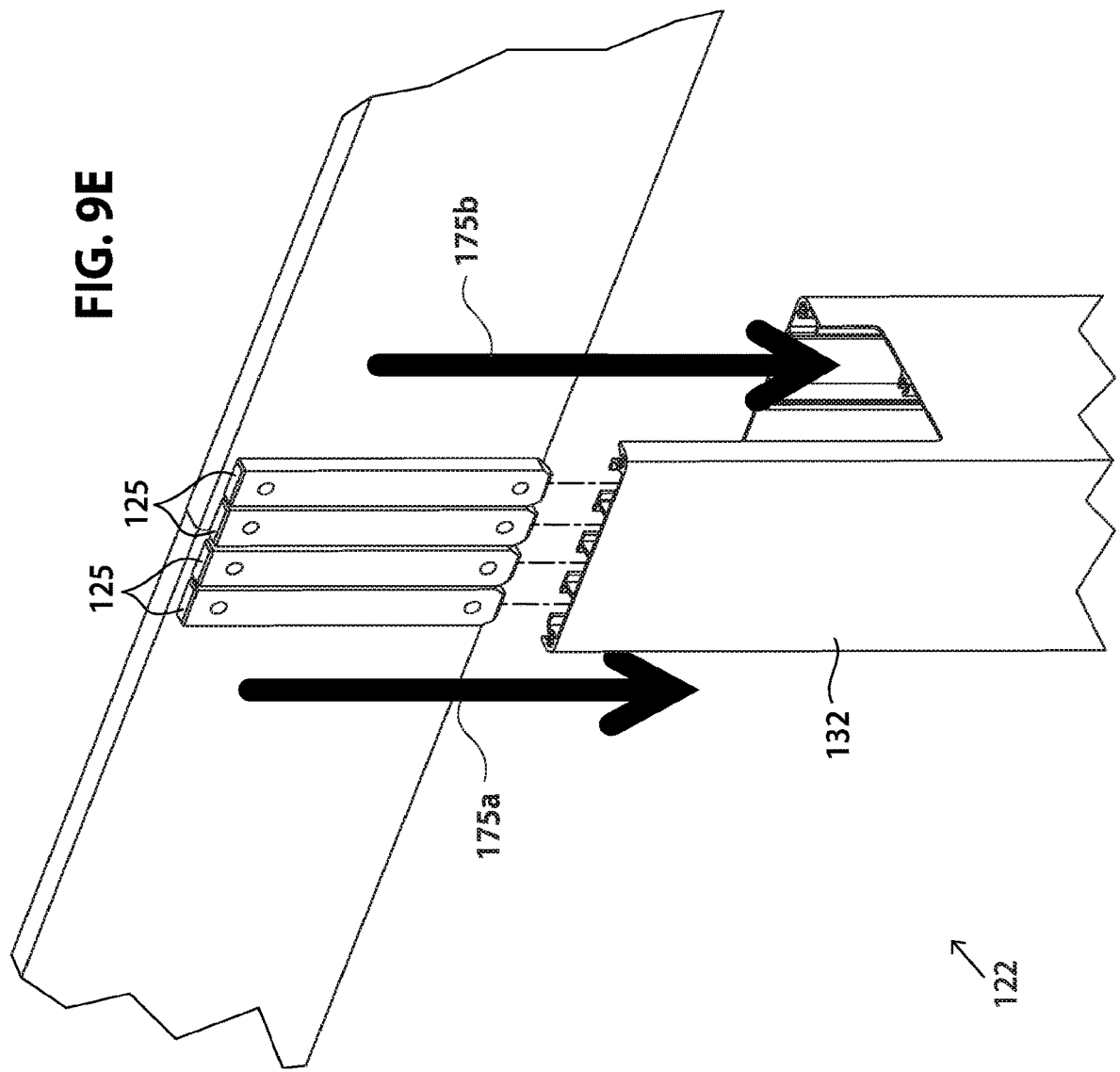

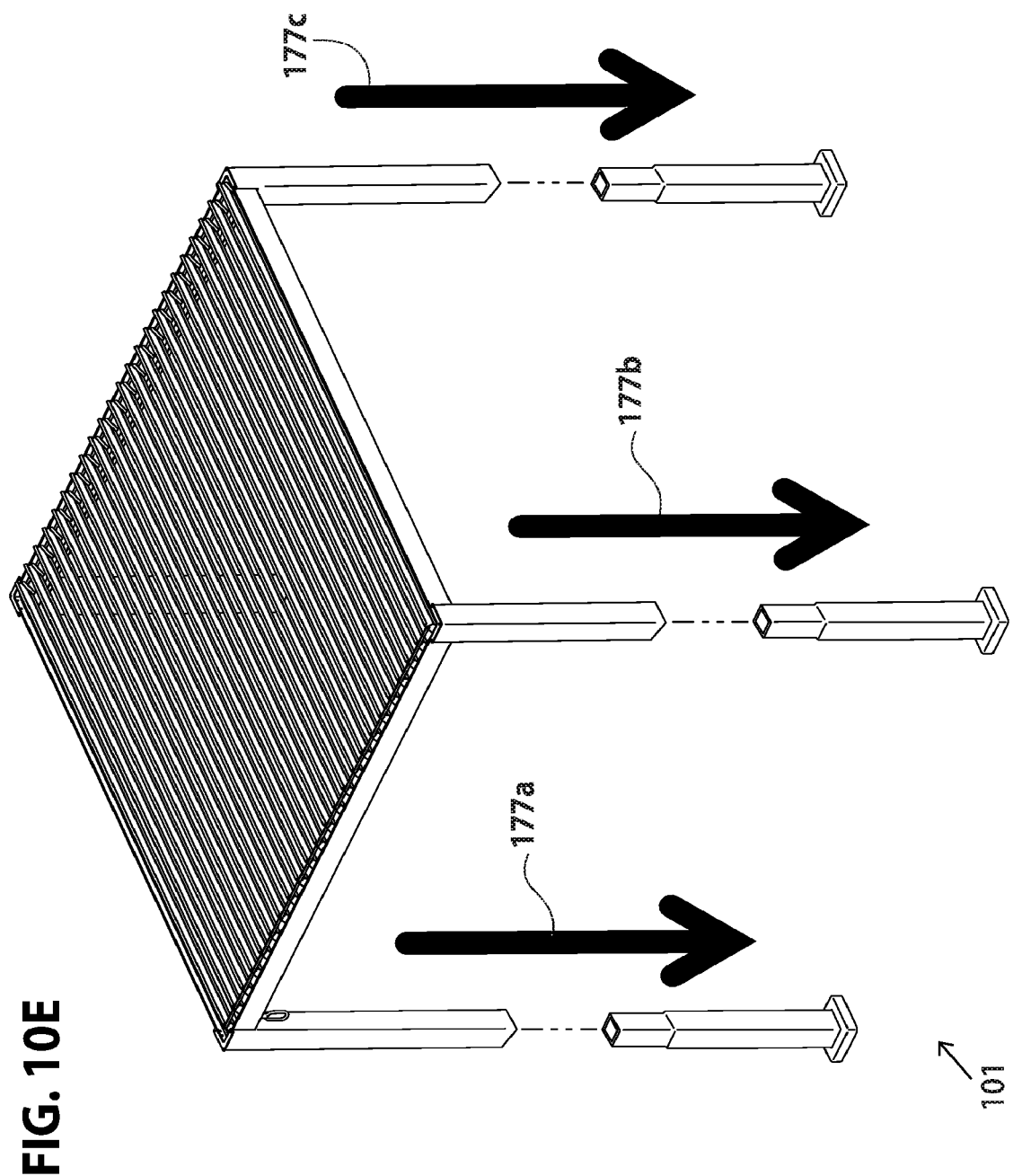

PERGOLA

CROSS-REFERENCE TO RELATED APPLICATIONS

The present application is a continuation of International Patent Application No. PCT/US20/37973, filed May 28, 2020, which claims priority to U.S. patent application Ser. No. 16/736,796, filing Jan. 7, 2020, now U.S. Pat. No. 10,851,544, both of which are hereby incorporated by reference in their entireties herein.

BACKGROUND OF THE INVENTION

The present invention relates to a pergola, which is economical to produce, is easy to ship as one unit, requires no tools, and can be quickly and easily folded and unfolded. Particularly, the present invention relates to an multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, comprising:
1) Wind-directing leaf-separating-and-discharging rainwater-sealing automatic-multi-screen-raising-and-lowering multi-screen-securing fruit-drying-and-sorting truck-bed-tonneau-covering louver-blade system,
2) Multi-louver-blade multi-position automatic-multi-screen-raising-and-lowering control system,
3) Rainwater-channeling-and-collecting and leaf-separating-and-discharging gutter-beam system, and
4) Height-and-angle-adjustable-post-and-base system.

DESCRIPTION OF THE PRIOR ART

A number of pergolas have been introduced.

U.S. Pat. No. 2,791,009, issued 1953 Apr. 16, to Wagner Charles Raymond, demonstrates an awning including spaced apart side frames each having a rafter portion and a depending terminal portion, trunnions spaced apart along the length of the rafter and terminal portions with the trunnions on one side frame in registry with those on the other side frame, louvers extending across the space between the side frames, clips on the ends of the trunnions and connected with the ends of the louvers to support the louvers in aligning registry with the trunnions, arms in fixed relation with the louvers and extending laterally of the trunnions at one end of the louvers, a link pivotally connecting all of the arms of the louvers which are carried by the rafter portions of said side frames for a link pivotally connecting all of the arms of the louvers carried by the terminal portions of the brackets to maintain the louvers transversely parallel and provide a ventilated front drop section for the awning, and means connected with one of said arms to turn the louvers of said roof section coaxially of the trunnions to close and open the louvers of the roof section while simultaneously moving the louvers of the front drop section by the interconnection of the links.

U.S. Pat. No. 3,571,973, issued 1969 May 5, to Frank D Roberts, demonstrates a closure operator to effect remote, failsafe opening and closing of a closure, particularly a single-blade or multi-blade type damper. A damper latch is attached directly to the damper to prevent momentary opening of the blades in response to transient pressures caused by wind, pressure blasts, or the like. Appropriate linkages connect the closure operator to the damper latch and to all blades to effect opening and closing as desired. In particular, the closure operator features a pivoted operator lever coupled to the damper linkages. An electromagnet carrier, including an armature latch, is driven by a motor to engage a cooperating driving arms latch pivoted on the operator lever. Engagement of the latter two latches locks the operator lever to the driven electromagnet carrier so that the lever and carrier move in unison. The carrier-controlled movement of the lever releases the damper latch and opens the damper blades. This enables immediate disengagement of the two latches; and the electromagnet carrier thus releases the operator lever to immediately close and latch securely the damper blades.

U.S. Pat. No. 3,741,102, issued 1970 Sep. 28, to S Kaiser, demonstrates a unit for ventilating an enclosure such as a poultry or livestock house is disclosed and claimed herein and includes a rectangular frame mountable within a framed opening in a wall of the enclosure for defining an air inlet opening. Negative pressure is created within the enclosure by suitable exhaust fans mounted therein and causes the flow of fresh air to pass through the inlet opening. The direction of this fresh air is controlled by a plurality of elongated adjustable louvers mounted to the frame, while a sliding door assembly independently controls the amount of air which passes through the inlet opening.

U.S. Pat. No. 3,884,414, issued 1974 Apr. 8, to Stephen C Baer, demonstrates an apparatus for maximizing the transfer of solar energy to the interior of a structure and minimizing heat loss therefrom. The apparatus includes at least one louver panel forming a portion of the exterior of the structure, the louver panel being pivotable about an axis passing through its center of gravity to open the panel. An interior reservoir is fixed to the interior surface of the panel so that the weight of the interior reservoir biases the panel in one direction to open it. An exterior reservoir is fixed to the exterior surface of the panel so that the weight of the exterior reservoir biases the panel in the opposite direction to close it. A tube provides fluid communication between the two reservoirs. A partially vaporized volatile fluid such as freon occupies the tube and the reservoirs. The relative proportions of liquid and vapor in the respective reservoirs are dependent upon the relative vapor pressure in the reservoirs, which is directly proportional to their temperatures.

U.S. Pat. No. 4,038,781, issued 1976 Mar. 19, to Richard W. Graham, demonstrates a louver assembly has a plurality of louver blades and pivot shafts pivotally supported for adjustable movement between open and closed position in a frame which includes two opposed vertical side frame members. A jamb seal between each side frame member and the adjacent ends of the louver blades prevents air flow around the ends of the blades when the blades are closed. Each jamb seal includes a panel installed between a side frame member and the transverse louver blade ends facing that side frame member. Each panel includes a rigid but flexible, substantially flat, face portion adapted for flush contact with the blade ends when the blades are closed, and two outer and two inner elongated rigid supporting ribs integral with respect to the face portion and extending away from that side of the face portion opposite the blades. Transverse slots are provided halfway through the panels to receive the louver pivot shafts as the panels are installed by sliding them between the blade ends and the side frame members.

U.S. Pat. No. 4,099,346, issued 1976 Jul. 27, to Nobujiro Isono, demonstrates a roof in which plurality of louver-type roof plates are designed to be opened and closed by means of a reciprocating connecting rod pivoted to cranks secured to said roof plates. A ratchet gear mechanism is mounted to connect with the said connecting rod through a crank shaft so that the said ratchet gear may rotate tooth by tooth to adjust the roof plates stepwise between a fully open and a fully closed condition. An accommodation for draining rainwater from the roof is disclosed, as are several designs of roof plates.

U.S. Pat. No. 4,518,012, issued 1982 Aug. 23, to Robert J. O'Hara, demonstrates an air damper assembly has a frame which is mounted on the walls of an air flow passageway, with flanges extending inwardly from at least one pair of opposed sides of the frame. A plurality of elongated damper blades have their opposite ends extending into pairs of opposed slots formed by the frame flanges, pivotally supporting the blades on the flanges for pivoting movement between open and closed positions. A pair of retaining stop means are associated with each end of each blade. These retaining stop means project outwardly from opposite sides of the blade and on opposite sides of each of the flanges for limiting pivoting movement of the blade to an open position and for retaining the blade in the respective slots in the flanges. The main body portion of each blade limits pivoting movement of the blade to a closed position by engaging opposite sides of the flanges on which the blade is pivotally supported.

U.S. Pat. No. 4,527,355, issued 1983 Feb. 24, to Hajime Numakami, and Hideyuki Kuroda, demonstrates an opening and closing type louver device comprising a louver in which a number of blades are arranged in a row in a required spaced relation on rotating shafts within a frame. Each blade is opened and closed by a driving mechanism while maintaining their parallel relation. A mounting construction of said blades and an opening and closing type louver device which can prevent slip of a ratchet as a driving mechanism to simply and accurately adjust engagement between the blades.

U.S. Pat. No. 4,926,599, issued 1989 Jan. 17, to Edward Scholz, demonstrates an improved adjustable louvered awning incorporating a simple, reliable and easy to use locking mechanism. Still another object is to provide a louvered awning locking mechanism that prevents unwanted movement of the louver vanes from their selected position when common environmental forces, such as wind and rain, are applied. A further object is to provide an improved angle adjustment mechanism for adjustable louvered awnings with means to adjust the vanes at a plurality of distinct angles plainly marked on the adjustment mechanism. Yet a further object is to provide an adjustable louvered awning that better withstands the effects of environmental forces, resulting in improved durability and a longer service life.

U.S. Pat. No. 5,020,423, issued 1990 Jul. 20, to James R. Hill, demonstrates a rotating blade damper for an air handling system, the damper having a perimetrical frame and a blade or a plurality of blades each of which is rotatable with respect to the frame between a flow permitting position and a flow blocking position. Each blade is biased toward its flow blocking position but is normally retained in its flow permitting position, for example, by a fusible link. A stop and lock mechanism is provided to stop each blade in a predetermined open or flow permitting position and to securely lock or latch each blade in its closed or flow blocking position. The stop and lock mechanism includes a disc segment which is carried by a blade rod, at a location outside of the damper frame, and a slide plate which is positioned between the damper frame and the disc segment. The slide plate is slidable with respect to the damper frame and the blade rod between a first position, corresponding to the open position of the blade.

U.S. Pat. No. 5,133,398, issued 1992 Jul. 28, to Anthony Yang, and Victor Yang, demonstrates a shutter assembly which requires minimal storing space substantially comprises a plurality of transparent or glass slats which form a shutter by being vertically suspended one after another, a storage case storing the slats in a stacked condition, the storage case being mounted on an upper part of an entrance of a building, a plurality of slat connecting devices each of which perpendicularly connects the bottom end of any succeeding slat to the upper end of any preceding slat, and brake means for applying braking force onto any one of the slats for enabling the shutter to stop at any desired height from the floor of the building. Accordingly, the shutter can be automatically stopped at any desired position from the ground or floor level thus assuring the safety of the user.

U.S. Pat. No. 5,267,414, issued 1992 Jul. 13, to George Vaida, demonstrates a louver assembly is provided which includes a frame having vertical side jambs, a head, a sill, and a central opening. A plurality of vertically-spaced, substantially-straight horizontal louver members extend across the opening between the side jambs, with each of the louver members including a closing section and an actuating section. A pivot member located between the closing section and actuating section extends across the entire louver member to provide structural strength and reinforcement of the louver members. Actuating means are attached to the actuating section of each of the louver members for actuating them between open and closed positions. Finally, the louver members are pivotally mounted off center, with the closing section being larger than the actuating section. The closing section only is exposed to the exterior, such that exterior wind conditions tend to close the louver members more tightly.

U.S. Pat. No. 5,306,210, issued 1991 Aug. 15, to Dirk V. Z. Smit, demonstrates a louvre type roof structure including a plurality of parallel slats mounted on carrier beams extending transversely to the slats, in which the slats are mounted on carrier elements which are in turn mounted on the carrier beams to permit pivotal displacement of the carrier elements and of the slats between a closed position in which they are disposed in a roughly coplanar position, and an open position in which they are disposed in spaced apart parallel planes. The carrier elements are secured to the slats by means of lugs engaging the slats without penetrating the slats. The carrier elements are mounted on the carrier beams by mounting levers, a pair of mounting levers being provided in respect of each carrier element, one of a pair of levers being a fixed lever and being secured to the carrier beam in a fixed position, and the other one being a free lever and being displaceable relative to the carrier beam.

U.S. Pat. No. 5,669,179, issued 1997 Sep. 23, to William S. Hanlon, demonstrates an improved louvered apparatus for the regulation of solar light and heat radiation through windows and the like, is disclosed. The unique configuration of the present invention is innovative, simple, and a considerable improvement over the conventional louvered apparatuses. Some of the various features of the present invention, which are described, herein, include precise very low frictional operation, apparatus is maintenance free, a compact design, uncomplicated fast two-bracket installation, available in the standard manual, or optional remote electronic actuation, and apparatus has been designed to be manufactured inexpensively.

U.S. Pat. No. 5,732,507, issued 1998 Mar. 31, to Gregory Edwards, demonstrates a louvre for a louvre assembly comprises a profile having a plurality of optionally useable pivot mounting positions each of which is selectively adapted to be utilized to mount the louvre in an assembly of adjacent louvres. Anyone of the remaining pivot mounting positions is selectively adapted to be utilized to control the pivotable orientation of the louvre in the assembly. Each louvre comprises an up-turned lip at one edge thereof and an down-turned lip at the other edge thereof. These lips serve to prevent ingress of water to the area below the assembly which forms an openable roof structure. An alternative louvre comprises a pair of like formed, elongate, resilient surface profile sections, each having disposed at opposed lateral edges thereof mutual interengagement means, which upon flexure of the respective sections during assembly results in interengagement of the sections. A prefabricated core having tapered or otherwise lateral edges is located between the surface profile sections.

U.S. Pat. No. 5,862,633, issued 1999 Jan. 26, to Lynn A. Van Ells, demonstrates an auxiliary roof for a building is provided including a building having a perimeter and a roof. A plurality of stanchions includes a pair of rear stanchions and a pair of front stanchions. Top ends of the rear stanchions have an equal height which is greater than that of the top ends of the front stanchions. A frame includes a pair of side members extending downwardly from top ends of the rear stanchions to top ends of the front stanchions. Also included is plurality of slats each defined by a pair of long edges and a pair of short edges, wherein one of the long edges of each slat is coupled between the side members of the frame in spaced parallel relationship. The slats have a raised orientation wherein the same reside at an acute angle for directing air toward the building.

U.S. Pat. No. 5,873,202, issued 1999 Feb. 23, to Charles Sherman Parks, demonstrates an improved rigid awning structure which permits some regulation of pass-through light and which may be constructed attached to a building or free standing. The invention provides slated louver sets arranged one above the other in banks of at least two sets. At least one of the louver sets in each bank is slidably movable to achieve the regulation of pass through-light. The invention may be constructed utilizing many conventional frame building methods and materials.

U.S. Pat. No. 6,202,363, issued 2001 Mar. 20, to Chao-Jen Chang, demonstrates a shielding canopy includes a fixture base mounted to a wall. A plurality of swiveling devices mounted to and equally-spaced along the fixture base. Each swiveling device rotatably supports a rotating shaft to which a panel of a predetermined width is fixed. The width of the panels substantially corresponds to a distance between adjacent swiveling devices whereby when the panels are rotated from a collapsed position where the panels substantially overlap each other to an expanded position, edges of the panels engage with each other whereby the panels together form a continuous canopy. A driving rod, actuated manually or by power, is movably supported in the fixture base. A plurality of connecting arms are pivoted to the driving rod and have free ends fixed to the rotating shafts thereby when the driving rod is moved, the panels are rotated.

U.S. Pat. No. 7,335,096, issued 2004 Aug. 23, to Haim Perez, and Emanuel Razon, demonstrates a louver type roof structure includes a plurality of elongated parallel slats mounted on slat hinges pivotally supported on carrier beams transverse to the slats. The slats are pivotable between a closed position in which their longitudinal adjacent edges overlap each other, and an open position in which the slats are spaced apart. The slat hinges are mounted to the slats at their lower surface and allow pivoting of the slats between the closed position and an extreme open position by an angle of at least 90°, preferably 110°. The pivoting axis of the slat hinge is disposed substantially under the longitudinal edge of the slat which is overlapped by the adjacent slat. The roof structure may comprise a border slat adapted to be displaced when urged by an adjacent slat when the latter pivots towards its extreme open position.

U.S. Pat. No. 8,413,389, issued 2013 Apr. 9, to Alessandro Frigerio, demonstrates an openable covering construction for pergolas and verandas, characterized in that said openable covering construction comprise a plurality of adjoining and partially over-lapping bands longitudinally mounted on a supporting frame by a driving system allowing each said bands to be rotated about a longitudinal axis thereof parallel to a sloping side of said covering construction, said driving system driving said bands to at least two positions, a closed position, thereat said bands are partially overlapped onto one another and substantially parallel to the covering construction plane, and an opened position thereat each said band is rotated to a substantially vertical condition with respect to said covering plane, each said band comprising a section member including a perpendicular side wall and, at an opposite side thereof, a channel defining curved wall, thereby a surface directly exposed to rain of said covering construction forms a water collecting and disposal of channel.

U.S. Pat. No. 8,413,705, issued 2013 Apr. 9, to Jean-Louis Castel, demonstrates an adjustable flap, designed for the production of a covering device, includes a section that is made of translucent material with length and longitudinal axis around which the flap is articulated to rotate, and at least one slat that is made of opaque material with length, that is at most equal to, and longitudinal axis, that is parallel to, around which the slat is articulated to rotate relative to the flap. An adjustable flap configured for gradually and homogeneously adjusting an amount of light and shade on a covered surface by modifying an orientation of said flap between two end positions, the two end positions being a first position in which said flap is essentially translucent, and a second position in which said flap is essentially opaque, said flap comprising a section of translucent material with a first length and a first longitudinal axis around which said flap is articulated to rotate.

U.S. Pat. No. 8,978,313, issued 2014 Apr. 4, to Antonio Pilla, demonstrates a roofing apparatus for deflecting precipitation comprises a first roofing panel movable between a retracted position and an extended position. The roofing apparatus further comprises an electrostatic charging device configured to selectively apply an electrostatic force to the first roofing panel to cause movement of the first roofing panel between the retracted position and the extended position. In another example, a method for deflecting precipitation comprises the steps of providing a first roofing panel biased by gravity and applying an electrostatic force to the first roofing panel to cause the first roofing panel to move between a retracted position and an extended position against the bias of gravity.

U.S. Pat. No. 9,157,270, issued 2015 Oct. 13, to Christopher J Hall, demonstrates a shutter for protecting an opening. The shutter comprising a plurality of horizontal curtain slats for covering the opening, wherein horizontal refers to a direction when viewing slats from a front surface, and wherein the curtain slats hang freely from a upper region of the opening; an upper transition slat movably affixed to a lower end of a first curtain slat; a lower transition slat movably affixed to an upper end of a second curtain slat; and a horizontal reinforcing member comprising at least an upper and a lower reinforcing slat, wherein the upper reinforcing slat is rotatably affixed to a lower end of the first transition slat and the lower reinforcing slat is rotatably affixed to an upper end of the second transition slat, and wherein the upper and lower reinforcing slats are rotatably joined.

U.S. Pat. No. 9,644,374, issued 2017 May 9, to Christopher J Hall, demonstrates a louver cover for a pergola, arbor and the like has pivotal elongated slat assemblies that move between an open upright position and a closed position covering the pergola. The cover is secured between upright supports and cross beams of the pergola. Each slat assembly has a pivotal shaft mounted for pivotal movement between parallel cross-beams. The pivotal shaft carries at least one slat member, which is movable between an upright position when the cover is open and a closed position when the slat assemblies extend in covering relationship over the pergola. In one embodiment, each slat assembly has a slat member with S-shaped profile, and in another embodiment the slat assembly has two mirror image slat members of J-shaped profile.

U.S. Pat. No. 10,392,821, issued 2018 Oct. 2, to Dee Volin, demonstrates a four-device-in-one splash-and-drip-eliminating gazebo comprising: a top roof, top-roof columns, top-roof mosquito-mesh panels respectively screwed to the top-roof columns, a bottom roof, respectively screwed to the top-roof columns, rain-water gutters molded to the rain-water gutters as one unit for functioning as gutters, splash-drip-eliminating eaves respectively formed at the bottom-roof end of the bottom roof for extending downward into the gutter inside to direct water downward into the gutter inside to eliminate water splash and water drip and for collecting rain water to be used for irrigation, top rails molded to the rain-water gutters as one unit for functioning as gutters and top rails at the same time, the bottom roof screwed to the rain-water gutters and the top rails, corner posts, respectively attached to the rain-water gutters and the top rails, double-U-shaped-end covers respectively slidably coupled with the corner posts, the triangular base and the four-device-in-one splash-and-drip-eliminating gazebo to the ground.

U.S. Pat. No. D293,934, issued 1988 Jan. 26, to Daryl J Lambert, Dennis J Paul, and William Chandler, depicts the ornamental design for an umbrella cap, as shown described.

U.S. Pat. No. D687,969 issued 2013 Jan. 26, to Kevin Jesse Randol, and Alicia Ann Osei, depicts the ornamental design for an umbrella cap, as shown described.

U. S. Publication No. 20040148899, issued 2004 Aug. 5, to Lawrence Pertile, describes a roof assembly, comprised of a frame and a plurality of louvers rotatably mounted within the frame, each louver having a channel running along its longitudinal axis. The assembly may also include a gutter located at one end of the frame below the louvers and running perpendicular to the longitudinal axes of the louvers. Also, the assembly further includes a mechanism for rotating the louvers from an open position to a closed position. The result is that liquid can flow along the channels in the louvers and into the gutter.

U. S. Publication No. 20130291438, issued 2013 Nov. 7, to C. Scott Selzer, describes a louvered roof assembly includes a pair of support members and several panels mounted between the support members. The panels are pivotally coupled to the support members for rotation about an axis by corresponding pivot pins. Each of the panels has a first end and a second end. One of the pivot pins is coupled to each end of the panels. A linear drive mechanism is coupled to each of the panels. The linear drive mechanism includes a track bar coupled to each of the panels and an actuator mounted to one of the support members and coupled to the track bar. The actuator is configured to move the track bar such that the panels rotate about the axis of their respective pivot pins.

The prior art have failed to solve many problems associated with such pergolas as follows:

1) No prior art mention or disclose any pergolas, having wind-directing-and-rainwater-sealing multi-screen-securing louver blades 102.

Therefore, the prior art of pergolas:

a) Can not function as a fruit sorting separator to automatically and adjustably divide the fruit according to predetermined diameters, being controlled by removable-collapsible-and-stowable automatic-multi-screen-raising-and-lowering multi-louver-control crank tool 121 in the directions of arrows 141*a* and 141*b*

(see FIG. 1N and FIG. 1O);

b) Can not control the deployment and retraction of a video projection screen (see FIG. 2C, FIG. 2D, FIG. 3H, and FIG. 3I);

c) Can not function as a tonneau cover to actuate a quick visual view of tools and other storage items within a truck bed in the directions of arrows 142*a*, 142*b*, and 142*c*

(see FIG. 2C, FIG. 2D, FIG. 10G, and FIG. 10H); and d) Can not function as an adjustable ventilating tonneau cover for pet containment to regulate the degree of louver opening while containing a pet within a truck bed, thereby regulating ventilation in the directions of arrows 143*a*, 143*b*, and 143*c* (see FIG. 2C, FIG. 10G, and FIG. 10H).

2) No prior art mention or disclose any pergolas, having wind-directing-and-rainwater-sealing multi-screen-securing louver blades 102.

Therefore, the prior art of pergolas:

a) Can not provide means to secure a mesh shade screen to regulate predetermined degrees of sun exposure (see FIG. 3J and FIG. 3K);

b) Can not function as a food dryer to predeterminatly regulate quicker or slower drying duration (see FIG. 2K, FIG. 2X, FIG. 2Y, and FIG. 3P);

c) Can not direct airflow from above wind-directing-and-rainwater-sealing multi-screen-securing louver blades 102 to below wind-directing-and-rainwater-sealing multi-screen-securing louver blades 102 to provide airflow for occupants therebelow; and d) Can not control a predetermined volume of airflow being directed from above wind-directing-and-rainwater-sealing multi-screen-securing louver blades 102 to below wind-directing-and-rainwater-sealing multi-screen-securing louver blades 102 to regulate the comfort level for occupants therebelow in the directions of arrows 144*a* and 144*b*

(see FIG. 2L, FIG. 10G, and FIG. 10H).

3) No prior art mention or disclose any pergolsa, having wind-directing-and-rainwater-sealing multi-screen-securing louver blades 102.

Therefore, the prior art of pergolas:
  a) Can not block rainwater
    to keep occupants dry therebelow
    (see FIG. 2V, FIG. 2W, and FIG. 2X);
  b) Can not block sunrays
    to protect the occupants therebelow from ultraviolet exposure
    (see FIG. 2W, and FIG. 2X);
  c) Can not control a predetermined amount of sunrays
    to regulate the occupant's exposure therebelow
    (see FIG. 2V, FIG. 2W, and FIG. 2X); and
    d) Can not function as an adjustable ventilating tonneau cover for pet containment
    to regulate the degree of louver opening while containing a pet within a truck bed, thereby regulating sun exposure.
    (see FIG. 2C, FIG. 2D, FIG. 10G, and FIG. 10H).

4) No prior art mention or disclose any pergolas, having wind-directing-and-rainwater-sealing-louver-blade multi-screen-securing leading edges 103.
Therefore, the prior art of pergolas:
  a) Can not provide a structural member on which to mount louver-blade rainwater-and-wind-sealing rattle-preventing insulation strips 104
    to thereby prevent rattling and vibration
    (see FIG. 1P, FIG. 1Q, FIG. 2B, FIG. 2E, and FIG. 2F);
  b) Can not provide a structural member on which to mount louver-blade rainwater-and-wind-sealing rattle-preventing insulation strips 104
    to create a sealed connection and limit noise transfer, thereby creating a quieter environment
    (see FIG. 2C, FIG. 2D, FIG. 2E, and FIG. 2F);
  c) Can not provide a structural member on which to mount louver-blade rainwater-and-wind-sealing rattle-preventing insulation strips 104
    to create a sealed connection and prevent rainwater leakage
    (see FIG. 2C, FIG. 2D, and FIG. 2F);
  d) Can not provide a structural member on which to mount louver-blade rainwater-and-wind-sealing rattle-preventing insulation strips 104
    to create a sealed connection and prevent sunrays to pass therethrough; and
  e) Can not enclose the upward-pointed edge of louver-blade wind- and rainwater-directing trailing edges 105
    to guide rainwater flow into louver-blade wind- and rainwater-directing trailing edges 105
    (see FIG. 1P, FIG. 1Q, FIG. 2C, FIG. 2D, and FIG. 2F).

5) No prior art mention or disclose any pergolas, having louver-blade wind- and rainwater-directing trailing edges 105.
Therefore, the prior art of pergolas:
  a) Can not releasably secure multiple projector screens thereon
    (see FIG. 2A, FIG. 2B, FIG. 3H, and FIG. 3I);
  b) Can not releasably secure both ends of sunshade thereon in horizontal or vertical position
    (see FIG. 2A, FIG. 2B, FIG. 3J, and FIG. 3K);
  c) Can not function as a C-channel
    to enclose adjacent downward-pointed edge of wind-directing-and-rainwater-sealing-louver-blade multi-screen-securing leading edges 103
    (see FIG. 2A, FIG. 2B, and FIG. 2C);
  d) Can not function as a C-channel
    to block airflow through adjacent wind-directing-and-rainwater-sealing-louver-blade multi-screen-securing leading edges 103
    (see FIG. 2A, FIG. 2B, and FIG. 2C); and
  e) Can not function as a C-channel
    to block sunrays between adjacent wind-directing-and-rainwater-sealing-louver-blade multi-screen-securing leading edges 103
    (see FIG. 2B and FIG. 2C).

6) No prior art mention or disclose any pergolas, having removable-collapsible-and-stowable automatic-multi-screen-raising-and-lowering multi-louver-control crank tool 121.
Therefore, the prior art of pergolas:
  a) Can not provide means for a person operating such
    to predeterminatly provide greater or less airflow;
  b) Can not provide means for a person operating such
    to predeterminatly provide greater or less sun exposure
    (see FIG. 1B, FIG. 1N, and FIG. 1O);
  c) Can not provide means for a person operating such
    to predeterminatly provide temperature control; and
  d) Can not provide means for a person operating such, when functioning as a food dryer
    to predeterminatly regulate quicker or slower drying duration to food
    (see FIG. 1B, FIG. 1N, and FIG. 3P).

7) No prior art mention or disclose any pergolas, having removable-collapsible-and-stowable automatic-multi-screen-raising-and-lowering multi-louver-control crank tool 121.
Therefore, the prior art of pergolas:
  a) Can not provide means for a person operating such, when functioning as a tonneau cover
    to actuate a quick visual view of tools and other storage items within a truck bed
    (see FIG. 1B, FIG. 1N, and FIG. 10H);
  b) Can not provide means for a person to raise and lower a mesh shade screen 162
    to regulate predetermined degrees of sun exposure,
    (see FIG. 1B, FIG. 1N, and FIG. 3K);
  c) Can not provide means for a person to raise and lower a projector screen to provide a retractable vertical surface for projecting video movies utilizing the multi-louver-blade multi-position automatic-multi-screen-raising-and-lowering control system 112 operating
    in the directions of arrows 148a, 148b, 148c, 148d, 149, 150a, 150b, 150c, 150d, 151a, 151b, 151c, 151d, 152, 153a, 153b, 153c, 153d, 154, 155a, 155b, 156, 157a, 157b, 158, 159a, and 159b, for screens 160a and 160b operating in the directions of arrows 161a, and 161b
    (see FIG. 2V, FIG. 2W, FIG. 2Y, FIG. 2Z, FIG. 3H, and FIG. 3I); and
  d) Can not provide means for a person to raise and lower a curtain to provide a retractable privacy screen utilizing the multi-louver-blade multi-position automatic-multi-screen-raising-and-lowering control system 112 whereby cord 163a operates a curtain 163b in the directions of arrows 148a, 148b, 148c, 148d, 149, 150a, 150b, 150c, 150d, 151a, 151b, 151c, 151d, 152, 153a, 153b, 153c, 153d, 154, 155a, 155b, 156, 157a, 157b, 158, 159, 164, 165, and 166
    (see FIG. 2V, FIG. 2W, FIG. 2Y, FIG. 2Z, FIG. 3L, FIG. 3M, FIG. 3N, and FIG. 3O).

8) No prior art mention or disclose any pergolas, having first rainwater-channeling-and-leaf-filtering side gutter beam 123a.

Therefore, the prior art of pergolas:

a) Can not function as a discrete gutter channel
to provide rainwater flow from louver-blade wind- and rainwater-directing trailing edges 105 to rainwater-draining spouts 129
(see FIG. 2L, FIG. 10G, and FIG. 10H);

b) Can not function as a horizontal structural support
to provide lateral rigidity between corner posts 132
in the directions of arrows 145*a*, 145*b*, 146*a*, and 146*b*
(see FIG. 2Q, FIG. 2R, and FIG. 2S);

c) Can not function as a structural member
to support wind-directing leaf-separating-and-discharging rainwater-sealing automatic-multi-screen-raising-and-lowering multi-screen-securing fruit-drying-and-sorting truck-bed-tonneau-covering louver-blade system
(see FIG. 2Q, FIG. 2R, FIG. 2S, and FIG. 2T);

d) Can not function as a structural member
to support louver-blade-rotation-stanchions 111*b*
(see FIG. 2Q, FIG. 2R, FIG. 2S, FIG. 2T, and FIG. 2V); and e) Can not function as a structural member
to mount multi-louver-blade multi-position automatic-multi-screen-raising-and-lowering control system 112
(see FIG. 2T, FIG. 2V, and FIG. 2X).

9) No prior art mention or disclose any pergolas, having second rainwater-channeling-and-leaf-filtering side gutter beam 123*b*.

Therefore, the prior art of pergolas:

a) Can not function as a discrete gutter channel
to provide rainwater flow from louver-blade wind- and rainwater-directing trailing edges 105 in the directions of arrows 145*a*, 145*b*, 146*a*, and 146*b*
(see FIG. 2Q, FIG. 2S, and FIG. 2T);

b) Can not function as a structural member
to support louver-blade-rotation cradle axels 109
(see FIG. 2V and FIG. 2W);

c) Can not function as a horizontal structural support
to provide lateral rigidity between corner posts 132;

d) Can not function as a structural member
to support wind-directing leaf-separating-and-discharging rainwater-sealing automatic-multi-screen-raising-and-lowering multi-screen-securing fruit-drying-and-sorting truck-bed-tonneau-covering louver-blade system
(see FIG. 2Q, FIG. 2S, and FIG. 2T); and e) Can not function as a structural member
to support louver-blade-rotation cradle axels 109
(see FIG. 2L and FIG. 2N).

10) No prior art mention or disclose any pergolas, having rainwater-channeling-and-leaf-filtering end gutter beams 124.

Therefore, the prior art of pergolas:

a) Can not function as a discrete gutter channel
to provide rainwater flow from louver-blade wind- and rainwater-directing trailing edges 105 to first rainwater-channeling-and-leaf-filtering side gutter beam 123*a*
(see FIG. 2Q, FIG. 2S, and FIG. 2T);

b) Can not function as a airflow blocker
to provide a physical means to block airflow with overlapping adjacent wind-directing-and-rainwater-sealing multi-screen-securing louver blade 102
(see FIG. 2C, FIG. 2V, and FIG. 2X);

c) Can not function as a airflow regulator
to provide a physical means to regulate the volume of airflow with overlapping adjacent wind-directing-and-rainwater-sealing multi-screen-securing louver blade 102
(see FIG. 2V and FIG. 2X); and d) Can not function as a sunlight blocker
to provide a physical means to block sunlight with overlapping adjacent wind-directing-and-rainwater-sealing multi-screen-securing louver blade 102
(see FIG. 2C, FIG. 2V, and FIG. 2X).

11) No prior art mention or disclose any pergolas, having rainwater-channeling-and-leaf-filtering end gutter beams 124.

Therefore, the prior art of pergolas:

a) Can not function as a sunlight regulator
to provide a physical means to regulate the exposure of sunlight with overlapping adjacent wind-directing-and-rainwater-sealing multi-screen-securing louver blade 102
(see FIG. 2C, FIG. 2V, and FIG. 2X);

b) Can not function as a food drying duration regulator
to provide a physical means to regulate the volume of airflow with overlapping adjacent wind-directing-and-rainwater-sealing multi-screen-securing louver blade 102 being operated by multi-louver-blade multi-position automatic-multi-screen-raising-and-lowering control system 112 in the directions of arrows 167*a*, 167*b*, 167*c*, 167*d*, 167*e*, 167*f*, 168*a*, 168*b*, 168*c*, 168*d*, 168*e*, 168*f*, 169*a*, 169*b*, 169*c*, 169*d*, 169*e*, and 169*f*, for drying and sorting
(see FIG. 3P, FIG. 3Q, and FIG. 3R);

c) Can not function as a horizontal structural support
to provide a mechanical connection and lateral rigidity between corner posts 132; and d) Can not function as a structural member
to support to wind-directing leaf-separating-and-discharging rainwater-sealing automatic-multi-screen-raising-and-lowering multi-screen-securing fruit-drying-and-sorting truck-bed-tonneau-covering louver-blade system.

12) No prior art mention or disclose any pergolas, having leaf-separating-and-discharging rainwater gutters 126.

Therefore, the prior art of pergolas:

a) Can not separate out leaves
to separate the water from leaves as it flows through the leaf-separating-and-discharging rainwater gutters 126
(see FIG. 2S, FIG. 2T, FIG. 3S, and FIG. 3T);

b) Can not filter rainwater
to flow through the leaf-separating-and-discharging rainwater gutters 126 without clogging up with debri
(see FIG. 2S, FIG. 2T, FIG. 3S, and FIG. 3T);

c) Can not provide rainwater channels that are hidden
to be visually unseen nestled behind the first rainwater-channeling-and-leaf-filtering side gutter beam 123*a*, second rainwater-channeling-and-leaf-filtering side gutter beam 123*b*, and rainwater-channeling-and-leaf-filtering end gutter beams 124
(see FIG. 1B, FIG. 1E, FIG. 3S, and FIG. 3T);

d) Can not provide channels for rainwater to flow
to lead rainwater away from areas that would get occupants wet in the directions of arrows 170*a*, 170*b*, 170*c*, 171*a*, 171*b*, and 171*c*
(see FIG. 1B, FIG. 1E, FIG. 3S, and FIG. 3T);

e) Can not provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and f) Can not provide channels for rainwater
to exit at the lowest point of rainwater-channeling-and-collecting and leaf-separating-and-discharging gutter-beam system 122 as to be externally manageable for rainwater flow out of the pergola area.

13) No prior art mention or disclose any pergolas, having leaf-separating-and-discharging opening 127*b*.

Therefore, the prior art of pergolas:
  a) Can not separate out leaves
to separate the water from leaves as it flows through the leaf-separating-and-discharging rainwater gutters 126 in the directions of arrows 170a, 170b, 170c, 171a, 171b, and 171c
(see FIG. 1B, FIG. 1E, FIG. 3S, and FIG. 3T);
  b) Can not filter rainwater
to flow through the leaf-separating-and-discharging rainwater gutters 126 without clogging up the system with debri;
  c) Can not separately and downwardly direct the flow of leaves and debri to angle the flow of leaves and debri toward the ground to obscure the messy build-up and appearance on the frame structure
in the directions of arrows 171a, 171b, 171c, 172a, 172b, and 172c
(see FIG. 1B, FIG. 1E, FIG. 3S, and FIG. 3T);
  d) Can not clear out the paths of waterflow
to prevent build-up of deposit the leaves and debri leaf-separating-and-discharging rainwater gutters 126; and
  e) Can not discharge leaves out of corner posts 132
to expel the leaves and debri outside of the leaf-separating-and-discharging rainwater gutters 126
in the directions of arrows 171a, 171b, and 171c
(see FIG. 1B, FIG. 1E, FIG. 3S, and FIG. 3T).

14) No prior art mention or disclose any pergolas, having leaf-separating-and-discharging tubes 128.
Therefore, the prior art of pergolas:
  a) Can not separate out leaves
to separate the water from leaves as it flows through the leaf-separating-and-discharging rainwater gutters 126 in the directions of arrows 170a, 170b, 170c, 171a, 171b, 171c, 172a, 172b, and 172c
(see FIG. 1B, FIG. 1E, FIG. 3S, and FIG. 3T);
  b) Can not filter rainwater
to flow through the leaf-separating- and discharging rainwater gutters 126 without clogging up the system with debris
in the directions of arrows 170a, 170b, 170c, 171a, 171b, and 171c
(see FIG. 1E, FIG. 3S, and FIG. 3T);
  c) Can not direct rainwater to flow
to lead rainwater away from areas that would get occupants wet;
  d) Can not provide rainwater channels that are hidden to be visually unseen inside of corner posts 132 (see FIG. 1E, FIG. 3S, and FIG. 3T);
  e) Can not provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and
  f) Can not provide channels for rainwater
to exit at the lowest point of rainwater-channeling-and-collecting and leaf-separating-and-discharging gutter-beam system 122 as to be externally manageable for rainwater flow out of the pergola area.

15) No prior art mention or disclose any pergolas, having height-and-angle-adjustable internally-externally-threaded tube screws 138a.
Therefore, the prior art of pergolas:
  a) Can not screw through corner-post base plates 137 (see FIG. 4A, FIG. 4B, and FIG. 4C);
  b) Can not secure each corner-post base plates 137 to corner posts 132;
  c) Can not provide independent vertical adjustment to each corner of each corner-post base plates 137
to compensate for uneven surfaces; and
  d) Can not provide vertical adjustment for each corner-post base plate 137 to level out each corner of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola
(see FIG. 4A, FIG. 4B, and FIG. 4C).

OBJECTS AND ADVANTAGES OF THE INVENTION

The present invention substantially departs from the conventional concepts and designs of the prior art. In doing so, the present invention provides a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola (having: a) Wind-directing leaf-separating-and-discharging rainwater-sealing automatic-multi-screen-raising-and-lowering multi-screen-securing fruit-drying-and-sorting truck-bed-tonneau-covering louver-blade system, b) Multi-louver-blade multi-position automatic-multi-screen-raising-and-lowering control system, c) Rainwater-channeling-and-colleting and leaf-separating-and-discharging gutter-beam system, and d) Height-and-angle-adjustable-post-and-base system), having many new and significant features, functions, and advantages, which overcome all the disadvantages of the prior art, as follows:

1) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102.
Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
  a) Can function as a fruit sorting separator
to automatically and adjustably divide the fruit according to predetermined diameters, being controlled by removable-collapsible-and-stowable automatic-multi-screen-raising-and-lowering multi-louver-control crank tool 121
in the directions of arrows 141a and 141b
(see FIG. 1N and FIG. 1O);
  b) Can control the deployment and retraction of a video projection screen
(see FIG. 2C, FIG. 2D, FIG. 3H, and FIG. 3I);
  c) Can function as a tonneau cover
to actuate a quick visual view of tools and other storage items within a truck bed in the directions of arrows 142a, 142b, and 142c
(see FIG. 2C, FIG. 2D, FIG. 10G, and FIG. 10H); and
  d) Can function as an adjustable ventilating tonneau cover for pet containment to regulate the degree of louver opening while containing a pet within a truck bed, thereby regulating ventilation
in the directions of arrows 143*a*, 143*b*, and 143*c*
(see FIG. 2C, FIG. 10G, and FIG. 10H).

2) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102. Therefore, the
multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide means to secure a mesh shade screen
to regulate predetermined degrees of sun exposure
(see FIG. 3J and FIG. 3K);

b) Can function as a food dryer
to predeterminatly regulate quicker or slower drying duration
(see FIG. 2K, FIG. 2X, FIG. 2Y, and FIG. 3P);

c) Can direct airflow from above wind-directing-and-rainwater-sealing multi-screen-securing louver blades 102 to below wind-directing-and-rainwater-sealing multi-screen-securing louver blades 102
to provide airflow for occupants therebelow; and d) Can control a predetermined volume of airflow being directed from above wind-directing-and-rainwater-sealing multi-screen-securing louver blades 102 to below wind-directing-and-rainwater-sealing multi-screen-securing louver blades 102
to regulate the comfort level for occupants therebelow
in the directions of arrows 144*a* and 144*b*
(see FIG. 2L, FIG. 10G, and FIG. 10H).

3) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102.
Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can block rainwater
to keep occupants dry therebelow
(see FIG. 2V, FIG. 2W, and FIG. 2X);

b) Can block sunrays
to protect the occupants therebelow from ultraviolet exposure
(see FIG. 2W, and FIG. 2X);

c) Can control a predetermined amount of sunrays
to regulate the occupant's exposure therebelow
(see FIG. 2V, FIG. 2W, and FIG. 2X); and d) Can function as an adjustable ventilating tonneau cover for pet containment to regulate the degree of louver opening while containing a pet within a truck bed, thereby regulating sun exposure.
(see FIG. 2C, FIG. 2D, FIG. 10G, and FIG. 10H).

4) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing-louver-blade multi-screen-securing leading edges 103.
Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide a structural member on which to mount louver-blade rainwater-and-wind-sealing rattle-preventing insulation strips 104
to thereby prevent rattling and vibration
(see FIG. 1P, FIG. 1Q, FIG. 2B, FIG. 2E, and FIG. 2F);

b) Can provide a structural member on which to mount louver-blade rainwater-and-wind-sealing rattle-preventing insulation strips 104
to create a sealed connection and limit noise transfer, thereby creating a quieter environment
(see FIG. 2C, FIG. 2D, FIG. 2E, and FIG. 2F);

c) Can provide a structural member on which to mount louver-blade rainwater-and-wind-sealing rattle-preventing insulation strips 104
to create a sealed connection and prevent rainwater leakage
(see FIG. 2C, FIG. 2D, and FIG. 2F);

d) Can provide a structural member on which to mount louver-blade rainwater-and-wind-sealing rattle-preventing insulation strips 104
to create a sealed connection and prevent sunrays to pass therethrough; and e) Can enclose the upward-pointed edge of louver-blade wind- and rainwater-directing trailing edges 105
to guide rainwater flow into louver-blade wind- and rainwater-directing trailing edges 105
(see FIG. 1P, FIG. 1Q, FIG. 2C, FIG. 2D, and FIG. 2F).

5) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having louver-blade wind- and rainwater-directing trailing edges 105.
Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can releasably secure multiple projector screens thereon
(see FIG. 2A, FIG. 2B, FIG. 3H, and FIG. 3I);

b) Can releasably secure both ends of sunshade thereon in horizontal or vertical position
(see FIG. 2A, FIG. 2B, FIG. 3J, and FIG. 3K);

c) Can function as a C-channel
to enclose adjacent downward-pointed edge of wind-directing-and-rainwater-sealing-louver-blade multi-screen-securing leading edges 103

(see FIG. 2A, FIG. 2B, and FIG. 2C);
    d) Can function as a C-channel
to block airflow through adjacent wind-directing-and-rainwater-sealing-louver-blade multi-screen-securing leading edges 103
(see FIG. 2A, FIG. 2B, and FIG. 2C); and
    e) Can function as a C-channel
to block sunrays between adjacent wind-directing-and-rainwater-sealing-louver-blade multi-screen-securing leading edges 103
(see FIG. 2B and FIG. 2C).

6) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having removable-collapsible-and-stowable automatic-multi-screen-raising-and-lowering multi-louver-control crank tool 121.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide means for a person operating such
to predeterminatly provide greater or less airflow;
    b) Can provide means for a person operating such
to predeterminatly provide greater or less sun exposure
(see FIG. 1B, FIG. 1N, and FIG. 1O);
    c) Can provide means for a person operating such
to predeterminatly provide temperature control; and
        d) Can provide means for a person operating such, when functioning as a food dryer
to predeterminatly regulate quicker or slower drying duration to food
(see FIG. 1B, FIG. 1N, and FIG. 3P).

7) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having removable-collapsible-and-stowable automatic-multi-screen-raising-and-lowering multi-louver-control crank tool 121.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide means for a person operating such, when functioning as a tonneau cover
to actuate a quick visual view of tools and other storage items within a truck bed
(see FIG. 1B, FIG. 1N, and FIG. 10H);
    b) Can provide means for a person to raise and lower a mesh shade screen 162 to regulate predetermined degrees of sun exposure,
(see FIG. 1B, FIG. 1N, and FIG. 3K);
    c) Can provide means for a person to raise and lower a projector screen to provide a retractable vertical surface for projecting video movies utilizing the multi-louver-blade multi-position automatic-multi-screen-raising-and-lowering control system 112 operating in the directions of arrows 148*a*, 148*b*, 148*c*, 148*d*, 149, 150*a*, 150*b*, 150*c*, 150*d*, 151*a*, 151*b*, 151*c*, 151*d*, 152, 153*a*, 153*b*, 153*c*, 153*d*, 154, 155*a*, 155*b*, 156, 157*a*, 157*b*, 158, 159*a*, and 159*b*, for screens 160*a* and 160*b* operating in the directions of arrows 161*a*, and 161*b*
(see FIG. 2V, FIG. 2W, FIG. 2Y, FIG. 2Z, FIG. 3H, and FIG. 3I); and
        d) Can provide means for a person to raise and lower a curtain to provide a retractable privacy screen utilizing the multi-louver-blade multi-position automatic-multi-screen-raising-and-lowering control system 112 whereby cord 163*a* operates a curtain 163*b* in the directions of arrows 148*a*, 148*b*, 148*c*, 148*d*, 149, 150*a*, 150*b*, 150*c*, 150*d*, 151*a*, 151*b*, 151*c*, 151*d*, 152, 153*a*, 153*b*, 153*c*, 153*d*, 154, 155*a*, 155*b*, 156, 157*a*, 157*b*, 158, 159, 164, 165, and 166
(see FIG. 2V, FIG. 2W, FIG. 2Y, FIG. 2Z, FIG. 3L, FIG. 3M, FIG. 3N, and FIG. 3O).

8) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having first rainwater-channeling-and-leaf-filtering side gutter beam 123*a*.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can function as a discrete gutter channel
to provide rainwater flow from louver-blade wind- and rainwater-directing trailing edges 105 to rainwater-draining spouts 129
(see FIG. 2L, FIG. 10G, and FIG. 10H);
    b) Can function as a horizontal structural support
to provide lateral rigidity between corner posts 132
in the directions of arrows 145*a*, 145*b*, 146*a*, and 146*b*
(see FIG. 2Q, FIG. 2R, and FIG. 2S);
    c) Can function as a structural member
to support wind-directing leaf-separating-and-discharging rainwater-sealing automatic-multi-screen-raising-and-lowering multi-screen-securing fruit-drying-and-sorting truck-bed-tonneau-covering louver-blade system
(see FIG. 2Q, FIG. 2R, FIG. 2S, and FIG. 2T);
    d) Can function as a structural member
to support louver-blade-rotation-stanchions 111*b*
(see FIG. 2Q, FIG. 2R, FIG. 2S, FIG. 2T, and FIG. 2V); and
    e) Can function as a structural member
to mount multi-louver-blade multi-position automatic-multi-screen-raising-and-lowering control system 112
(see FIG. 2T, FIG. 2V, and FIG. 2X).

9) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having second rainwater-channeling-and-leaf-filtering side gutter beam 123*b*.

Therefore, the multi-function wind-directing leaf-separating-and-discharging rainwater-sealing automatic-multi-screen-raising-and-lowering multi-screen-securing fruitdrying-and-sorting truck-tonneau-covering rainwater-channeling-and-collecting leaf-filtering height-and-angle-adjustable louvered pergola:

a) Can function as a discrete gutter channel
to provide rainwater flow from louver-blade wind- and rainwater-directing trailing edges 105 in the directions of arrows 145a, 145b, 146a, and 146b (see FIG. 2Q, FIG. 2S, and FIG. 2T);

b) Can function as a structural member
to support louver-blade-rotation cradle axels 109
(see FIG. 2V and FIG. 2W);

c) Can function as a horizontal structural support
to provide lateral rigidity between corner posts 132;

d) Can function as a structural member
to support wind-directing leaf-separating-and-discharging rainwater-sealing automatic-multi-screen-raising-and-lowering multi-screen-securing fruit-drying-and-sorting truck-bed-tonneau-covering louver-blade system
(see FIG. 2Q, FIG. 2S, and FIG. 2T); and e) Can function as a structural member
to support louver-blade-rotation cradle axels 109
(see FIG. 2L and FIG. 2N).

10) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having rainwater-channeling-and-leaf-filtering end gutter beams 124.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can function as a discrete gutter channel
to provide rainwater flow from louver-blade wind- and rainwater-directing trailing edges 105 to first rainwater-channeling-and-leaf-filtering side gutter beam 123a
(see FIG. 2Q, FIG. 2S, and FIG. 2T);

b) Can function as a airflow blocker
to provide a physical means to block airflow with overlapping adjacent wind-directing-and-rainwater-sealing multi-screen-securing louver blade 102
(see FIG. 2C, FIG. 2V, and FIG. 2X);

c) Can function as a airflow regulator
to provide a physical means to regulate the volume of airflow with overlapping adjacent wind-directing-and-rainwater-sealing multi-screen-securing louver blade 102
(see FIG. 2V and FIG. 2X); and d) Can function as a sunlight blocker
to provide a physical means to block sunlight with overlapping adjacent wind-directing-and-rainwater-sealing multi-screen-securing louver blade 102
(see FIG. 2C, FIG. 2V, and FIG. 2X).

11) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having rainwater-channeling-and-leaf-filtering end gutter beams 124.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can function as a sunlight regulator
to provide a physical means to regulate the exposure of sunlight with overlapping adjacent wind-directing-and-rainwater-sealing multi-screen-securing louver blade 102
(see FIG. 2C, FIG. 2V, and FIG. 2X);

b) Can function as a food drying duration regulator
to provide a physical means to regulate the volume of airflow with overlapping adjacent wind-directing-and-rainwater-sealing multi-screen-securing louver blade 102 being operated by multi-louver-blade multi-position automatic-multi-screen-raising-and-lowering control system 112 in the directions of arrows 167a, 167b, 167c, 167d, 167e, 167f, 168a, 168b, 168c, 168d, 168e, 168f, 169a, 169b, 169c, 169d, 169e, and 169f, for drying and sorting
(see FIG. 3P, FIG. 3Q, and FIG. 3R);

c) Can function as a horizontal structural support
to provide a mechanical connection and lateral rigidity between corner posts 132; and d) Can function as a structural member
to support to wind-directing leaf-separating-and-discharging rainwater-sealing automatic-multi-screen-raising-and-lowering multi-screen-securing fruit-drying-and-sorting truck-bed-tonneau-covering louver-blade system.

12) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging rainwater gutters 126.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can separate out leaves
to separate the water from leaves as it flows through the leaf-separating-and-discharging rainwater gutters 126
(see FIG. 2S, FIG. 2T, FIG. 3S, and FIG. 3T);

b) Can filter rainwater
to flow through the leaf-separating-and-discharging rainwater gutters 126 without clogging up with debri
(see FIG. 2S, FIG. 2T, FIG. 3S, and FIG. 3T);

c) Can provide rainwater channels that are hidden
to be visually unseen nestled behind the first rainwater-channeling-and-leaf-filtering side gutter beam 123a, second rainwater-channeling-and-leaf-filtering side gutter beam 123b, and rainwater-channeling-and-leaf-filtering end gutter beams 124
(see FIG. 1B, FIG. 1E, FIG. 3S, and FIG. 3T);

d) Can provide channels for rainwater to flow
to lead rainwater away from areas that would get occupants wet in the directions of arrows 170a, 170b, 170c, 171a, 171b, and 171c
(see FIG. 1B, FIG. 1E, FIG. 3S, and FIG. 3T);

e) Can provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and f) Can provide channels for rainwater to exit at the lowest point of rainwater-channeling-and-collecting and leaf-separating-and-discharging gutter-beam system 122 as to be externally manageable for rainwater flow out of the pergola area.

13) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging opening 127*b*. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can separate out leaves
to separate the water from leaves as it flows through the leaf-separating-and-discharging rainwater gutters 126
in the directions of arrows 170*a*, 170*b*, 170*c*, 171*a*, 171*b*, and 171*c*
(see FIG. 1B, FIG. 1E, FIG. 3S, and FIG. 3T);

b) Can filter rainwater
to flow through the leaf-separating-and-discharging rainwater gutters 126 without clogging up the system with debri;

c) Can separately and downwardly direct the flow of leaves and debri
to angle the flow of leaves and debri toward the ground to obscure the messy build-up and appearance on the frame structure
in the directions of arrows 171*a*, 171*b*, 171*c*, 172*a*, 172*b*, and 172*c*
(see FIG. 1B, FIG. 1E, FIG. 3S, and FIG. 3T);

d) Can clear out the paths of waterflow
to prevent build-up of deposit the leaves and debri leaf-separating-and-discharging rainwater gutters 126; and e) Can discharge leaves out of corner posts 132
to expel the leaves and debri outside of the leaf-separating-and-discharging rainwater gutters 126
in the directions of arrows 171*a*, 171*b*, and 171*c*
(see FIG. 1B, FIG. 1E, FIG. 3S, and FIG. 3T).

14) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging tubes 128. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can separate out leaves
to separate the water from leaves as it flows through the leaf-separating-and-discharging rainwater gutters 126
in the directions of arrows 170*a*, 170*b*, 170*c*, 171*a*, 171*b*, 171*c*, 172*a*, 172*b*, and 172*c*
(see FIG. 1B, FIG. 1E, FIG. 3S, and FIG. 3T);

b) Can filter rainwater
to flow through the leaf-separating- and discharging rainwater gutters 126 without clogging up the system with debris in the directions of arrows 170*a*, 170*b*, 170*c*, 171*a*, 171*b*, and 171*c*
(see FIG. 1E, FIG. 3S, and FIG. 3T);

c) Can direct rainwater to flow
to lead rainwater away from areas that would get occupants wet;

d) Can provide rainwater channels that are hidden to be visually unseen inside of corner posts 132 (see FIG. 1E, FIG. 3S, and FIG. 3T);

e) Can provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and f) Can provide channels for rainwater
to exit at the lowest point of rainwater-channeling-and-collecting and leaf-separating-and-discharging gutter-beam system 122 as to be externally manageable for rainwater flow out of the pergola area.

15) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having height-and-angle-adjustable internally-externally-threaded tube screws 138*a*.
Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can screw through corner-post base plates 137
(see FIG. 4A, FIG. 4B, and FIG. 4C);

b) Can secure each corner-post base plates 137 to corner posts 132;

c) Can provide independent vertical adjustment to each corner of each corner-post base plates 137
to compensate for uneven surfaces; and d) Can provide vertical adjustment for each corner-post base plate 137 to level out each corner of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola
(see FIG. 4A, FIG. 4B, and FIG. 4C).

Other objects and advantages of the present invention will become apparent from a consideration of the accompanying drawings and ensuing description.

BRIEF SUMMARY OF THE INVENTION

A multi-function wind-directing rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola comprises: opposing end caps, wind-directing-and-rainwater-sealing-louver-blade multi-screen-securing leading and trailing edges, and rainwater-and-wind-sealing rattle-preventing insulation strips, attached and/or molded to wind-directing-and-rainwater-sealing multi-screen-securing louver blades, which automatically raise and lower sun shade and video projection screens, control the duration of fruit-drying, provide fruit sorting function, and provide a full-content-viewing truck-bed tonneau cover, insertion axels are inserted into stanchions, cradle axels being inserted between cradle caps and rotation cradles, stanchions and rotation cradles screwed to first and second rainwater-channeling-and-leaf-filtering side gutter beams, with rainwater-channeling-and-leaf-filtering end gutter beams fit into gutter-beam cradles and are clamped to corner posts by gutter-beam-securing bars into securing-bar slots, corner posts are capped and protected by corner-post l-shaped caps, multi-louver-control bar rotatably connects to multi-louver-control axels and multi-louver-control linkage arm connected to transmission upper axel connected to worm-gear transmission connected to transmission lower axel connected to coupling loop, controlled by removable-collapsible-and-stowable automatic-multi-screen-raising-and-lowering multi-louver-control crank tool, discrete rainwater gutters filter rainwater and leaves through drain holes and are molded to first and second rainwater-channeling-and-leaf-filtering side gutter beams, within the corner posts, the discrete-leaf-filtering tubes, and spouts, rainwater-draining spout holes, base-plate covers secure to corner-post base plates, which are screwed to corner posts, height-and-angle-adjustable tube screws compensate for uneven terrain and are screwed into corner-post base plates, anchoring screws are inserted through anchoring-screw holes.

BRIEF DESCRIPTION OF THE DRAWINGS

FIG. 1E illustrates a hidden-line side view of rainwater-channeling-and-collecting and leaf-separating-and-discharging gutter-beam system and height-and-angle-adjustable-post-and-base system.

FIG. 1P and FIG. 1Q illustrate a side and a perspective view of louver-blade rainwater-and-wind-sealing rattle-preventing insulation strips.

FIG. 2I illustrates a perspective view of a louver-blade-rotation-cradle cap.

FIG. 2O illustrates a perspective view of a gutter-beam-securing bar.

FIG. 2Q illustrates a partial perspective view demonstrating a rainwater-channeling-and-leaf-filtering end gutter beams with attached gutter-beam-securing bars inserting into gutter-beam-securing-bar slots.

FIG. 2R illustrates a partial perspective view demonstrating a first rainwater-channeling-and-leaf-filtering side gutter beam with attached gutter-beam-securing bars inserting into gutter-beam-securing-bar slots.

FIG. 2V and FIG. 2W illustrate partial side views demonstrating how a removable-collapsible-and-stowable automatic-multi-screen-raising-and-lowering multi-louver-control crank tool removably attaches to a multi-louver-control adjustable coupling loop, and rotates to open and close the wind-directing-and-rainwater-sealing multi-screen-securing louver blades.

FIG. 2X illustrates a perspective view of the multi-louver-control adjustable coupling loop and the wind-directing-and-rainwater-sealing multi-screen-securing louver blades in an open position.

FIG. 3A, FIG. 3B, and FIG. 3C illustrate a perspective, side, and top views of the corner post, respectively.

FIG. 3D, FIG. 3E, FIG. 3F, and FIG. 3G illustrate perspective views of the corner-post L-shaped cap, corner-post-base-plate cover, and corner-post base plate, respectively.

FIG. 3H and FIG. 3I illustrate side and perspective views of the wind-directing-and-rainwater-sealing multi-screen-securing louver blades controlling the deployment and retraction of a video projection screen and.

FIG. 3L and FIG. 3M illustrate side and perspective views of the wind-directing-and-rainwater-sealing multi-screen-securing louver blades controlling the lengthening and shortening of a cord, with multi-louver-control adjustable coupling loop and removable-collapsible-and-stowable automatic-multi-screen-raising-and-lowering multi-louver-control crank tool.

FIG. 3N and FIG. 3O illustrate side and perspective views of the wind-directing-and-rainwater-sealing multi-screen-securing louver blades controlling cord to deploy and retract a curtain.

FIG. 3P, FIG. 3Q, and FIG. 3R illustrate a side view demonstrating the wind-directing leaf-separating-and-discharging rainwater-sealing automatic-multi-screen-raising-and-lowering multi-screen-securing fruit-drying-and-sorting truck-bed-tonneau-covering louver-blade system functioning as a fruit sorting and separating device.

FIG. 4A, FIG. 4B, and FIG. 4C illustrate perspective views of the assembly, and height-adjusting function of corner-posts base plates, height-and-angle-adjustable internally-externally-threaded tube screws, and anchoring screws, respectively.

FIG. 9C and FIG. 9D depict perspective views of equivalent variations of components and assembly of first rainwater-channeling-and-leaf-filtering side gutter beams and/or second rainwater-channeling-and-leaf-filtering side gutter beam, with gutter-beam-securing bars.

FIG. 9E and FIG. 9F depict perspective views of equivalent variations of an assembly of first rainwater-channeling-and-leaf-filtering side gutter beams, and/or second rainwater-channeling-and-leaf-filtering side gutter beam, and/or rainwater-channeling-and-leaf-filtering end gutter beams, with gutter-beam-securing bars being secured to a corner post.

FIG. 10B, FIG. 10C, FIG. 10D, and FIG. 10E depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, with a variation of multi-louver-blade multi-position automatic-multi-screen-raising-and-lowering control system, and/or privacy shades, and/or hinged or sectionable corner posts, respectively.

DETAILED DESCRIPTION OF THE DRAWINGS

Figure 1A:
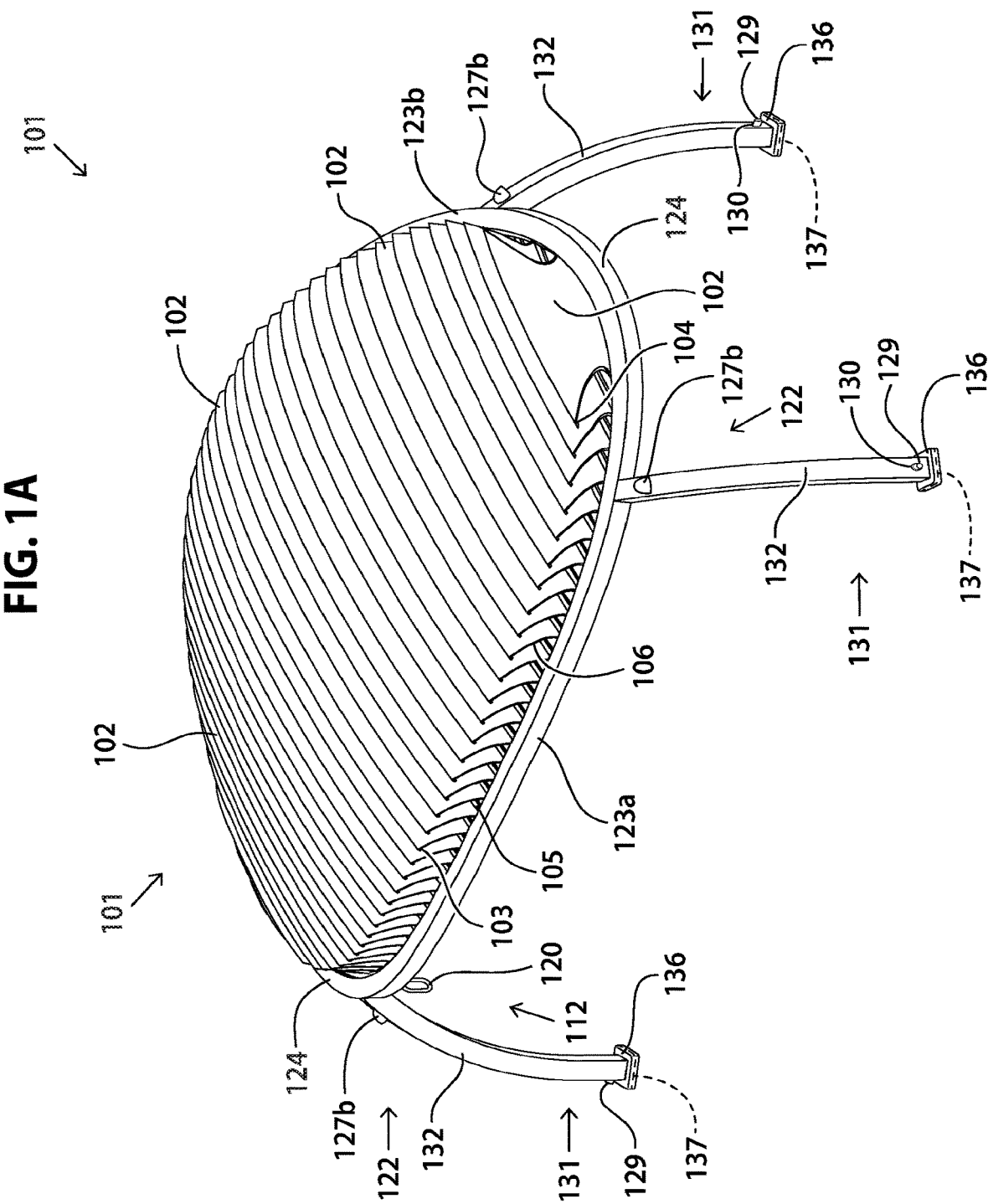
FIG. 1A and FIG. 1B illustrate a left-top-front and top-side perspective views of the wind-directing leaf-separating-and-discharging rainwater-sealing automatic-multi-screen-raising-and-lowering multi-screen-securing fruit-drying-and-sorting truck-bed-tonneau-covering louver-blade system, with the wind-directing-and-rainwater-sealing multi-screen-securing louver blades depicted open, respectively.
Figure 1B:
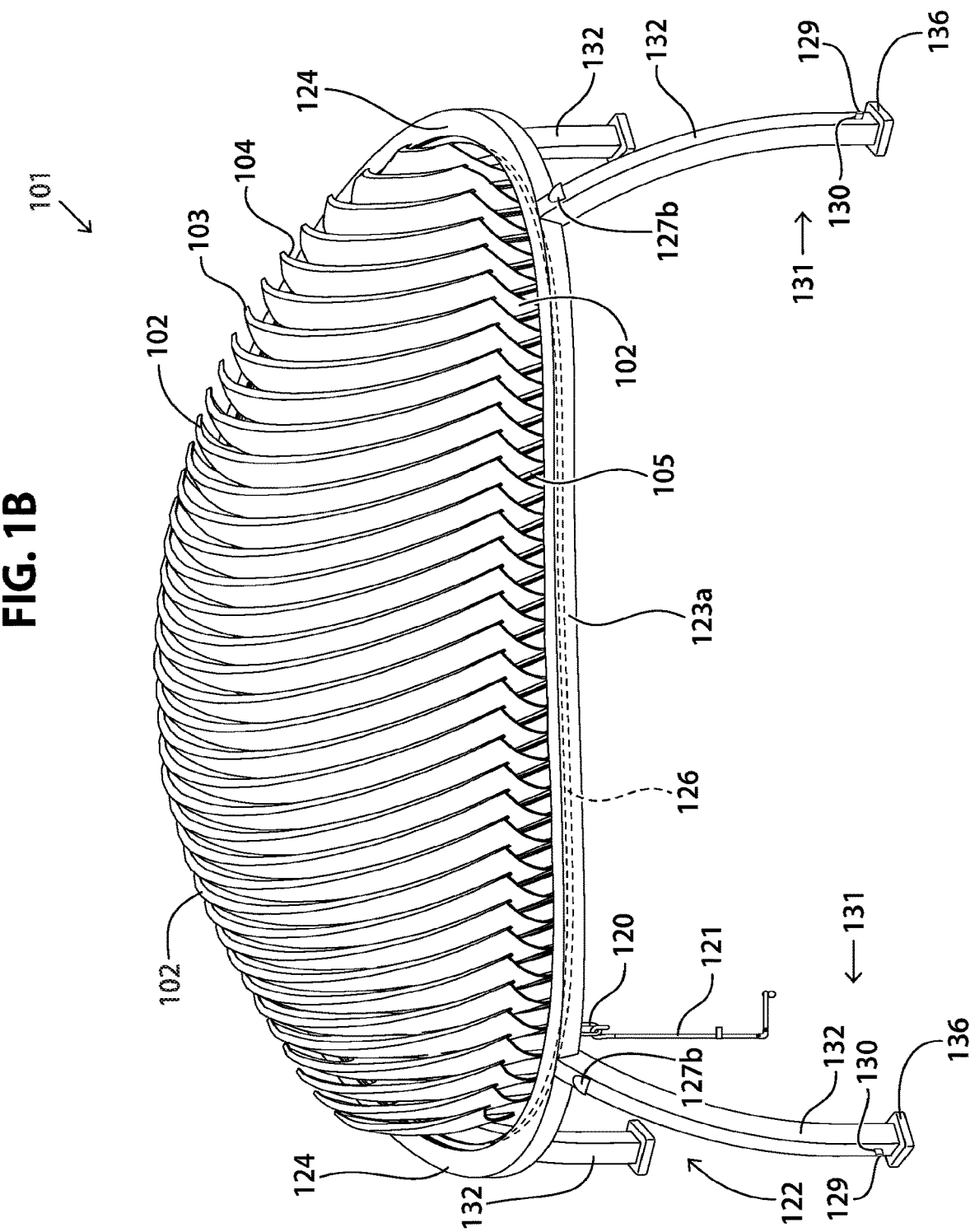
Figure 1C:
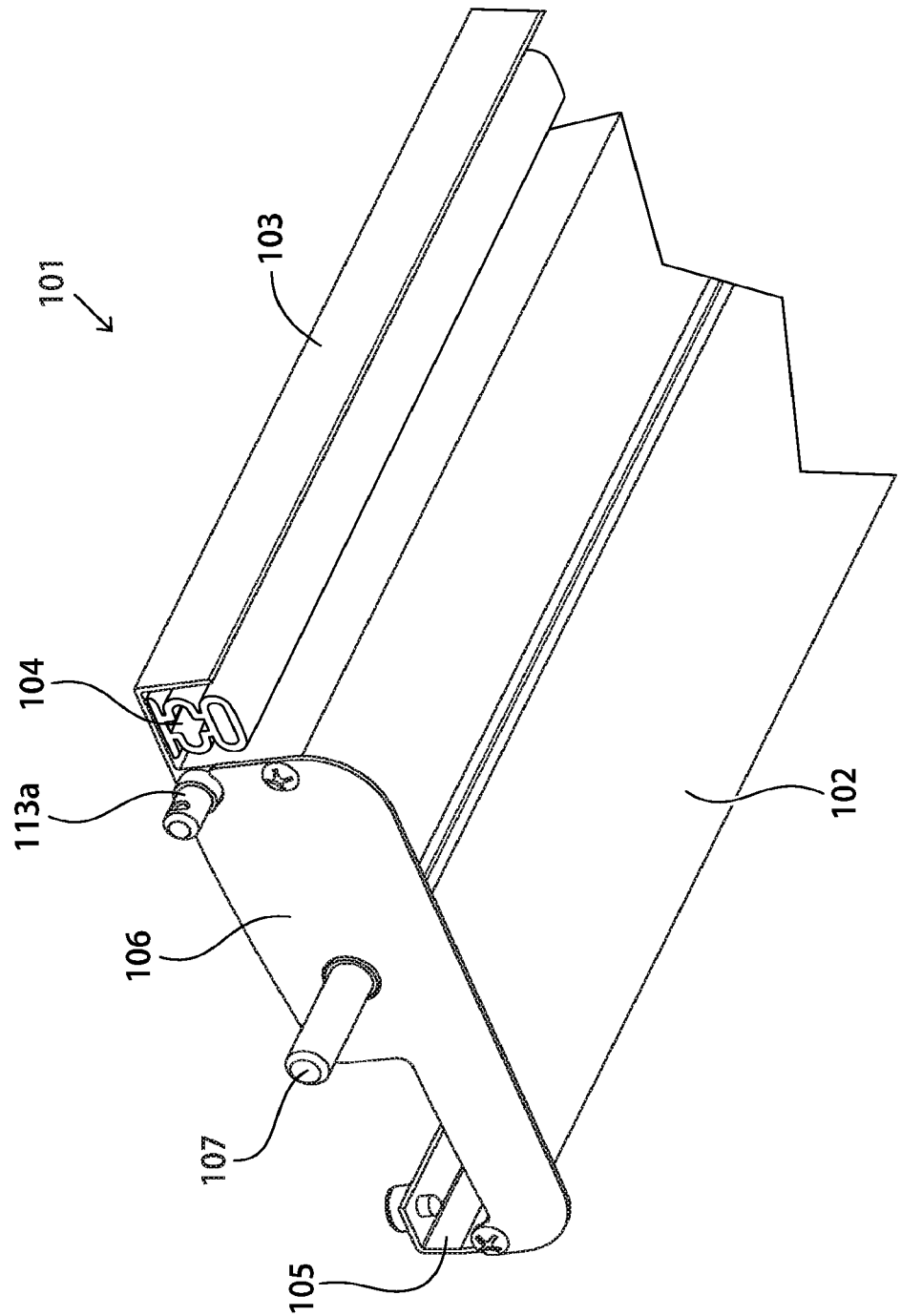
FIG. 1C illustrates a partial perspective view of multiple wind-directing-and-rainwater-sealing multi-screen-securing louver blade, multi-louver-control axels, louver-blade-supporting insertion axels, and louver-blade rainwater-and-wind-sealing rattle-preventing insulation strips.
Figure 1D:
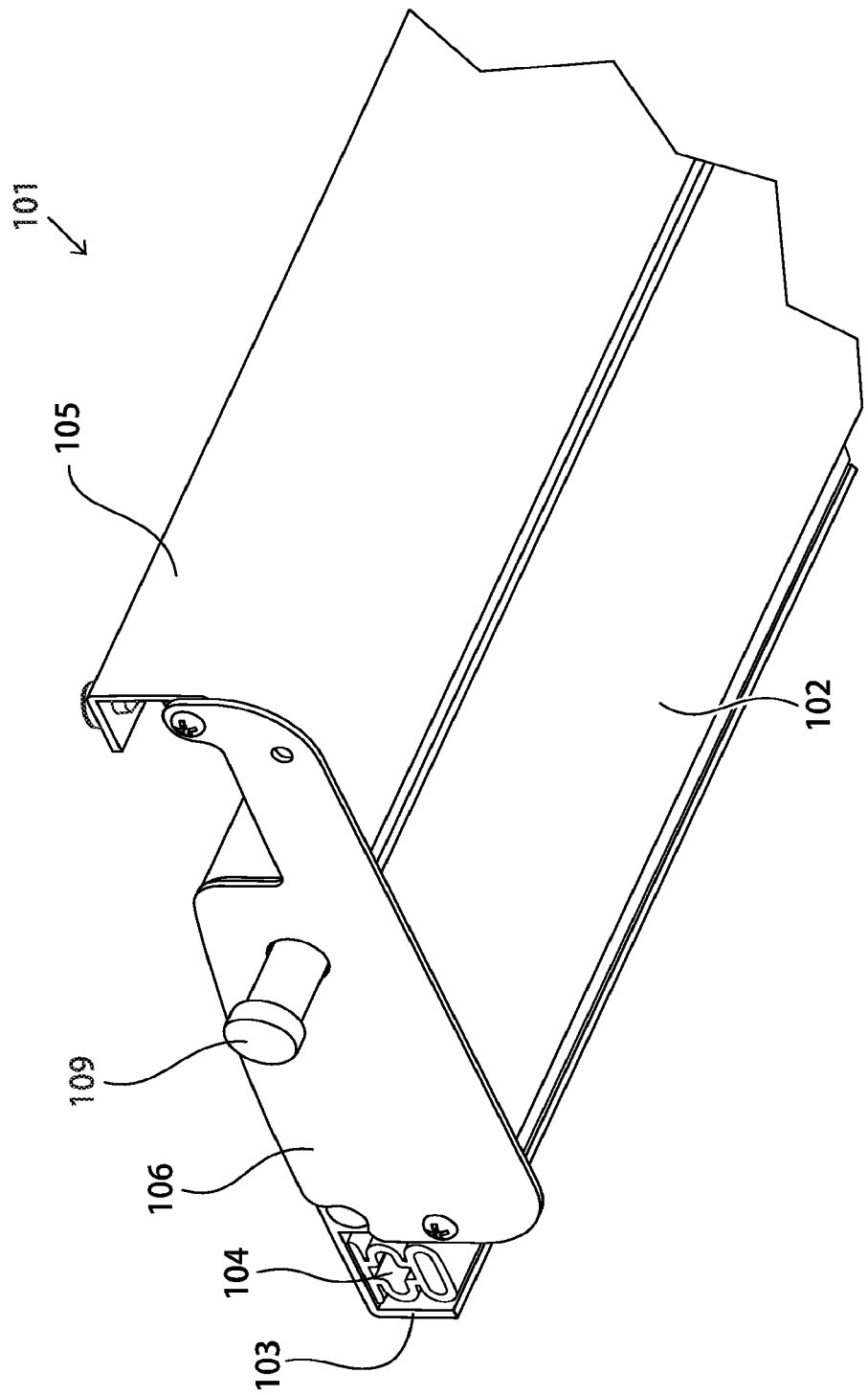
FIG. 1D illustrates a partial perspective view of multiple wind-directing-and-rainwater-sealing multi-screen-securing louver blade, louver-blade-rotation cradle axels and louver-blade rainwater-and-wind-sealing rattle-preventing insulation strips.
Figure 1F:
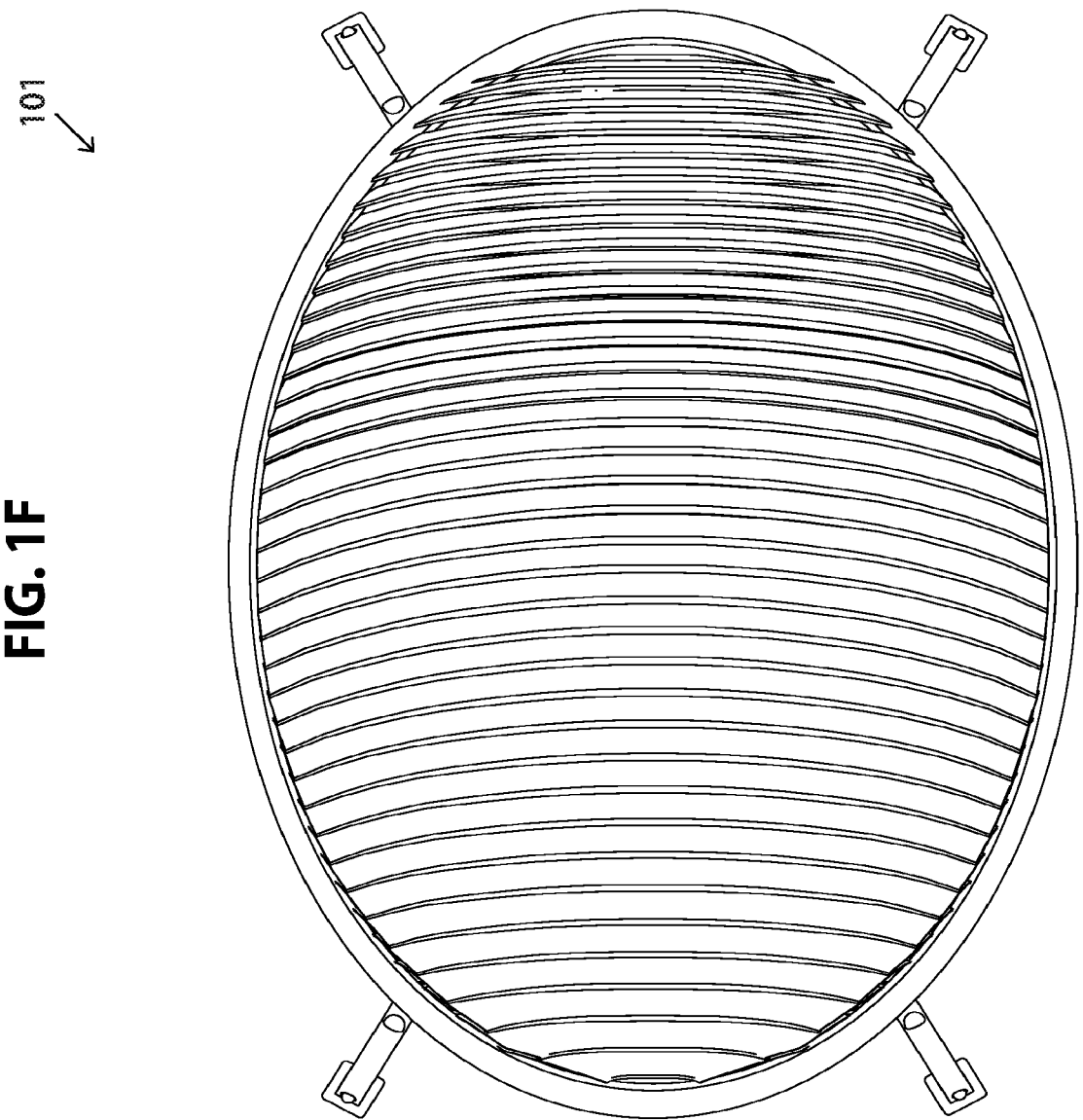
FIG. 1F and FIG. 1G illustrate top and top-front perspective views of the wind-directing leaf-separating-and-discharging rainwater-sealing automatic-multi-screen-raising-and-lowering multi-screen-securing fruit-drying-and-sorting truck-bed-tonneau-covering louver-blade system, with the wind-directing-and-rainwater-sealing multi-screen-securing louver blades depicted closed, respectively.
Figure 1G:
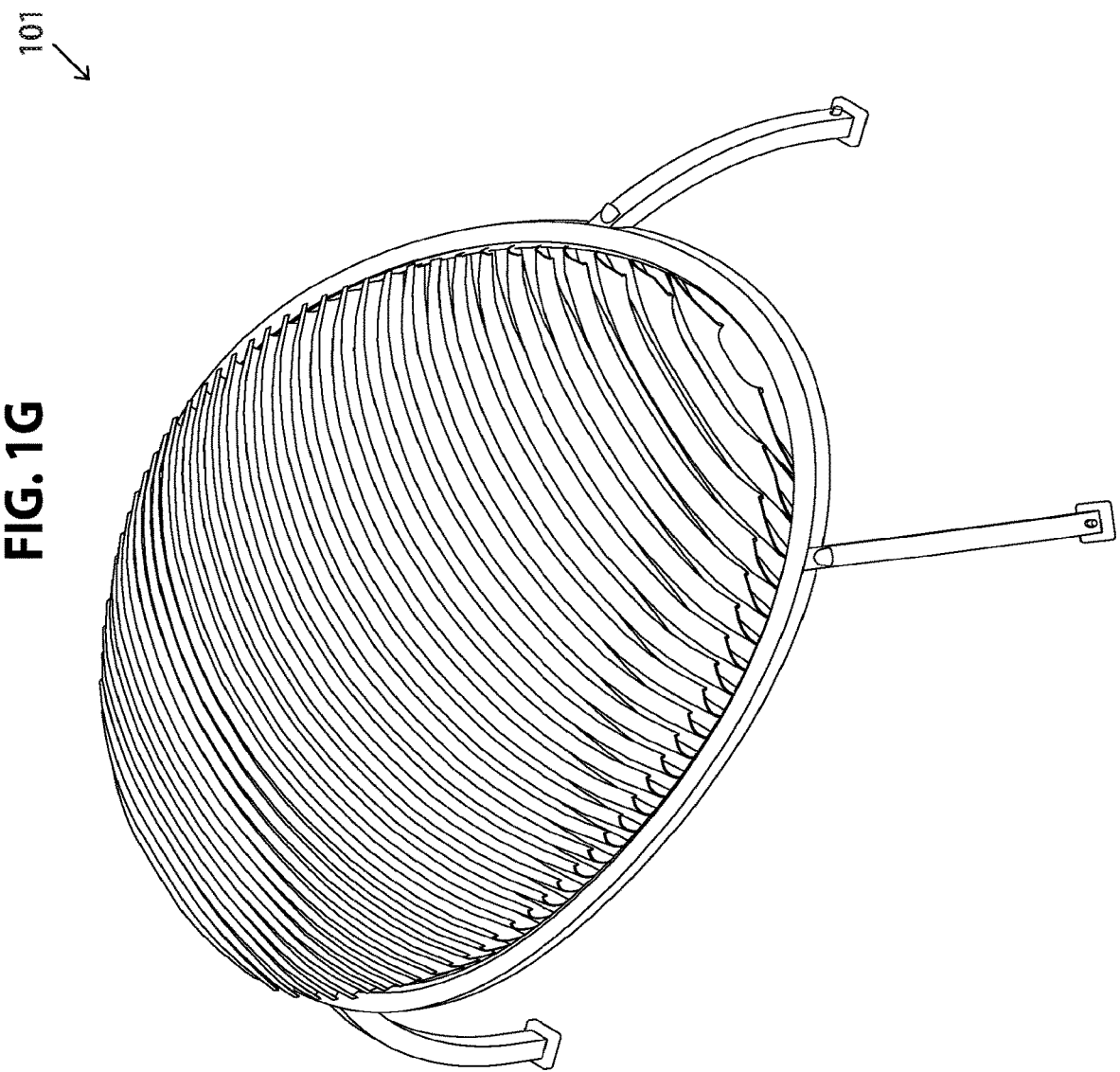
Figure 1H:
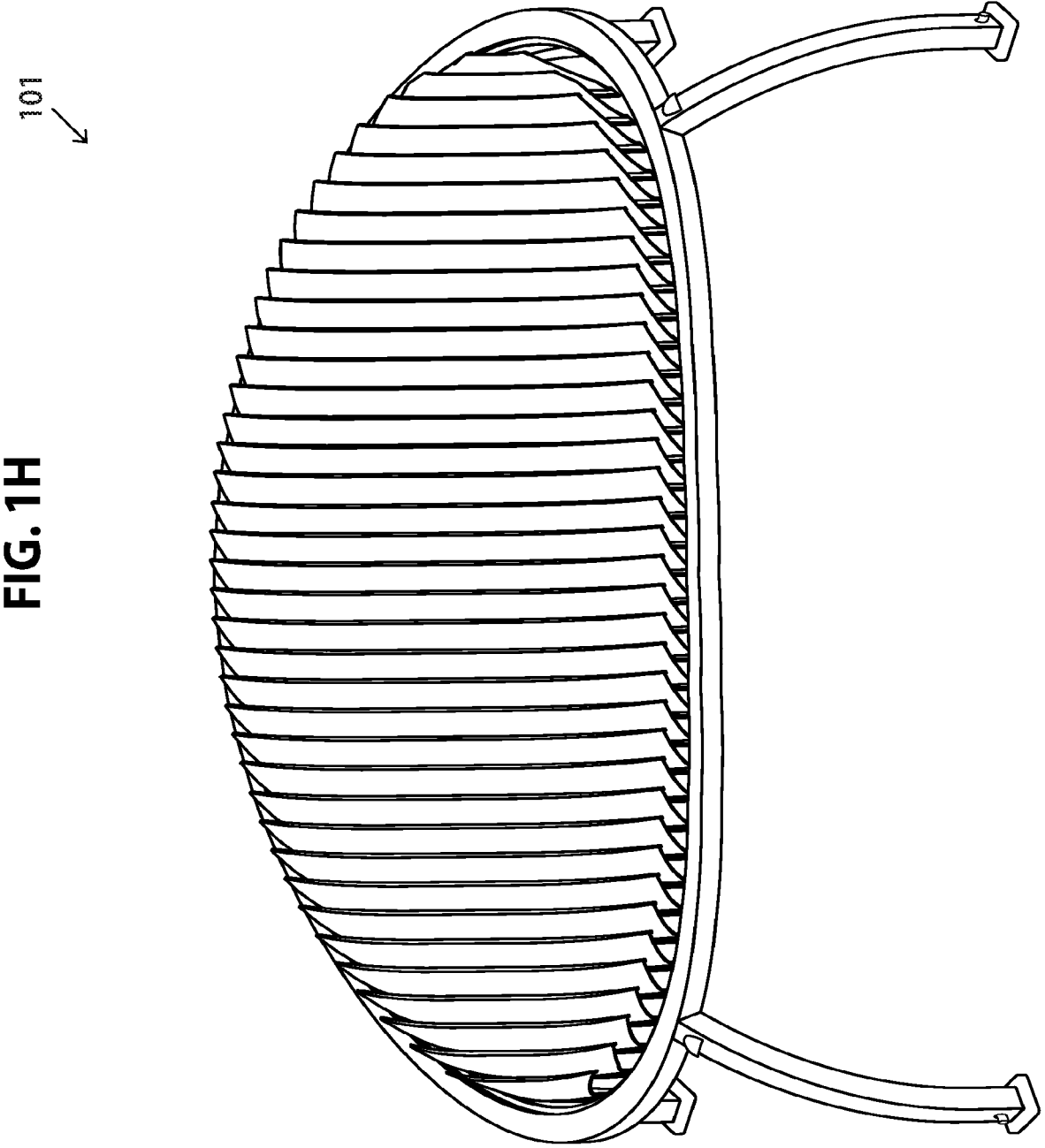
FIG. 1H and FIG. 1I illustrate side and high-side perspective views of the wind-directing leaf-separating-and-discharging rainwater-sealing automatic-multi-screen-raising-and-lowering multi-screen-securing fruit-drying-and-sorting truck-bed-tonneau-covering louver-blade system, with the wind-directing-and-rainwater-sealing multi-screen-securing louver blades depicted partially-open, respectively.
Figure 1I:
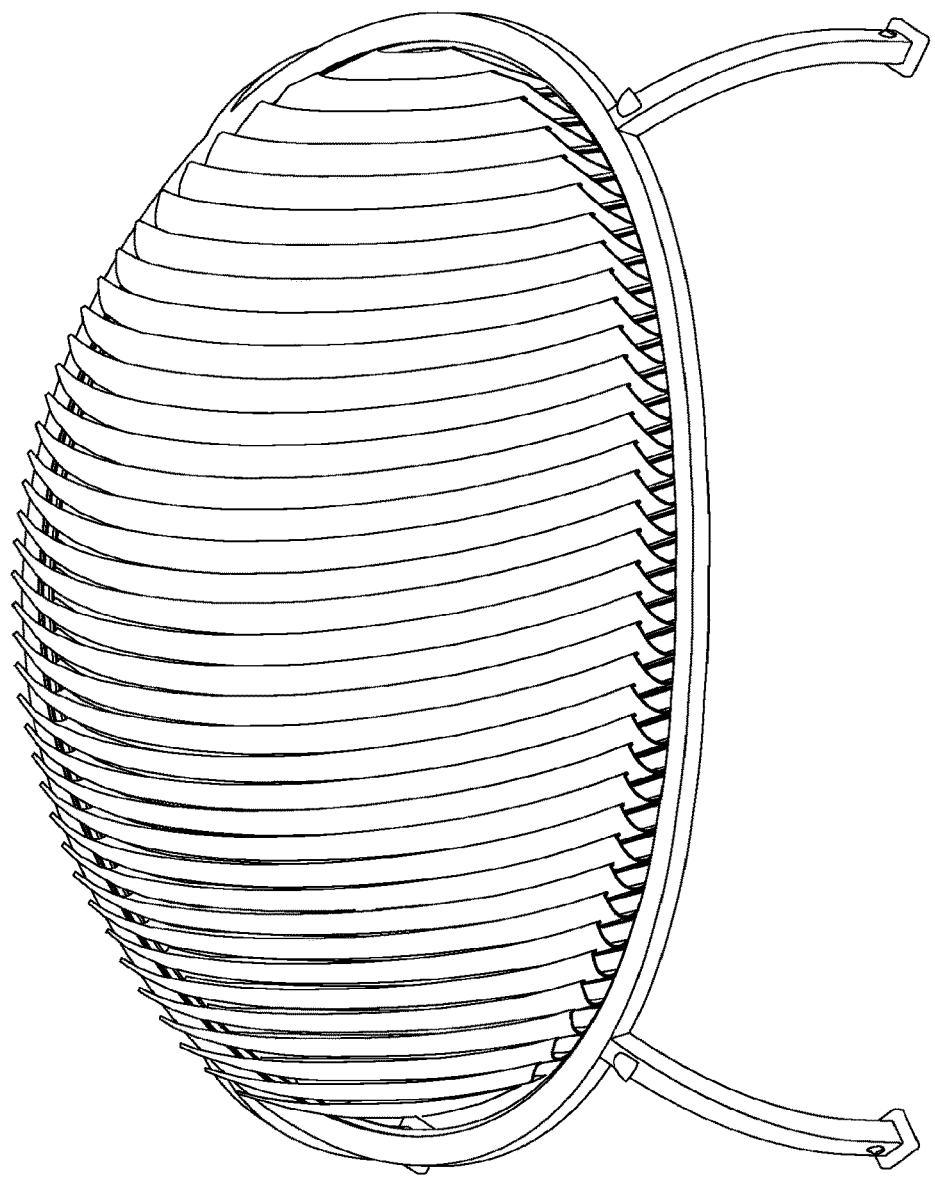
Figure 1J:
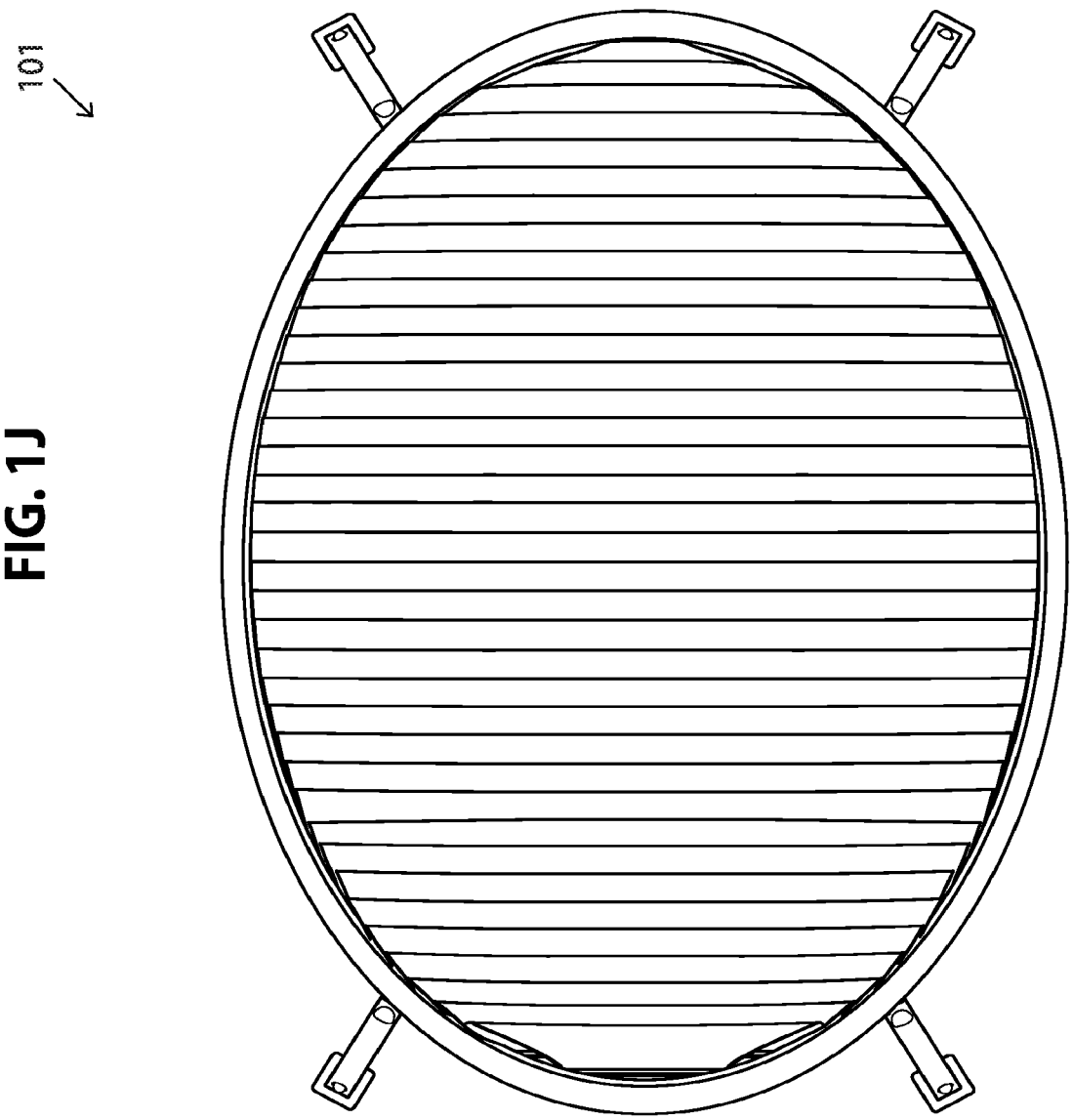
FIG. 1J, FIG. 1K, and FIG. 1L illustrate a top, high-right-side perspective, and front views of the wind-directing leaf-separating-and-discharging rainwater-sealing automatic-multi-screen-raising-and-lowering multi-screen-securing fruit-drying-and-sorting truck-bed-tonneau-covering louver-blade system, with the wind-directing-and-rainwater-sealing multi-screen-securing louver blades depicted closed, respectively.
Figure 1K:
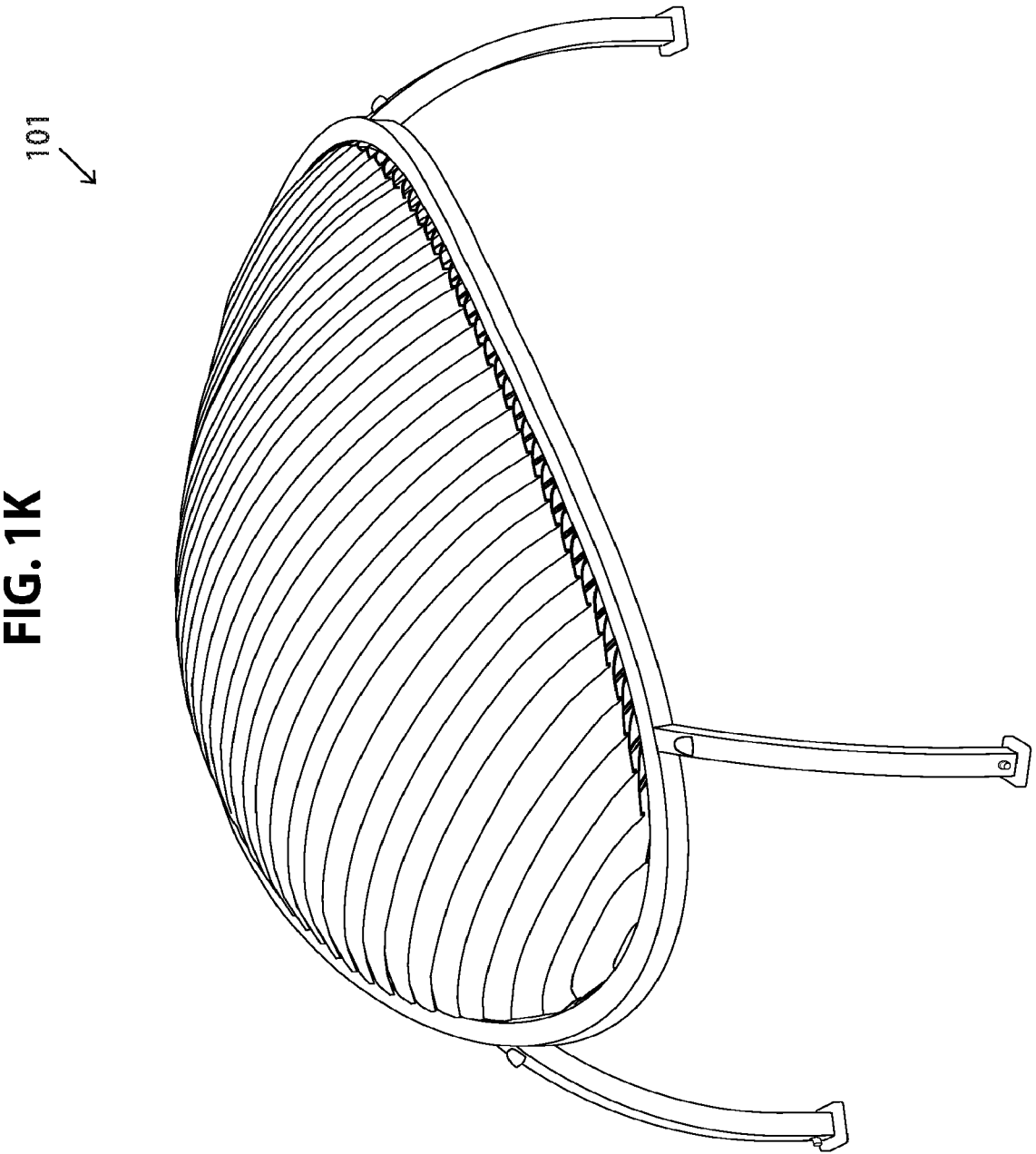
Figure 1L:
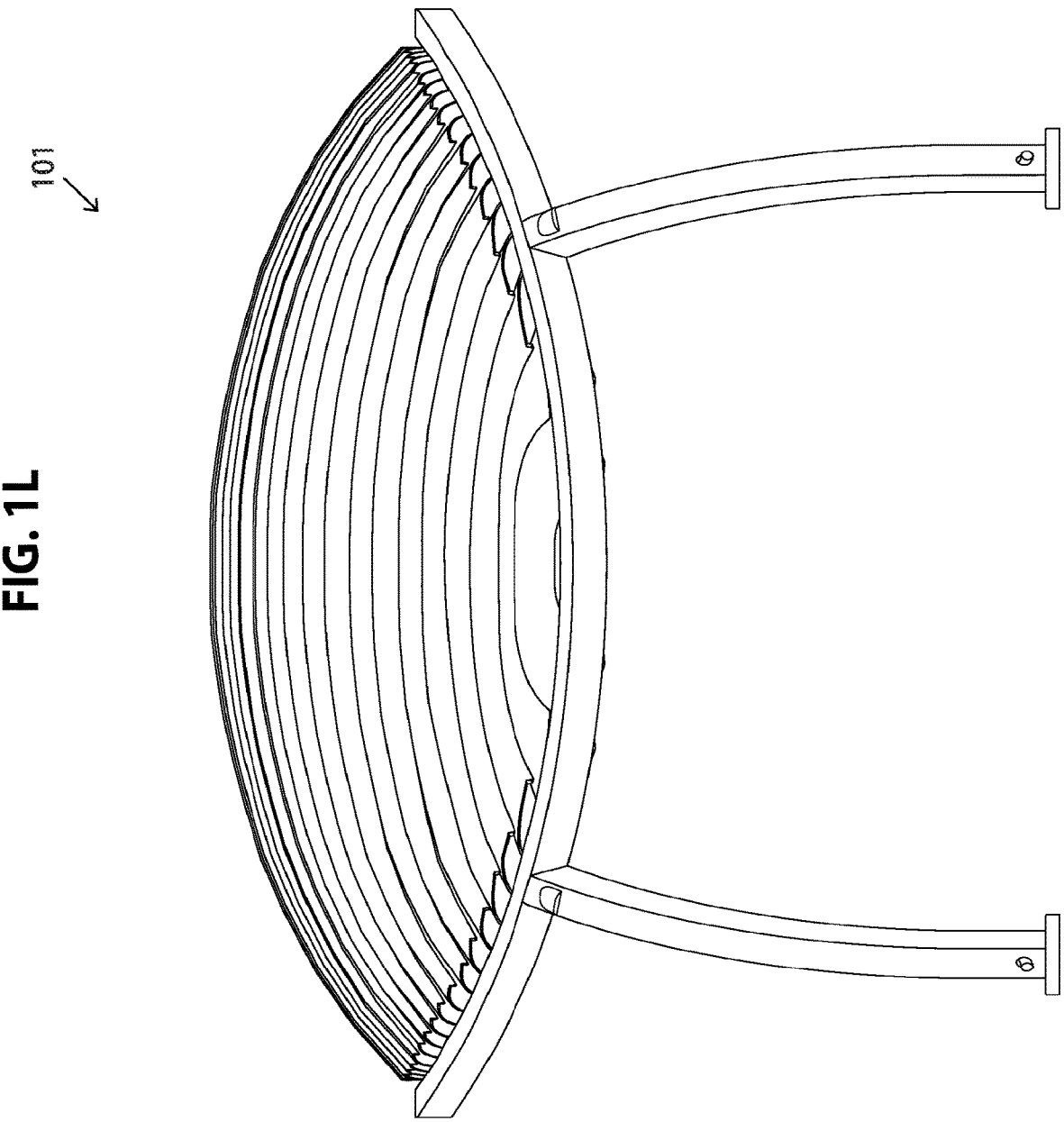
Figure 1M:
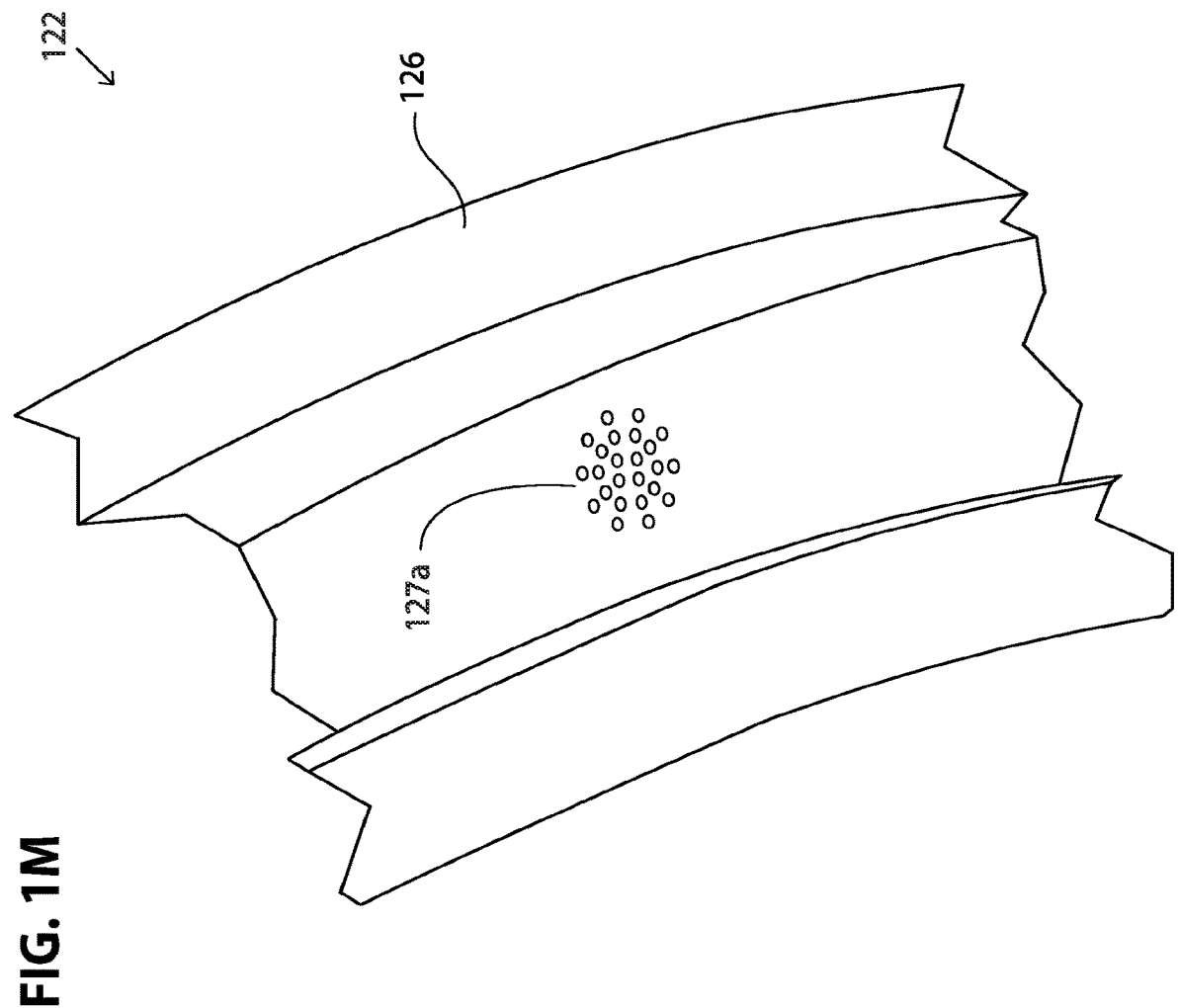
FIG. 1M illustrates a top perspective view of leaf-separating-and-discharging drain holes.

The multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola has:

1) Wind-directing leaf-separating-and-discharging rainwater-sealing automatic-multi-screen-raising-and-lowering multi-screen-securing fruit-drying-and-sorting truck-bed-tonneau-covering louver-blade system,
2) Multi-louver-blade multi-position automatic-multi-screen-raising-and-lowering control system,
3) Rainwater-channeling-and-colleting and leaf-separating-and-discharging gutter-beam system, and
4) Height-and-angle-adjustable-post-and-base system.
Component Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, and FIG. 1M, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola comprises:

1) Wind-directing leaf-separating-and-discharging rainwater-sealing automatic-multi-screen-raising-and-lowering multi-screen-securing fruit-drying-and-sorting truck-bed-tonneau-covering louver-blade system 101, comprising:
2) Wind-directing-and-rainwater-sealing multi-screen-securing louver blades 102,
3) Wind-directing-and-rainwater-sealing-louver-blade multi-screen-securing leading edges 103,
4) Louver-blade rainwater-and-wind-sealing rattle-preventing insulation strips 104,
5) Louver-blade wind- and rainwater-directing trailing edges 105,
6) Louver-blade end caps 106,
7) Louver-blade-supporting insertion axels 107,
8) Louver-blade-rotation receiving holes 108,
9) Louver-blade-rotation cradle axels 109,
10) Louver-blade-rotation cradles 110,
11) Louver-blade-rotation-cradle caps 111a, and Louver-blade-rotation-stanchions 111b;
12) Multi-louver-blade multi-position automatic-multi-screen-raising-and-lowering control system 112, comprising:
13) Multi-louver-control axels 113a, Multi-louver-control-axel cotter-pins and cotter-pin holes 113b,
14) Multi-louver-control bar 114,
15) Multi-louver-control-bar axel-insertion holes 115,
16) Multi-louver-control linkage arm 116,
17) Worm-gear-transmission upper axel 117,
18) Linkage-arm gear 118a, Lower-axel gear 118b,
19) Worm-gear-transmission lower axel 119,
20) Multi-louver-control adjustable coupling loop 120, and
21) Removable-collapsible-and-stowable automatic-multi-screen-raising-and-lowering multi-louver-control crank tool 121;
22) Rainwater-channeling-and-collecting and leaf-separating-and-discharging gutter-beam system 122, comprising:
23) First rainwater-channeling-and-leaf-filtering side gutter beam 123a, Second rainwater-channeling-and-leaf-filtering side gutter beam 123b,
24) Rainwater-channeling-and-leaf-filtering end gutter beams 124,
25) Gutter-beam-securing bars 125,
26) Leaf-separating-and-discharging rainwater gutters 126,
27) Leaf-separating-and-discharging drain holes 127a, Leaf-separating-and-discharging opening 127b,
28) Leaf-separating-and-discharging tubes 128,
29) Rainwater-draining spouts 129, and
30) Rainwater-draining spout holes 130;
31) Height-and-angle-adjustable-post-and-base system 131, comprising:
32) Corner posts 132,
33) Corner-post L-shaped caps 133,
34) Gutter-beam cradles 134,
35) Gutter-beam-securing-bar slots 135,
36) Corner-post-base-plate covers 136,
37) Corner-posts base plates 137,
38) Height-and-angle-adjustable internally-externally-threaded tube screws 138a, Height-and-angle-adjustable-internally-externally-threaded tube-screw holes 138*b*,
39) Anchoring-screw holes 139, and
40) Anchoring screws 140.

Material

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, and FIG. 1M:

1) Wind-directing leaf-separating-and-discharging rainwater-sealing automatic-multi-screen-raising-and-lowering multi-screen-securing fruit-drying-and-sorting truck-bed-tonneau-covering louver-blade system 101 is made of the combined materials of its components.
2) Wind-directing-and-rainwater-sealing multi-screen-securing louver blades 102
   is (or are each) made of metallic material.
3) Wind-directing-and-rainwater-sealing-louver-blade multi-screen-securing leading edges 103
   is (or are each) made of metallic material.
4) Louver-blade rainwater-and-wind-sealing rattle-preventing insulation strips 104
   is (or are each) made of foam rubber, or an equivalent material.
5) Louver-blade wind- and rainwater-directing trailing edges 105
   is (or are each) made of metallic material.
6) Louver-blade end caps 106
   is (or are each) made of metallic material.
7) Louver-blade-supporting insertion axels 107
   is (or are each) made of metallic material.
8) Louver-blade-rotation receiving holes 108
   is (or are each) made of empty space.
9) Louver-blade-rotation cradle axels 109
   is (or are each) made of metallic material.
10) Louver-blade-rotation cradles 110
    is (or are each) made of metallic material.
11) Louver-blade-rotation-cradle caps 111*a*
    is (or are each) made of metallic material.
    Louver-blade-rotation-stanchions 111*b*
    is (or are each) made of metallic material.
12) Multi-louver-blade multi-position automatic-multi-screen-raising-and-lowering control system 112 is made of the combined materials of its components.
13) Multi-louver-control axel s 113*a*
    is (or are each) made of metallic material.
    Multi-louver-control-axel cotter-pins and cotter-pin holes 113*b*
    is (or are each) made of metallic material and/or empty space, respectively.
14) Multi-louver-control bar 114
    is (or are each) made of metallic material.
15) Multi-louver-control-bar axel-insertion holes 115
    is (or are each) made of empty space.
16) Multi-louver-control linkage arm 116
    is (or are each) made of metallic material.
17) Worm-gear-transmission upper axel 117
    is (or are each) made of metallic material.
18) Linkage-arm gear 118*a*
    is (or are each) made of metallic material.
    Lower-axel gear 118*b*
    is (or are each) made of metallic material.
19) Worm-gear-transmission lower axel 119
    is (or are each) made of metallic material.
20) Multi-louver-control adjustable coupling loop 120
    is (or are each) made of metallic material.
21) Removable-collapsible-and-stowable automatic-multi-screen-raising-and-lowering multi-louver-control crank tool 121
    is (or are each) made of metallic material.
22) Rainwater-channeling-and-collecting and leaf-separating-and-discharging gutter-beam system 122 is made of the combined materials of its components.
23) First rainwater-channeling-and-leaf-filtering side gutter beam 123*a*
    is (or are each) made of metallic material.
    Second rainwater-channeling-and-leaf-filtering side gutter beam 123*b*
    is (or are each) made of metallic material.
24) Rainwater-channeling-and-leaf-filtering end gutter beams 124
    is (or are each) made of metallic material.
25) Gutter-beam-securing bars 125
    is (or are each) made of metallic material.
26) Leaf-separating-and-discharging rainwater gutters 126
    is (or are each) made of metallic material.
27) Leaf-separating-and-discharging drain holes 127*a*
    is (or are each) made of empty space.
    Leaf-separating-and-discharging opening 127*b*
    is (or are each) made of empty space.
28) Leaf-separating-and-discharging tubes 128
    is (or are each) made of plastic or rubber material.
29) Rainwater-draining spouts 129
    is (or are each) made of plastic or rubber material.
30) Rainwater-draining spout holes 130
    is (or are each) made of empty space.
31) Height-and-angle-adjustable-post-and-base system 131 is made of the combined materials of its components.
32) Corner posts 132
    is (or are each) made of metallic material.
33) Corner-post L-shaped caps 133
    is (or are each) made of metallic material.
34) Gutter-beam cradles 134
    is (or are each) made of metallic material.
35) Gutter-beam-securing-bar slots 135
    is (or are each) made of metallic material.
36) Corner-post-base-plate covers 136
    is (or are each) made of metallic material.
37) Corner-posts base plates 137
    is (or are each) made of metallic material.
38) Height-and-angle-adjustable internally-externally-threaded tube screws 138*a*
    is (or are each) made of metallic material.
    Height-and-angle-adjustable-internally-externally-threaded tube-screw holes 138*b*
    is (or are each) made of empty space.
39) Anchoring-screw holes 139
    is (or are each) made of empty space.
40) Anchoring screws 140
    is (or are each) made of metallic material.

Shape

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, and FIG. 1M:

1) Wind-directing leaf-separating-and-discharging rainwater-sealing automatic-multi-screen-raising-and-lowering multi-screen-securing fruit-drying-and-sorting truck-bed-tonneau-covering louver-blade system 101 has the combined shapes of its components.
2) Wind-directing-and-rainwater-sealing multi-screen-securing louver blades 102
   is (or are each) formed into rectangular blade shape.

3) Wind-directing-and-rainwater-sealing-louver-blade multi-screen-securing leading edges 103
   is (or are each) formed into a rectangular shape with a C shaped profile.
4) Louver-blade rainwater-and-wind-sealing rattle-preventing insulation strips 104
   is (or are each) formed into an elongated rectangle shape with a rectangular profile.
5) Louver-blade wind- and rainwater-directing trailing edges 105
   is (or are each) formed into rectangular shape with a C shaped profile.
6) Louver-blade end caps 106
   is (or are each) formed into a number nine shape.
7) Louver-blade-supporting insertion axels 107
   is (or are each) formed into a rod shape.
8) Louver-blade-rotation receiving holes 108
   is (or are each) formed into a circular shape.
9) Louver-blade-rotation cradle axels 109
   is (or are each) formed into a rod shape.
10) Louver-blade-rotation cradles 110
    is (or are each) formed into a rectangle shape, with a flat-topped protrusion separated by a concave valley as a profile.
11) Louver-blade-rotation-cradle caps 111*a*
    is (or are each) formed into a rectangle shape, with a U shaped profile.
    Louver-blade-rotation-stanchions 111*b*
    is (or are each) formed into a rectangle shape, with a rectangular base and an upper O shaped profile.
12) Multi-louver-blade multi-position automatic-multi-screen-raising-and-lowering control system 112 has the combined shapes of its components.
13) Multi-louver-control axels 113*a*
    is (or are each) formed into a rod shape.
    Multi-louver-control-axel cotter-pins and cotter-pin holes 113*b*
    is (or are each) formed into a U shape and circular shape, respectively.
14) Multi-louver-control bar 114
    is (or are each) formed into an elongated rectangle shape with a rectangular profile.
15) Multi-louver-control-bar axel-insertion holes 115
    is (or are each) formed into a circular shape.
16) Multi-louver-control linkage arm 116
    is (or are each) formed into an L shape.
17) Worm-gear-transmission upper axel 117
    is (or are each) formed into a rod shape.
18) Linkage-arm gear 118*a*
    is (or are each) formed into a gear shape.
    Lower-axel gear 118*b*
    is (or are each) formed into a gear shape.
19) Worm-gear-transmission lower axel 119
    is (or are each) formed into a rod shape.
20) Multi-louver-control adjustable coupling loop 120
    is (or are each) formed into an O shape.
21) Removable-collapsible-and-stowable automatic-multi-screen-raising-and-lowering multi-louver-control crank tool 121
    is (or are each) formed into an Z shape with a U shaped end.
22) Rainwater-channeling-and-collecting and leaf-separating-and-discharging gutter-beam system 122 has the combined shapes of its components.
23) First rainwater-channeling-and-leaf-filtering side gutter beam 123*a*
    is (or are each) formed into a rectangular shape.
    Second rainwater-channeling-and-leaf-filtering side gutter beam 123*b*
    is (or are each) formed into a rectangular shape.
24) Rainwater-channeling-and-leaf-filtering end gutter beams 124
    is (or are each) formed into a rectangular shape.
25) Gutter-beam-securing bars 125
    is (or are each) formed into a rectangular shape.
26) Leaf-separating-and-discharging rainwater gutters 126
    is (or are each) formed into a U shape.
27) Leaf-separating-and-discharging drain holes 127*a*
    is (or are each) formed into a multiple-circular shape.
    Leaf-separating-and-discharging opening 127*b,*
    is (or are each) formed into a semi-circular shape.
28) Leaf-separating-and-discharging tubes 128
    is (or are each) formed into a tube shape.
29) Rainwater-draining spouts 129
    is (or are each) formed into a quarter-circle shape with an O profile.
30) Rainwater-draining spout holes 130
    is (or are each) formed into an oval shape.
31) Height-and-angle-adjustable-post-and-base system 131 has the combined shapes of its components.
32) Corner posts 132
    is (or are each) formed into a rectangular shape with a square profile.
33) Corner-post L-shaped caps 133
    is (or are each) formed into a L shape.
34) Gutter-beam cradles 134
    is (or are each) formed into a rectangular shape with radius corners.
35) Gutter-beam-securing-bar slots 135
    is (or are each) formed into a rectangular shape with a C shaped profile.
36) Corner-post-base-plate covers 136
    is (or are each) formed into a rectangular shape with a rectangular center hole.
37) Corner-posts base plates 137
    is (or are each) formed into a square shape.
38) Height-and-angle-adjustable internally-externally-threaded tube screws 138*a*
    is (or are each) formed into a screw shape.
    Height-and-angle-adjustable-internally-externally-threaded tube-screw holes 138*b*
    is (or are each) formed into a circular shape.
39) Anchoring-screw holes 139
    is (or are each) formed into a circular shape.
40) Anchoring screws 140
    is (or are each) formed into a screw shape.

Connection

Referring to FIG. 1A, FIG. 1B, FIG. 1C, FIG. 1D, FIG. 1E, FIG. 1F, FIG. 1G, FIG. 1H, FIG. 1I, FIG. 1J, FIG. 1K, FIG. 1L, and FIG. 1M:

1) Wind-directing leaf-separating-and-discharging rainwater-sealing automatic-multi-screen-raising-and-lowering multi-screen-securing fruit-drying-and-sorting truck-bed-tonneau-covering louver-blade system 101 is (or are respectively) connected by the combined connections of its components.
2) Wind-directing-and-rainwater-sealing multi-screen-securing louver blades 102
   is (or are respectively) riveted between opposing louver-blade end caps 106.

3) Wind-directing-and-rainwater-sealing-louver-blade multi-screen-securing leading edges 103
   is (or are respectively) molded to wind-directing-and-rainwater-sealing multi-screen-securing louver blades 102.
4) Louver-blade rainwater-and-wind-sealing rattle-preventing insulation strips 104
   is (or are respectively) connected to wind-directing-and-rainwater-sealing-louver-blade multi-screen-securing leading edges 103.
5) Louver-blade wind- and rainwater-directing trailing edges 105
   is (or are respectively) molded to wind-directing-and-rainwater-sealing multi-screen-securing louver blades 102.
6) Louver-blade end caps 106
   is (or are respectively) riveted to wind-directing-and-rainwater-sealing multi-screen-securing louver blades 102.
7) Louver-blade-supporting insertion axels 107
   is (or are respectively) rotatably attached between louver-blade-rotation cradles 110 and louver-blade-rotation-cradle caps 111a.
8) Louver-blade-rotation receiving holes 108
   is (or are respectively) drilled into louver-blade-rotation-stanchions 111b.
9) Louver-blade-rotation cradle axels 109
   is (or are respectively) rotatably attached between louver-blade-rotation cradles 110 and louver-blade-rotation-cradle caps 111a.
10) Louver-blade-rotation cradles 110
    is (or are respectively) screwed to second rainwater-channeling-and-leaf-filtering side gutter beam 123b.
11) Louver-blade-rotation-cradle caps 111a
    is (or are respectively) screwed to louver-blade-rotation cradles 110.
    Louver-blade-rotation-stanchions 111b
    is (or are respectively) screwed to first rainwater-channeling-and-leaf-filtering side gutter beam 123a.
12) Multi-louver-blade multi-position automatic-multi-screen-raising-and-lowering control system 112 is (or are respectively) connected by the combined connections of its components.
13) Multi-louver-control axels 113a
    is (or are respectively) secured to louver-blade end caps 106, and rotatably inserted into multi-louver-control-bar axel-insertion holes 115.
    Multi-louver-control-axel cotter-pins and cotter-pin holes 113b
    is (or are respectively) inserted into cotter-pin-holes 113b, and/or drilled into multi-louver-control axels 113a.
14) Multi-louver-control bar 114
    is (or are respectively) rotatably connected to multiple multi-louver-control axels 113a.
15) Multi-louver-control-bar axel-insertion holes 115
    is (or are respectively) drilled into multi-louver-control bar 114, and rotatably connected to multi-louver-control axels 113a.
16) Multi-louver-control linkage arm 116
    is (or are respectively) secured to worm-gear-transmission upper axel 117.
17) Worm-gear-transmission upper axel 117
    is (or are respectively) rotatably secured to worm-gear transmission 118.
18) Linkage-arm gear 118a
    rotatably secured to said worm-gear-transmission upper axel 117.
    Lower-axel gear 118b
    rotatably secured to said linkage-arm gear 118a.
19) Worm-gear-transmission lower axel 119
    is (or are respectively) rotatably secured to worm-gear transmission 118.
20) Multi-louver-control adjustable coupling loop 120
    is (or are respectively) set-screwed to worm-gear-transmission lower axel 119.
21) Removable-collapsible-and-stowable automatic-multi-screen-raising-and-lowering multi-louver-control crank tool 121
    is (or are respectively) removably hooked to multi-louver-control adjustable coupling loop 120.
22) Rainwater-channeling-and-collecting and leaf-separating-and-discharging gutter-beam system 122 is (or are respectively) connected by the combined connections of its components.
23) First rainwater-channeling-and-leaf-filtering side gutter beam 123a
    is (or are respectively) screwed to rainwater-channeling-and-leaf-filtering end gutter beams 124.
    Second rainwater-channeling-and-leaf-filtering side gutter beam 123b
    is (or are respectively) screwed to rainwater-channeling-and-leaf-filtering end gutter beams 124.
24) Rainwater-channeling-and-leaf-filtering end gutter beams 124 is (or are respectively) screwed to a first rainwater-channeling-and-leaf-filtering side gutter beam 123a and a second rainwater-channeling-and-leaf-filtering side gutter beam 123b.
25) Gutter-beam-securing bars 125
    is (or are respectively) screwed to first rainwater-channeling-and-leaf-filtering side gutter beam 123a, second rainwater-channeling-and-leaf-filtering side gutter beam 123b, and rainwater-channeling-and-leaf-filtering end gutter beams 124.
26) Leaf-separating-and-discharging rainwater gutters 126
    is (or are respectively) molded to first rainwater-channeling-and-leaf-filtering side gutter beam 123a, second rainwater-channeling-and-leaf-filtering side gutter beam 123b, and rainwater-channeling-and-leaf-filtering end gutter beams 124.
27) Leaf-separating-and-discharging drain holes 127a
    is (or are respectively) drilled into first rainwater-channeling-and-leaf-filtering side gutter beam 123a and second rainwater-channeling-and-leaf-filtering side gutter beam 123b.
    Leaf-separating-and-discharging opening 127b
    is (or are respectively) pressed/cutout of corner posts 132.
28) Leaf-separating-and-discharging tubes 128
    is (or are respectively) attached to first rainwater-channeling-and-leaf-filtering side gutter beam 123a and second rainwater-channeling-and-leaf-filtering side gutter beam 123b.
29) Rainwater-draining spouts 129
    is (or are respectively) molded to leaf-separating-and-discharging tubes 128.
30) Rainwater-draining spout holes 130
    is (or are respectively) drilled into corner posts 132.
31) Height-and-angle-adjustable-post-and-base system 131
    is (or are respectively) connected by the combined connections of its components.
32) Corner posts 132
    is (or are respectively) clamped to first rainwater-channeling-and-leaf-filtering side gutter beam 123a, second rainwater-channeling-and-leaf-filtering side gutter beam 123*b*, and rainwater-channeling-and-leaf-filtering end gutter beams 124, by gutter-beam-securing bars 125.
33) Corner-post L-shaped caps 133
   is (or are respectively) screwed to tops of corner posts 132.
34) Gutter-beam cradles 134
   is (or are respectively) cut out of corner posts 132.
35) Gutter-beam-securing-bar slots 135
   is (or are respectively) molded to corner posts 132.
36) Corner-post-base-plate covers 136
   is (or are respectively) removably attached to corner posts 132 and corner-posts base plate 137.
37) Corner-post base plates 137
   is (or are respectively) screwed to corner posts 132.
38) Height-and-angle-adjustable internally-externally-threaded tube screws 138*a*
   is (or are respectively) screwed to corner-post base plates 137.
   Height-and-angle-adjustable-internally-externally-threaded tube-screw holes 138*b* is (or are respectively) threaddedly drilled into corner-post base plates 137.
39) Anchoring-screw holes 139
   is (or are respectively) drilled into height-and-angle-adjustable tube screws 138*a*.
40) Anchoring screws 140
   is (or are respectively) inserted through anchoring-screw holes 139.
Function
   Referring to FIG. 1A, FIG. 1B, FIG. 1E, FIG. 1N, FIG. 1O, FIG. 1P, FIG. 1Q, FIG. 1R, FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 2S, FIG. 2T, FIG. 2U, FIG. 2V, FIG. 2W, FIG. 2X, FIG. 2Y, FIG. 2Z, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 3T, FIG. 4A, FIG. 4B, FIG. 4C, FIG. 9D, FIG. 9E, FIG. 10D, and FIG. 10E:
1) Wind-directing leaf-separating-and-discharging rainwater-sealing automatic-multi-screen-raising-and-lowering multi-screen-securing fruit-drying-and-sorting truck-bed-tonneau-covering louver-blade system 101 is for performing the combined functions of its components.
2) Wind-directing-and-rainwater-sealing multi-screen-securing louver blades 102 respectively are for:
   a) Functioning as a fruit sorting separator
      to automatically and adjustably divide the fruit according to predetermined diameters, being controlled by removable-collapsible-and-stowable automatic-multi-screen-raising-and-lowering multi-louver-control crank tool 121
      in the directions of arrows 141*a* and 141*b*
      (see FIG. 1N and FIG. 1O);
   b) Controlling the deployment and retraction of a video projection screen
      (see FIG. 2C, FIG. 2D, FIG. 3H, and FIG. 3I);
   c) Functioning as a tonneau cover
      to actuate a quick visual view of tools and other storage items within a truck bed
      in the directions of arrows 142*a*, 142*b*, and 142*c*
      (see FIG. 2C, FIG. 2D, FIG. 10G, and FIG. 10H);
   d) Functioning as an adjustable ventilating tonneau cover for pet containment
      to regulate the degree of louver opening while containing a pet within a truck bed, thereby regulating ventilation
      in the directions of arrows 143*a*, 143*b*, and 143*c*
      (see FIG. 2C, FIG. 10G, and FIG. 10H);
   e) Providing means to secure a mesh shade screen
      to regulate predetermined degrees of sun exposure
      (see FIG. 3J and FIG. 3K).
   f) Functioning as a food dryer
      to predeterminatly regulate quicker or slower drying duration
      (see FIG. 2K, FIG. 2X, FIG. 2Y, and FIG. 3P);
   g) Directing airflow from above wind-directing-and-rainwater-sealing multi-screen-securing louver blades 102 to below wind-directing-and-rainwater-sealing multi-screen-securing louver blades 102
      to provide airflow for occupants therebelow;
   h) Controlling a predetermined volume of airflow being directed from above wind-directing-and-rainwater-sealing multi-screen-securing louver blades 102 to below wind-directing-and-rainwater-sealing multi-screen-securing louver blades 102
      to regulate the comfort level for occupants therebelow
      in the directions of arrows 144*a* and 144*b*
      (see FIG. 2L, FIG. 10G, and FIG. 10H);
   i) Blocking rainwater
      to keep occupants dry therebelow
      (see FIG. 2V, FIG. 2W, and FIG. 2X);
   j) Blocking sunrays
      to protect the occupants therebelow from ultraviolet exposure
      (see FIG. 2W, and FIG. 2X);
   k) Controlling a predetermined amount of sunrays
      to regulate the occupant's exposure therebelow
      (see FIG. 2V, FIG. 2W, and FIG. 2X); and
   l) Functioning as an adjustable ventilating tonneau cover for pet containment
      to regulate the degree of louver opening while containing a pet within a truck bed, thereby regulating sun exposure.
      (see FIG. 2C, FIG. 2D, FIG. 10G, and FIG. 10H).
3) Wind-directing-and-rainwater-sealing-louver-blade multi-screen-securing leading edges 103 respectively are for:
   a) Providing a structural member on which to mount louver-blade rainwater-and-wind-sealing rattle-preventing insulation strips 104
      to thereby prevent rattling and vibration
      (see FIG. 1P, FIG. 1Q, FIG. 2B, FIG. 2E, and FIG. 2F);
   b) Providing a structural member on which to mount louver-blade rainwater-and-wind-sealing rattle-preventing insulation strips 104
      to create a sealed connection and limit noise transfer, thereby creating
      a quieter environment
      (see FIG. 2C, FIG. 2D, FIG. 2E, and FIG. 2F);
   c) Providing a structural member on which to mount louver-blade rainwater-and-wind-sealing rattle-preventing insulation strips 104
      to create a sealed connection and prevent rainwater leakage
      (see FIG. 2C, FIG. 2D, and FIG. 2F);
   d) Providing a structural member on which to mount louver-blade rainwater-and-wind-sealing rattle-preventing insulation strips 104
      to create a sealed connection and prevent sunrays to pass therethrough; and
   e) Enclosing the upward-pointed edge of louver-blade wind- and rainwater-directing trailing edges 105 to guide rainwater flow into louver-blade wind- and rainwater-directing
trailing edges 105
(see FIG. 1P, FIG. 1Q, FIG. 2C, FIG. 2D, and FIG. 2F).
4) Louver-blade rainwater-and-wind-sealing rattle-preventing insulation strips 104 respectively are for:
a) Sealing the space between adjacent wind-directing-and-rainwater-sealing multi-screen-securing louver blades 102
to thereby prevent rainwater from leaking through
(see FIG. 1P, FIG. 1Q, FIG. 2E, and FIG. 2F);
b) Sealing the space between adjacent wind-directing-and-rainwater-sealing multi-screen-securing louver blades 102
to thereby prevent air from flowing through
(see FIG. 2C, FIG. 2D, FIG. 2E, and FIG. 2F); and
c) Providing dampening between adjacent wind-directing-and-rainwater-sealing multi-screen-securing louver blades 102
to thereby prevent rattling and vibration
(see FIG. 1P, FIG. 1Q, FIG. 2C, FIG. 2D, and FIG. 2F).
5) Louver-blade wind- and rainwater-directing trailing edges 105 respectively are for:
a) Releasably securing multiple projector screens thereon
(see FIG. 2A, FIG. 2B, FIG. 3H, and FIG. 3I);
b) Releasably securing both ends of sunshade thereon in horizontal or vertical position
(see FIG. 2A, FIG. 2B, FIG. 3J, and FIG. 3K);
c) Functioning as a C-channel
to enclose adjacent downward-pointed edge of wind-directing-and-rainwater-sealing-louver-blade multi-screen-securing leading edges 103
(see FIG. 2A, FIG. 2B, and FIG. 2C);
d) Functioning as a C-channel
to block airflow through adjacent wind-directing-and-rainwater-sealing-louver-blade multi-screen-securing leading edges 103
(see FIG. 2A, FIG. 2B, and FIG. 2C);
e) Functioning as a C-channel
to block sunrays between adjacent wind-directing-and-rainwater-sealing-louver-blade multi-screen-securing leading edges 103
(see FIG. 2B and FIG. 2C); and
f) Functioning as a gutter
to guide rainwater flow into first rainwater-channeling-and-leaf-filtering side gutter beam 123a and second rainwater-channeling-and-leaf-filtering side gutter beam 123b
(see FIG. 2A, FIG. 2B, FIG. 2C, and FIG. 2D).
6) Louver-blade end caps 106 respectively are for:
Providing a secured enclosure to the opposing ends of wind-directing-and-rainwater-sealing multi-screen-securing louver blades 102
(see FIG. 2A, FIG. 2B, FIG. 2C, FIG. 2D, and FIG. 2E).
7) Louver-blade-supporting insertion axels 107 respectively are for:
Providing a rotatable, structural member, to laterally support wind-directing-and-rainwater-sealing multi-screen-securing louver blades 102
(see FIG. 2B, FIG. 2C, FIG. 2D, FIG. 2E, and FIG. 2K).
8) Louver-blade-rotation receiving holes 108 respectively are for:
Receiving the insertion of louver-blade-supporting insertion axels 107
(see FIGS. 2G and 2K).
9) Louver-blade-rotation cradle axels 109 respectively are for:
Inserting between louver-blade-rotation cradles 110 and louver-blade-rotation-cradle caps 111a and providing lateral support to wind-directing-and-rainwater-sealing multi-screen-securing louver blades 102
(see FIG. 2F, FIG. 2H, FIG. 2L, FIG. 2M, and FIG. 2N).
10) Louver-blade-rotation cradles 110 respectively are for:
Rotatably supporting cradle axels 109, and being secured to second rainwater-channeling-and-leaf-filtering side gutter beam 123b
(see FIG. 2F, FIG. 2L, FIG. 2M, and FIG. 2N).
11) Louver-blade-rotation-cradle caps 111a respectively are for:
Being secured to louver-blade-rotation cradles 110
to provide enclosure to cradle axels 109
(see FIG. 2I and FIG. 2N).
Louver-blade-rotation-stanchions 111b respectively are for:
Providing structural support and rotatable function to louver-blade-supporting insertion axels 107
(see FIG. 2G and FIG. 2K).
12) Multi-louver-blade multi-position automatic-multi-screen-raising-and-lowering control system 112 is for performing the combined functions of its components.
13) Multi-louver-control axels 113a respectively are for:
inserting into multi-louver-control-bar axel-insertion holes 115 and providing lateral support to wind-directing-and-rainwater-sealing multi-screen-securing louver blades 102.
Multi-louver-control-axel cotter-pins and cotter-pin holes 113b securing multi-louver-control axels 113a to multi-louver-control bar 114
(see FIG. 2E and FIG. 2V).
14) Multi-louver-control bar 114 is for:
Rotatably connecting multiple multi-louver-control axels 113a.
to thereby provide controlled movement to multiple multi-louver-control axels 113a simultaneously
in the directions of arrows 142a, 142b, 142c, 143a, 143b, and 143c
(see FIG. 2C, FIG. 2D, FIG. 2V, and FIG. 2W).
15) Multi-louver-control-bar axel-insertion holes 115 respectively are for:
Receiving the insertion of multi-louver-control axels 113a
(see FIG. 2V).
16) Multi-louver-control linkage arm 116 is for:
Connecting worm-gear-transmission upper axel 117 to a multi-louver-control axel 113a
(see FIG. 2V, FIG. 2W, FIG. 2Y, and FIG. 2Z).
17) Worm-gear-transmission upper axel 117 is for:
Connecting worm-gear transmission 118a to multi-louver-control linkage arm 116, attached within first rainwater-channeling-and-leaf-filtering side gutter beam 123a, supported by gutter-beam-securing bars 125 within gutter-beam-securing-bar slots 135
in the directions of arrows 145a, 145b, 146a, 146b, 147a, and 147b (see FIG. 2C, FIG. 2R, FIG. 2Y, FIG. 2Z, FIG. 10G, and FIG. 10H).
18) Linkage-arm gear 118a is for:
Providing means to transition the rotation of lower-axel gear 118b to a rotation of worm-gear-transmission upper axel 117
(see FIG. 2Y).

Lower-axel gear 118*b* is for:
Providing means to transition a vertical rotation of worm-gear-transmission lower axel 119 to the rotation of linkage-arm gear 118*a*
(see FIG. 2Y).

19) Worm-gear-transmission lower axel 119 respectively are for:
Securing multi-louver-control adjustable coupling loop 120 to worm-gear transmission 118
(see FIG. 2V and FIG. 2W).

20) Multi-louver-control adjustable coupling loop 120 respectively are for:
Rotatably and removably connecting removable-collapsible-and-stowable automatic-multi-screen-raising-and-lowering multi-louver-control crank tool 121 to worm-gear-transmission lower axel 119
(see FIG. 2V and FIG. 2W).

21) Removable-collapsible-and-stowable automatic-multi-screen-raising-and-lowering multi-louver-control crank tool 121 respectively are for:
 a) Providing means for a person operating such
  to predeterminatly provide greater or less airflow;
 b) Providing means for a person operating such
  to predeterminatly provide greater or less sun exposure
  (see FIG. 1B, FIG. 1N, and FIG. 1O);
 c) Providing means for a person operating such
  to predeterminatly provide temperature control;
 d) Providing means for a person operating such, when functioning as a food dryer
  to predeterminatly regulate quicker or slower drying duration to food (see FIG. 1B, FIG. 1N, and FIG. 3P).
 e) Providing means for a person operating such, when functioning as a tonneau cover
  to actuate a quick visual view of tools and other storage items within a truck bed
  (see FIG. 1B, FIG. 1N, and FIG. 10H);
 f) Providing means for a person to raise and lower a mesh shade screen 162 to regulate predetermined degrees of sun exposure,
  (see FIG. 1B, FIG. 1N, and FIG. 3K);
 g) Providing means for a person to raise and lower a projector screen
  to provide a retractable vertical surface for projecting video movies utilizing the multi-louver-blade multi-position automatic-multi-screen-raising-and-lowering control system 112 operating in the directions of arrows 148*a*, 148*b*, 148*c*, 148*d*, 149, 150*a*, 150*b*, 150*c*, 150*d*, 151*a*, 151*b*, 151*c*, 151*d*, 152, 153*a*, 153*b*, 153*c*, 153*d*, 154, 155*a*, 155*b*, 156, 157*a*, 157*b*, 158, 159*a*, and 159*b*, for screens 160*a* and 160*b* operating in the directions of arrows 161*a*, and 161*b*
  (see FIG. 2V, FIG. 2W, FIG. 2Y, FIG. 2Z, FIG. 3H, and FIG. 3I); and
 h) Providing means for a person to raise and lower a curtain
  to provide a retractable privacy screen utilizing the multi-louver-blade multi-position automatic-multi-screen-raising-and-lowering control system 112 whereby cord 163*a* operates a curtain 163*b* in the directions of arrows 148*a*, 148*b*, 148*c*, 148*d*, 149, 150*a*, 150*b*, 150*c*, 150*d*, 151*a*, 151*b*, 151*c*, 151*d*, 152, 153*a*, 153*b*, 153*c*, 153*d*, 154, 155*a*, 155*b*, 156, 157*a*, 157*b*, 158, 159, 164, 165, and 166
  (see FIG. 2V, FIG. 2W, FIG. 2Y, FIG. 2Z, FIG. 3L, FIG. 3M, FIG. 3N, and FIG. 3O).

22) Rainwater-channeling-and-collecting and leaf-separating-and-discharging gutter-beam system 122 is for performing the combined functions of its components.

Figure 2A:
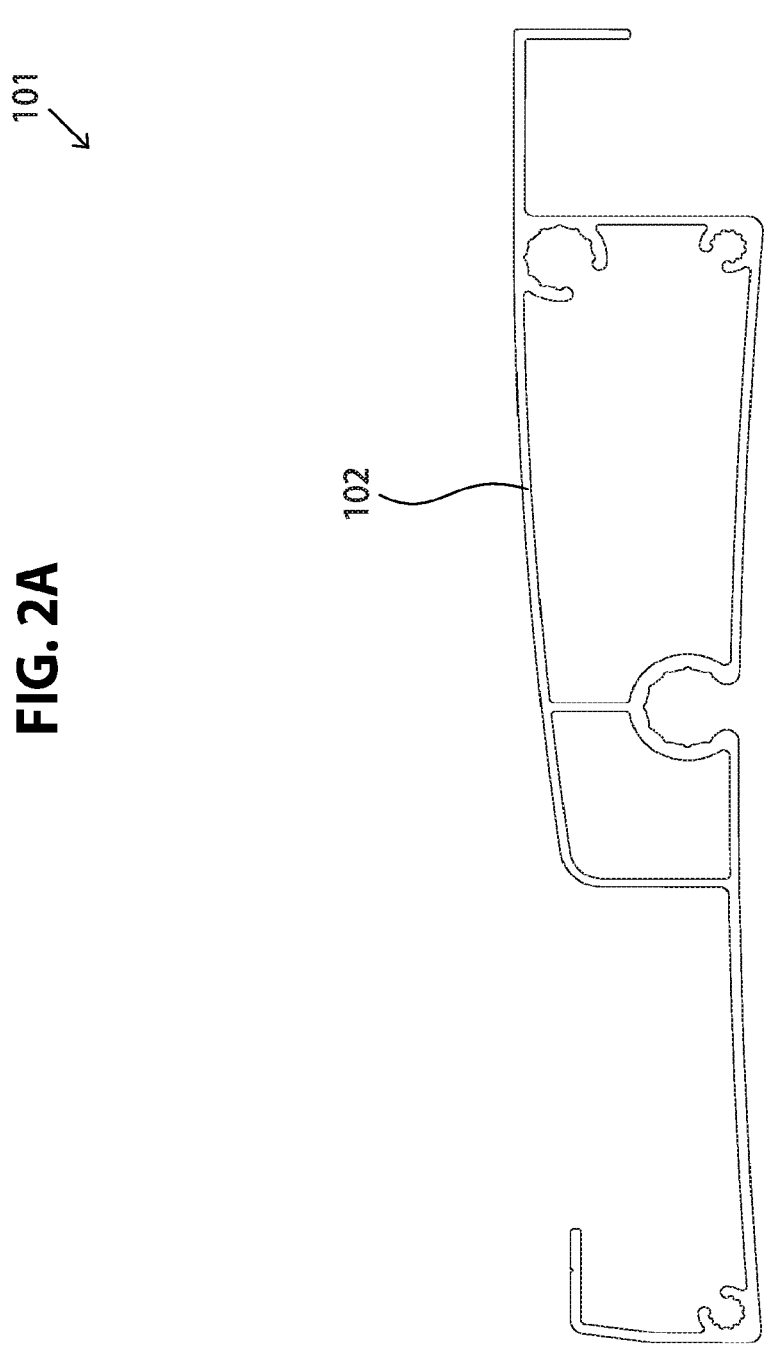
FIG. 2A illustrates a sectional profile view of a wind-directing-and-rainwater-sealing multi-screen-securing louver blade.
Figure 2B:
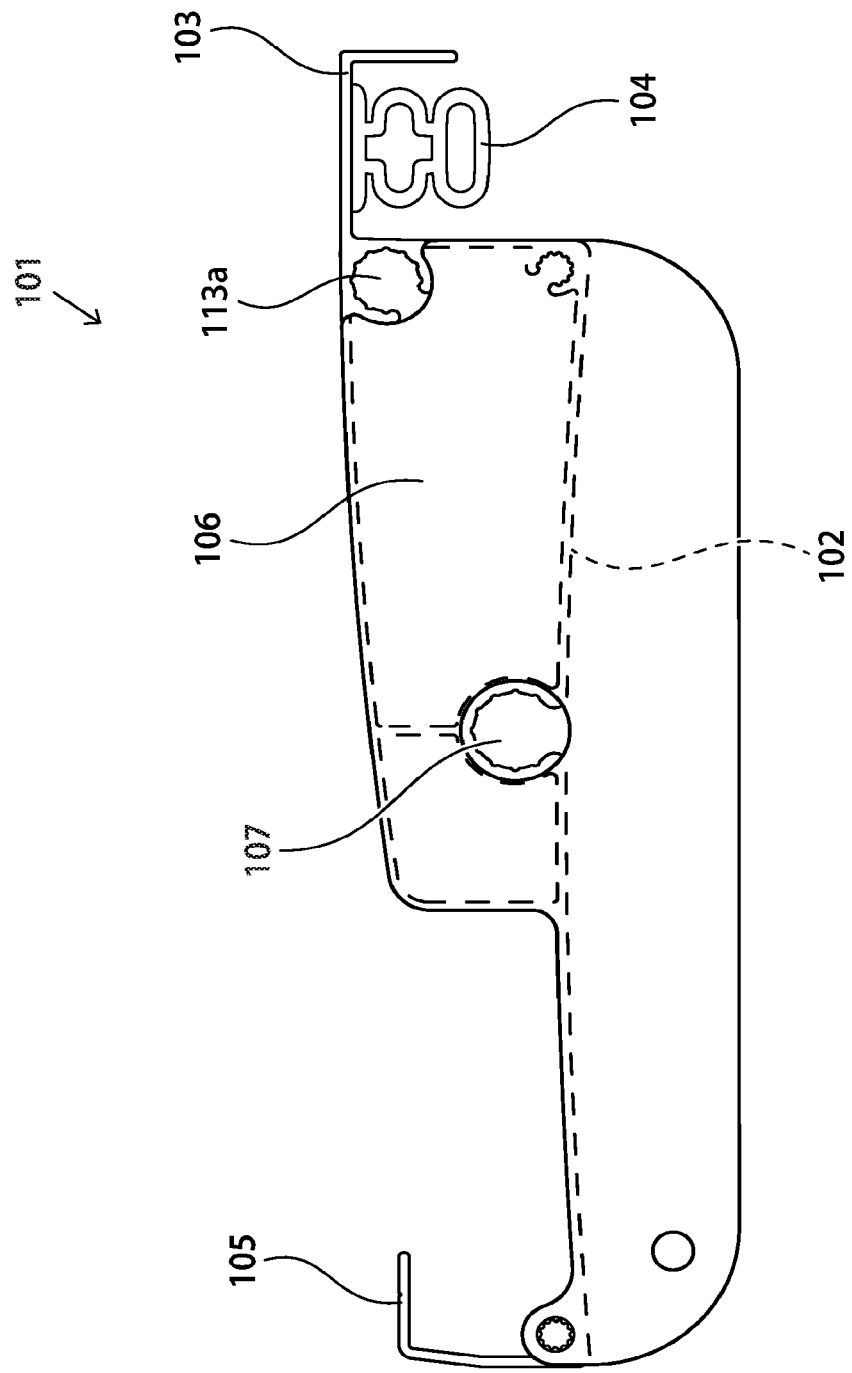
FIG. 2B illustrates a hidden-line sectional profile view of a wind-directing-and-rainwater-sealing multi-screen-securing louver blade with a louver-blade end cap and louver-blade rainwater-and-wind-sealing rattle-preventing insulation strip.
Figure 2C:
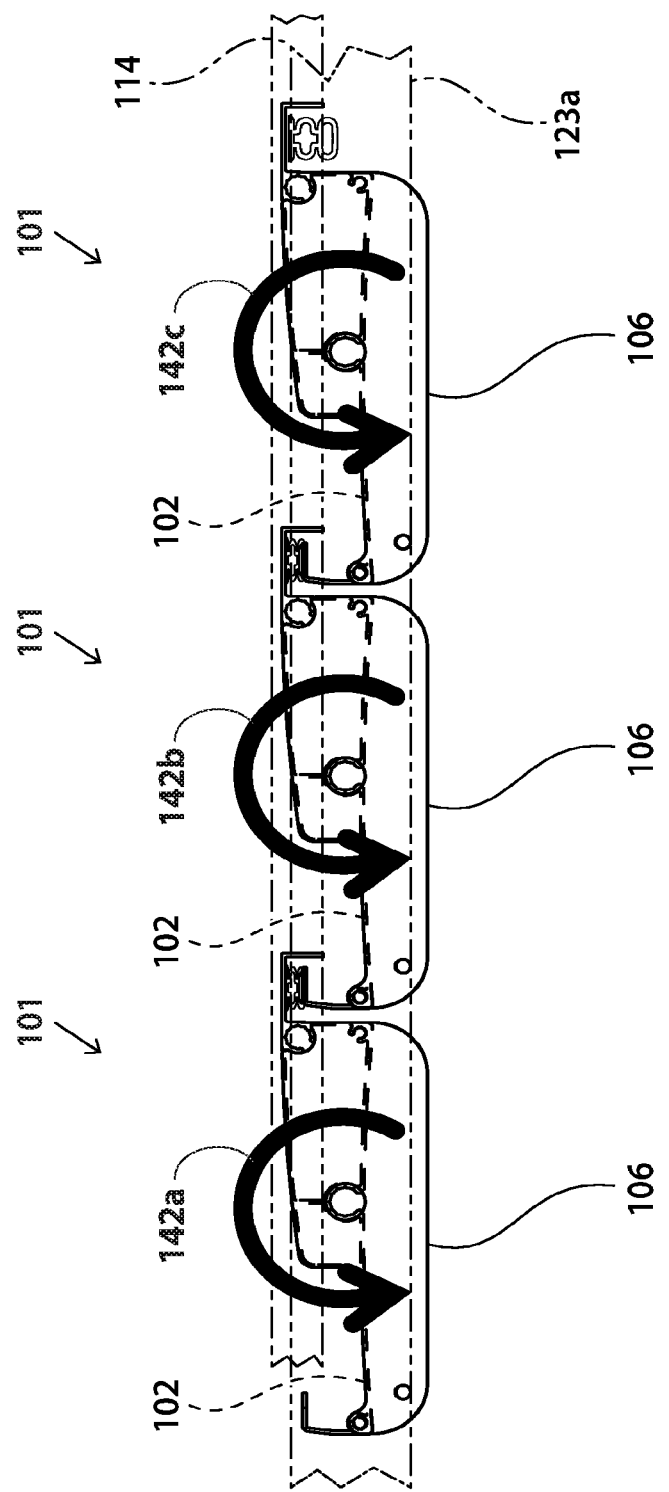
FIG. 2C illustrates a diagram depicting a profile view of multiple wind-directing-and-rainwater-sealing multi-screen-securing louver blades, in a closed position, controlled by multi-louver-control bar.
Figure 2D:
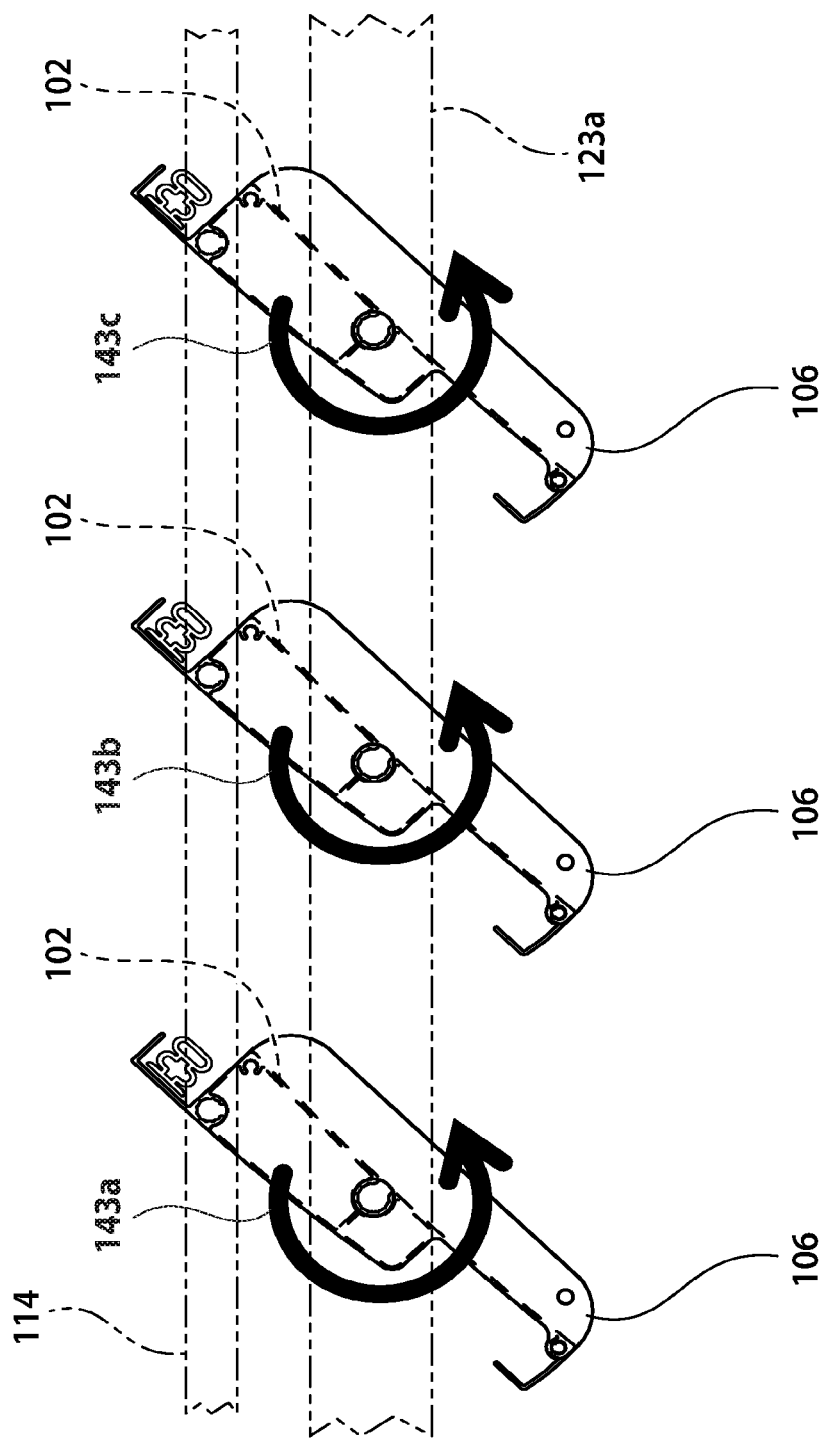
FIG. 2D illustrates a diagram depicting a profile view of multiple wind-directing-and-rainwater-sealing multi-screen-securing louver blades, in an open position, supported by a first rainwater-channeling-and-leaf-filtering side gutter beam, and controlled by multi-louver-control bar.
Figure 2E:
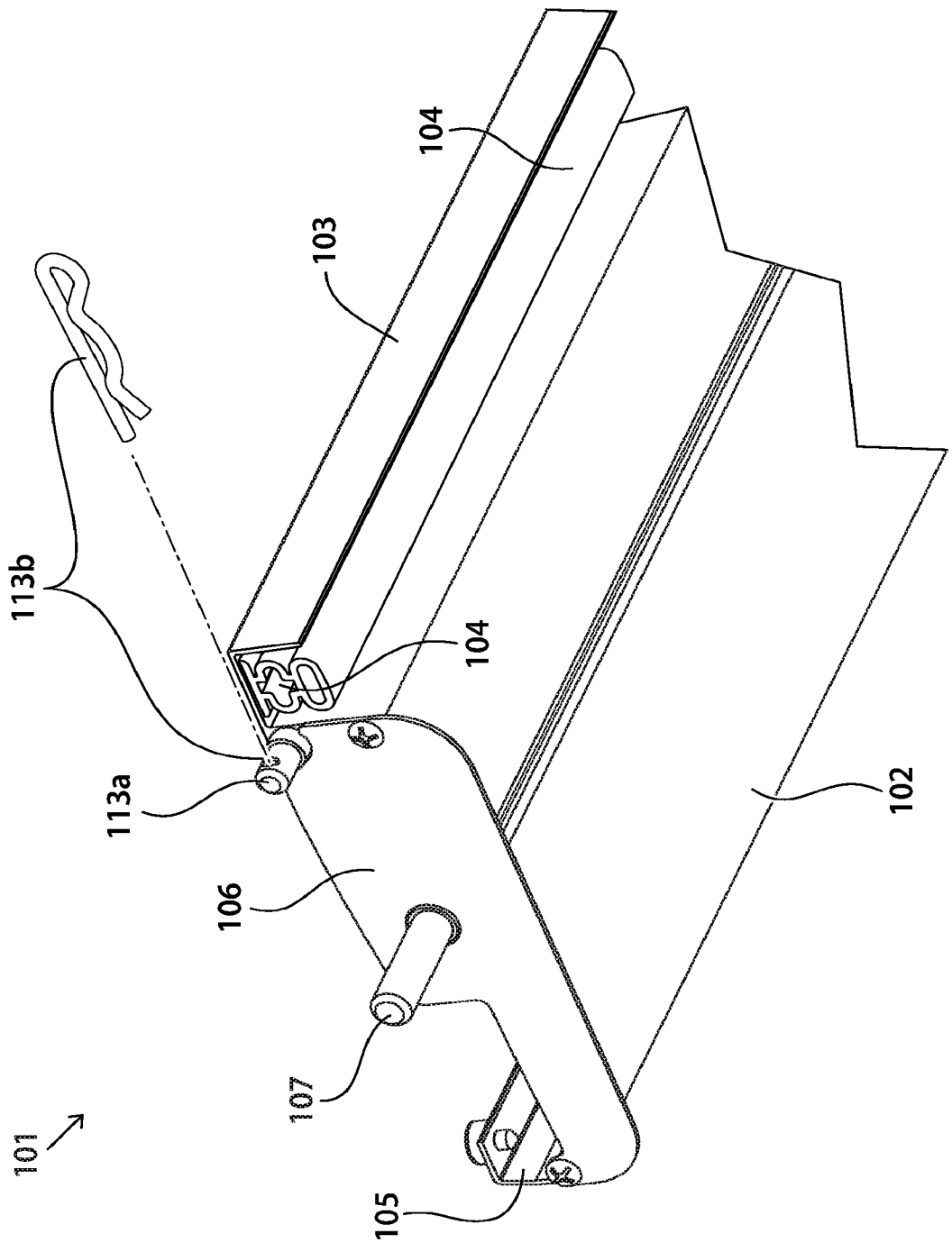
FIG. 2E illustrates a partial perspective view of multiple wind-directing-and-rainwater-sealing multi-screen-securing louver blade, multi-louver-control axels, louver-blade-supporting insertion axels, multi-louver-control-axel cotter-pins and cotter-pin holes, and louver-blade rainwater-and-wind-sealing rattle-preventing insulation strips.
Figure 2F:
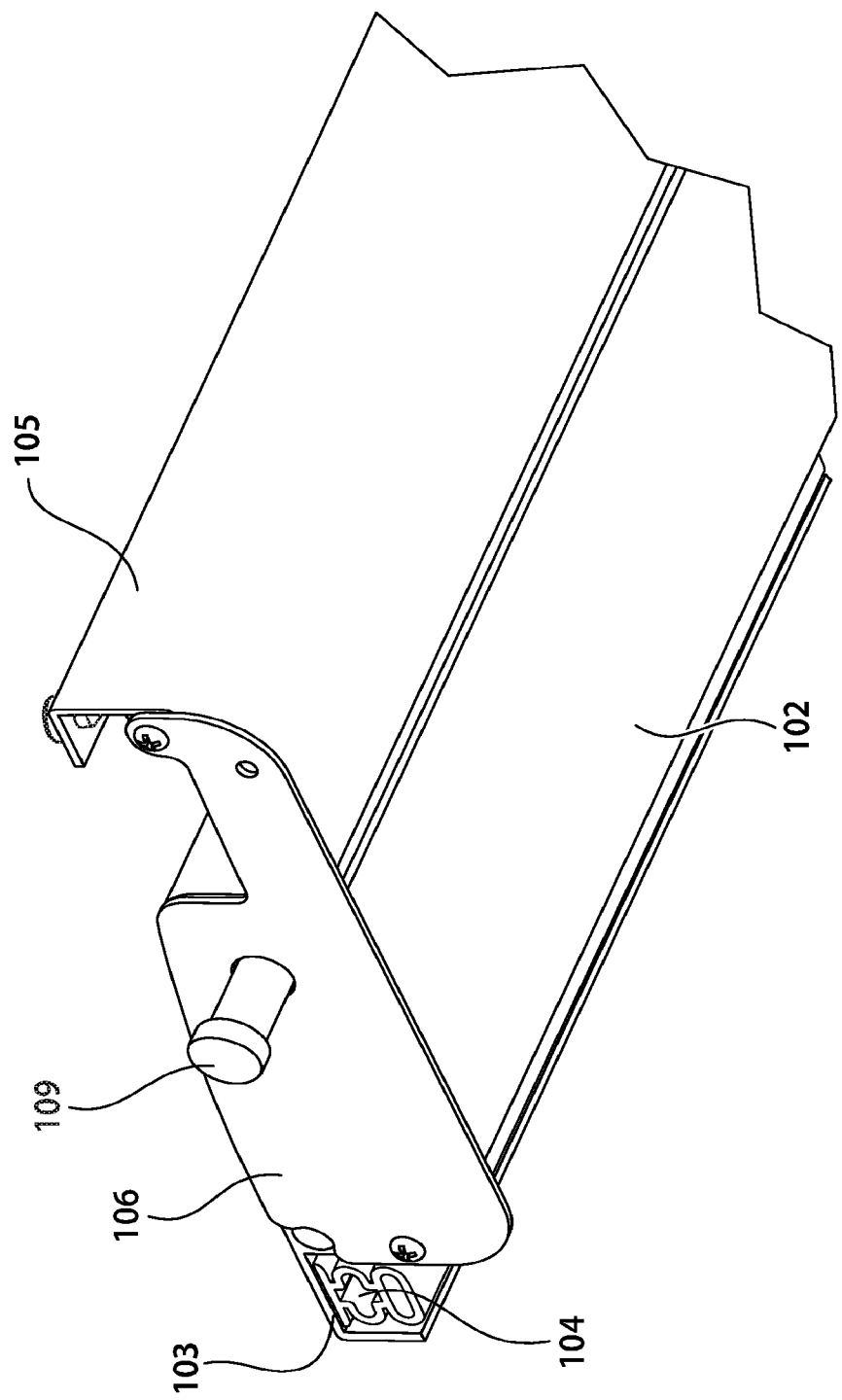
FIG. 2F illustrates a partial perspective view of multiple wind-directing-and-rainwater-sealing multi-screen-securing louver blade, louver-blade-rotation cradle axels, and louver-blade rainwater-and-wind-sealing rattle-preventing insulation strips.
Figure 2G:
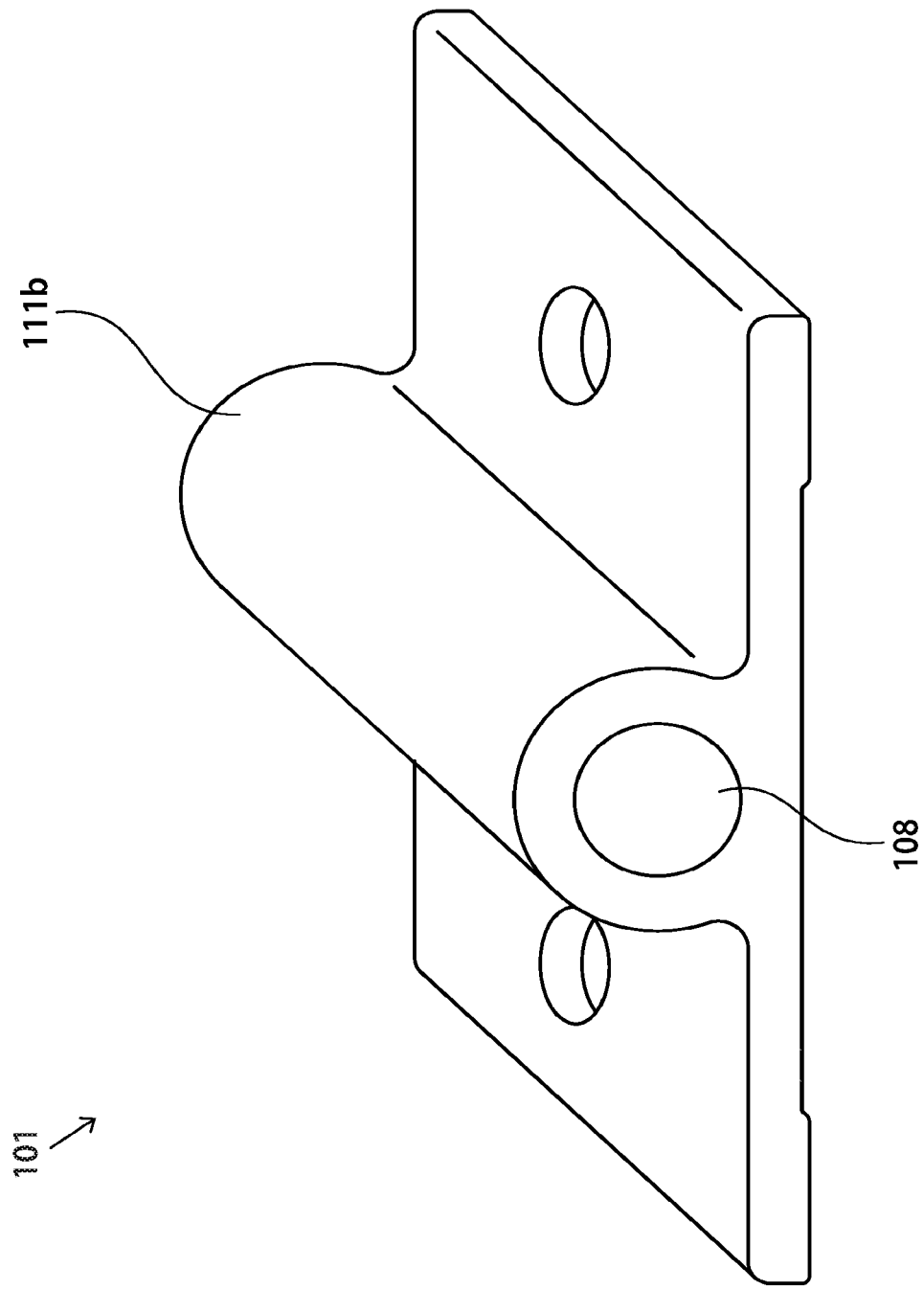
FIG. 2G illustrates a perspective view of a louver-blade-rotation-stanchion.
Figure 2H:
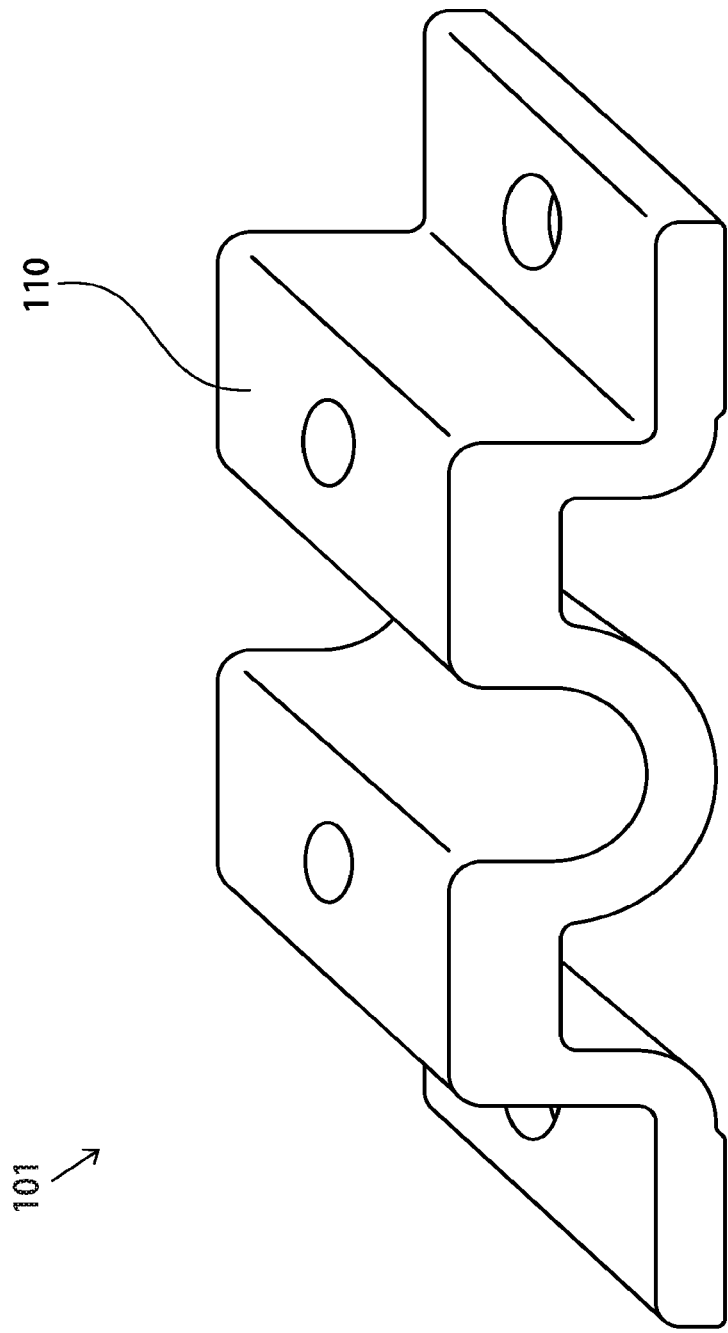
FIG. 2H illustrates a perspective view of a louver-blade-rotation cradle.
Figure 2J:
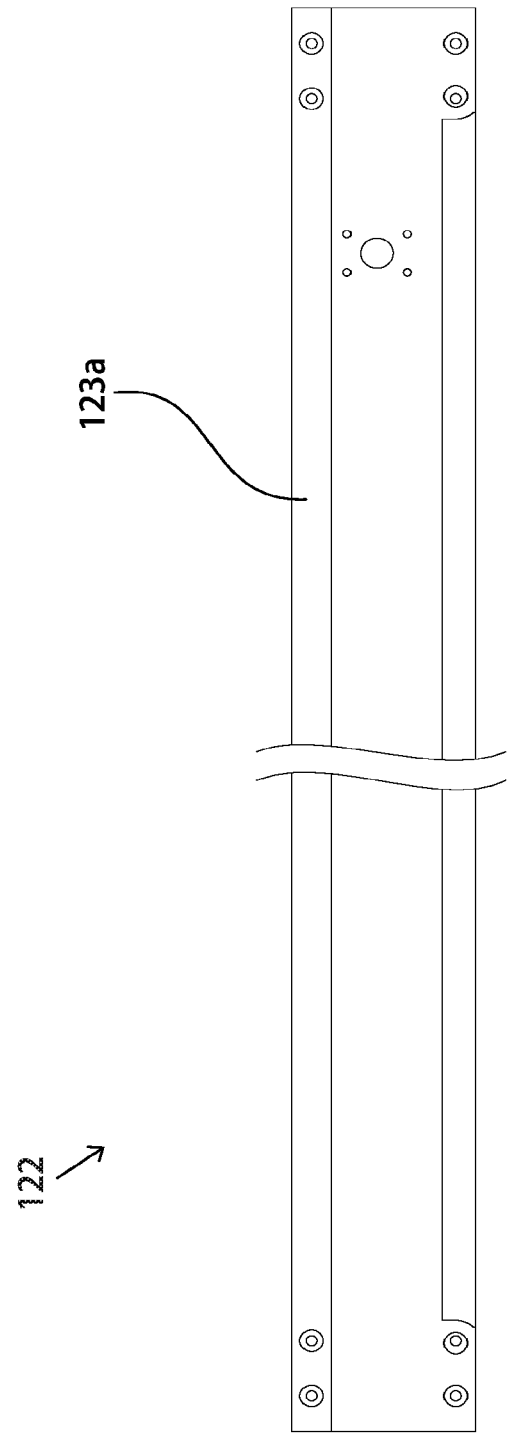
FIG. 2J illustrates a side view of a first rainwater-channeling-and-leaf-filtering side gutter beam.
Figure 2K:
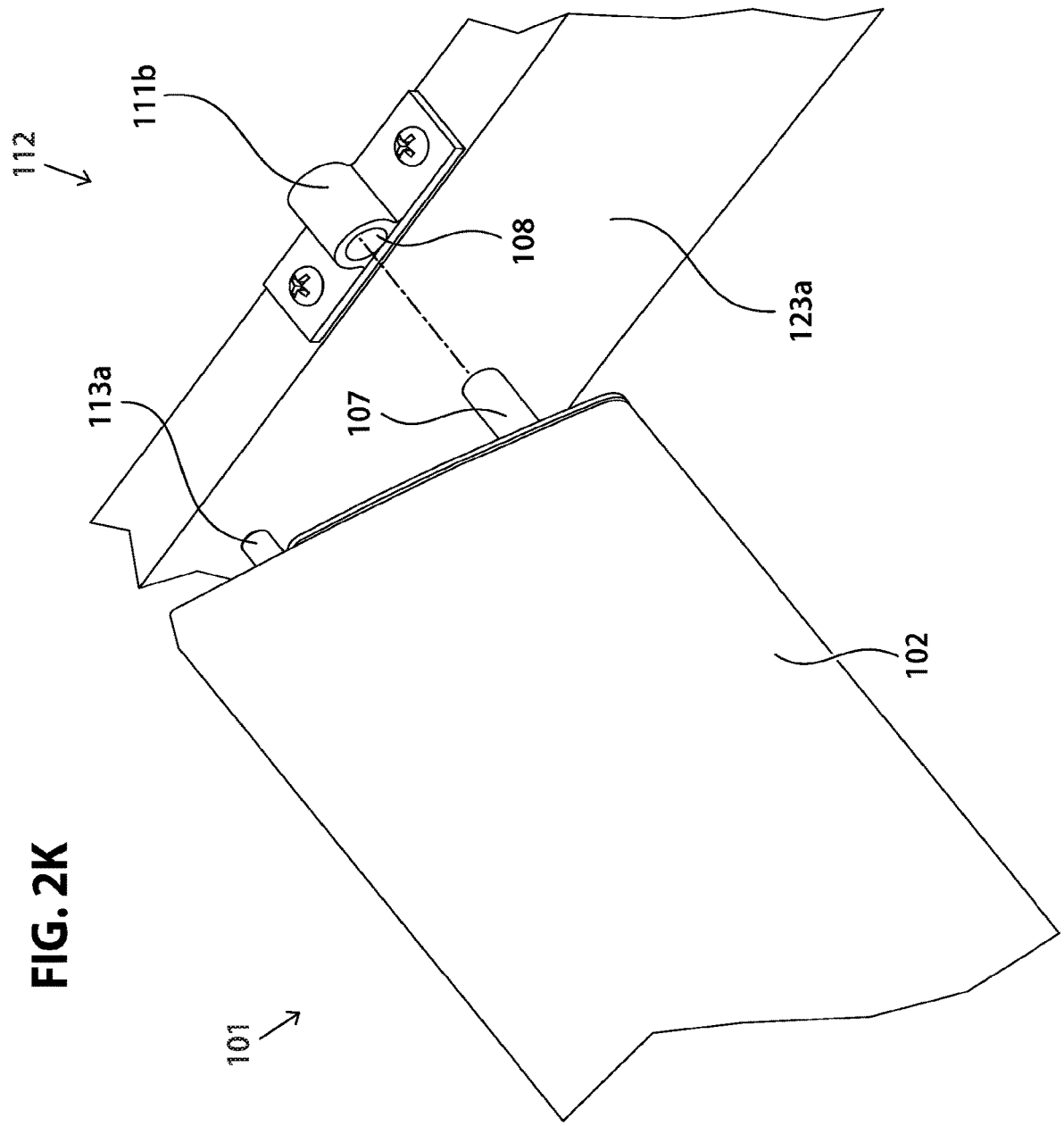
FIG. 2K illustrates a partial perspective view of a louver-blade-supporting insertion axel being inserted into a louver-blade-rotation receiving hole.
Figure 2L:
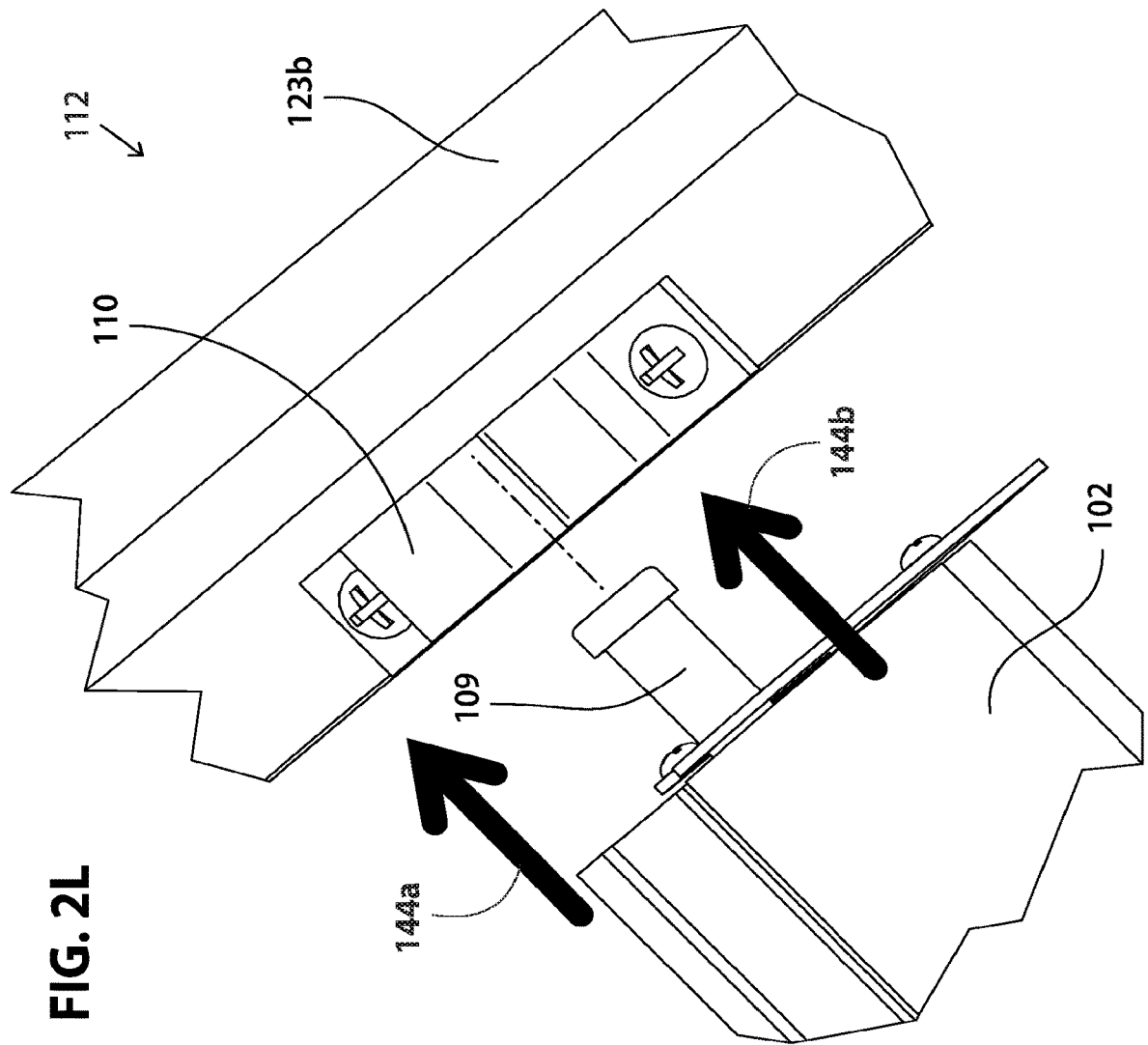
FIG. 2L illustrates a partial perspective view of a louver-blade-rotation cradle axel beside a louver-blade-rotation cradle.
Figure 2M:
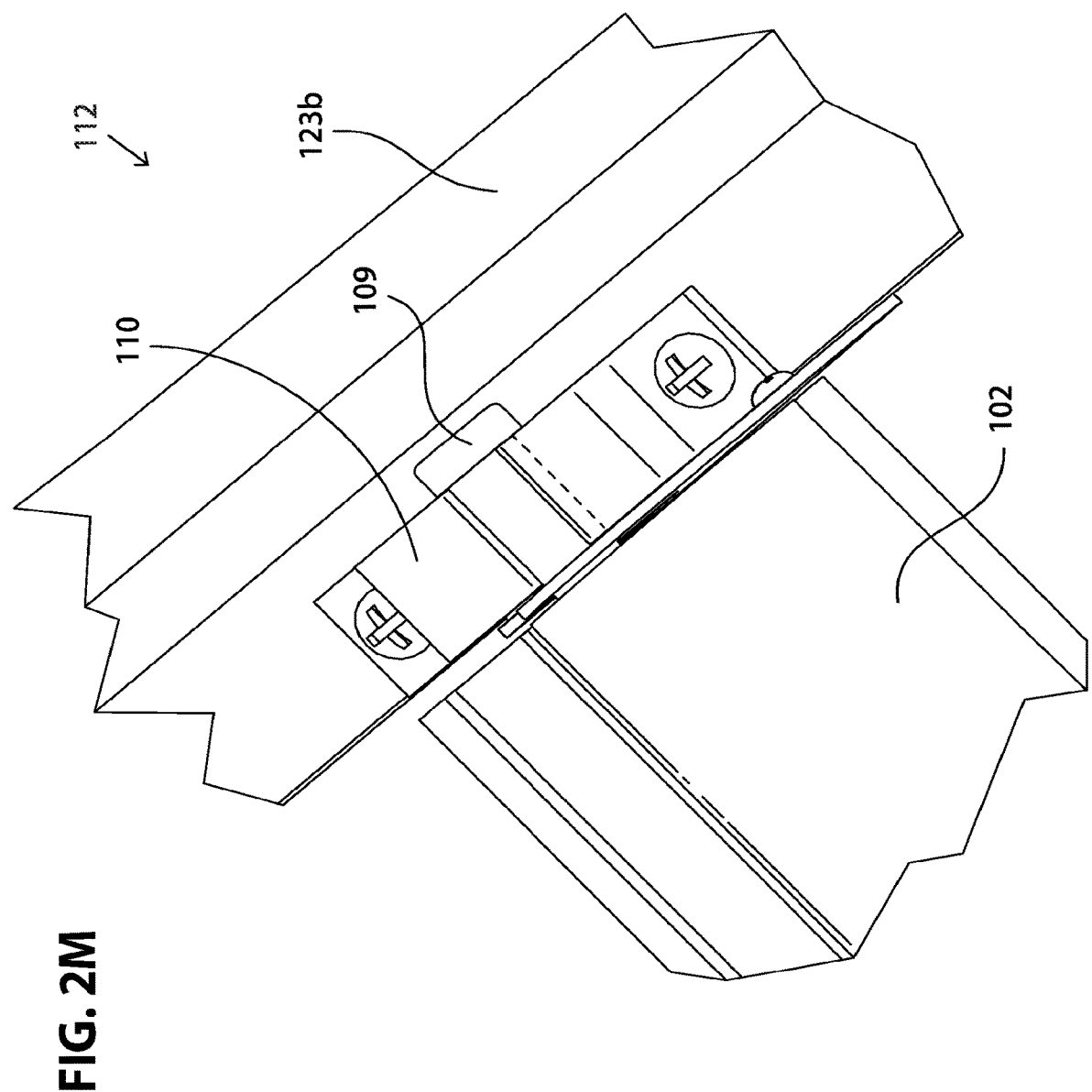
FIG. 2M illustrates a partial perspective view of a louver-blade-rotation cradle axel set in a louver-blade-rotation cradle.
Figure 2N:
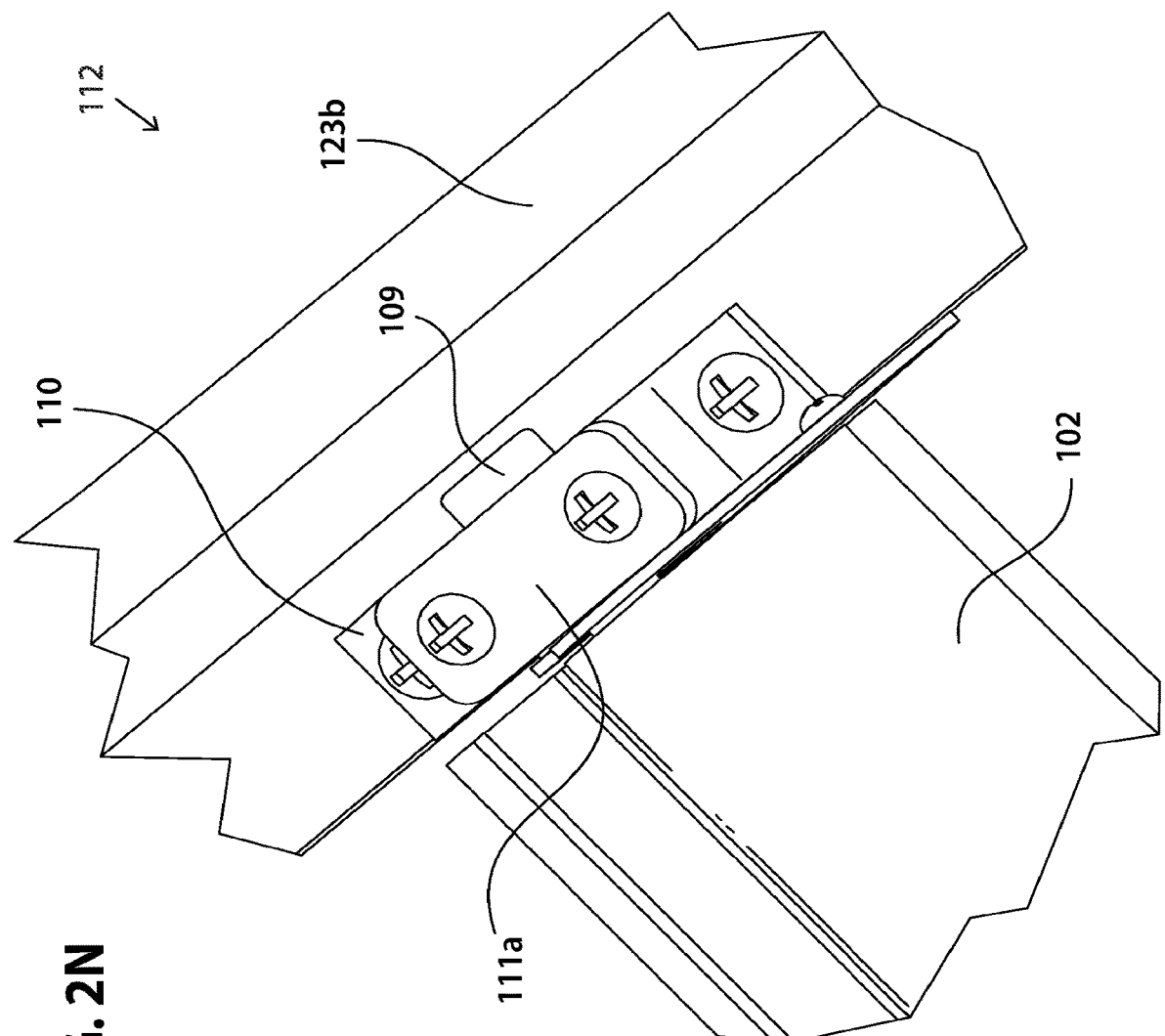
FIG. 2N illustrates a partial perspective view of a louver-blade-rotation cradle axel installed into a louver-blade-rotation cradle with louver-blade-rotation-cradle cap.
Figure 20:
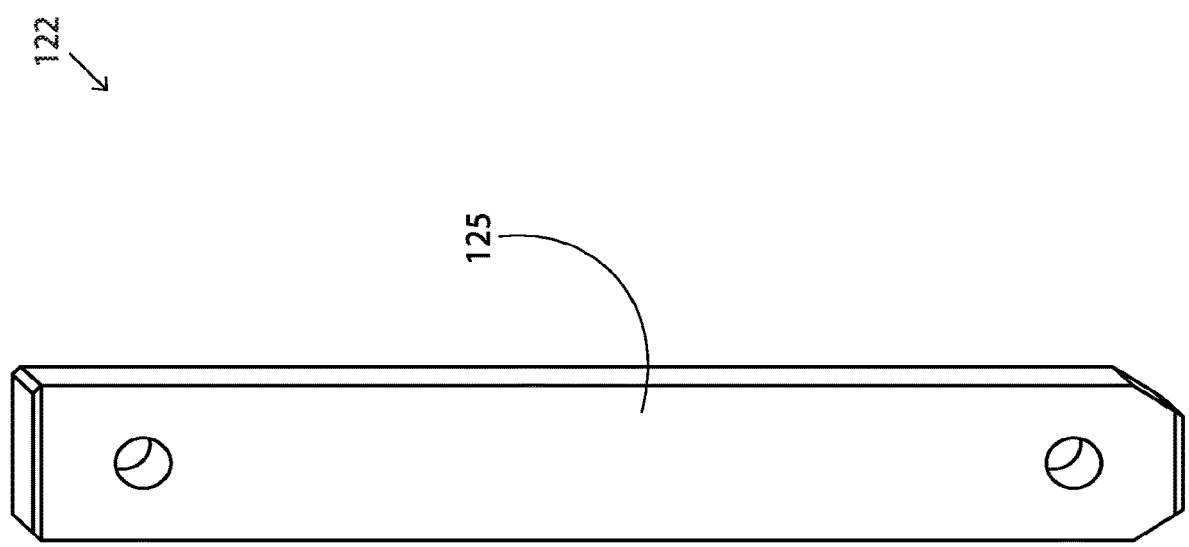
Figure 2P:
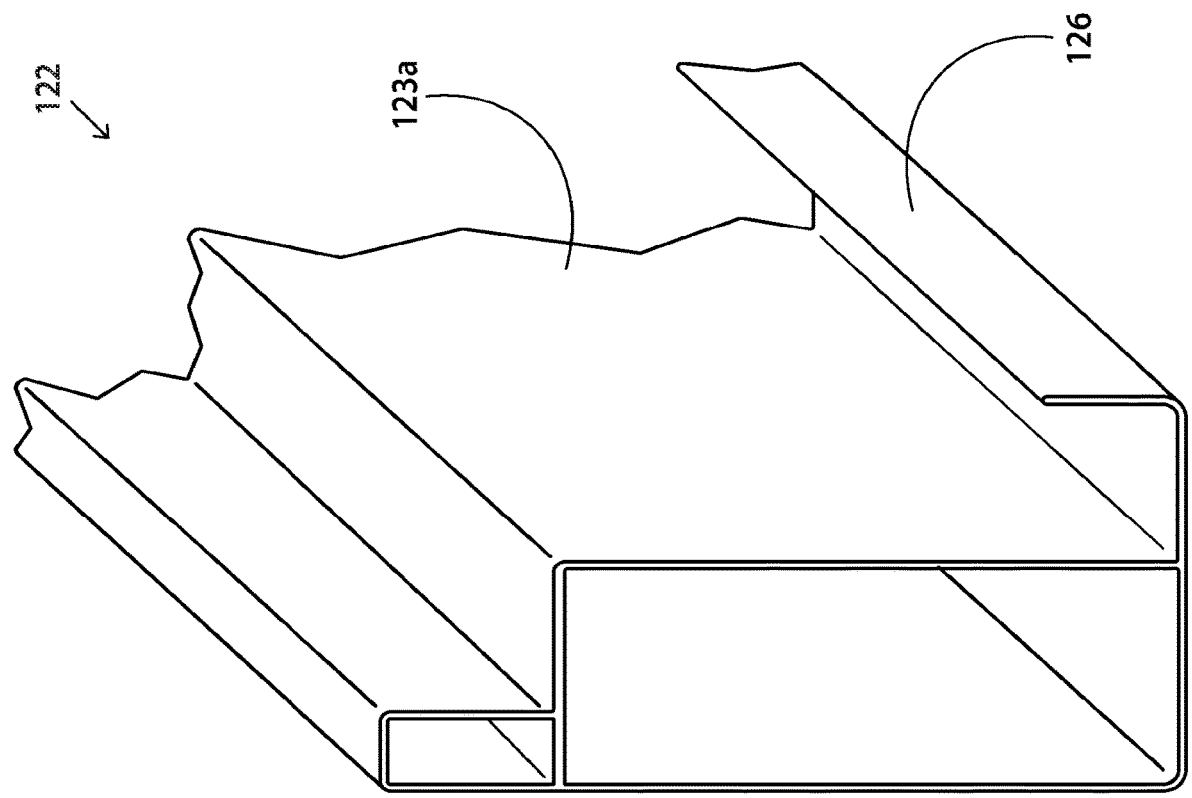
FIG. 2P illustrates a partial perspective view of a rainwater-channeling-and-leaf-filtering end gutter beams and leaf-separating-and-discharging rainwater gutter.
Figure 2S:
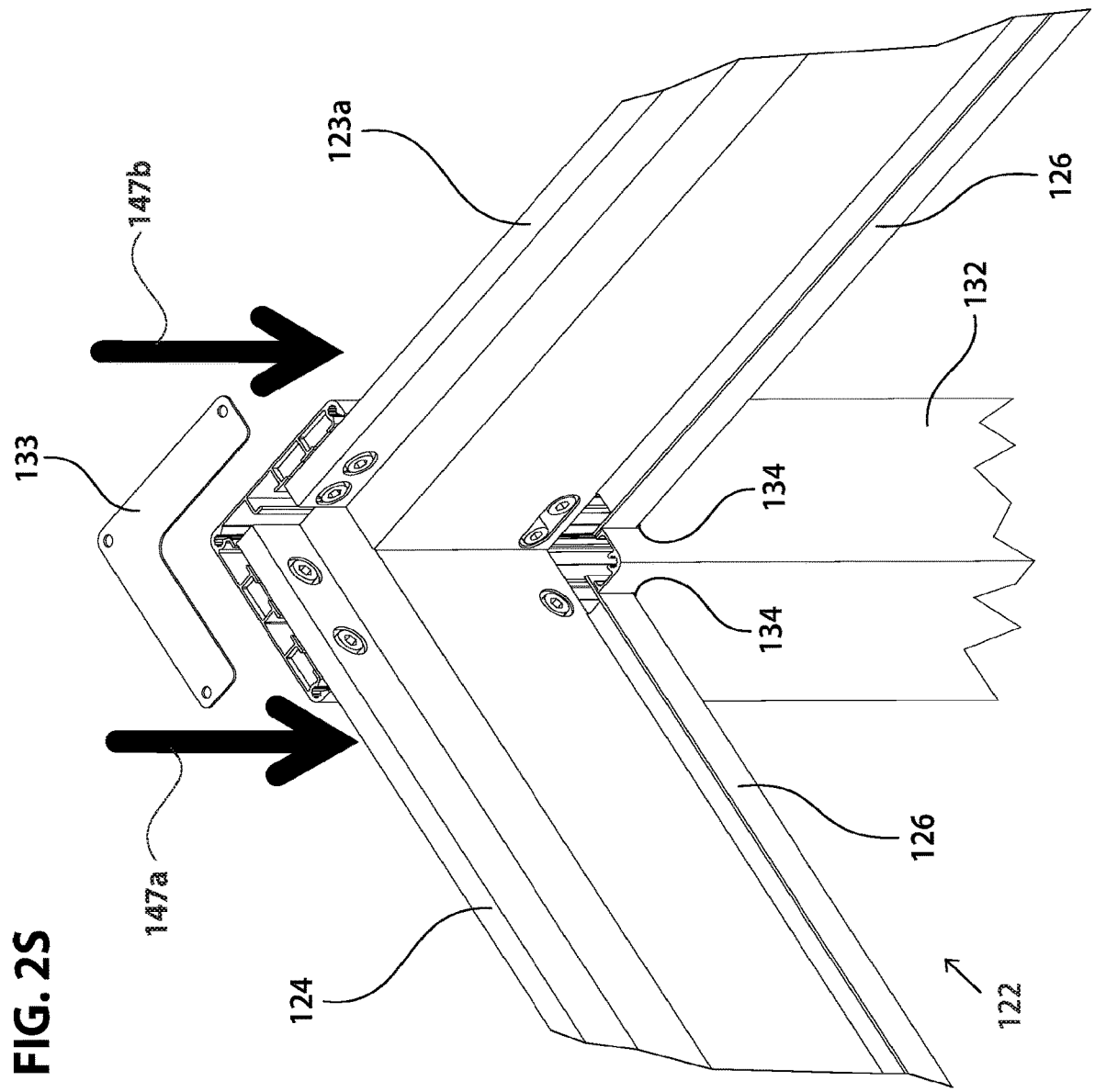
FIG. 2S and FIG. 2T illustrate partial perspective views demonstrating a leaf-separating-and-discharging rainwater gutter, a rainwater-channeling-and-leaf-filtering end gutter beams, and a first rainwater-channeling-and-leaf-filtering side gutter beam attached to a corner post, with a corner-post L-shaped cap above, or attached, respectively.
Figure 2T:
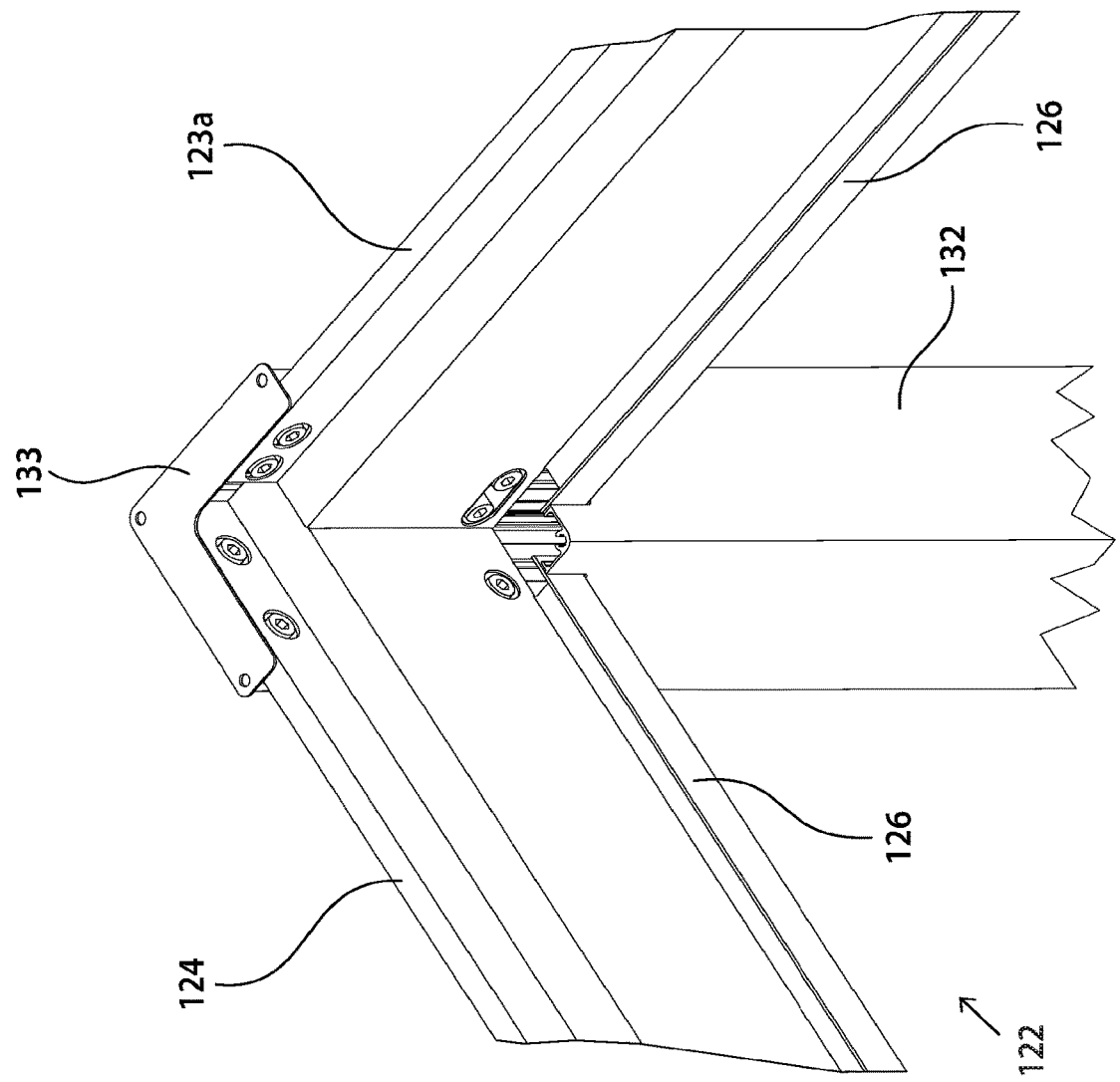
Figure 2U:
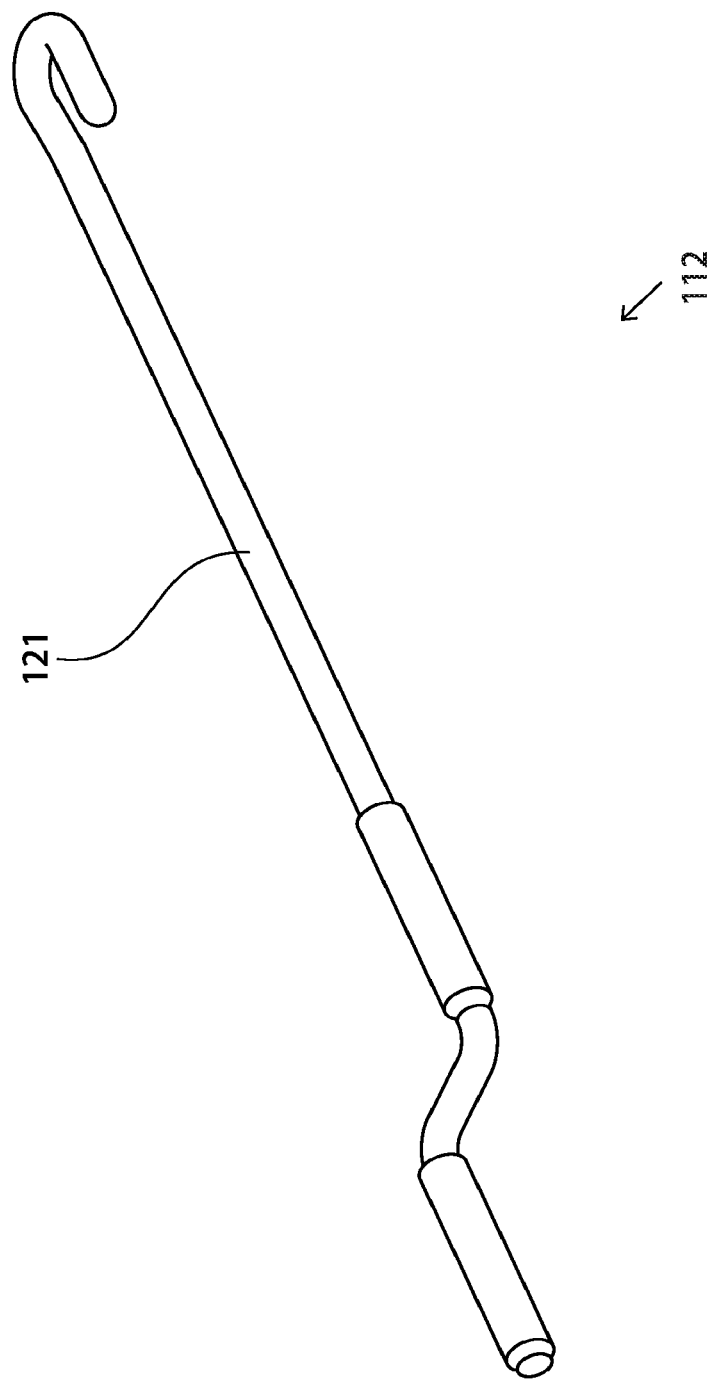
FIG. 2U illustrates a removable-collapsible-and-stowable automatic-multi-screen-raising-and-lowering multi-louver-control crank tool.
Figure 2V:
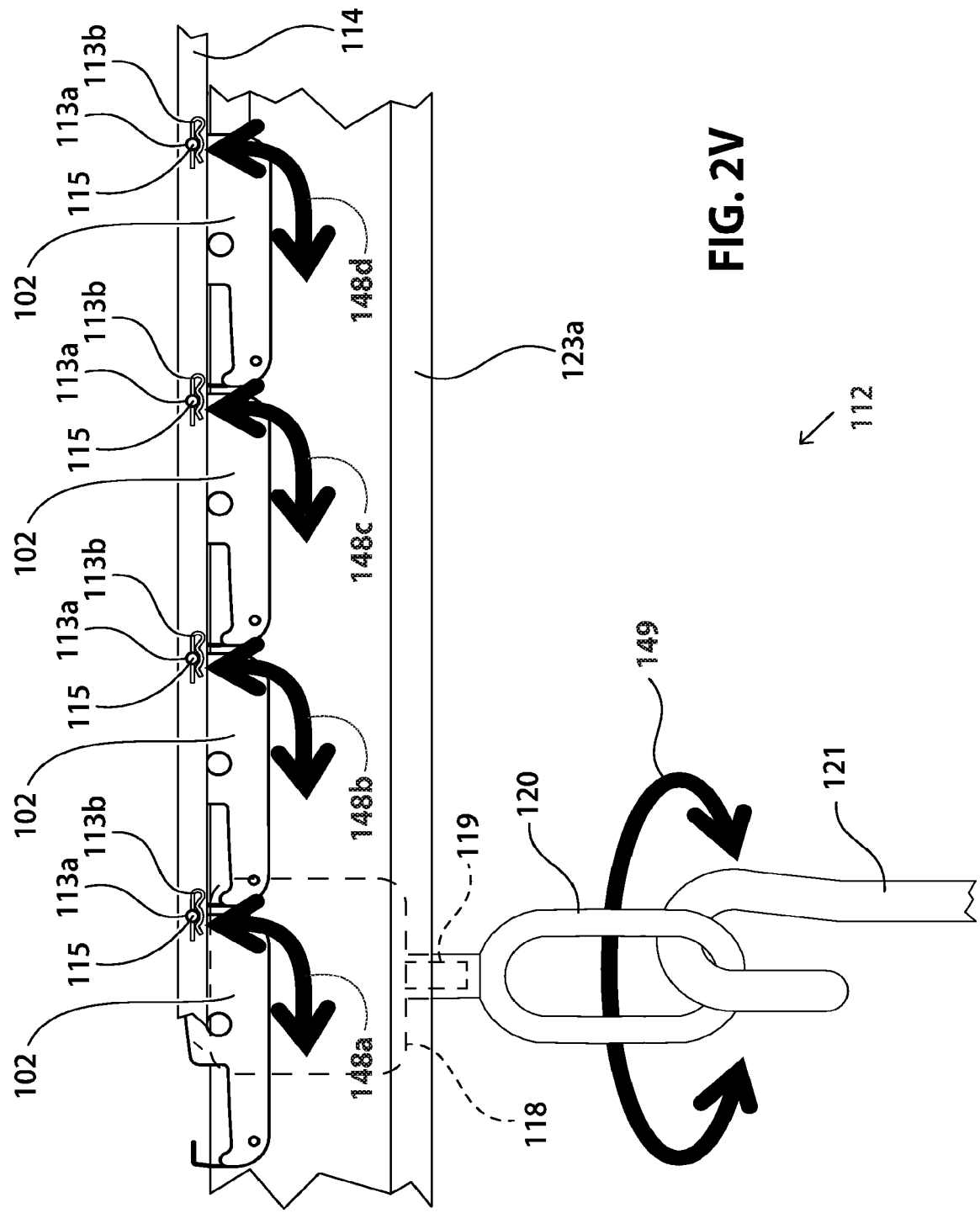
Figure 3B:
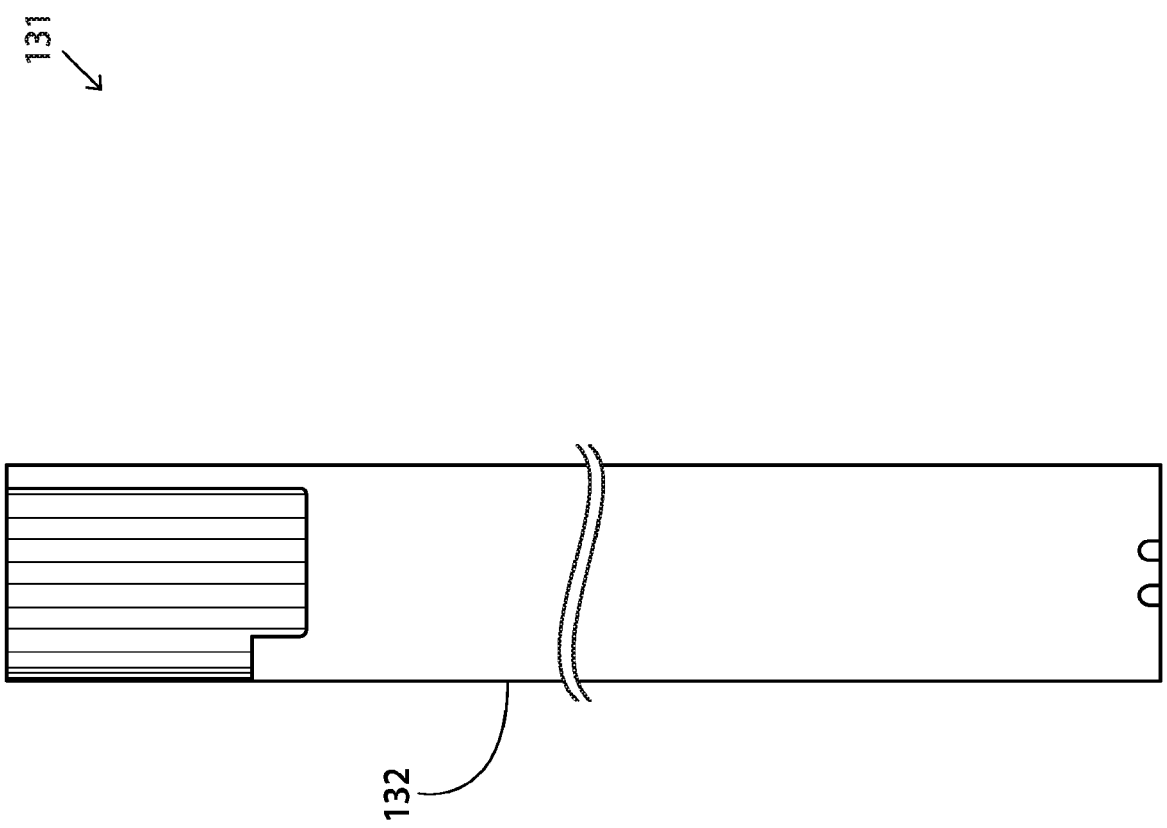
Figure 3D:
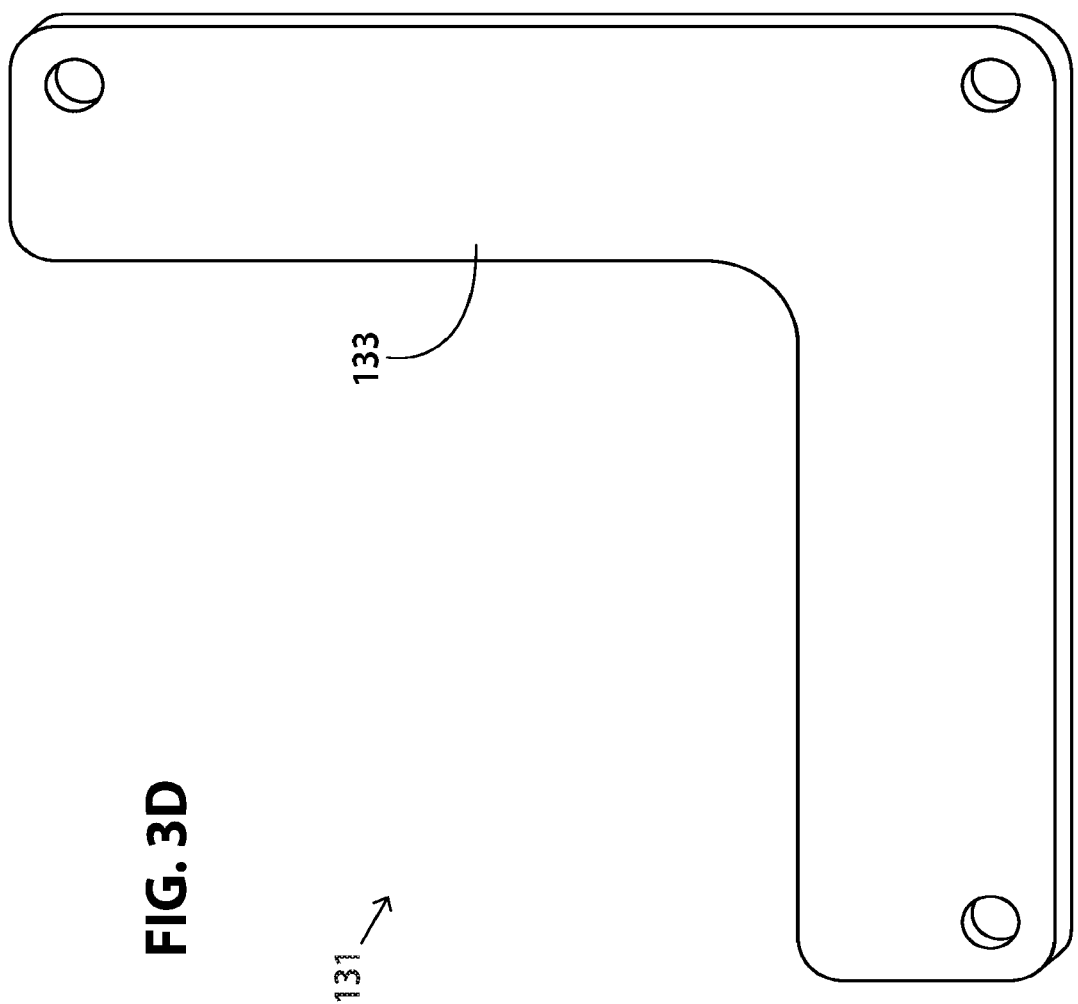
Figure 3G:
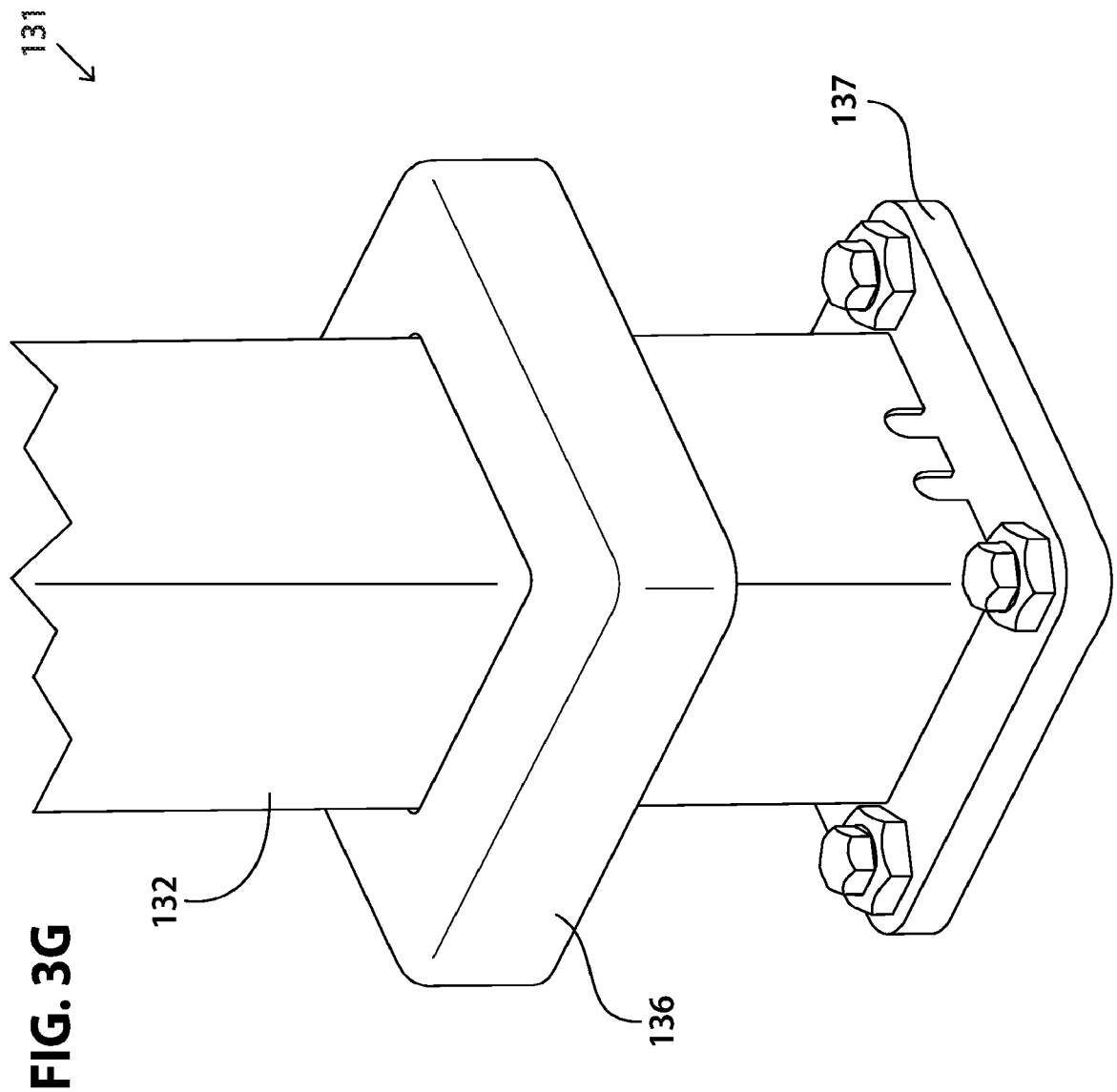
Figure 3I:
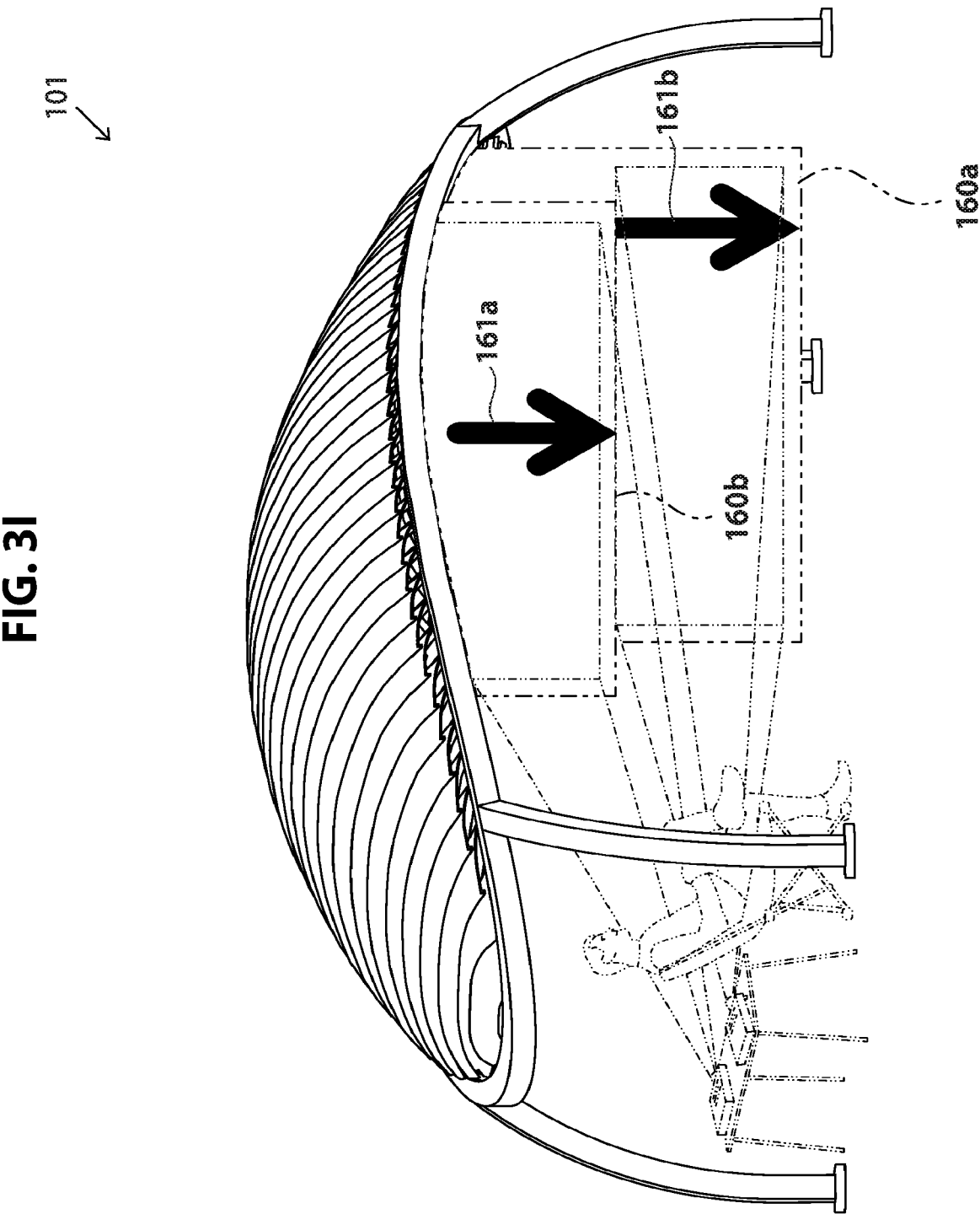
Figure 3J:
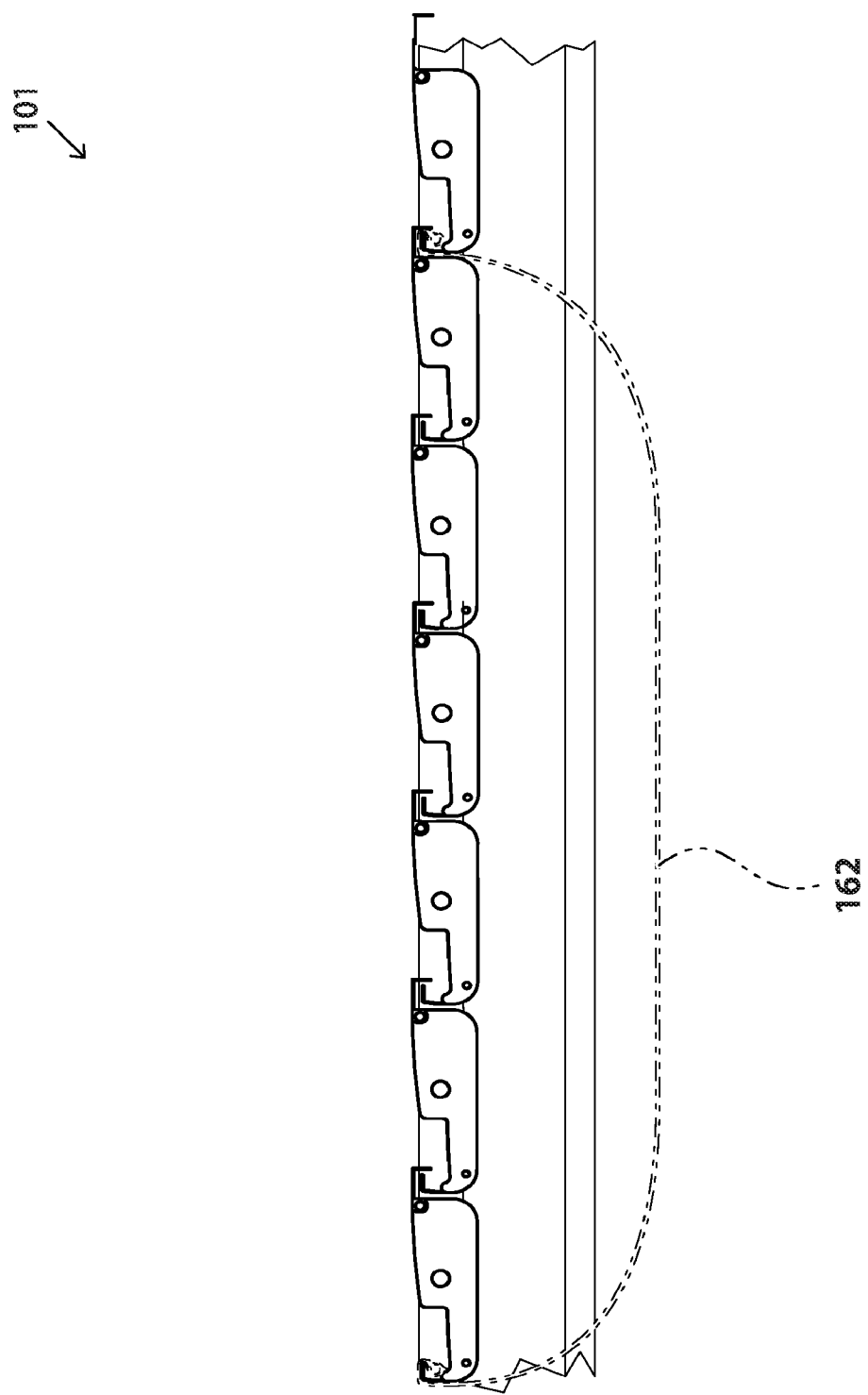
FIG. 3J and FIG. 3K illustrate side and perspective views of the wind-directing-and-rainwater-sealing multi-screen-securing louver blades securing a mesh shade screen.
Figure 3K:
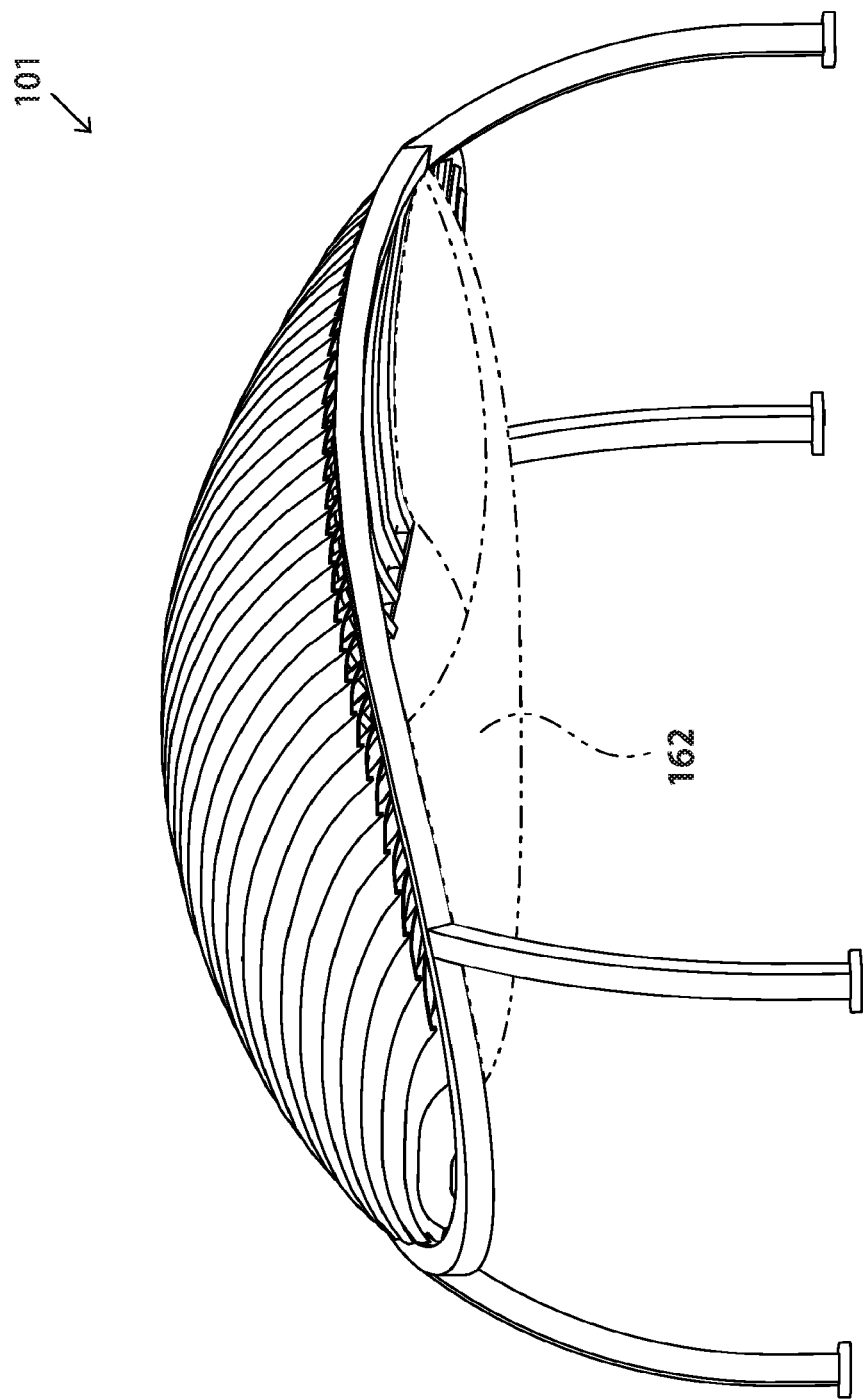
Figure 3N:
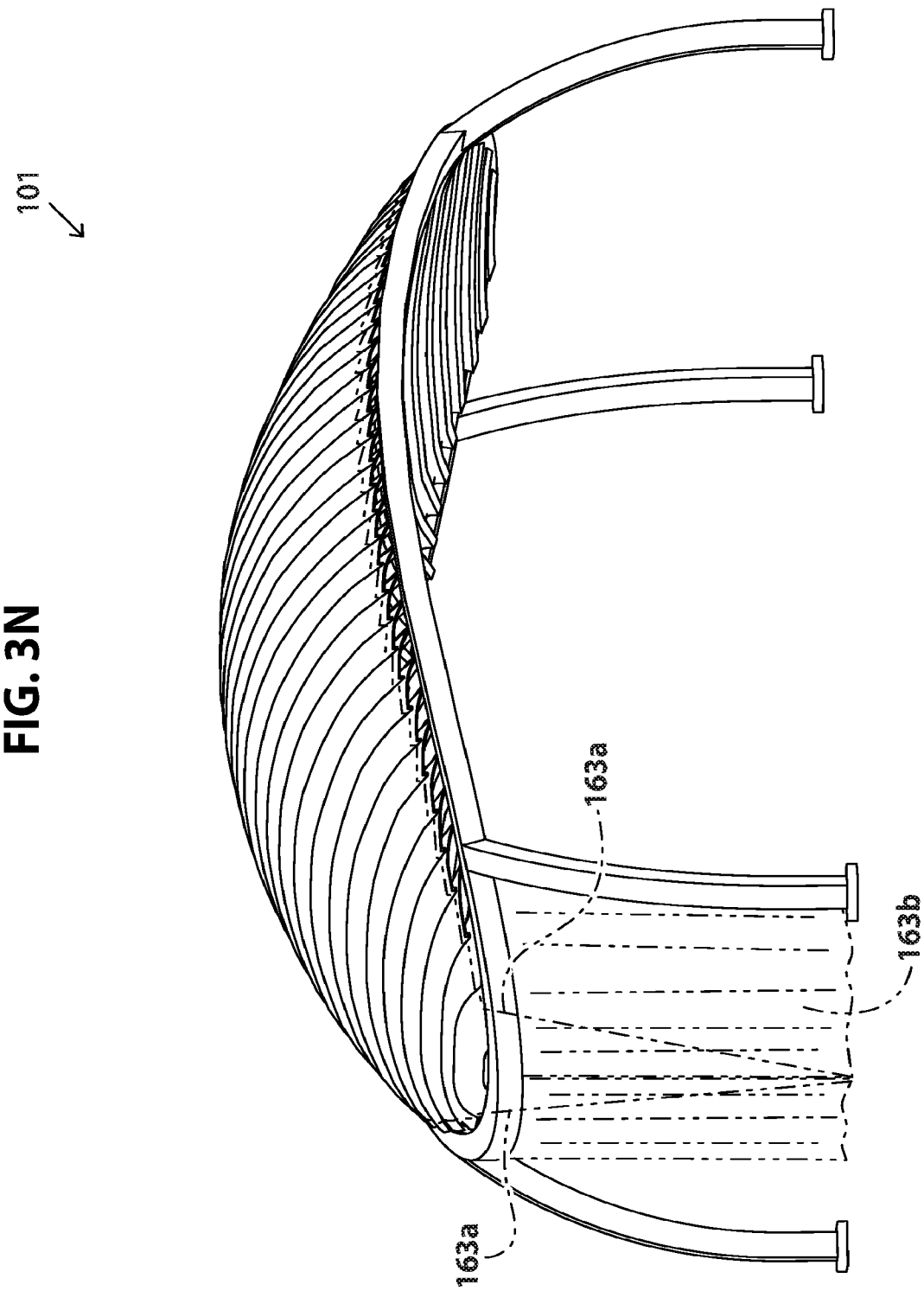
Figure 30:
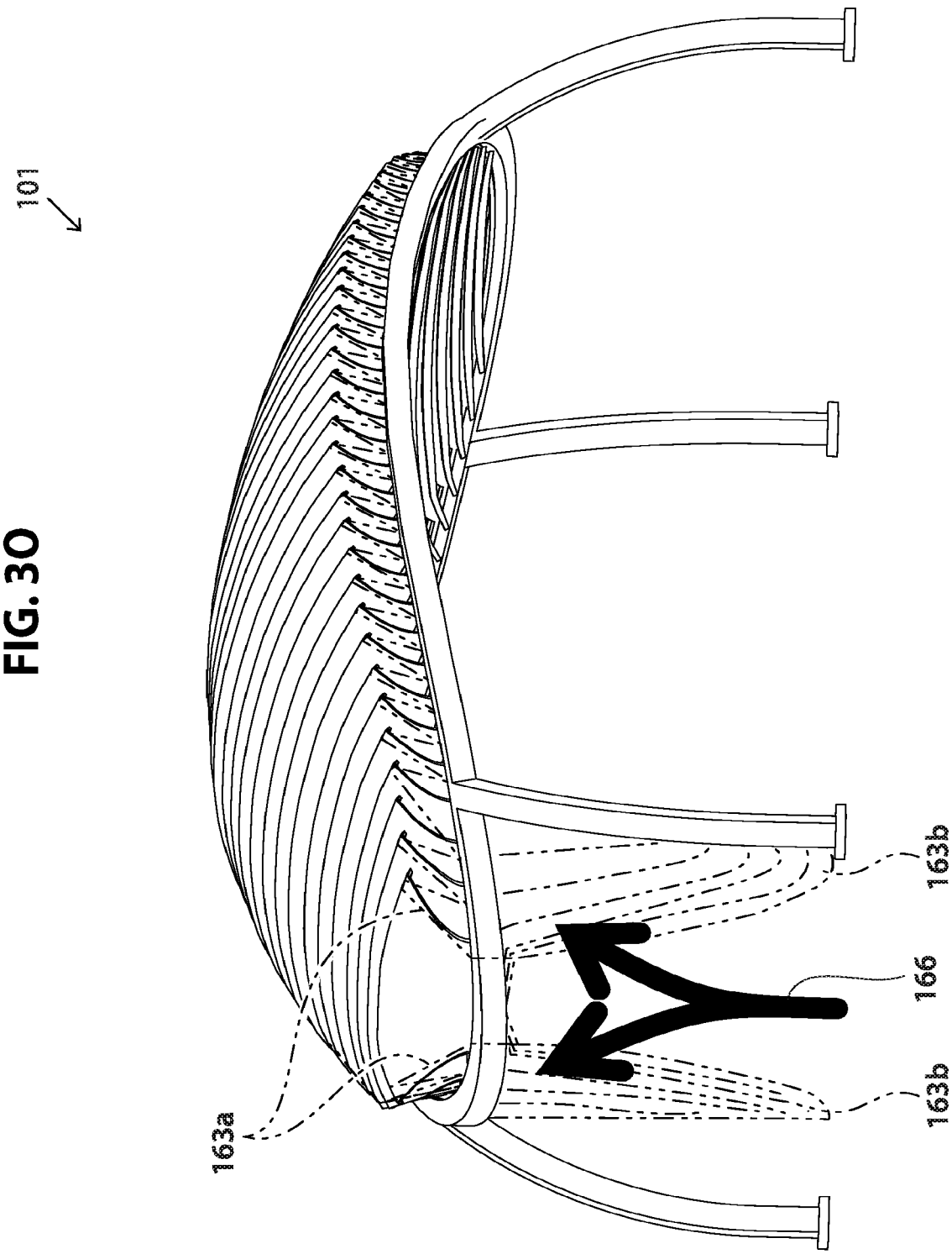
Figure 3Q:
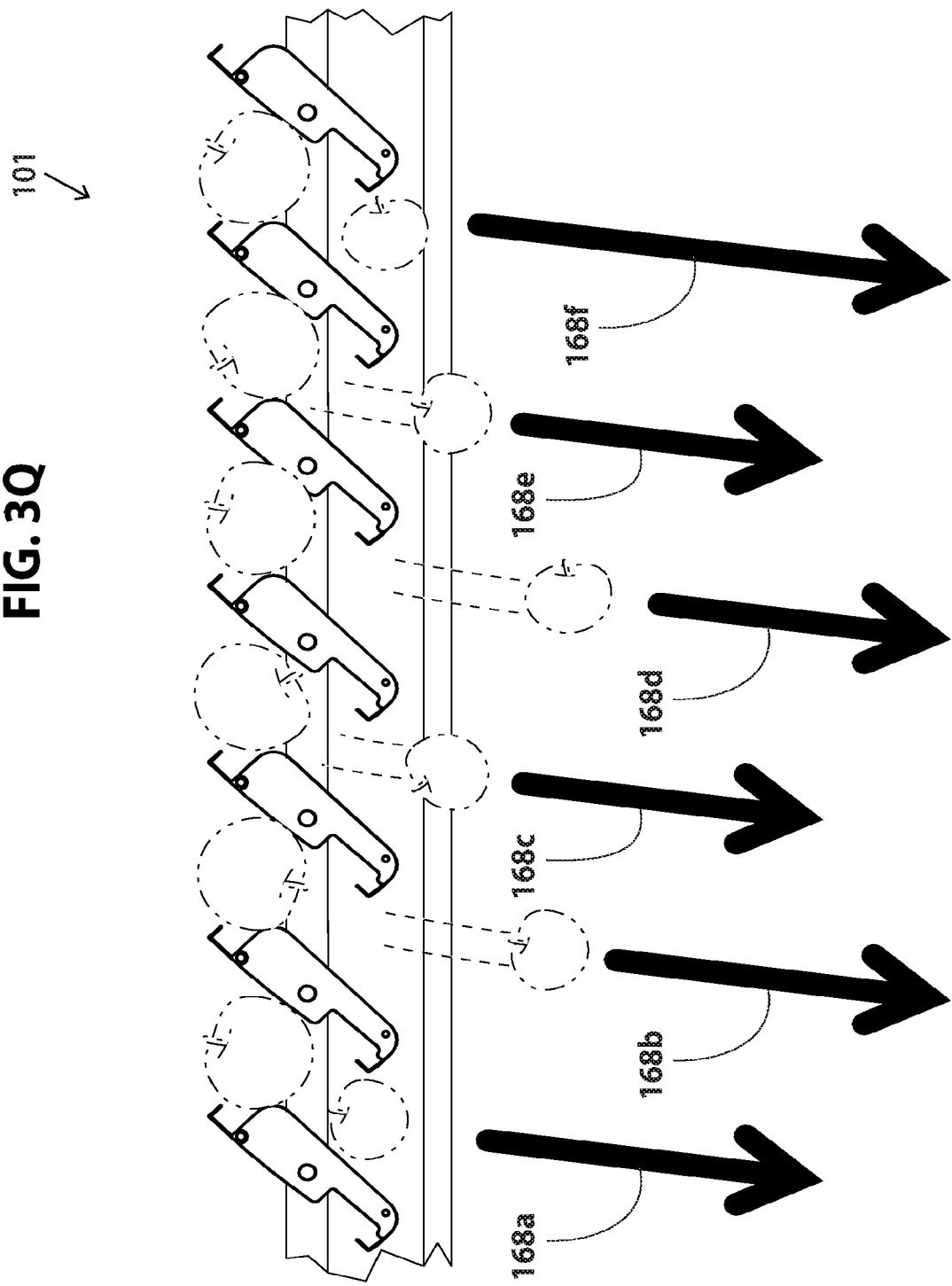
Figure 3R:
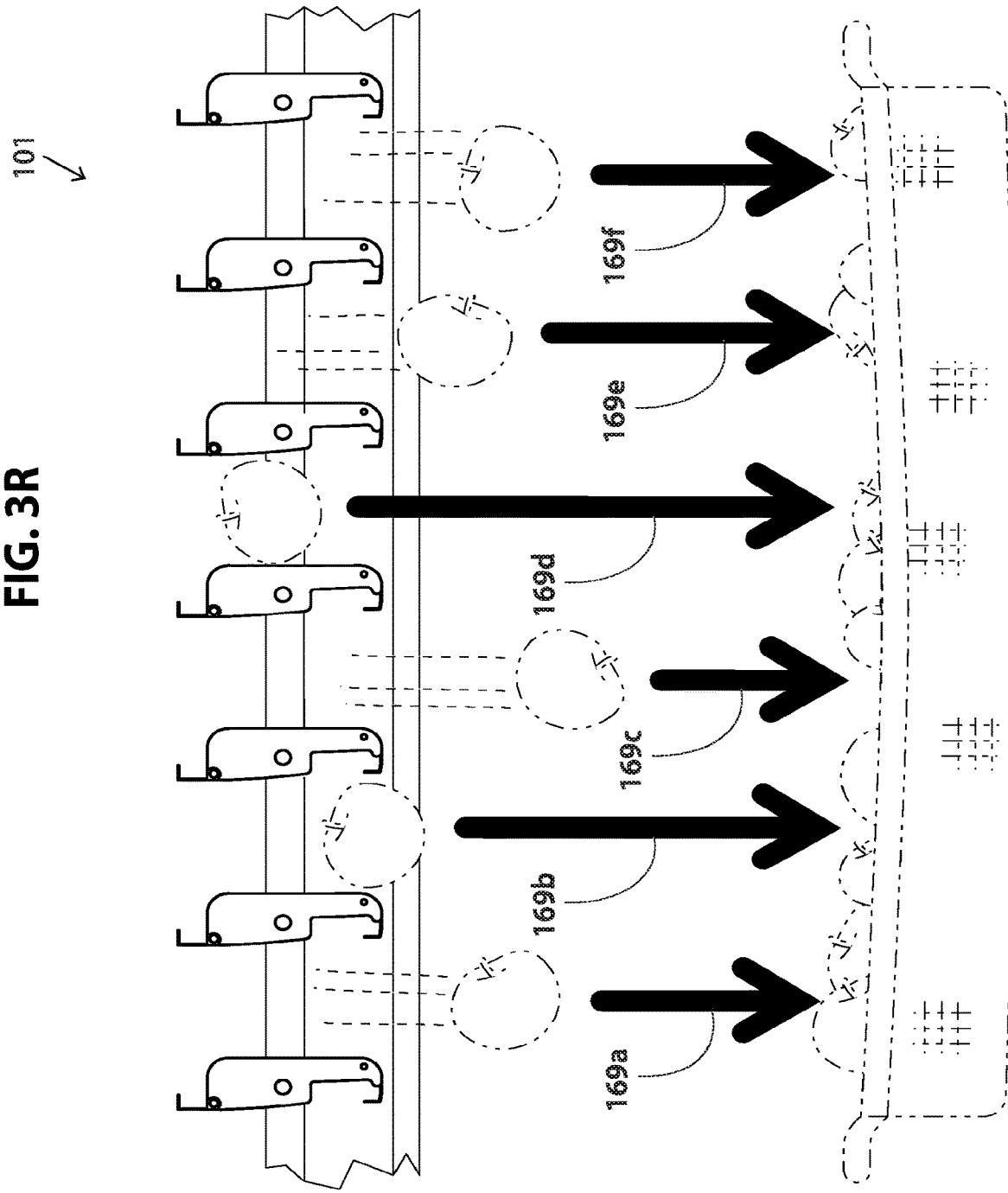
Figure 3S:
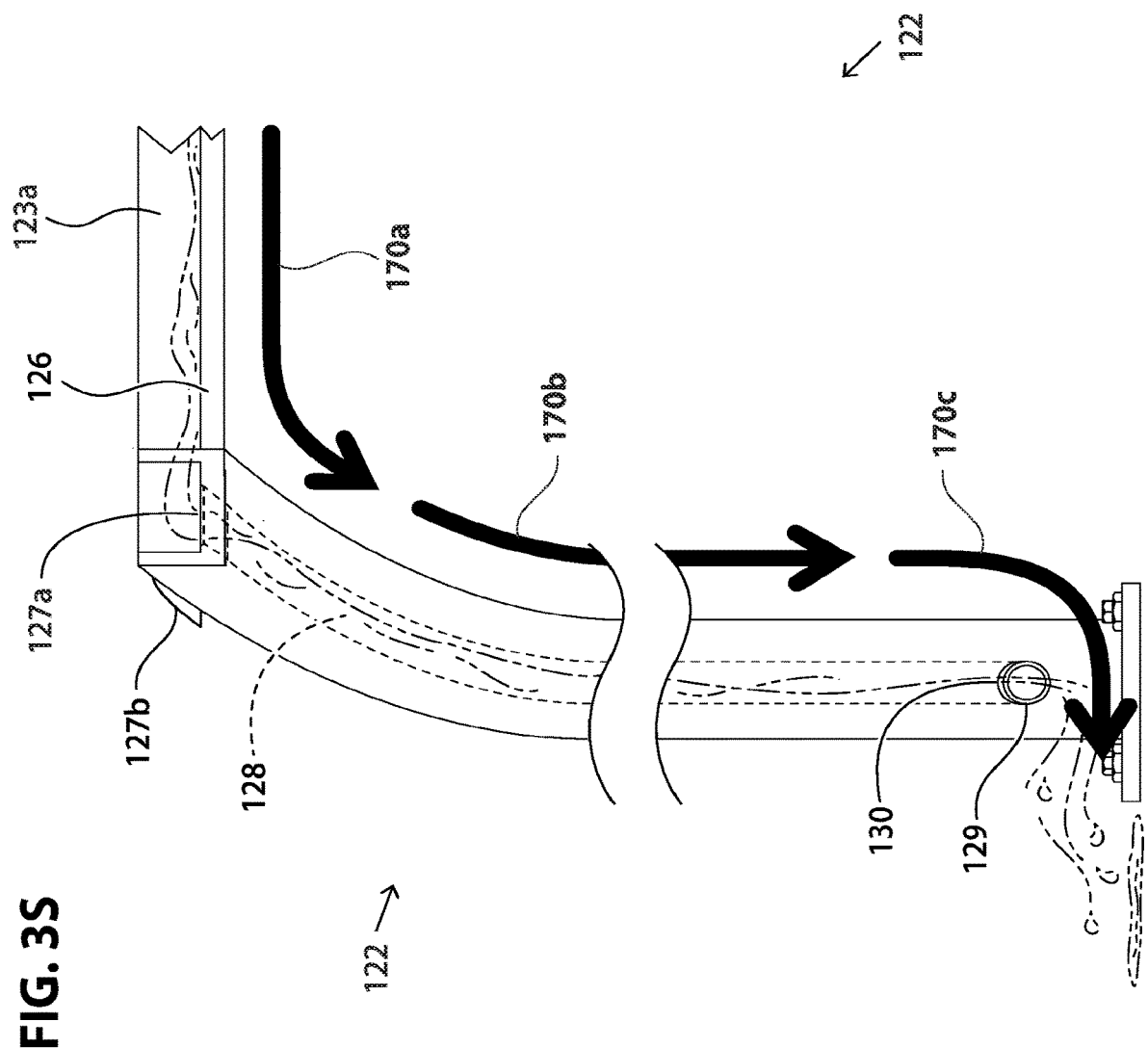
FIG. 3S illustrates a hidden-line side view demonstrating the flow of rainwater through rainwater-channeling-and-collecting and leaf-separating-and-discharging gutter-beam system.
Figure 3T:
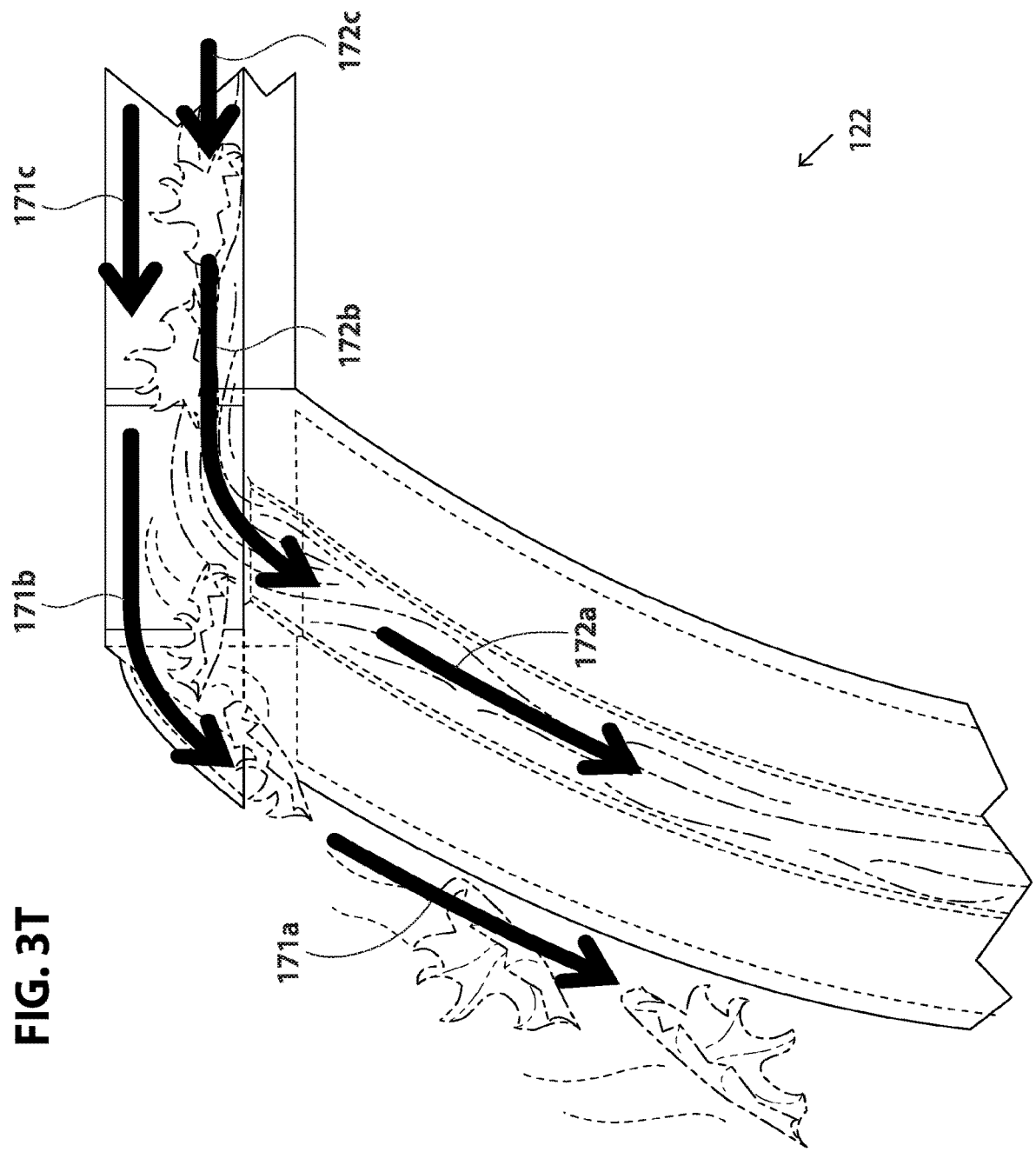
FIG. 3T illustrates a hidden-line side view demonstrating the flow of rainwater and how rainwater-channeling-and-collecting and leaf-separating-and-discharging gutter-beam system separates and discharges leaves.
Figure 4B:
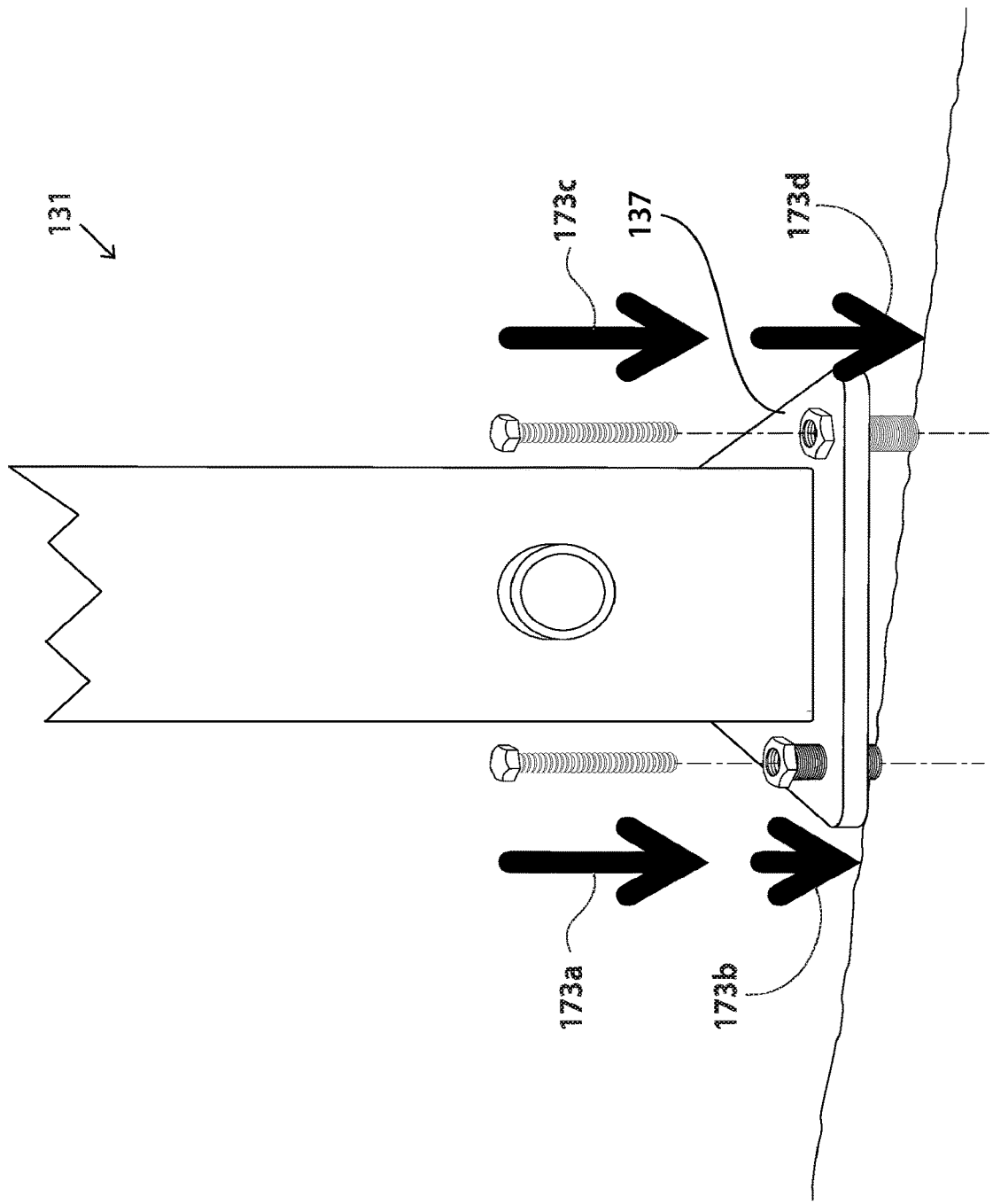

23) First rainwater-channeling-and-leaf-filtering side gutter beam 123*a* is for:
 a) Functioning as a discrete gutter channel
  to channel rainwater flow from louver-blade wind- and rainwater-directing trailing edges 105 to rainwater-draining spouts 129 (see FIG. 2L, FIG. 10G, and FIG. 10H);
 b) Functioning as a horizontal structural support
  to provide lateral rigidity between corner posts 132 in the directions of arrows 145*a*, 145*b*, 146*a*, and 146*b*
  (see FIG. 2Q, FIG. 2R, and FIG. 2S);
 c) Functioning as a structural member
  to support wind-directing leaf-separating-and-discharging rainwater-sealing automatic-multi-screen-raising-and-lowering multi-screen-securing fruit-drying-and-sorting truck-bed-tonneau-covering louver-blade system
  (see FIG. 2Q, FIG. 2R, FIG. 2S, and FIG. 2T);
 d) Functioning as a structural member
  to support louver-blade-rotation-stanchions 111*b* (see FIG. 2Q, FIG. 2R, FIG. 2S, FIG. 2T, and FIG. 2V); and
 e) Functioning as a structural member
  to mount multi-louver-blade multi-position automatic-multi-screen-raising-and-lowering control system 112 (see FIG. 2T, FIG. 2V, and FIG. 2X).

Second rainwater-channeling-and-leaf-filtering side gutter beam 123*b* is (or are respectively) screwed to rainwater-channeling-and-leaf-filtering end gutter beams 124.
 a) Functioning as a discrete gutter channel
  to channel rainwater flow from louver-blade wind- and rainwater-directing trailing edges 105
  in the directions of arrows 145*a*, 145*b*, 146*a*, and 146*b*
  (see FIG. 2Q, FIG. 2S, and FIG. 2T);
 b) Functioning as a structural member
  to support louver-blade-rotation cradle axels 109
  (see FIG. 2V and FIG. 2W);
 c) Functioning as a horizontal structural support
  to provide lateral rigidity between corner posts 132;
 d) Functioning as a structural member
  to support wind-directing leaf-separating-and-discharging rainwater-sealing automatic-multi-screen-raising-and-lowering multi-screen-securing fruit-drying-and-sorting truck-bed-tonneau-covering louver-blade system
  (see FIG. 2Q, FIG. 2S, and FIG. 2T); and
 e) Functioning as a structural member
  to support louver-blade-rotation cradle axels 109
  (see FIG. 2L and FIG. 2N).

Figure 5:
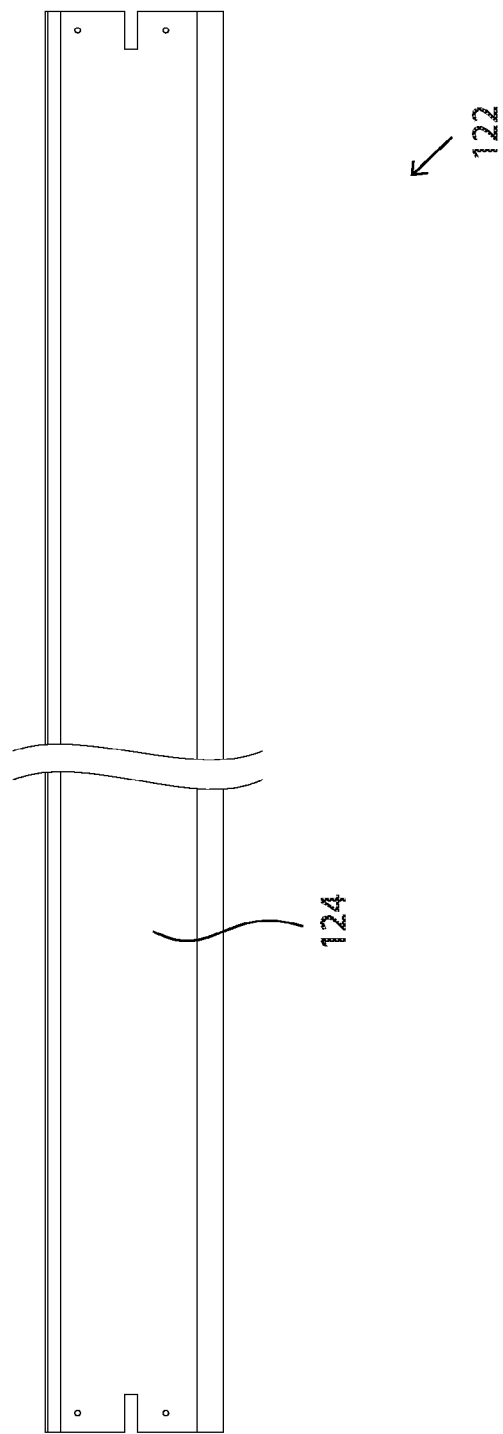
FIG. 5 depicts an equivalent variation of rainwater-channeling-and-leaf-filtering end gutter beams.
Figure 6A:
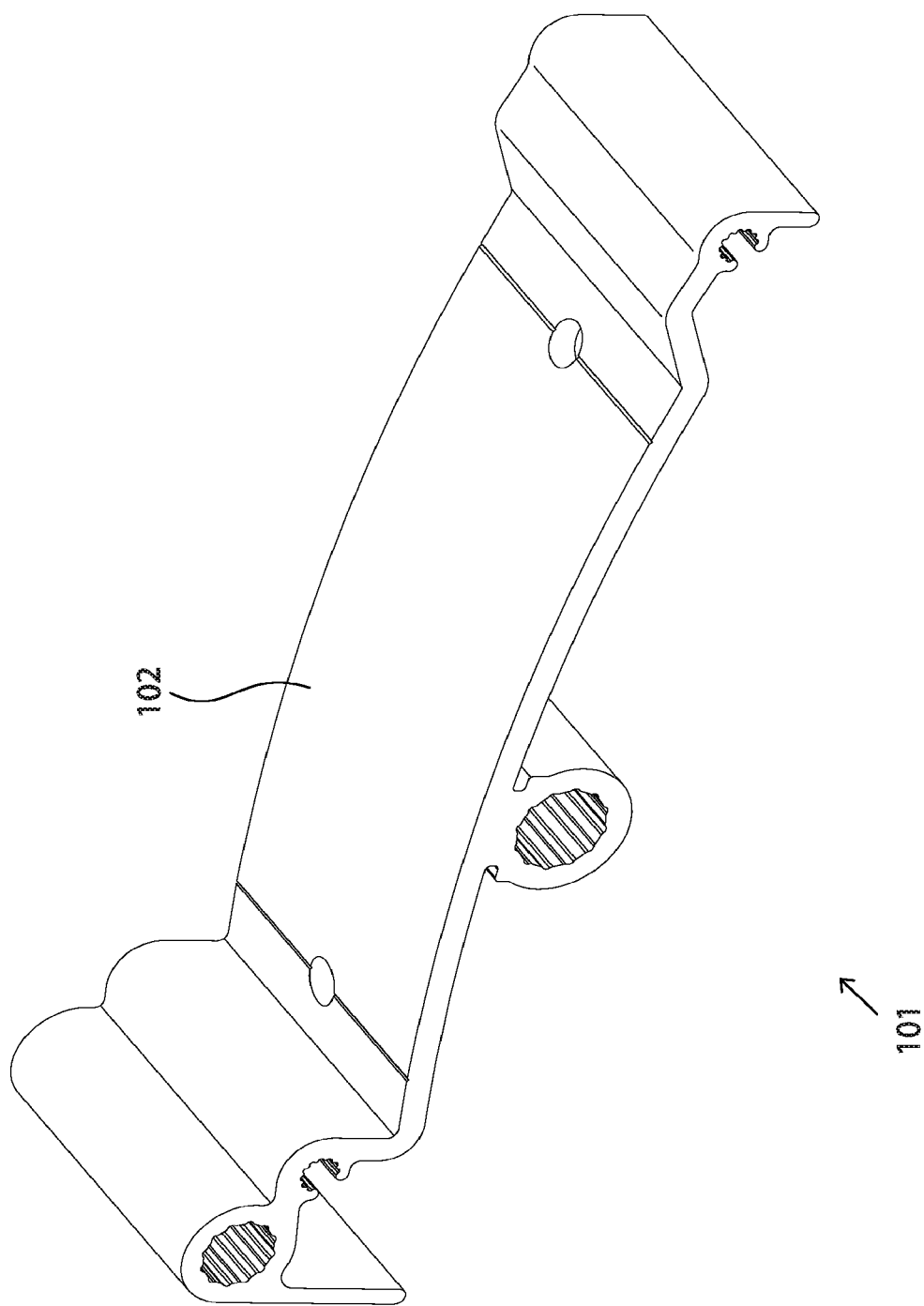
FIG. 6A, FIG. 6B, and FIG. 6C depict perspective views of equivalent variations of wind-directing-and-rainwater-sealing multi-screen-securing louver blades, respectively.
Figure 6B:
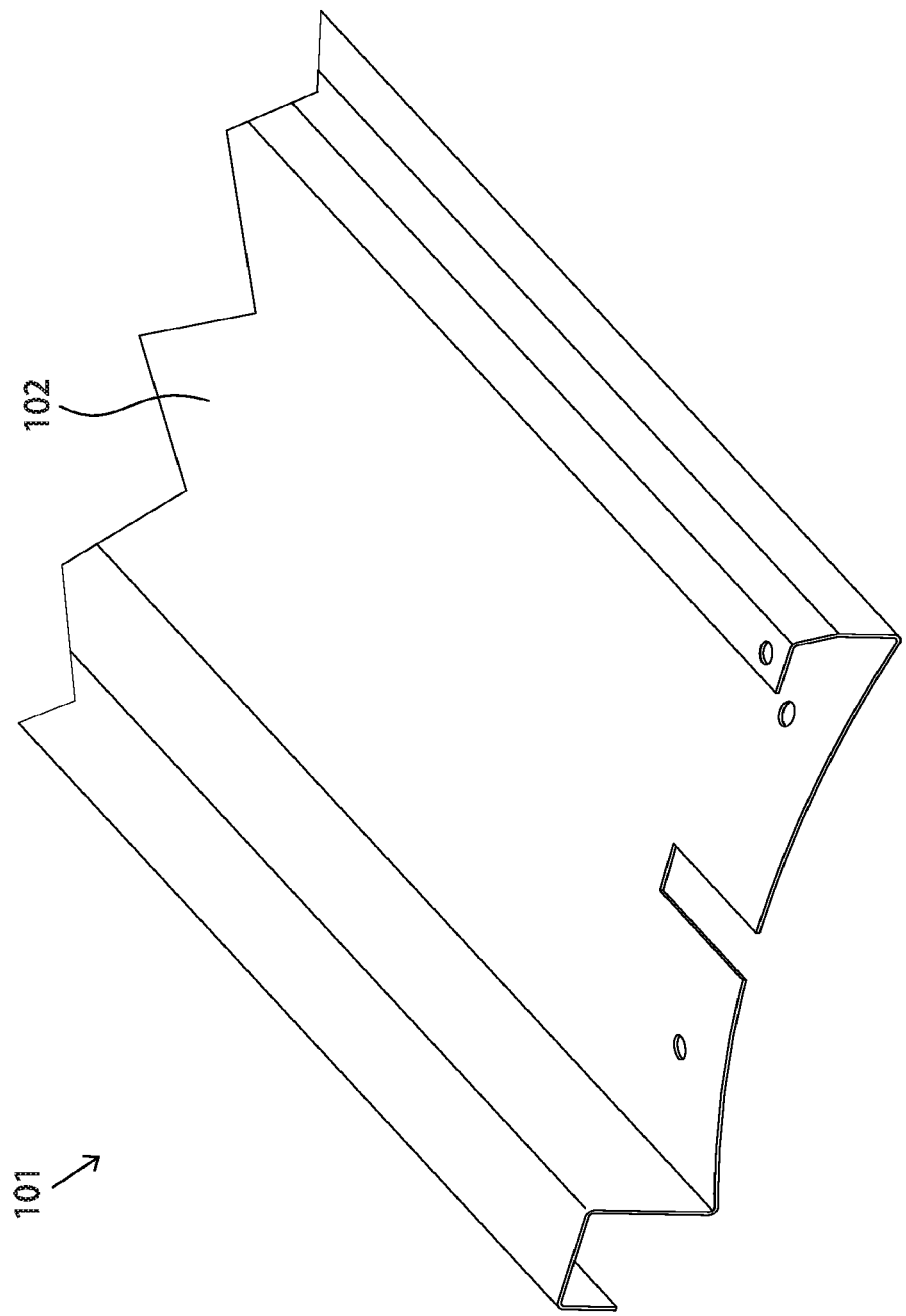
Figure 6C:
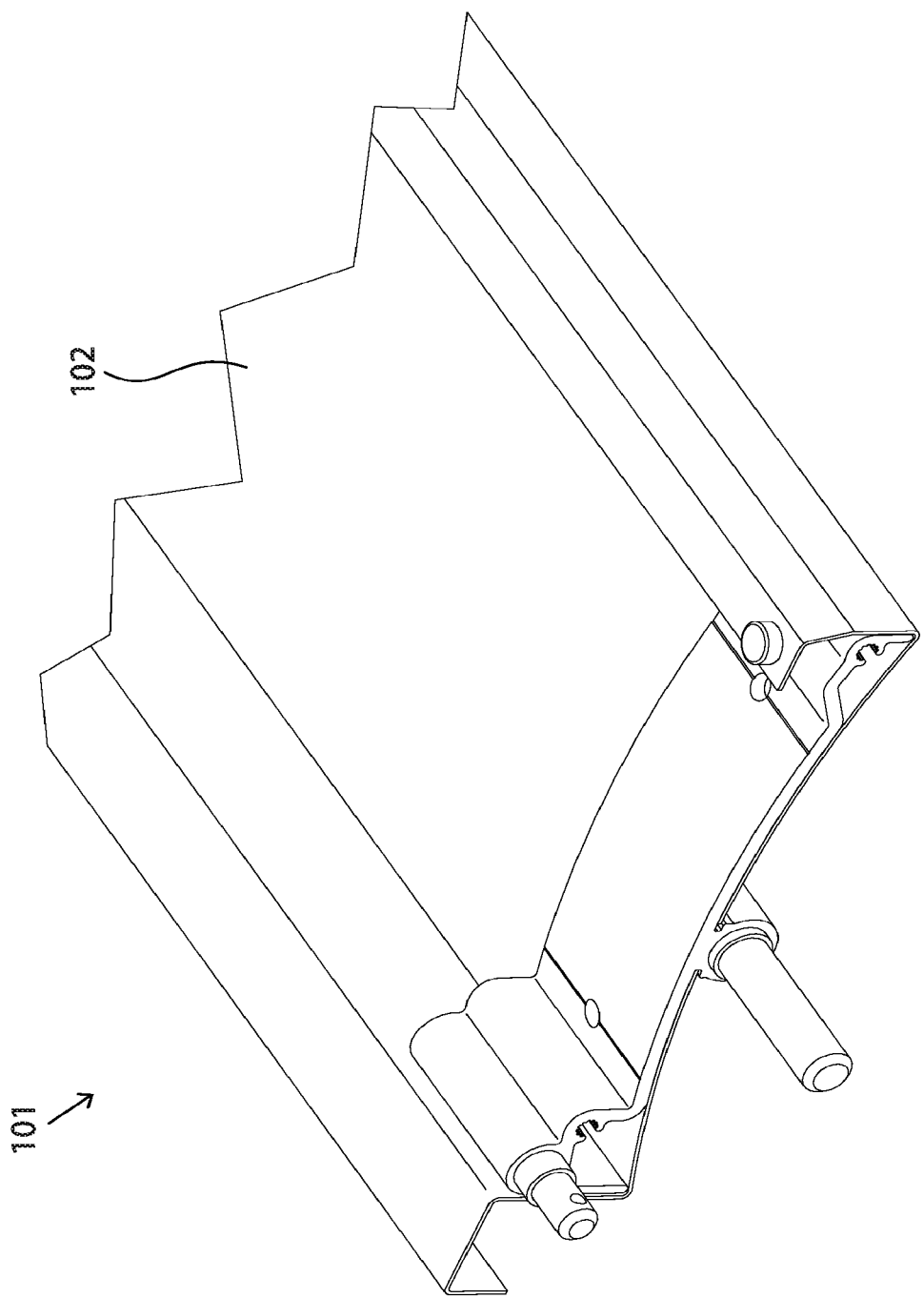
Figure 6D:
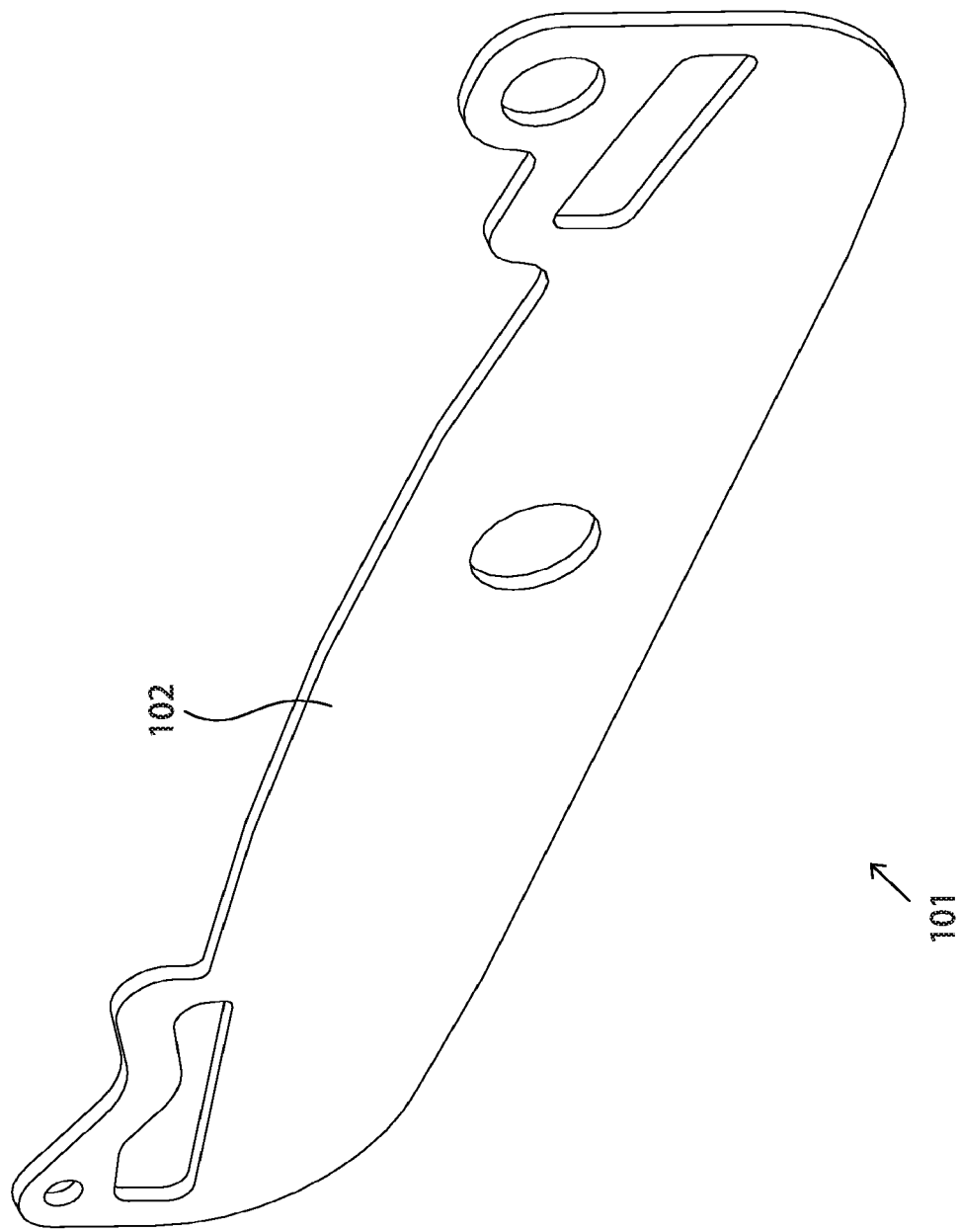
FIG. 6D depicts a perspective view of an equivalent variation of louver-blade end cap.
Figure 6E:
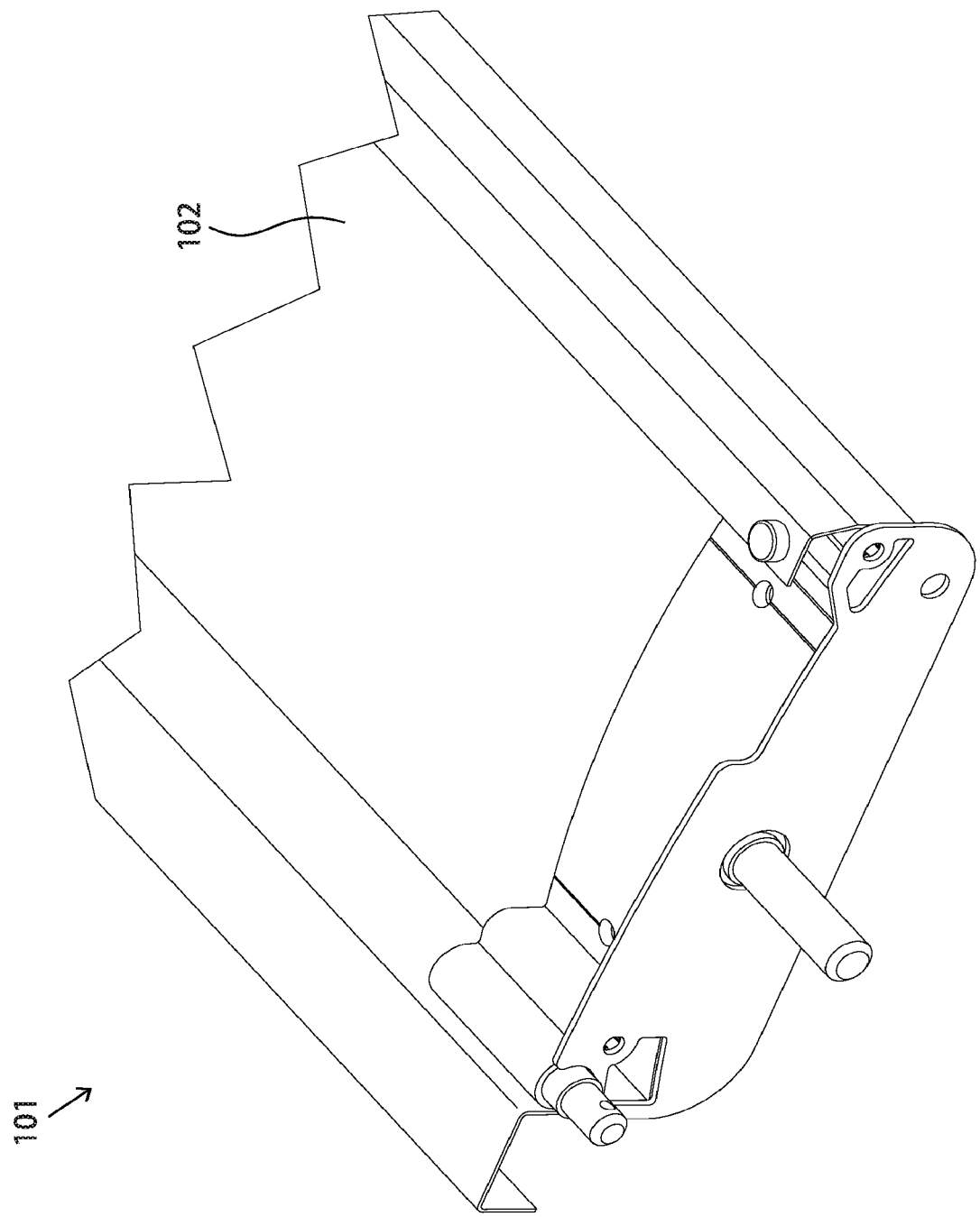
FIG. 6E and FIG. 6F depict a perspective and a side views of equivalent variations of a wind-directing-and-rainwater-sealing multi-screen-securing louver blades and louver-blade end caps, respectively.
Figure 6F:
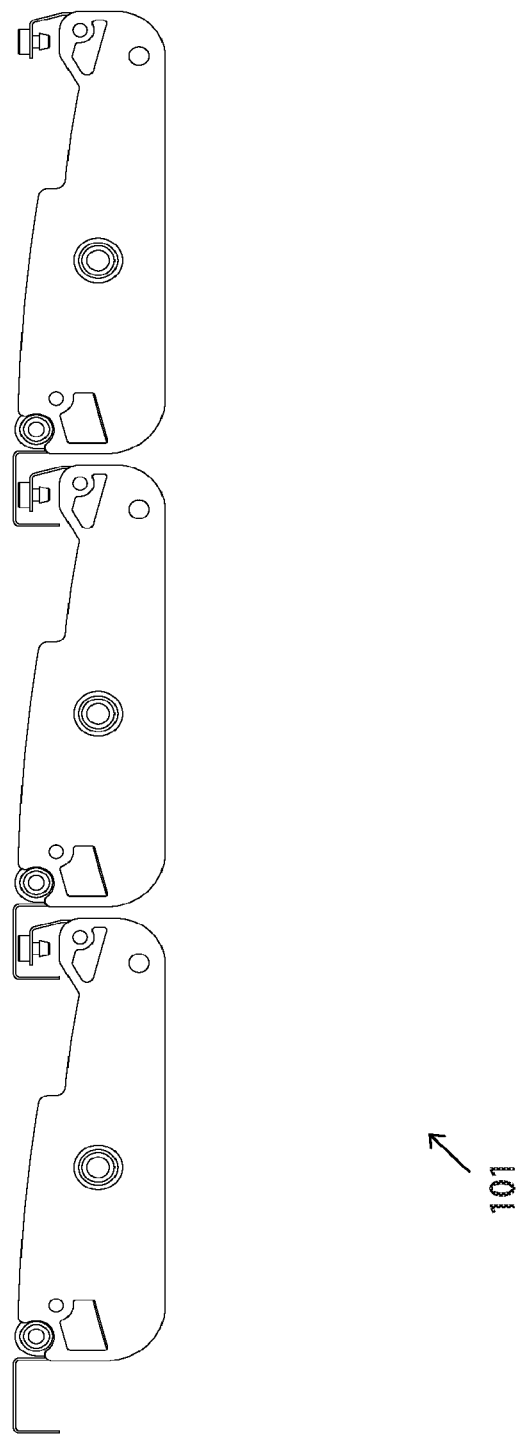
Figure 7A:
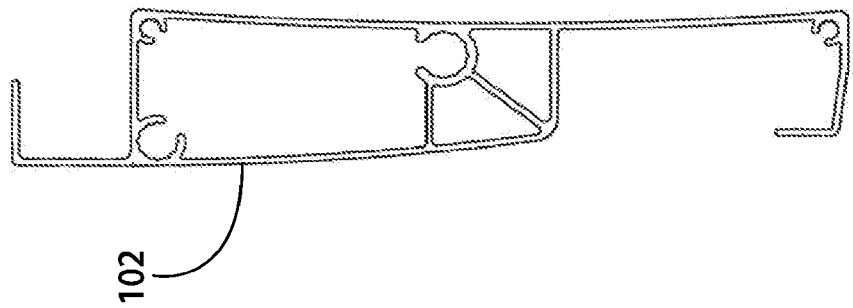
FIG. 7A, FIG. 7B, and FIG. 7C depict profiles of equivalent variations of wind-directing-and-rainwater-sealing multi-screen-securing louver blades, respectively.
Figure 7B:
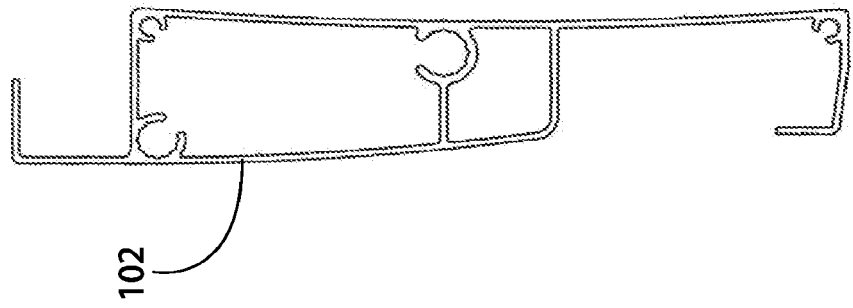
Figure 7C:
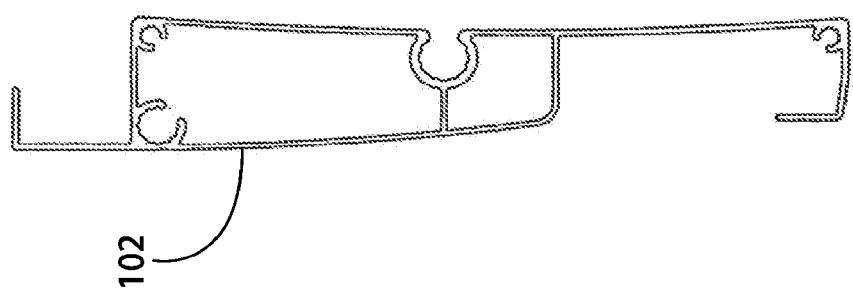
Figure 7D:
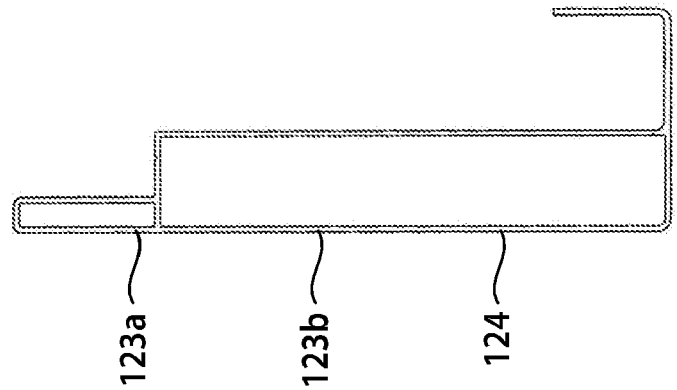
FIG. 7D, FIG. 7E, FIG. 7F, FIG. 7G, FIG. 7H, and FIG. 7I depict profiles of equivalent variations of first rainwater-channeling-and-leaf-filtering side gutter beams, and/or second rainwater-channeling-and-leaf-filtering side gutter beam, and/or rainwater-channeling-and-leaf-filtering end gutter beams, respectively.
Figure 7E:
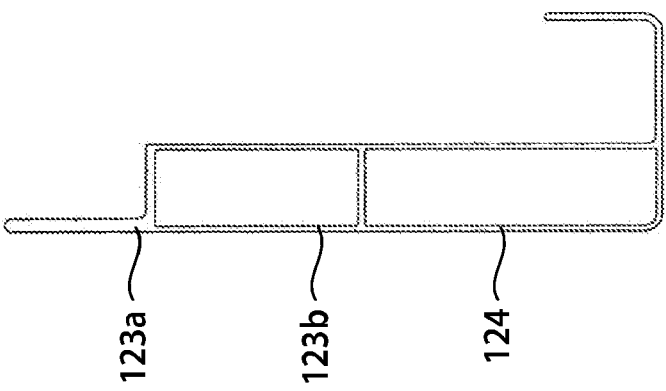
Figure 7F:
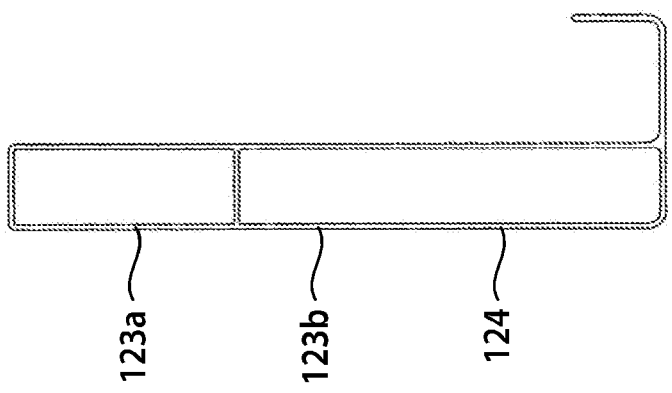
Figure 7G:
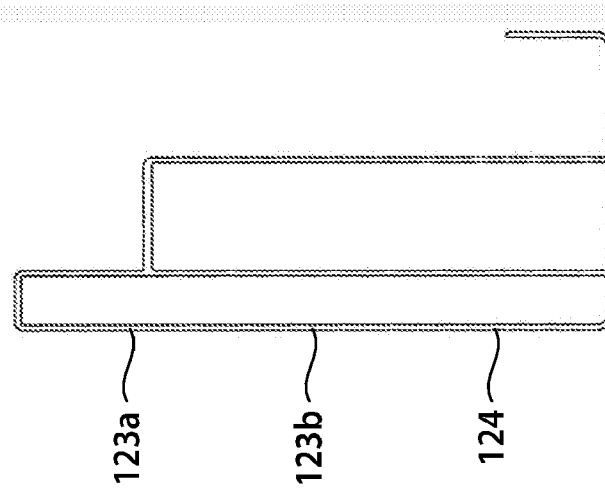
Figure 7H:
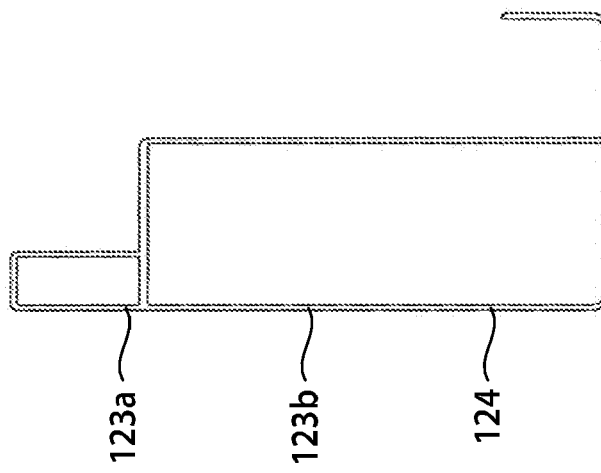
Figure 7I:
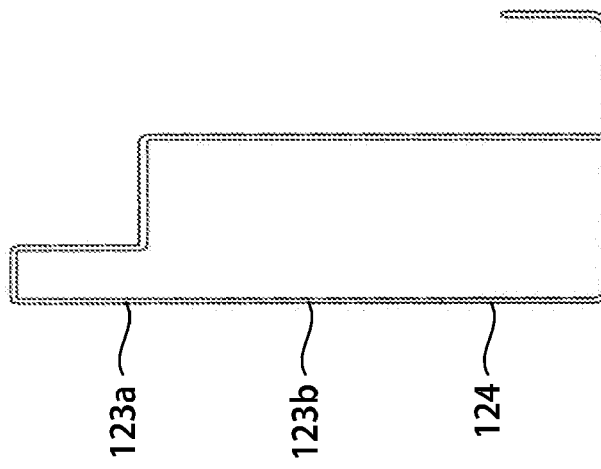
Figure 7K:
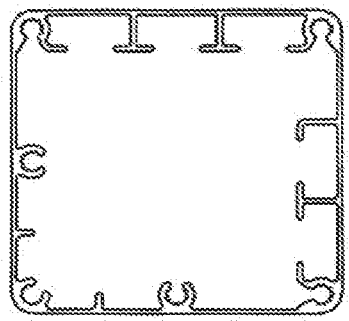
FIG. 7J, FIG. 7K, FIG. 7L, FIG. 7M, FIG. 7N, FIG. 7O, FIG. 7P, FIG. 7Q, FIG. 7R, FIG. 7S, FIG. 7T, FIG. 7U, FIG. 8A, FIG. 8B, FIG. 8C, FIG. 8D, FIG. 8E, FIG. 8F, FIG. 8G, FIG. 8H, FIG. 8I, FIG. 8J, FIG. 8K, FIG. 8L, FIG. 8M, FIG. 8N, FIG. 8O, FIG. 8P, FIG. 8Q, and FIG. 8R depict profiles of equivalent variations of corner posts, respectively.
Figure 7N:
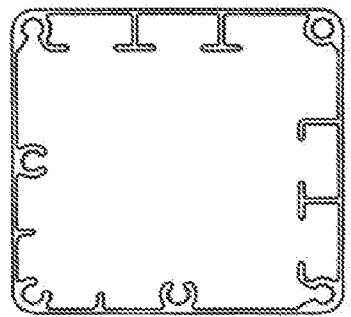
Figure 7L:
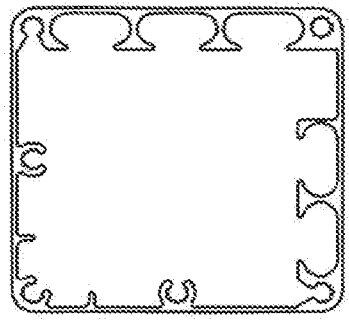
Figure 7O:
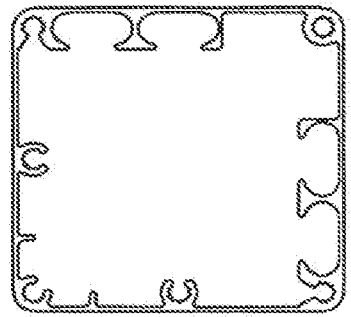
Figure 7J:
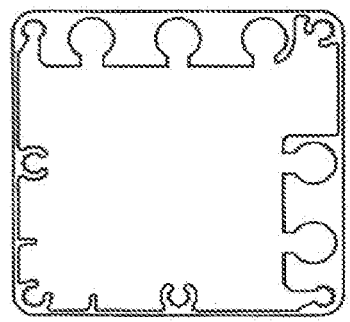
Figure 7M:
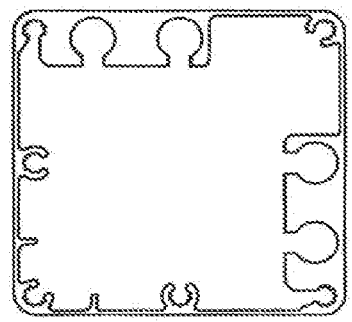
Figure 7R:
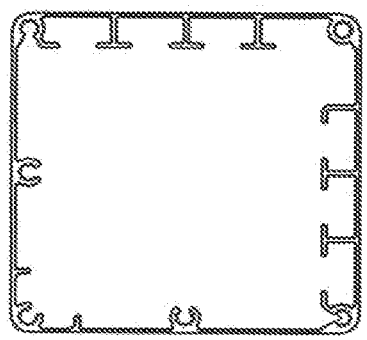
Figure 7U:
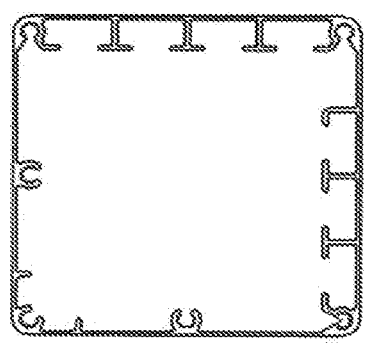
Figure 7Q:
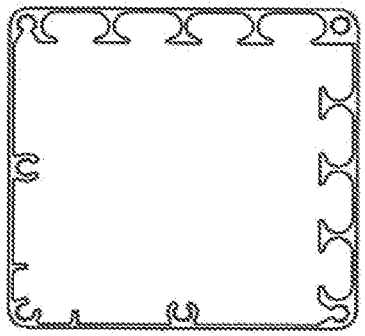
Figure 7T:
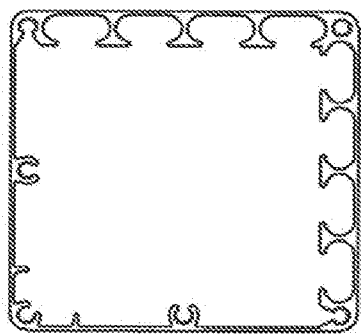
Figure 7P:
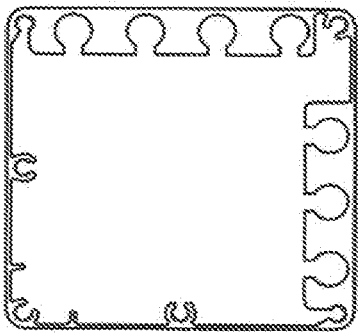
Figure 7S:
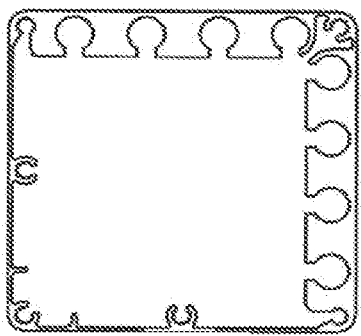
Figure 8C:
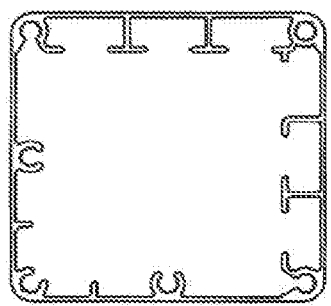
Figure 8B:
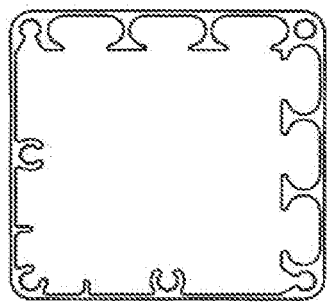
Figure 8A:
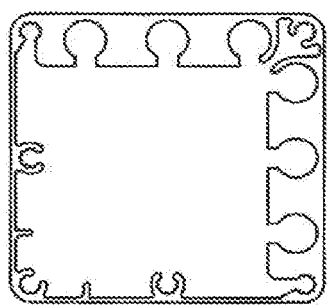
Figure 8F:
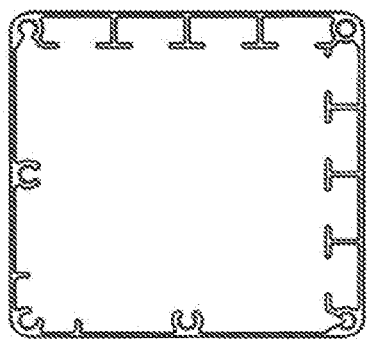
Figure 8E:
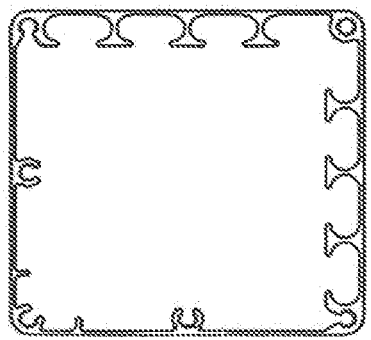
Figure 8D:
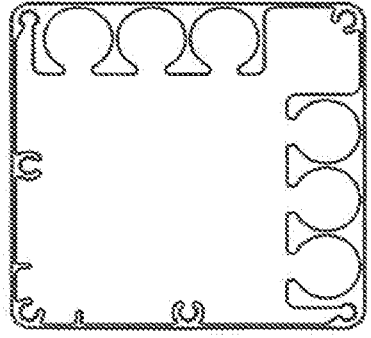
Figure 8G:
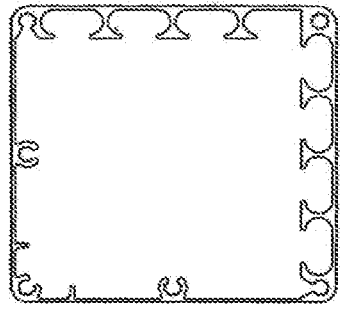
Figure 8H:
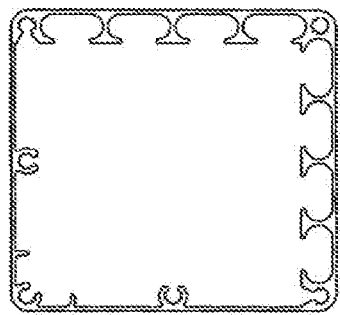
Figure 8I:
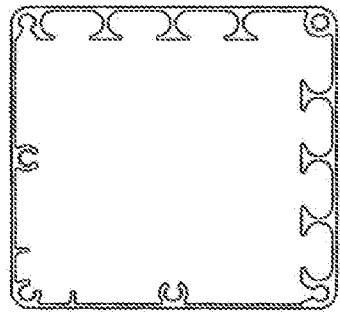
Figure 8J:
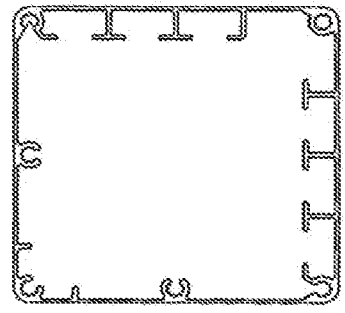
Figure 8K:
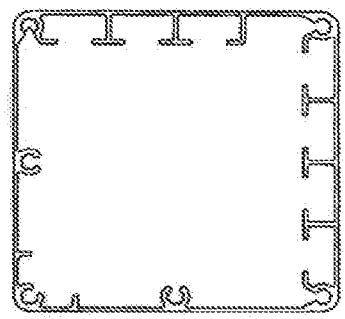
Figure 8L:
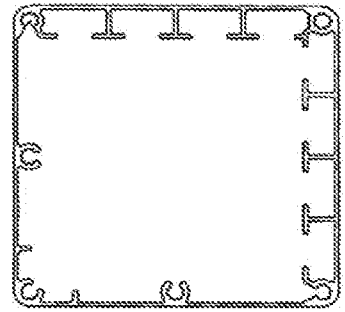
Figure 8M:
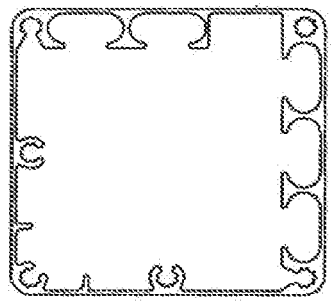
Figure 8N:
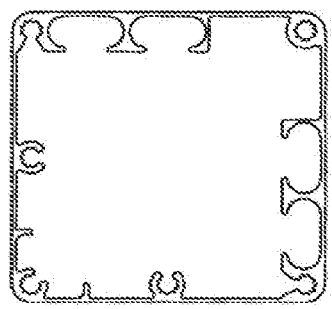
Figure 8O:
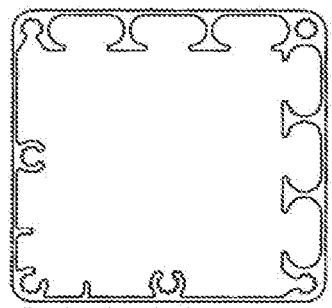
Figure 8P:
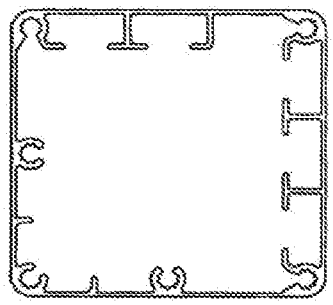
Figure 8Q:
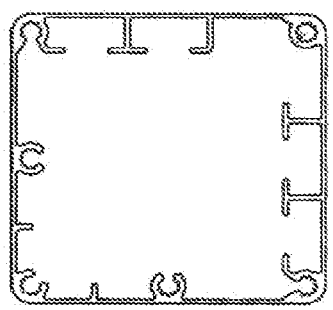
Figure 8R:
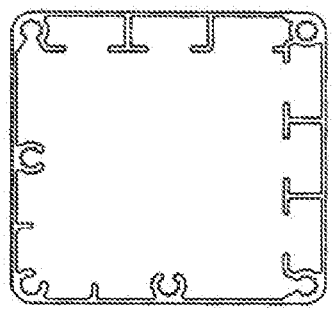
Figure 9A:
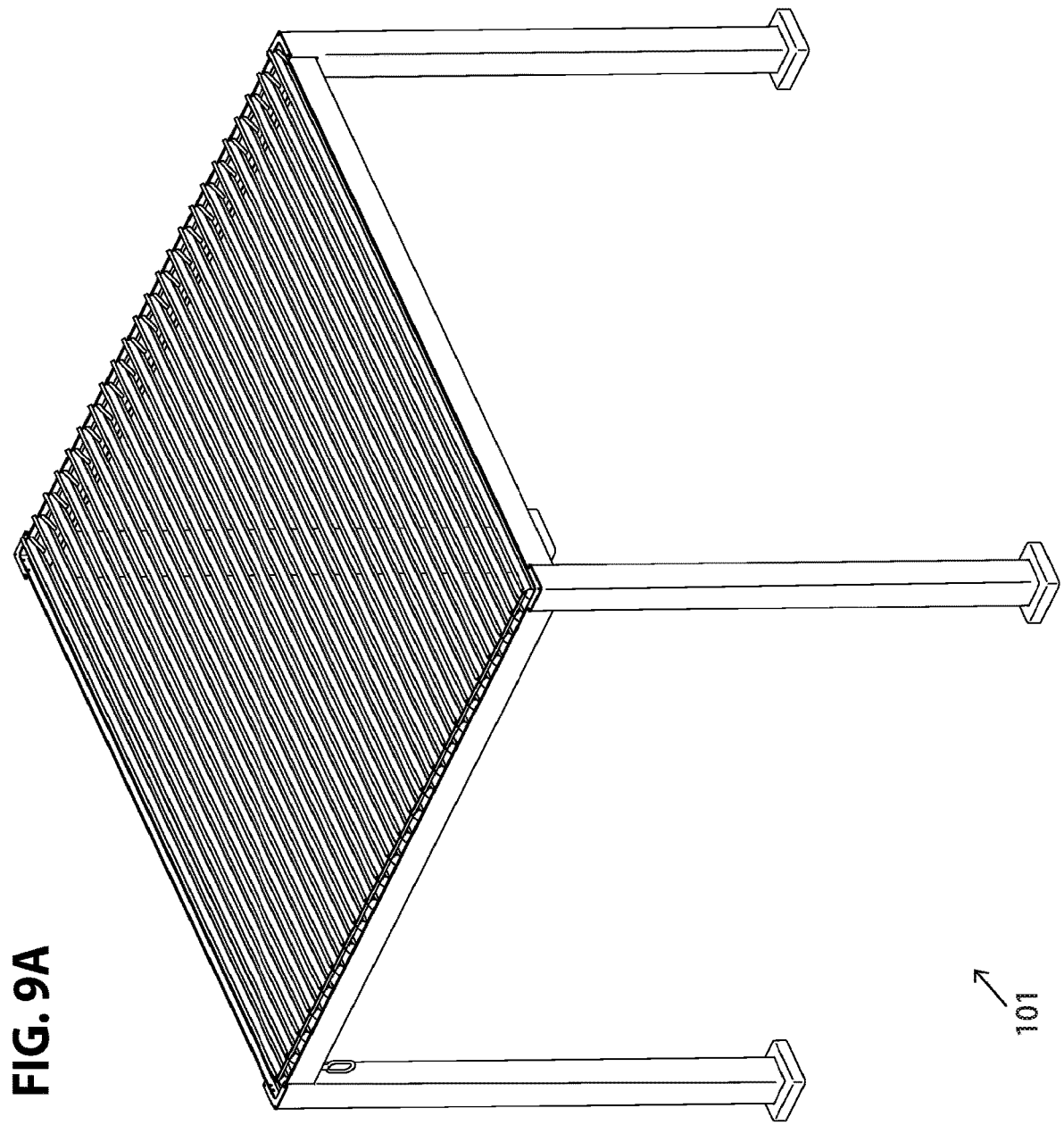
FIG. 9A and FIG. 9B depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, respectively.
Figure 9B:
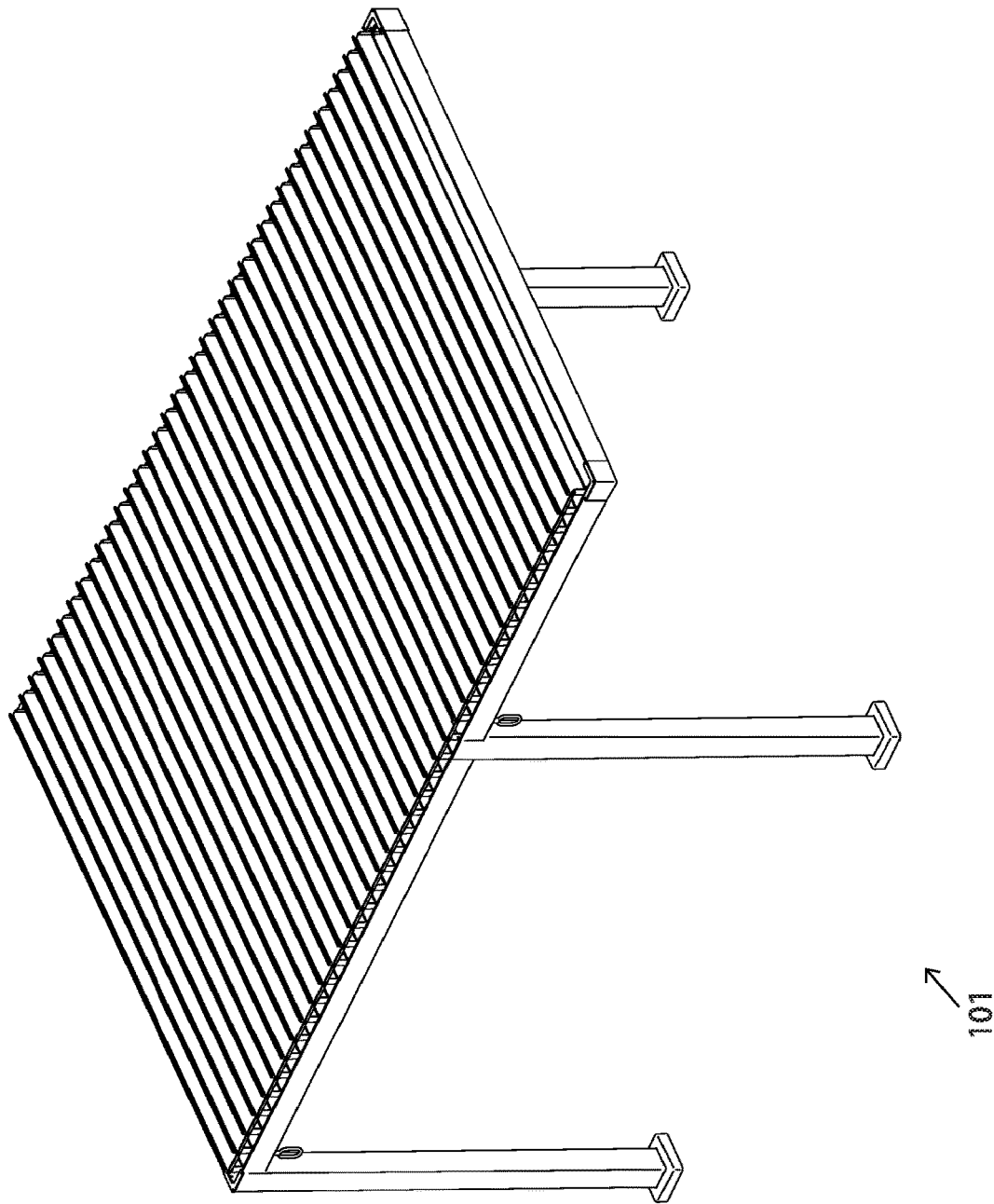
Figure 9D:
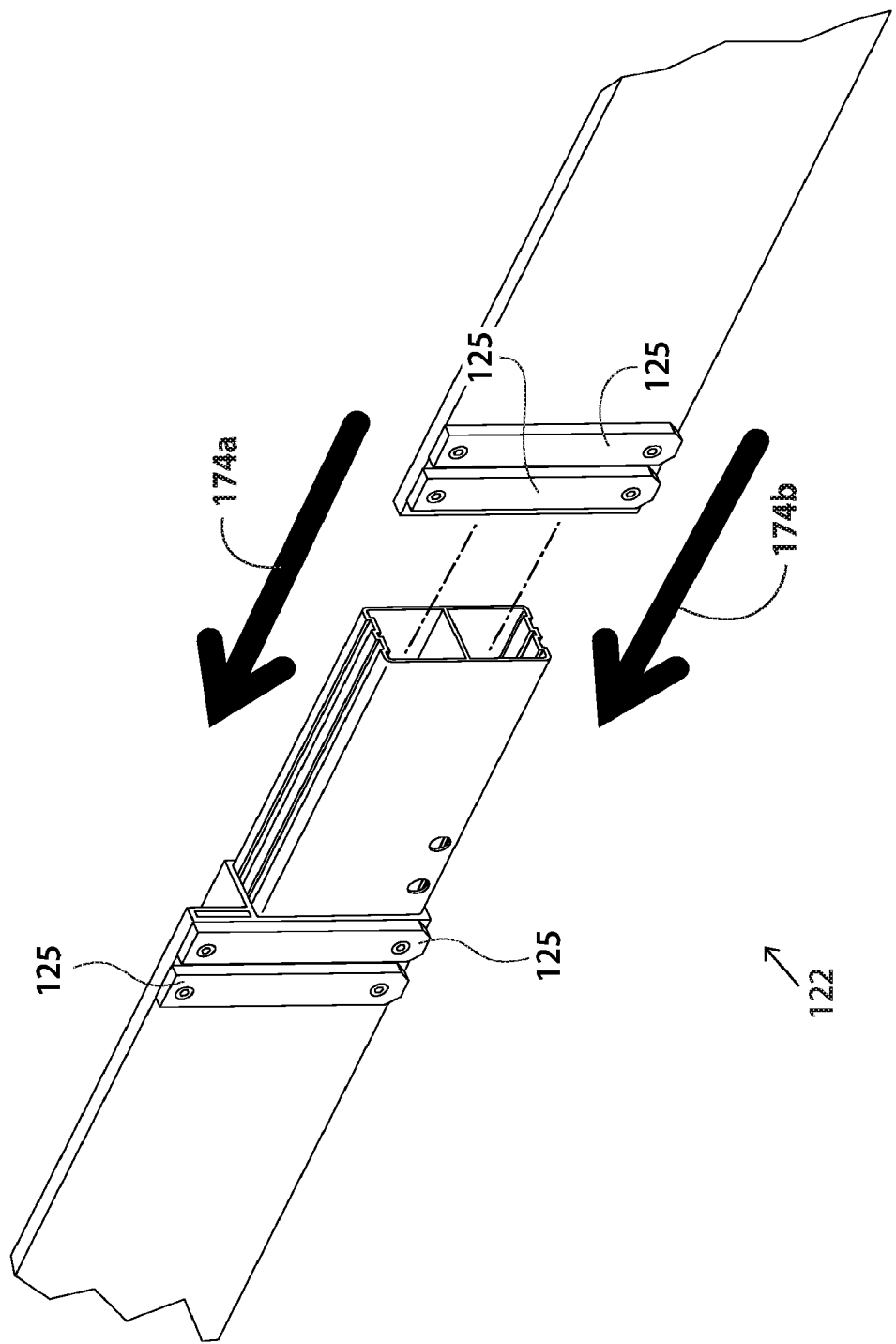
Figure 9F:
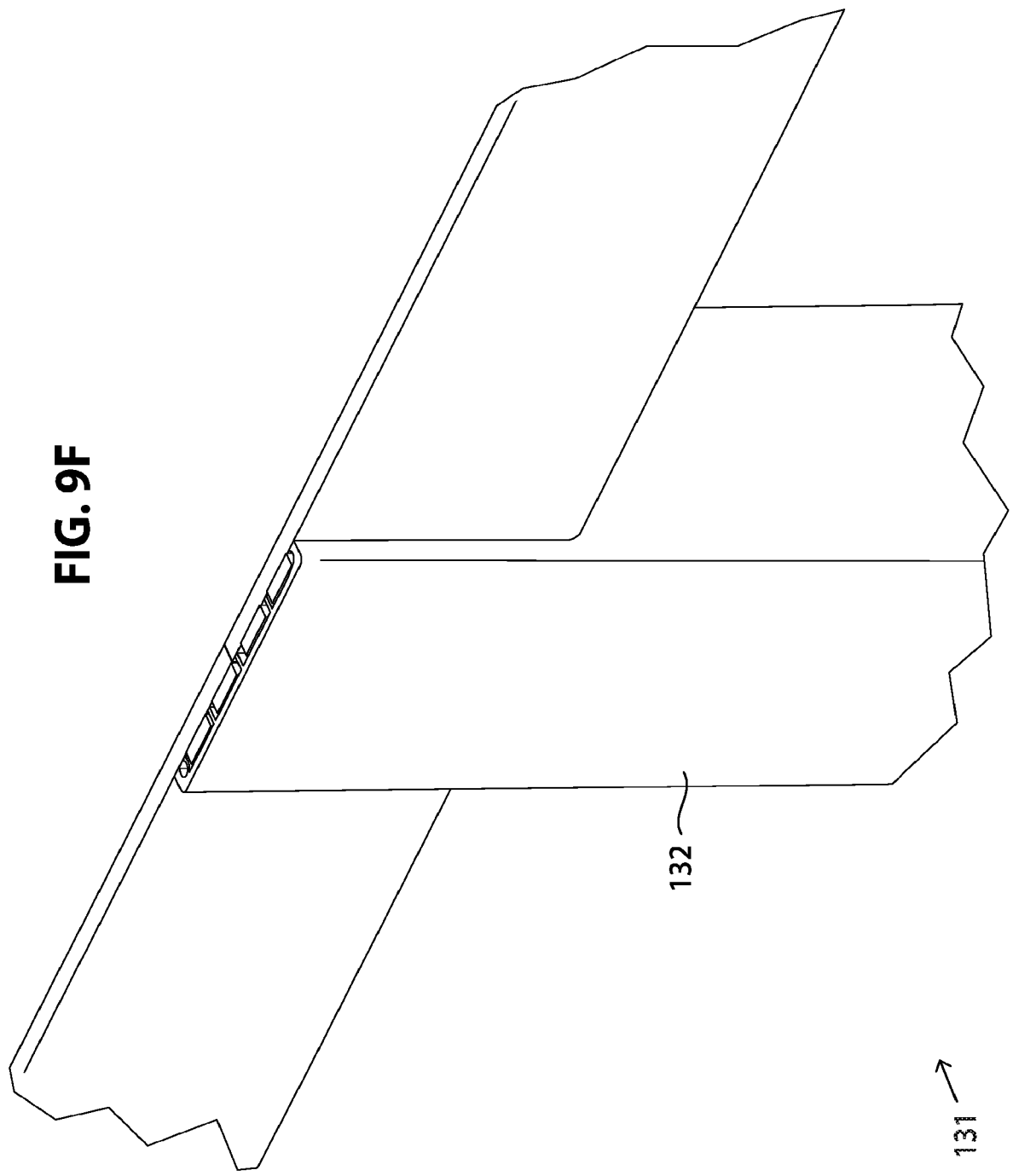
Figure 9G:
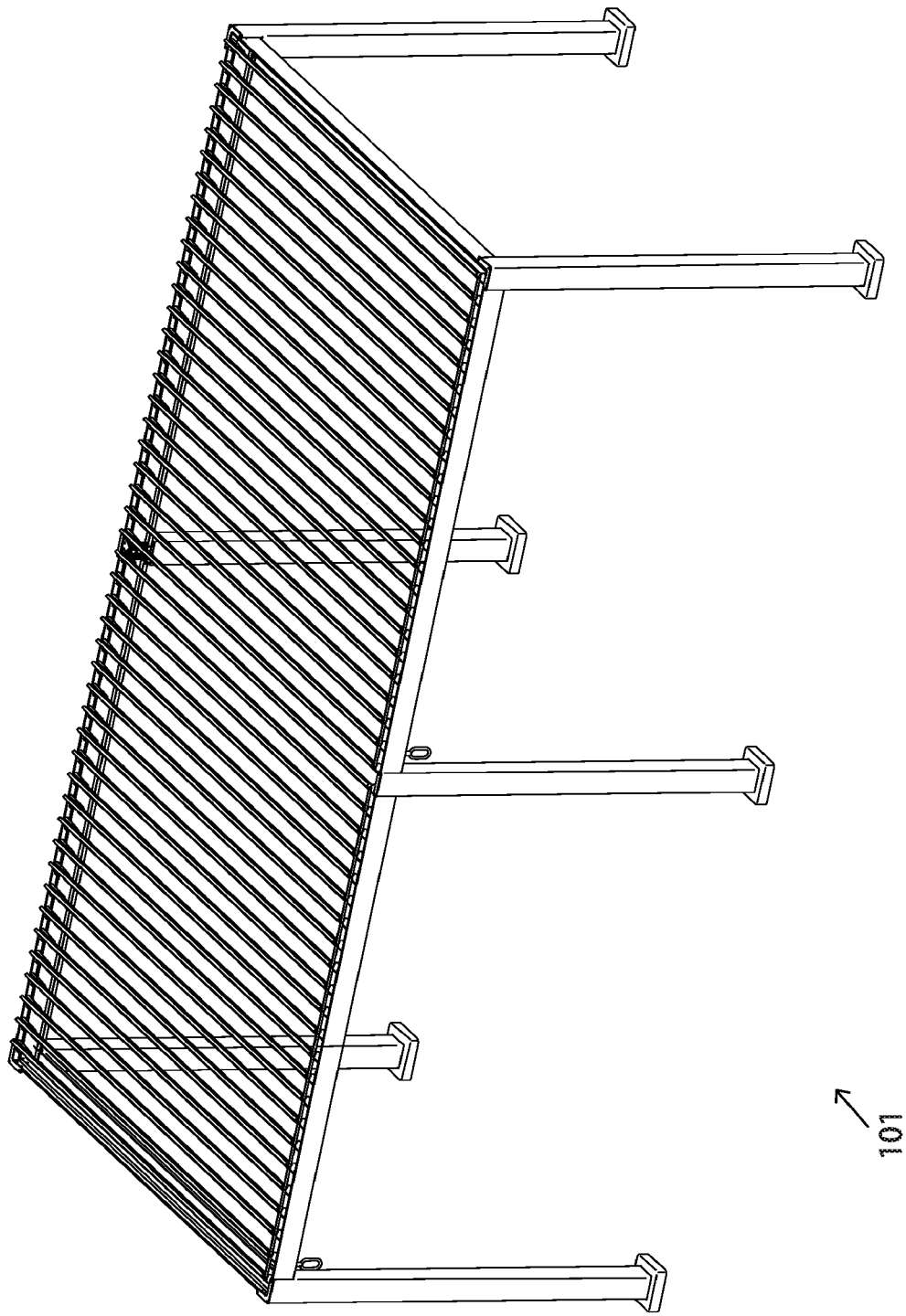
FIG. 9G and FIG. 9H depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, respectively.
Figure 9H:
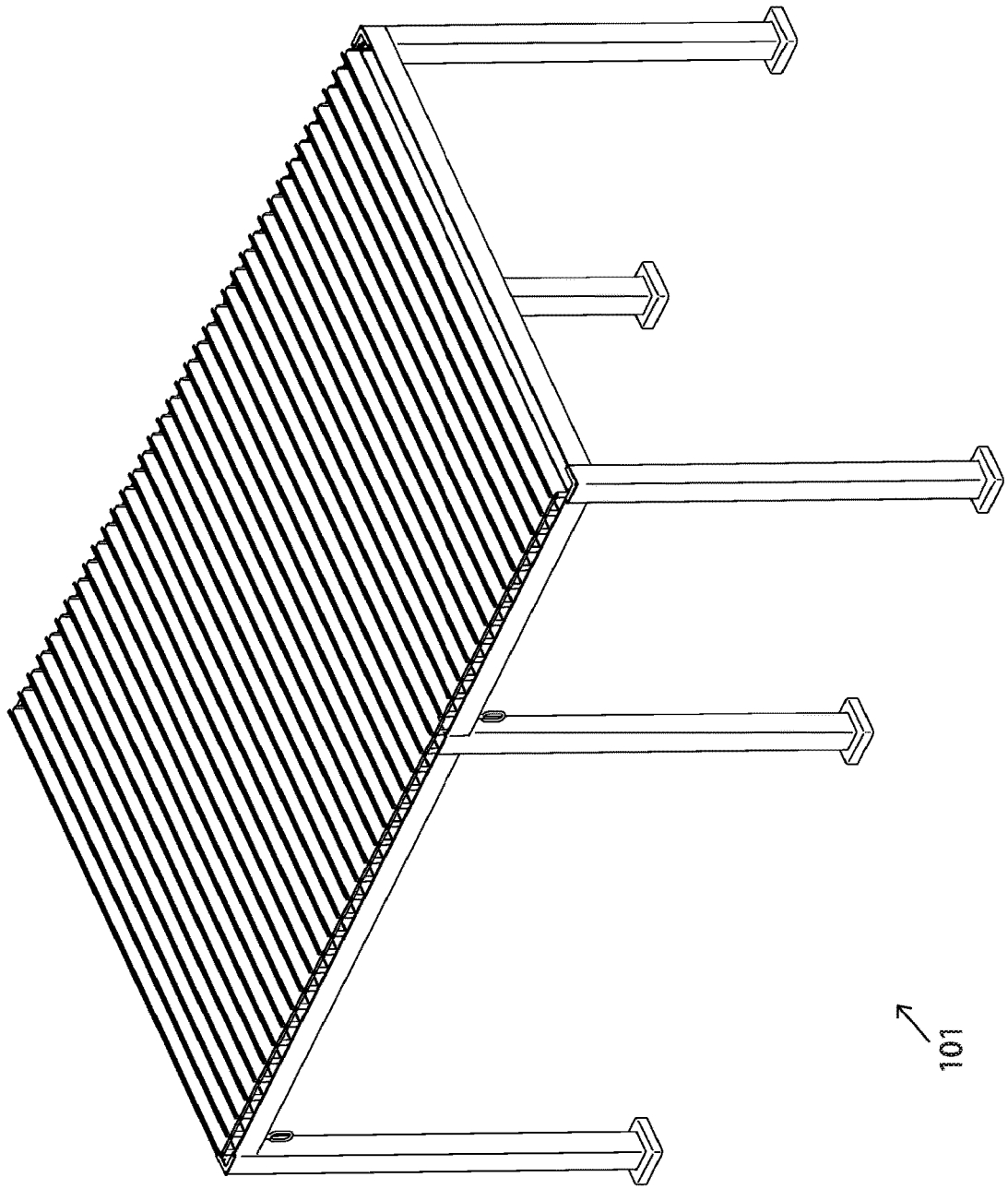
Figure 9J:
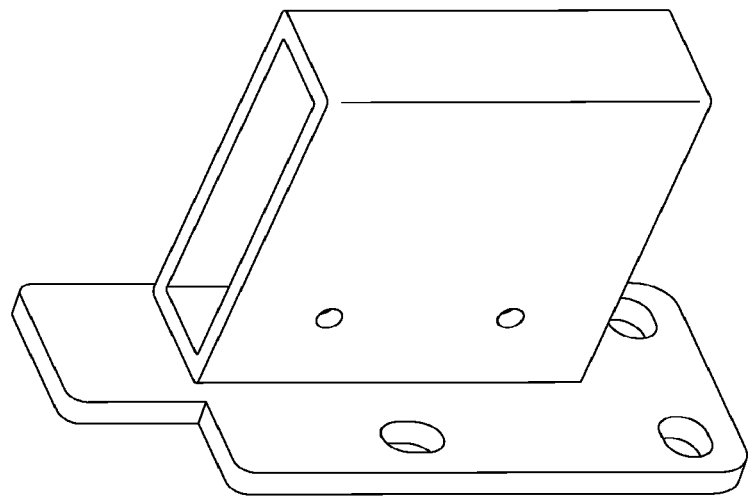
FIG. 9I, FIG. 9J, and FIG. 9K depict perspective views of equivalent variations of the gutter-beam-securing bars, and the assembly thereof.
Figure 9I:
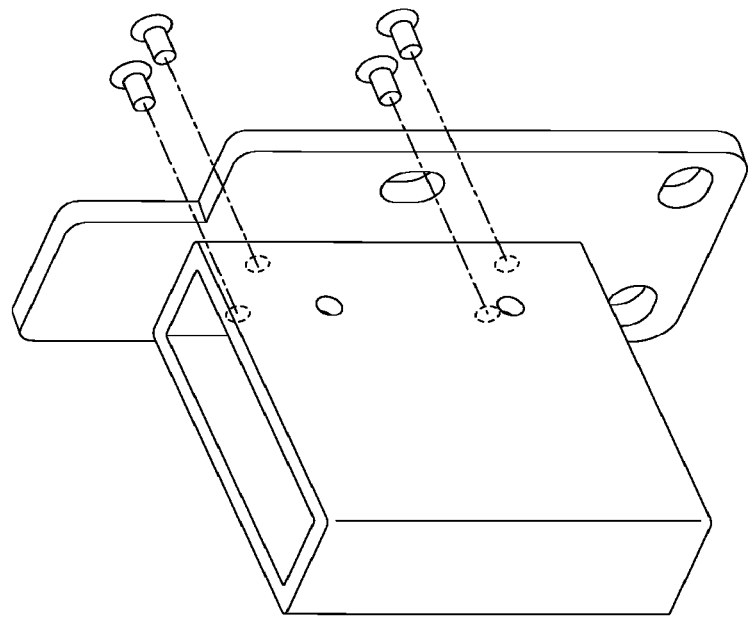
Figure 9K:
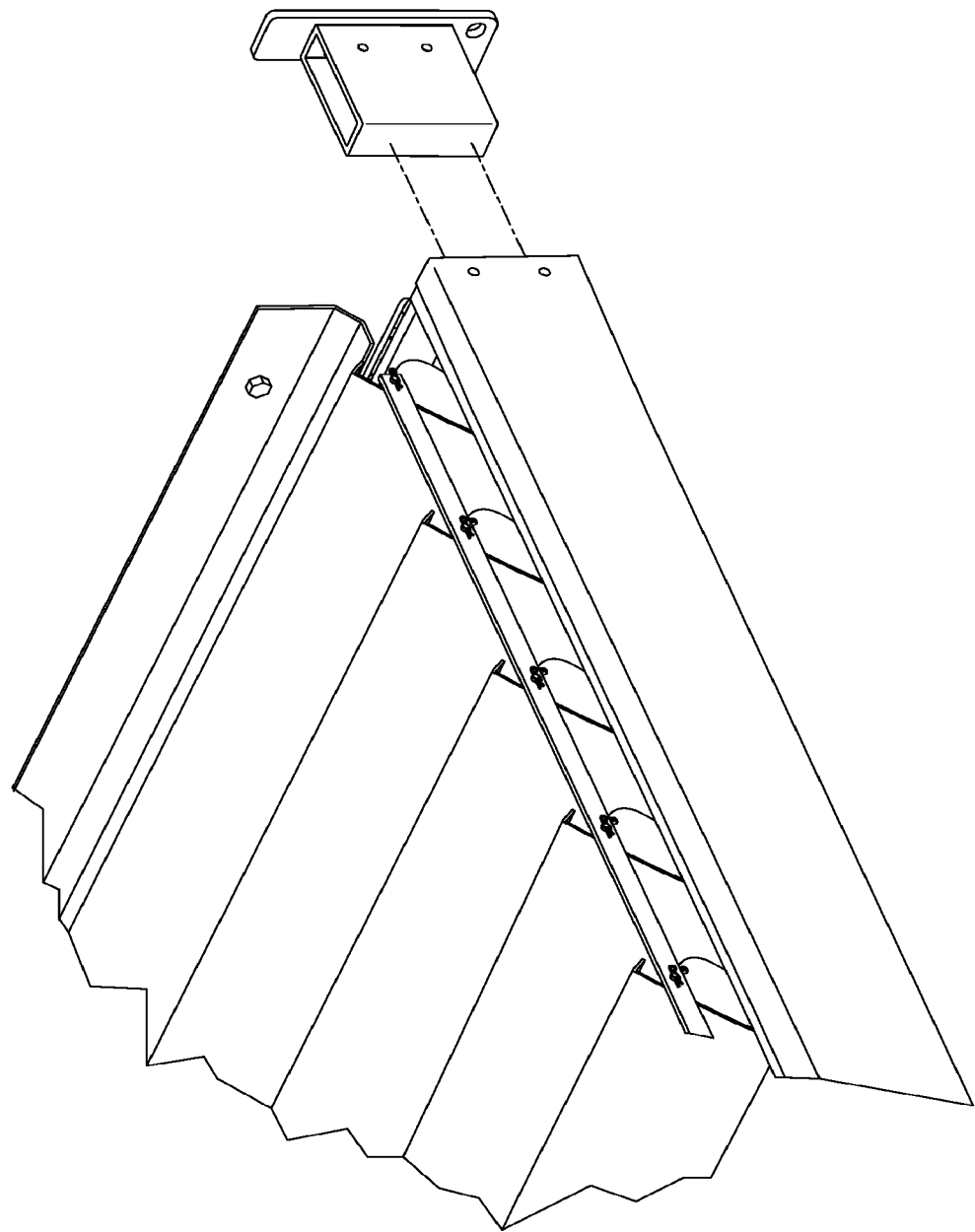
Figure 9L:
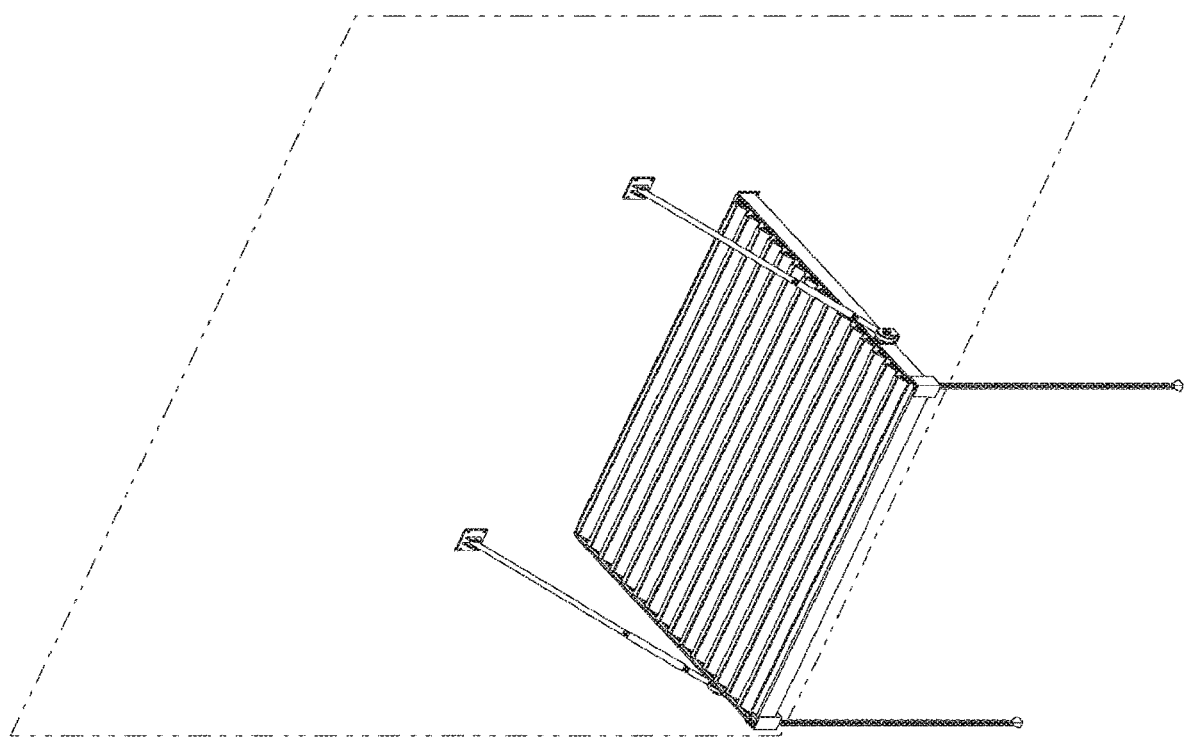
FIG. 9L, FIG. 9M, and FIG. 10A depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola attached to a wall including equivalent variations of corner posts, and/or suspension braces, and/or suspension cables, respectively.
Figure 9M:
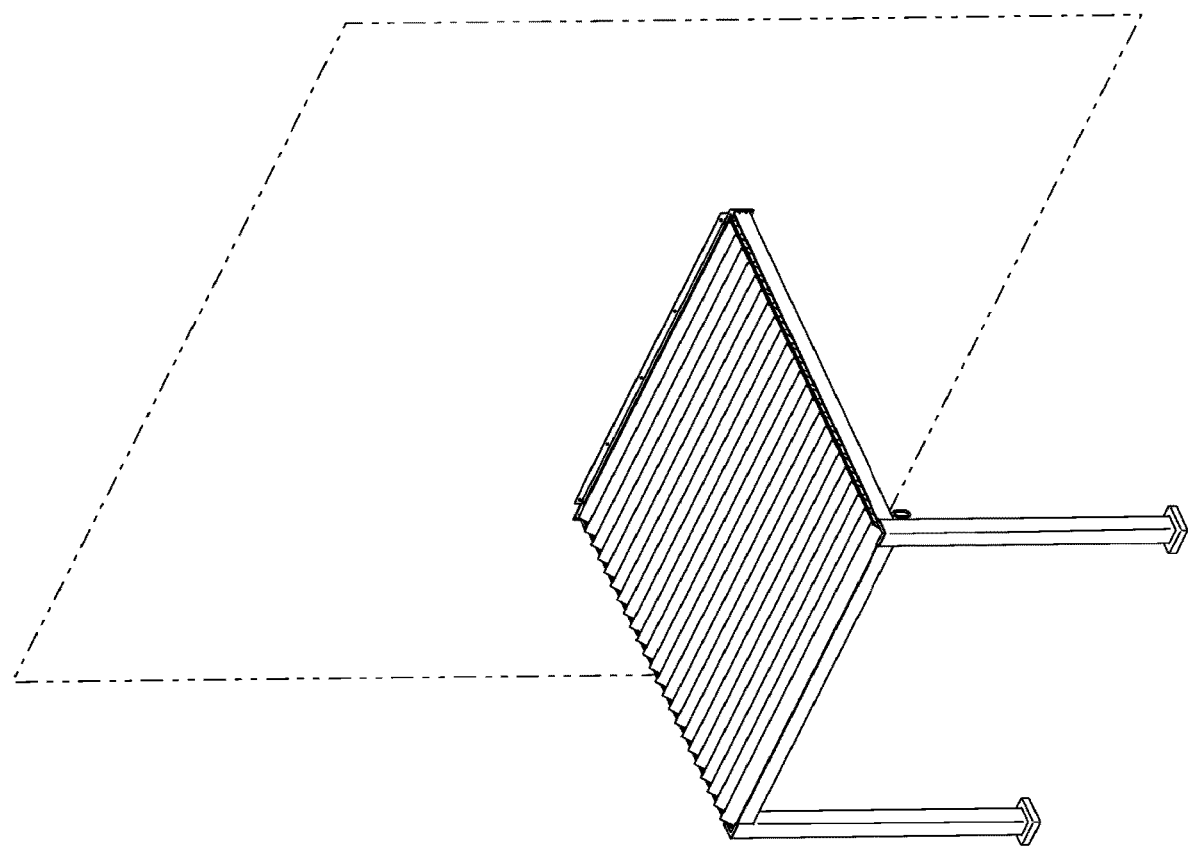
Figure 10A:
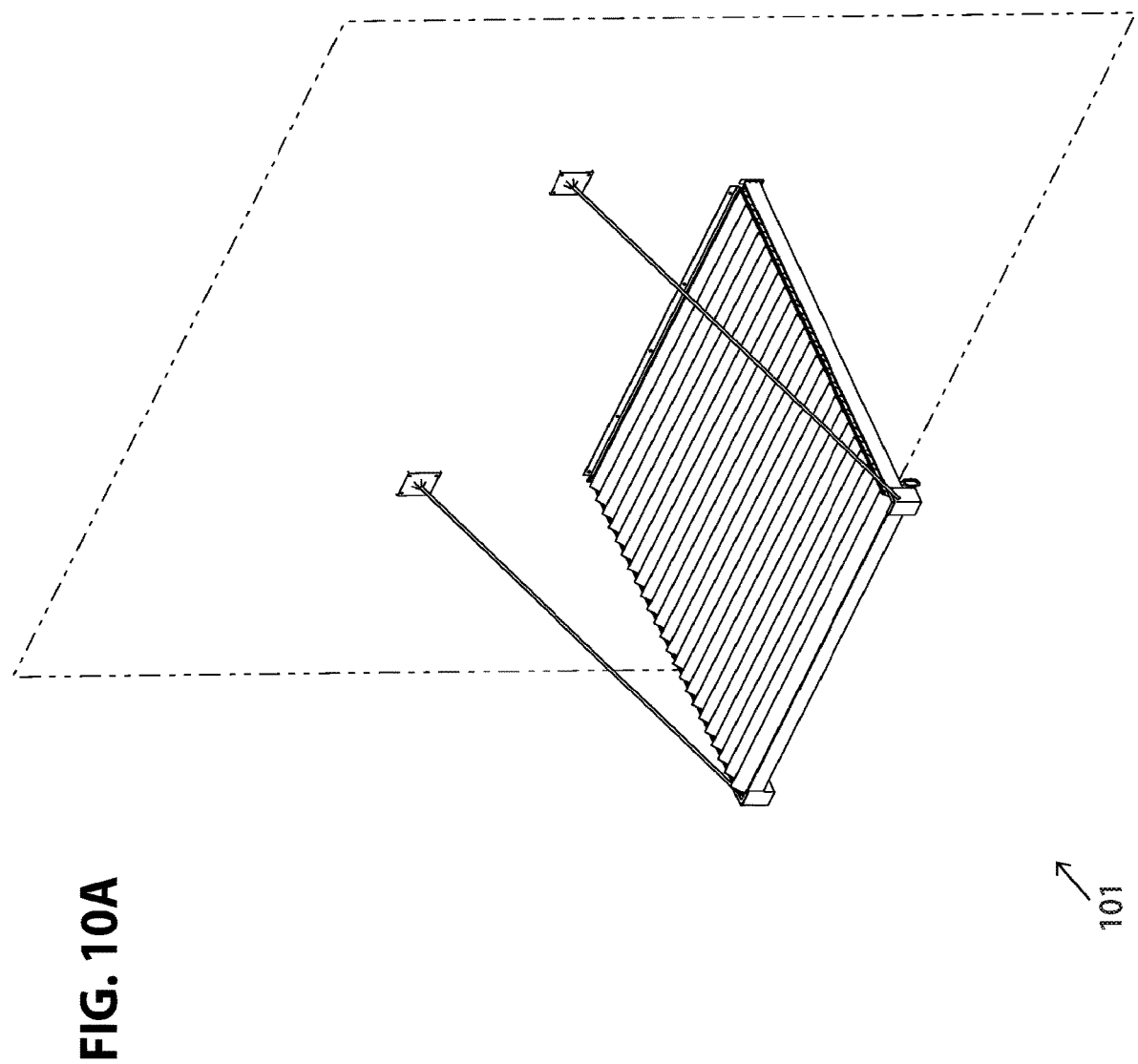
Figure 10B:
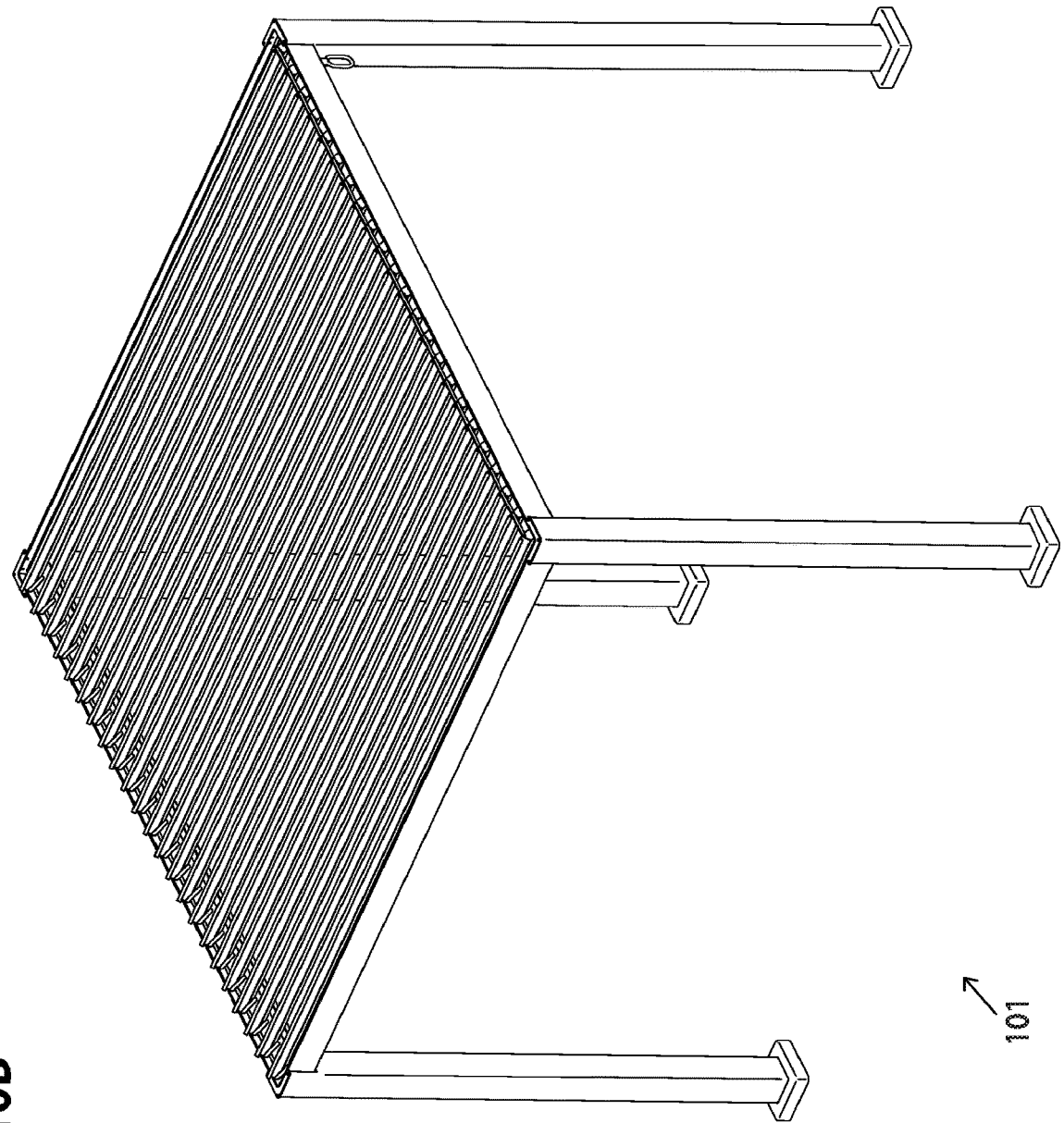
Figure 10C:
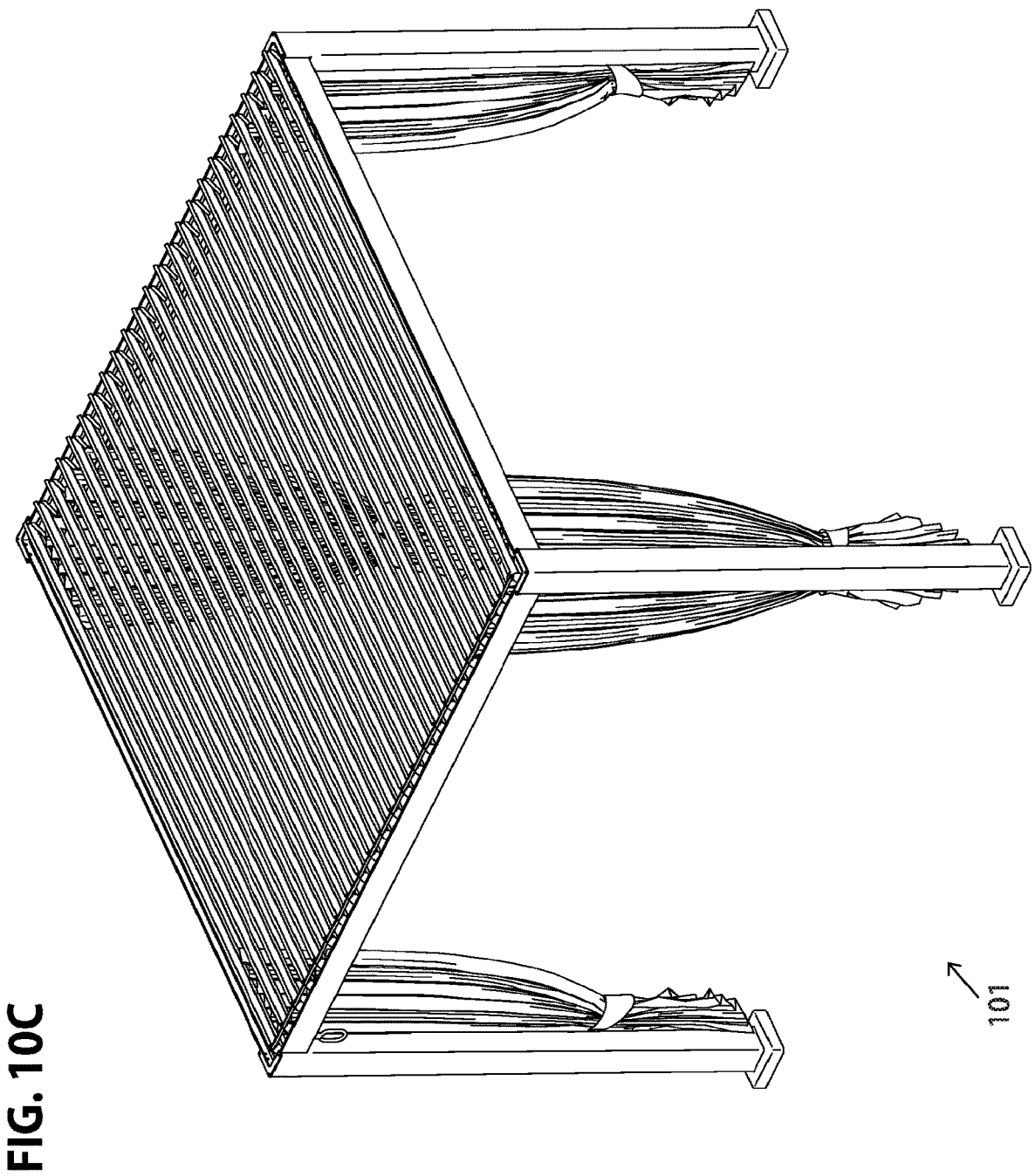
Figure 10D:
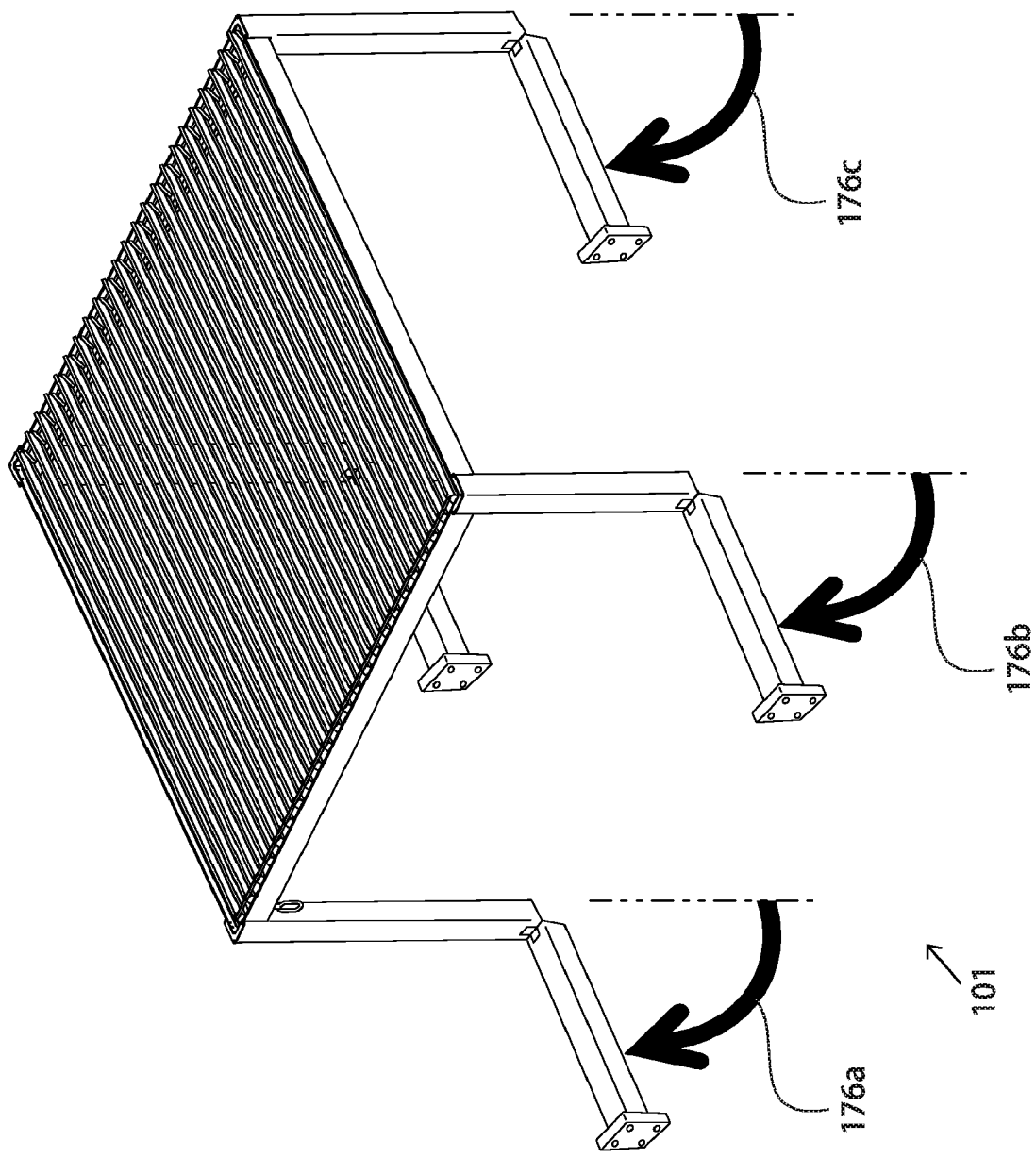
Figure 10F:
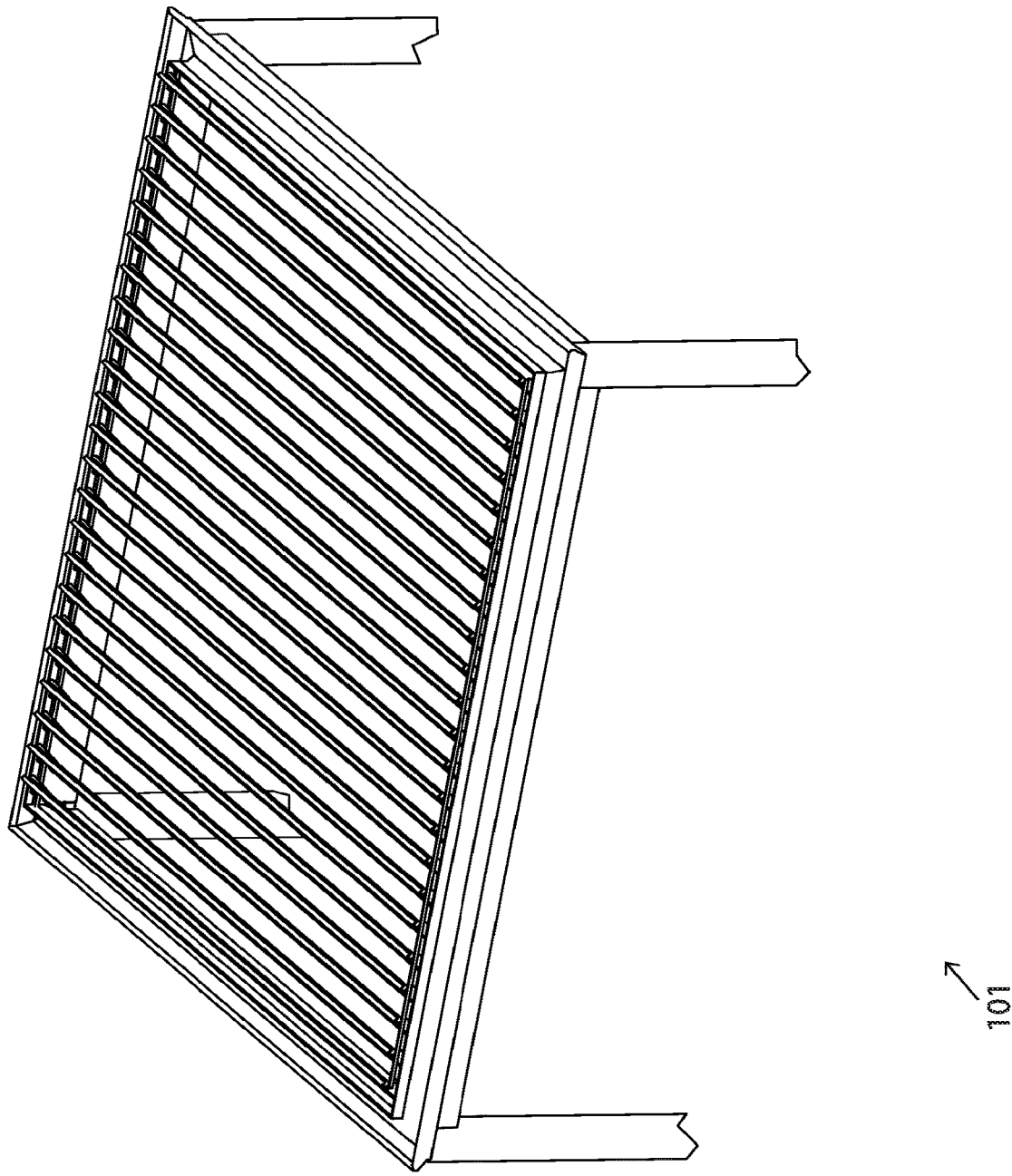
FIG. 10F depicts an equivalent variation of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, with external rainwater gutters.
Figure 10H:
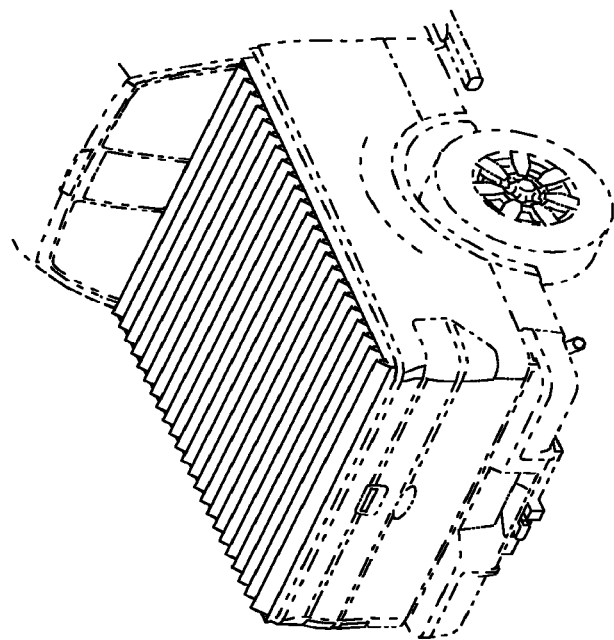
FIG. 10G and FIG. 10H depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, functioning as a truck bed tonneau cover.
Figure 10G:
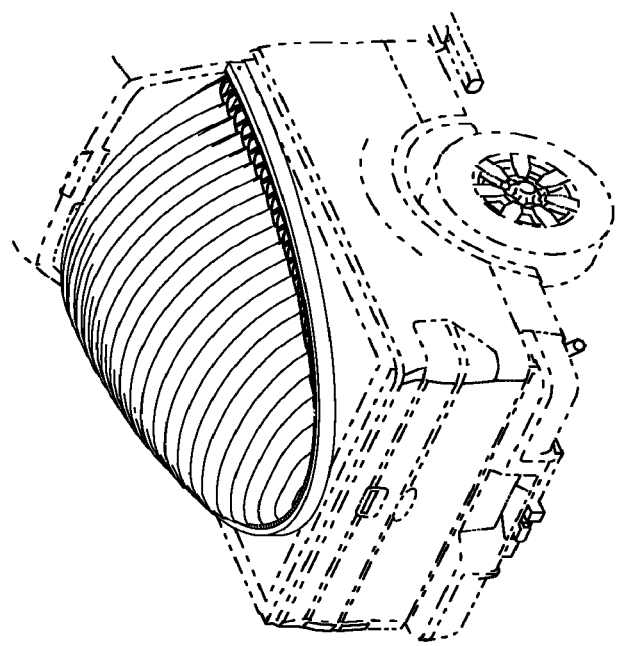
Figure 10J:
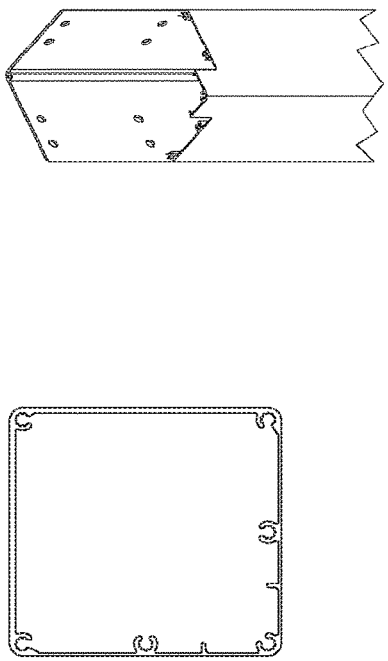
FIG. 10I, FIG. 10J, FIG. 10K, FIG. 10L, and FIG. 10M depict perspective and top views of equivalent variations of first rainwater-channeling-and-leaf-filtering side gutter beam 123a, second rainwater-channeling-and-leaf-filtering side gutter beam 123b, and corner posts 132.
Figure 10K:
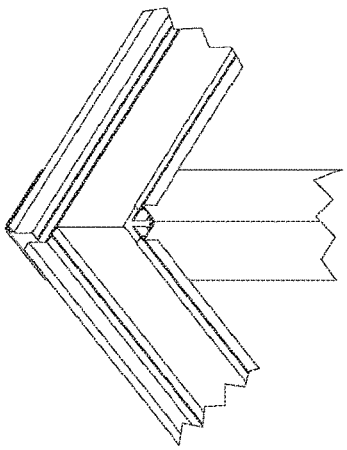
Figure 10I:
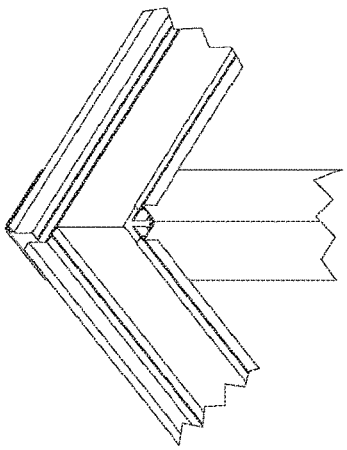
Figure 10M:
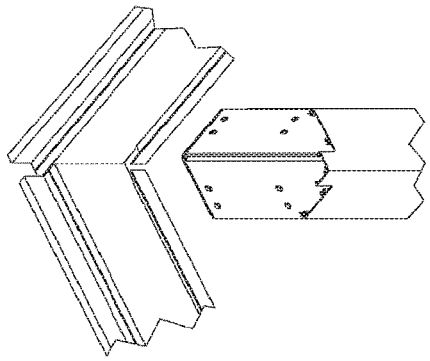
Figure 10L:
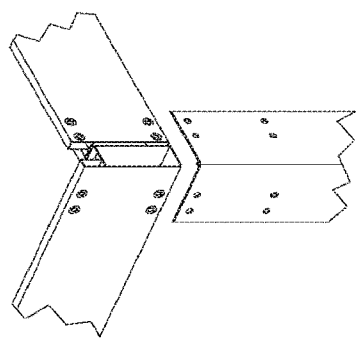

24) Rainwater-channeling-and-leaf-filtering end gutter beams 124 respectively are for:
 a) Functioning as a discrete gutter channel
  to channel rainwater flow from louver-blade wind- and rainwater-directing trailing edges 105 to first rainwater-channeling-and-leaf-filtering side gutter beam 123*a*
  (see FIG. 2Q, FIG. 2S, and FIG. 2T);
 b) Functioning as a airflow blocker
  to provide a physical means to block airflow with overlapping adjacent wind-directing-and-rainwater-sealing multi-screen-securing louver blades 102
  (see FIG. 2C, FIG. 2V, and FIG. 2X);

c) Functioning as a airflow regulator
   to provide a physical means to regulate the volume of airflow with overlapping adjacent wind-directing-and-rainwater-sealing multi-screen-securing louver blades 102
   (see FIG. 2V and FIG. 2X);
d) Functioning as a sunlight blocker
   to provide a physical means to block sunlight with overlapping adjacent wind-directing-and-rainwater-sealing multi-screen-securing louver blades 102
   (see FIG. 2C, FIG. 2V, and FIG. 2X);
e) Functioning as a sunlight regulator
   to provide a physical means to regulate the exposure of sunlight with overlapping adjacent wind-directing-and-rainwater-sealing multi-screen-securing louver blades 102
   (see FIG. 2C, FIG. 2V, and FIG. 2X);
f) Functioning as a food drying duration regulator
   to provide a physical means to regulate the volume of airflow with overlapping adjacent wind-directing-and-rainwater-sealing multi-screen-securing louver blades 102 being operated by multi-louver-blade multi-position automatic-multi-screen-raising-and-lowering control system 112 in the directions of arrows 167a, 167b, 167c, 167d, 167e, 167f, 168a, 168b, 168c, 168d, 168e, 168f, 169a, 169b, 169c, 169d, 169e, and 169f, for drying and sorting
   (see FIG. 3P, FIG. 3Q, and FIG. 3R);
g) Functioning as a horizontal structural support
   to provide a mechanical connection and lateral rigidity between corner posts 132; and
h) Functioning as a structural member
   to support to wind-directing leaf-separating-and-discharging rainwater-sealing automatic-multi-screen-raising-and-lowering multi-screen-securing fruit-drying-and-sorting truck-bed-tonneau-covering louver-blade system.
25) Gutter-beam-securing bars 125 respectively are for:
Securing first rainwater-channeling-and-leaf-filtering side gutter beam 123a, second rainwater-channeling-and-leaf-filtering side gutter beam 123b, and rainwater-channeling-and-leaf-filtering end gutter beams 124 to corner posts 132
(see FIG. 2O, FIG. 2Q, and FIG. 2R).
26) Leaf-separating-and-discharging rainwater gutters 126 respectively are for:
a) Separating out leaves
   to separate the water from leaves as it flows through the leaf-separating-and-discharging rainwater gutters 126
   (see FIG. 2S, FIG. 2T, FIG. 3S, and FIG. 3T);
b) Filtering rainwater
   to flow through the leaf-separating-and-discharging rainwater gutters 126 without clogging up with debri
   (see FIG. 2S, FIG. 2T, FIG. 3S, and FIG. 3T);
c) Providing rainwater channels that are hidden
   to be visually unseen nestled behind the first rainwater-channeling-and-leaf-filtering side gutter beam 123a, second rainwater-channeling-and-leaf-filtering side gutter beam 123b, and rainwater-channeling-and-leaf-filtering end gutter beams 124
   (see FIG. 1B, FIG. 1E, FIG. 3S, and FIG. 3T);
d) Providing channels for rainwater to flow
   to lead rainwater away from areas that would get occupants wet in the directions of arrows 170a, 170b, 170c, 171a, 171b, and 171c
   (see FIG. 1B, FIG. 1E, FIG. 3S, and FIG. 3T);
e) Providing channels for rainwater
   to guide rainwater in a specific flow pattern within rainwater-channeling-and-collecting and leaf-separating-and-discharging gutter-beam system 122 as to not create mineral stains or discoloration on the outer, exposed surfaces; and
f) Providing channels for rainwater
   to exit at the lowest point of rainwater-channeling-and-collecting and leaf-separating-and-discharging gutter-beam system 122 as to be externally manageable for rainwater flow out of the pergola area.
27) Leaf-separating-and-discharging drain holes 127a respectively are for:
a) Filtering rainwater
   to flow through the rainwater-channeling-and-collecting and leaf-separating-and-discharging gutter-beam system 122 without clogging up the system with debri
   (see FIG. 1A, FIG. 1B, FIG. 1E, FIG. 3S, and FIG. 3T); and
b) Filtering out leaves
   to separate the water from leaves as it flows through the rainwater-channeling-and-collecting and leaf-separating-and-discharging gutter-beam system 122
   (see FIG. 1A, FIG. 1E, and FIG. 3S).
Leaf-separating-and-discharging opening 127b respectively are for:
a) Separating out leaves
   to separate the water from leaves as it flows through the leaf-separating-and-discharging rainwater gutters 126 in the directions of arrows 170a, 170b, 170c, 171a, 171b, and 171c
   (see FIG. 1B, FIG. 1E, FIG. 3S, and FIG. 3T);
b) Filtering rainwater
   to flow through the leaf-separating-and-discharging rainwater gutters 126 without clogging up the system with debri;
c) Separately directing the flow of leaves and debri
   to angle the flow of leaves and debri toward the ground to obscure the messy build-up and appearance on the frame structure in the directions of arrows 171a, 171b, 171c, 172a, 172b, and 172c
   (see FIG. 1B, FIG. 1E, FIG. 3S, and FIG. 3T);
d) Clearing out the paths of waterflow
   to prevent build-up of deposit the leaves and debri leaf-separating-and-discharging rainwater gutters 126; and
e) Discharging leaves out of corner posts 132
   to expel the leaves and debri outside of the leaf-separating-and-discharging rainwater gutters 126 in the directions of arrows 171a, 171b, and 171c
   (see FIG. 1B, FIG. 1E, FIG. 3S, and FIG. 3T).
28) Leaf-separating-and-discharging tubes 128 respectively are for:
a) Separating out leaves
   to separate the water from leaves as it flows through the leaf-separating-and-discharging rainwater gutters 126 in the directions of arrows 170a, 170b, 170c, 171a, 171b, 171c, 172a, 172b, and 172c
   (see FIG. 1B, FIG. 1E, FIG. 3S, and FIG. 3T);
b) Filtering rainwater
   to flow through the leaf-separating- and discharging rainwater gutters 126 without clogging up the system with debris in the directions of arrows 170a, 170b, 170c, 171a, 171b, and 171c
   (see FIG. 1E, FIG. 3S, and FIG. 3T);

c) Directing rainwater to flow
   to lead rainwater away from areas that would get occupants wet;
d) Providing rainwater channels that are hidden
   to be visually unseen inside of corner posts 132
   (see FIG. 1E, FIG. 3S, and FIG. 3T);
e) Providing channels for rainwater
   to guide rainwater in a specific flow pattern within rainwater-channeling-and-collecting and leaf-separating-and-discharging gutter-beam system 122 as to not create mineral stains or discoloration on the outer, exposed surfaces; and
f) Providing channels for rainwater
   to exit at the lowest point of rainwater-channeling-and-collecting and leaf-separating-and-discharging gutter-beam system 122 as to be externally manageable for rainwater flow out of the pergola area.
29) Rainwater-draining spouts 129 respectively are for:
   Providing a curved directional exit point for water
      to flow from the inside of leaf-separating-and-discharging tubes 128 and exit through rainwater-draining spout holes 130
      (see FIG. 1E, FIG. 3S, and FIG. 3T).
30) Rainwater-draining spout holes 130 respectively are for:
   Inserting rainwater-draining spouts 129 therethrough
      (see FIG. 1E, FIG. 3S, and FIG. 3T).
31) Height-and-angle-adjustable-post-and-base system 131 is for performing the combined functions of its components.
32) Corner posts 132 respectively are for:
   Securing first rainwater-channeling-and-leaf-filtering side gutter beam 123a, second rainwater-channeling-and-leaf-filtering side gutter beam 123b, and rainwater-channeling-and-leaf-filtering end gutter beams 124, thereto in the directions of arrows 173a, 173b, 173c, 173d, 174a, 174b, 176a, 176b, 176c, 177a, 177b, and 177c
      (see FIG. 4A, FIG. 4B, FIG. 4B, FIG. 4B, FIG. 9D, FIG. 10D, and FIG. 10E).
33) Corner-post L-shaped caps 133 respectively are for:
   providing enclosure to tops of corner posts 132
      (see FIG. 2S, FIG. 2T, and FIG. 3D).
34) Gutter-beam cradles 134 respectively are for:
   Supporting first rainwater-channeling-and-leaf-filtering side gutter beam 123a, second rainwater-channeling-and-leaf-filtering side gutter beam 123b, and rainwater-channeling-and-leaf-filtering end gutter beams 124 in the directions of arrows 145a, 145b, 146a, 146b, 147a, and 147b
      (see FIG. 2Q, FIG. 2R, and FIG. 2S).
35) Gutter-beam-securing-bar slots 135 respectively are for:
   Securing corner-post base plates 137 132 thereto in the directions of arrows 175a and 175b
      (see FIG. 2Q, FIG. 2R, FIG. 2S, FIG. 2T and FIG. 9E).
36) Corner-post-base-plate covers 136 respectively are for:
   Removably attaching to and covering corner-post base plates 137
      (see FIG. 3E and FIG. 3G).
37) Corner-post base plates 137 respectively are for:
   Screwing to the bottoms of corner posts 132
      (see FIG. 3F and FIG. 3G).
38) Height-and-angle-adjustable internally-externally-threaded tube screws 138a respectively are for:
   a) Screwing through corner-post base plates 137
      (see FIG. 4A, FIG. 4B, and FIG. 4C);
   b) Securing each corner-post base plates 137 to corner posts 132;
   c) Providing independent vertical adjustment to each corner of each corner-post base plates 137
      to compensate for uneven surfaces; and
   d) Providing vertical adjustment for each corner-post base plate 137 to level out each corner of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola
      (see FIG. 4A, FIG. 4B, and FIG. 4C).
Height-and-angle-adjustable-internally-externally-threaded tube-screw holes 138b respectively are for:
   Providing threaded holes to receive height-and-angle-adjustable internally-externally-threaded tube screws 138a.
39) Anchoring-screw holes 139 respectively are for:
   Screwing anchoring screws 140 therethrough in the directions of arrows 173a, 173b, 173c, and 173d
      (see FIG. 4A, FIG. 4B, and FIG. 4C).
40) Anchoring screws 140 respectively are for:
   Inserting through anchoring-screw holes 139
      to independently adjust the corner of each corner-post base plates 137 to secure corner-post base plates 137 into concrete, wood, and other decking or flooring materials
      in the directions of arrows 173a, 173b, 173c, and 173d
      (see FIG. 4A, FIG. 4B, and FIG. 4C).
Variation
   Referring to FIG. 5, FIG. 6A, FIG. 6B, FIG. 6C, FIG. 6D, FIG. 6E, FIG. 6F, FIG. 7A, FIG. 7B, FIG. 7C, FIG. 7D, FIG. 7E, FIG. 7F, FIG. 7G, FIG. 7H, FIG. 7I, FIG. 7J, FIG. 7K, FIG. 7L, FIG. 7M, FIG. 7N, FIG. 7O, FIG. 7P, FIG. 7Q, FIG. 7R, FIG. 7S, FIG. 7T, FIG. 7U, FIG. 8A, FIG. 8B, FIG. 8C, FIG. 8D, FIG. 8E, FIG. 8F, FIG. 8G,
   FIG. 8H, FIG. 8I, FIG. 8J, FIG. 8K, FIG. 8L, FIG. 8M, FIG. 8N, FIG. 8O, FIG. 8P, FIG. 8Q, FIG. 8R, FIG. 9A, FIG. 9B, FIG. 9C, FIG. 9D, FIG. 9E, FIG. 9F, FIG. 9G, FIG. 911, FIG. 9I, FIG. 9J, FIG. 9K, FIG. 9L, FIG. 9M, FIG. 10A, FIG. 10B, FIG. 10C, FIG. 10D, FIG. 10E, FIG. 10F, FIG. 10G, FIG. 10H, FIG. 10I, FIG. 10J, FIG. 10K, FIG. 10L, and FIG. 10M:
      Any component of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola can have any shape and size. Any component of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola can be made of any material(s). FIG. 5 depicts an equivalent variation of rainwater-channeling-and-leaf-filtering end gutter beams 124. FIG. 6A, FIG. 6B, and FIG. 6C depict perspective views of equivalent variations of wind-directing-and-rainwater-sealing multi-screen-securing louver blades 102, respectively. FIG. 6D depicts a perspective view of an equivalent variation of louver-blade end cap 106. FIG. 6E and FIG. 6F depict a perspective and a side views of equivalent variations of a wind-directing-and-rainwater-sealing multi-screen-securing louver blades 102 and louver-blade end caps 106, respectively. FIG. 7A, FIG. 7B, and FIG. 7C depict profiles of equivalent variations of wind-directing-and-rainwater-sealing multi-screen-securing louver blades 102, respectively. FIG. 7D, FIG. 7E, FIG. 7F, FIG. 7G, FIG. 7H, and FIG. 7I depict profiles of equivalent variations of first rainwater-channeling-and-leaf-filtering side gutter beams, and/or second rainwater-channeling-and-leaf-filtering side gutter beam, and/or rainwater-channeling-and-leaf-filtering end gutter beams, respectively. FIG. 7J, FIG. 7K, FIG. 7L, FIG. 7M, FIG. 7N, FIG. 7O, FIG. 7P, FIG. 7Q, FIG. 7R, FIG. 7S, FIG. 7T, FIG. 7U, FIG. 8A, FIG. 8B, FIG. 8C, FIG. 8D, FIG. 8E, FIG. 8F, FIG. 8G, FIG. 8H, FIG. 8I, FIG. 8J, FIG. 8K, FIG. 8L, FIG. 8M, FIG. 8N, FIG. 8O, FIG. 8P, FIG. 8Q, and FIG. 8R depict profiles of equivalent variations of corner posts 132, respectively. FIG. 9A and FIG. 9B depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, respectively. FIG. 9C and FIG. 9D depict perspective views of equivalent variations of components and assembly of first rainwater-channeling-and-leaf-filtering side gutter beams and/or second rainwater-channeling-and-leaf-filtering side gutter beam, with gutter-beam-securing bars 125. FIG. 9E and FIG. 9F depict perspective views of equivalent variations of an assembly of first rainwater-channeling-and-leaf-filtering side gutter beams, and/or second rainwater-channeling-and-leaf-filtering side gutter beam, and/or rainwater-channeling-and-leaf-filtering end gutter beams, with gutter-beam-securing bars 125 being secured to a corner post 132. FIG. 9G and FIG. 9H depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, respectively. FIG. 9I, FIG. 9J, and FIG. 9K depict perspective views of equivalent variations of the gutter-beam-securing bars 125, and the assembly thereof. FIG. 9L, FIG. 9M, and FIG. 10A depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola attached to a wall including equivalent variations of corner posts 132, and/or suspension braces, and/or suspension cables, respectively. FIG. 10B, FIG. 10B, FIG. 10C, and FIG. 10D depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, with a variation of multi-louver-blade multi-position automatic-multi-screen-raising-and-lowering control system 112, and/or privacy shades, and/or hinged or sectionable corner posts, respectively. FIG. 10F depicts an equivalent variation of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, with external rainwater gutters. FIG. 10G and FIG. 10H depict perspective views of equivalent variations of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, functioning as a truck bed tonneau cover. FIG. 10I, FIG. 10J, FIG. 10K, FIG. 10L, and FIG. 10M depict perspective and top views of equivalent variations of first rainwater-channeling-and-leaf-filtering side gutter beam 123*a*, second rainwater-channeling-and-leaf-filtering side gutter beam 123*b*, and corner posts 132.

Major Disadvantages of the Invention

The present invention substantially departs from the conventional concepts and designs of the prior art. In doing so, the present invention provides a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola (having: a) Wind-directing leaf-separating-and-discharging rainwater-sealing automatic-multi-screen-raising-and-lowering multi-screen-securing fruit-drying-and-sorting truck-bed-tonneau-covering louver-blade system, b) Multi-louver-blade multi-position automatic-multi-screen-raising-and-lowering control system, c) Rainwater-channeling-and-colleting and leaf-separating-and-discharging gutter-beam system, and d) Height-and-angle-adjustable-post-and-base system), having many new and significant features, functions, and advantages, which overcome all the disadvantages of the prior art, as follows:

1) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102.

Figure 1N:
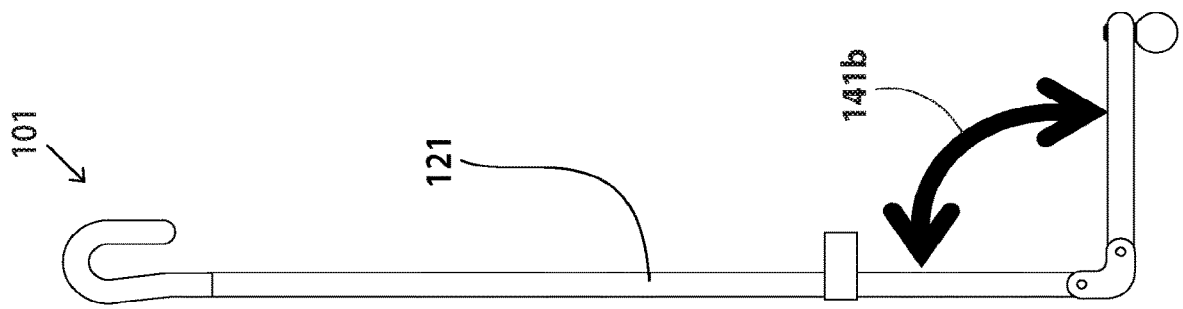
FIG. 1N and FIG. 1O illustrate side views of removable-collapsible-and-stowable automatic-multi-screen-raising-and-lowering multi-louver-control crank tool, depicted in a closed and an open configuration.
Figure 1O:
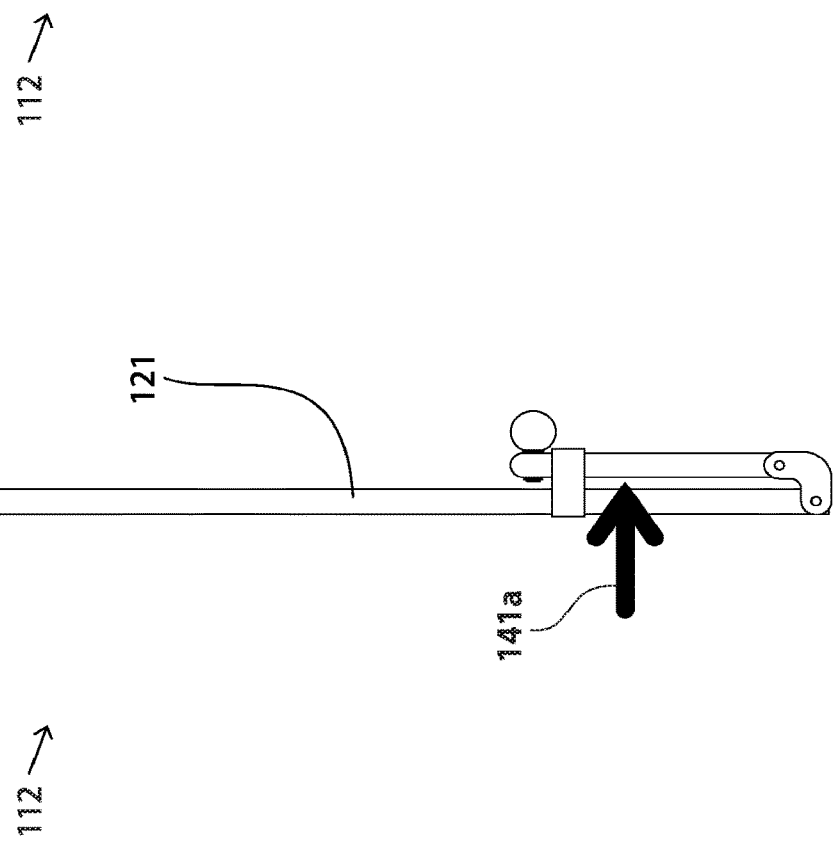
Figure 1R:
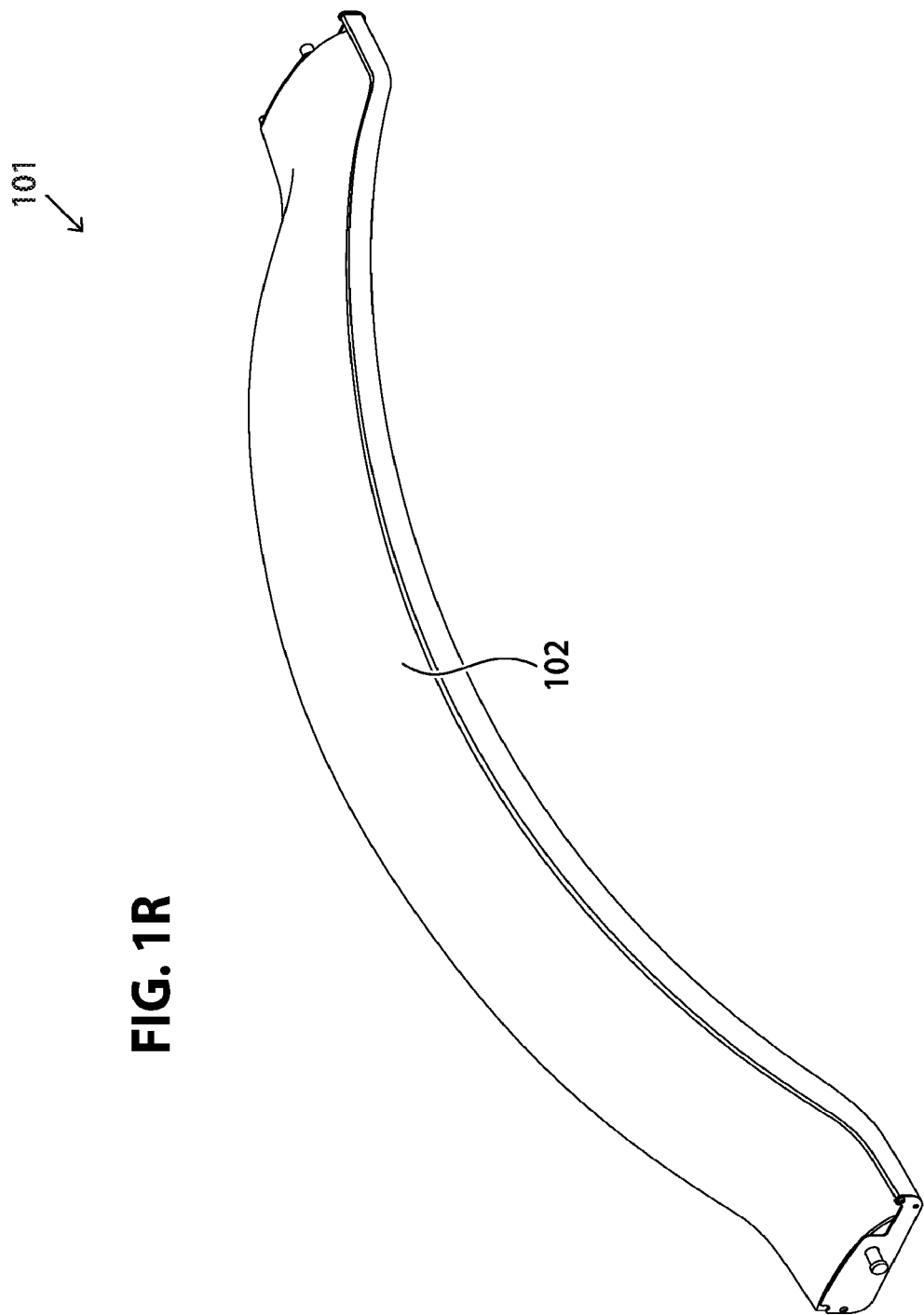
FIG. 1R illustrates a perspective view of a wind-directing-and-rainwater-sealing multi-screen-securing louver blade.
Figure 2Y:
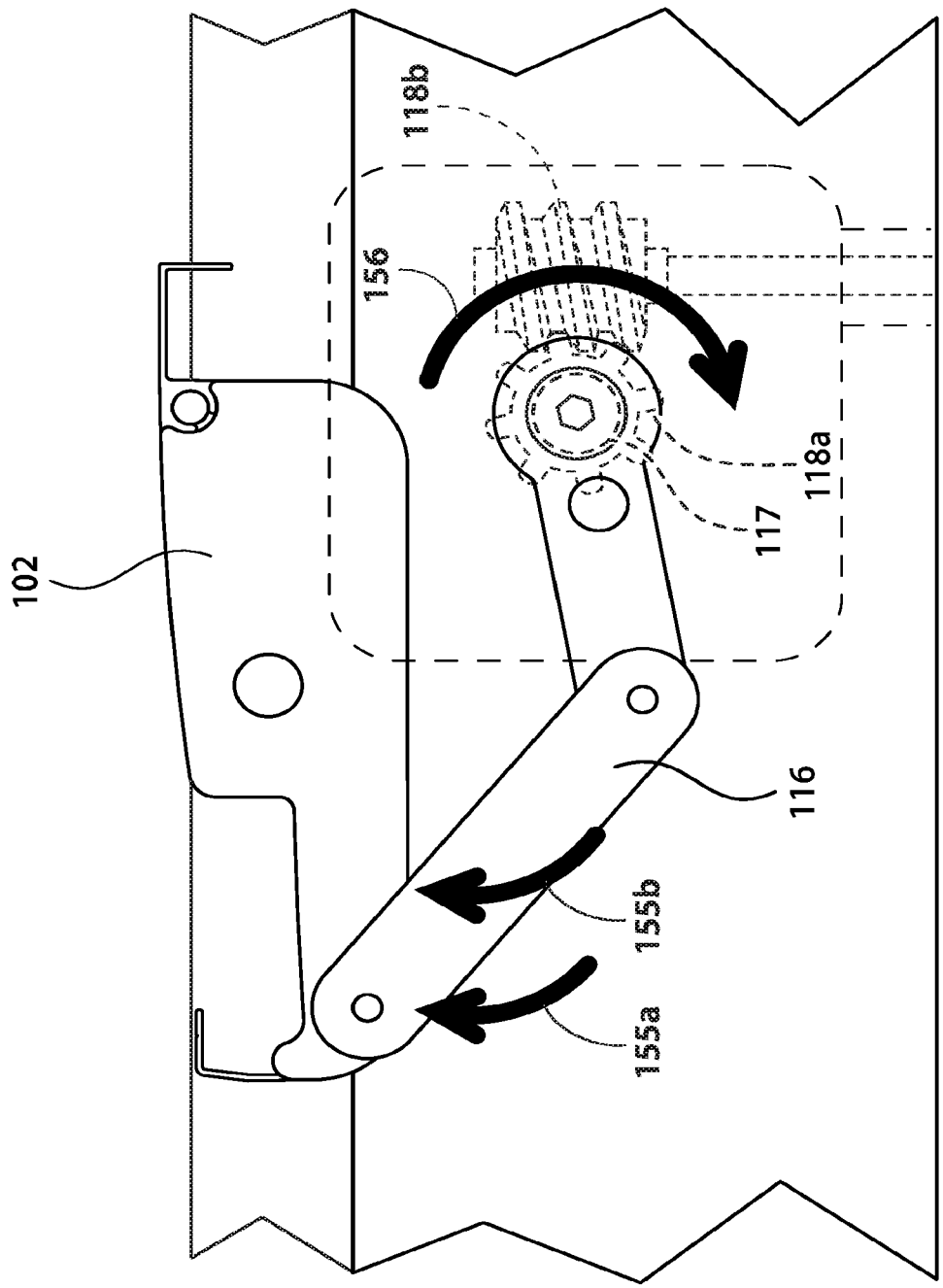
FIG. 2Y and FIG. 2Z illustrate diagrams depicting a linkage-arm gear and multi-louver-control linkage arm actuating the wind-directing-and-rainwater-sealing multi-screen-securing louver blades in open and closed positions.
Figure 2Z:
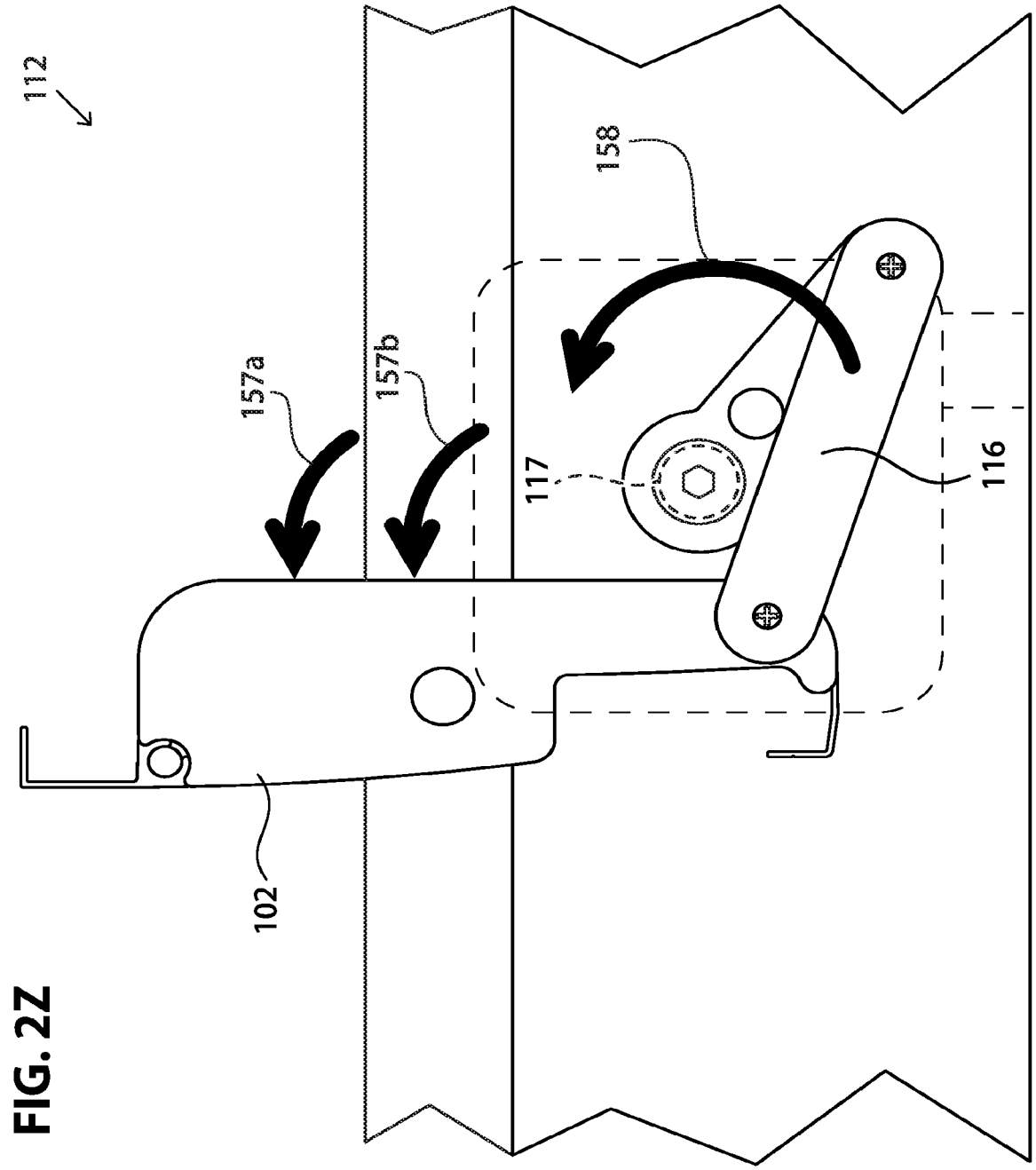

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can function as a fruit sorting separator
to automatically and adjustably divide the fruit according to predetermined diameters, being controlled by removable-collapsible-and-stowable automatic-multi-screen-raising-and-lowering multi-louver-control crank tool 121
in the directions of arrows 141*a* and 141*b*
(see FIG. 1N and FIG. 1O);

b) Can control the deployment and retraction of a video projection screen
(see FIG. 2C, FIG. 2D, FIG. 3H, and FIG. 3I);

c) Can function as a tonneau cover
to actuate a quick visual view of tools and other storage items within a truck bed
in the directions of arrows 142*a*, 142*b*, and 142*c*
(see FIG. 2C, FIG. 2D, FIG. 10G, and FIG. 10H); and d) Can function as an adjustable ventilating tonneau cover for pet containment
to regulate the degree of louver opening while containing a pet within a truck bed, thereby regulating ventilation in the directions of arrows 143*a*, 143*b*, and 143*c*

(see FIG. 2C, FIG. 10G, and FIG. 10H).

2) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102.

Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide means to secure a mesh shade screen
    to regulate predetermined degrees of sun exposure
    (see FIG. 3J and FIG. 3K);
  b) Can function as a food dryer
    to predeterminatly regulate quicker or slower drying duration
    (see FIG. 2K, FIG. 2X, FIG. 2Y, and FIG. 3P);
  c) Can direct airflow from above wind-directing-and-rainwater-sealing multi-screen-securing louver blades 102 to below wind-directing-and-rainwater-sealing multi-screen-securing louver blades 102
    to provide airflow for occupants therebelow; and
  d) Can control a predetermined volume of airflow being directed from above wind-directing-and-rainwater-sealing multi-screen-securing louver blades 102 to below wind-directing-and-rainwater-sealing multi-screen-securing louver blades 102
    to regulate the comfort level for occupants therebelow in the directions of arrows 144*a* and 144*b*
    (see FIG. 2L, FIG. 10G, and FIG. 10H).

3) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing multi-screen-securing louver blades 102. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can block rainwater
    to keep occupants dry therebelow
    (see FIG. 2V, FIG. 2W, and FIG. 2X);
  b) Can block sunrays
    to protect the occupants therebelow from ultraviolet exposure
    (see FIG. 2W, and FIG. 2X);
  c) Can control a predetermined amount of sunrays
    to regulate the occupant's exposure therebelow
    (see FIG. 2V, FIG. 2W, and FIG. 2X); and
  d) Can function as an adjustable ventilating tonneau cover for pet containment to regulate the degree of louver opening while containing a pet within a truck bed, thereby regulating sun exposure.
    (see FIG. 2C, FIG. 2D, FIG. 10G, and FIG. 10H).

4) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having wind-directing-and-rainwater-sealing-louver-blade multi-screen-securing leading edges 103. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can provide a structural member on which to mount louver-blade rainwater-and-wind-sealing rattle-preventing insulation strips 104
    to thereby prevent rattling and vibration
    (see FIG. 1P, FIG. 1Q, FIG. 2B, FIG. 2E, and FIG. 2F);
  b) Can provide a structural member on which to mount louver-blade rainwater-and-wind-sealing rattle-preventing insulation strips 104
    to create a sealed connection and limit noise transfer, thereby creating a quieter environment
    (see FIG. 2C, FIG. 2D, FIG. 2E, and FIG. 2F);
  c) Can provide a structural member on which to mount louver-blade rainwater-and-wind-sealing rattle-preventing insulation strips 104
    to create a sealed connection and prevent rainwater leakage (see FIG. 2C, FIG. 2D, and FIG. 2F);
  d) Can provide a structural member on which to mount louver-blade rainwater-and-wind-sealing rattle-preventing insulation strips 104
    to create a sealed connection and prevent sunrays to pass therethrough; and
  e) Can enclose the upward-pointed edge of louver-blade wind- and rainwater-directing trailing edges 105
    to guide rainwater flow into louver-blade wind- and rainwater-directing trailing edges 105
    (see FIG. 1P, FIG. 1Q, FIG. 2C, FIG. 2D, and FIG. 2F).

5) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having louver-blade wind- and rainwater-directing trailing edges 105. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:

a) Can releasably secure multiple projector screens thereon
    (see FIG. 2A, FIG. 2B, FIG. 3H, and FIG. 3I);
  b) Can releasably secure both ends of sunshade thereon in horizontal or vertical position
    (see FIG. 2A, FIG. 2B, FIG. 3J, and FIG. 3K);
  c) Can function as a C-channel
    to enclose adjacent downward-pointed edge of wind-directing-and-rainwater-sealing-louver-blade multi-screen-securing leading edges 103
    (see FIG. 2A, FIG. 2B, and FIG. 2C);

d) Can function as a C-channel
   to block airflow through adjacent wind-directing-and-rainwater-sealing-louver-blade multi-screen-securing leading edges 103
   (see FIG. 2A, FIG. 2B, and FIG. 2C); and
e) Can function as a C-channel
   to block sunrays between adjacent wind-directing-and-rainwater-sealing-louver-blade multi-screen-securing leading edges 103
   (see FIG. 2B and FIG. 2C).

6) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having removable-collapsible-and-stowable automatic-multi-screen-raising-and-lowering multi-louver-control crank tool 121. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
   a) Can provide means for a person operating such
      to predeterminatly provide greater or less airflow;
   b) Can provide means for a person operating such
      to predeterminatly provide greater or less sun exposure
      (see FIG. 1B, FIG. 1N, and FIG. 1O);
   c) Can provide means for a person operating such
      to predeterminatly provide temperature control; and
   d) Can provide means for a person operating such, when functioning as a food dryer
      to predeterminatly regulate quicker or slower drying duration to food
      (see FIG. 1B, FIG. 1N, and FIG. 3P).

7) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having removable-collapsible-and-stowable automatic-multi-screen-raising-and-lowering multi-louver-control crank tool 121. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
   a) Can provide means for a person operating such, when functioning as a tonneau cover
      to actuate a quick visual view of tools and other storage items within a truck bed
      (see FIG. 1B, FIG. 1N, and FIG. 10H);
   b) Can provide means for a person to raise and lower a mesh shade screen 162
      to regulate predetermined degrees of sun exposure,
      (see FIG. 1B, FIG. 1N, and FIG. 3K);
   c) Can provide means for a person to raise and lower a projector screen to provide a retractable vertical surface for projecting video movies utilizing the multi-louver-blade multi-position automatic-multi-screen-raising-and-lowering control system 112 operating in the directions of arrows 148a, 148b, 148c, 148d, 149, 150a, 150b, 150c, 150d, 151a, 151b, 151c, 151d, 152, 153a, 153b, 153c, 153d, 154, 155a, 155b, 156, 157a, 157b, 158, 159a, and 159b, for screens 160a and 160b operating in the directions of arrows 161a, and 161b
      (see FIG. 2V, FIG. 2W, FIG. 2Y, FIG. 2Z, FIG. 3H, and FIG. 3I); and
   d) Can provide means for a person to raise and lower a curtain
      to provide a retractable privacy screen utilizing the multi-louver-blade multi-position automatic-multi-screen-raising-and-lowering control system 112 whereby cord 163a operates a curtain 163b in the directions of arrows 148a, 148b, 148c, 148d, 149, 150a, 150b, 150c, 150d, 151a, 151b, 151c, 151d, 152, 153a, 153b, 153c, 153d, 154, 155a, 155b, 156, 157a, 157b, 158, 159, 164, 165, and 166
      (see FIG. 2V, FIG. 2W, FIG. 2Y, FIG. 2Z, FIG. 3L, FIG. 3M, FIG. 3N, and FIG. 3O).

8) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having first rainwater-channeling-and-leaf-filtering side gutter beam 123a. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
   a) Can function as a discrete gutter channel
      to provide rainwater flow from louver-blade wind- and rainwater-directing trailing edges 105 to rainwater-draining spouts 129
      (see FIG. 2L, FIG. 10G, and FIG. 10H);
   b) Can function as a horizontal structural support
      to provide lateral rigidity between corner posts 132 in the directions of arrows 145a, 145b, 146a, and 146b
      (see FIG. 2Q, FIG. 2R, and FIG. 2S);
   c) Can function as a structural member
      to support wind-directing leaf-separating-and-discharging rainwater-sealing automatic-multi-screen-raising-and-lowering multi-screen-securing fruit-drying-and-sorting truck-bed-tonneau-covering louver-blade system
      (see FIG. 2Q, FIG. 2R, FIG. 2S, and FIG. 2T);
   d) Can function as a structural member
      to support louver-blade-rotation-stanchions 111b
      (see FIG. 2Q, FIG. 2R, FIG. 2S, FIG. 2T, and FIG. 2V); and
   e) Can function as a structural member
      to mount multi-louver-blade multi-position automatic-multi-screen-raising-and-lowering control system 112
      (see FIG. 2T, FIG. 2V, and FIG. 2X).

9) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having second rainwater-channeling-and-leaf-filtering side gutter beam 123b. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
  a) Can function as a discrete gutter channel
    to provide rainwater flow from louver-blade wind- and rainwater-directing trailing edges 105
    in the directions of arrows 145a, 145b, 146a, and 146b
    (see FIG. 2Q, FIG. 2S, and FIG. 2T);
  b) Can function as a structural member
    to support louver-blade-rotation cradle axels 109
    (see FIG. 2V and FIG. 2W);
  c) Can function as a horizontal structural support
    to provide lateral rigidity between corner posts 132;
  d) Can function as a structural member
    to support wind-directing leaf-separating-and-discharging rainwater-sealing automatic-multi-screen-raising-and-lowering multi-screen-securing fruit-drying-and-sorting truck-bed-tonneau-covering louver-blade system
    (see FIG. 2Q, FIG. 2S, and FIG. 2T); and
  e) Can function as a structural member
    to support louver-blade-rotation cradle axels 109
    (see FIG. 2L and FIG. 2N).
10) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having rainwater-channeling-and-leaf-filtering end gutter beams 124. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
  a) Can function as a discrete gutter channel
    to provide rainwater flow from louver-blade wind- and rainwater-directing trailing edges 105 to first rainwater-channeling-and-leaf-filtering side gutter beam 123a
    (see FIG. 2Q, FIG. 2S, and FIG. 2T);
  b) Can function as a airflow blocker
    to provide a physical means to block airflow with overlapping adjacent wind-directing-and-rainwater-sealing multi-screen-securing louver blade 102
    (see FIG. 2C, FIG. 2V, and FIG. 2X);
  c) Can function as a airflow regulator
    to provide a physical means to regulate the volume of airflow with overlapping adjacent wind-directing-and-rainwater-sealing multi-screen-securing louver blade 102
    (see FIG. 2V and FIG. 2X); and
  d) Can function as a sunlight blocker
    to provide a physical means to block sunlight with overlapping adjacent wind-directing-and-rainwater-sealing multi-screen-securing louver blade 102
    (see FIG. 2C, FIG. 2V, and FIG. 2X).
11) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having rainwater-channeling-and-leaf-filtering end gutter beams 124. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
  a) Can function as a sunlight regulator
    to provide a physical means to regulate the exposure of sunlight with overlapping adjacent wind-directing-and-rainwater-sealing multi-screen-securing louver blade 102
    (see FIG. 2C, FIG. 2V, and FIG. 2X);
  b) Can function as a food drying duration regulator
    to provide a physical means to regulate the volume of airflow with overlapping adjacent wind-directing-and-rainwater-sealing multi-screen-securing louver blade 102 being operated by multi-louver-blade multi-position automatic-multi-screen-raising-and-lowering control system 112 in the directions of arrows 167a, 167b, 167c, 167d, 167e, 167f, 168a, 168b, 168c, 168d, 168e, 168f, 169a, 169b, 169c, 169d, 169e, and 169f, for drying and sorting
    (see FIG. 3P, FIG. 3Q, and FIG. 3R);
  c) Can function as a horizontal structural support
    to provide a mechanical connection and lateral rigidity between corner posts 132; and
  d) Can function as a structural member
    to support to wind-directing leaf-separating-and-discharging rainwater-sealing automatic-multi-screen-raising-and-lowering multi-screen-securing fruit-drying-and-sorting truck-bed-tonneau-covering louver-blade system.
12) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging rainwater gutters 126. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
  a) Can separate out leaves
    to separate the water from leaves as it flows through the leaf-separating-and-discharging rainwater gutters 126
    (see FIG. 2S, FIG. 2T, FIG. 3S, and FIG. 3T);
  b) Can filter rainwater
    to flow through the leaf-separating-and-discharging rainwater gutters 126 without clogging up with debri
    (see FIG. 2S, FIG. 2T, FIG. 3S, and FIG. 3T);
  c) Can provide rainwater channels that are hidden
    to be visually unseen nestled behind the first rainwater-channeling-and-leaf-filtering side gutter beam 123a, second rainwater-channeling-and-leaf-filtering side gutter beam 123b, and rainwater-channeling-and-leaf-filtering end gutter beams 124
    (see FIG. 1B, FIG. 1E, FIG. 3S, and FIG. 3T);
  d) Can provide channels for rainwater to flow
    to lead rainwater away from areas that would get occupants wet in the directions of arrows 170a, 170b, 170c, 171a, 171b, and 171c (see FIG. 1B, FIG. 1E, FIG. 3S, and FIG. 3T);

e) Can provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and
f) Can provide channels for rainwater
to exit at the lowest point of rainwater-channeling-and-collecting and leaf-separating-and-discharging gutter-beam system 122 as to be externally manageable for rainwater flow out of the pergola area.

13) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging opening 127b. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
a) Can separate out leaves
to separate the water from leaves as it flows through the leaf-separating-and-discharging rainwater gutters 126 in the directions of arrows 170a, 170b, 170c, 171a, 171b, and 171c
(see FIG. 1B, FIG. 1E, FIG. 3S, and FIG. 3T);
b) Can filter rainwater
to flow through the leaf-separating-and-discharging rainwater gutters 126 without clogging up the system with debri;
c) Can separately and downwardly direct the flow of leaves and debri
to angle the flow of leaves and debri toward the ground to obscure the messy build-up and appearance on the frame structure in the directions of arrows 171a, 171b, 171c, 172a, 172b, and 172c
(see FIG. 1B, FIG. 1E, FIG. 3S, and FIG. 3T);
d) Can clear out the paths of waterflow
to prevent build-up of deposit the leaves and debri leaf-separating-and-discharging rainwater gutters 126; and
e) Can discharge leaves out of corner posts 132
to expel the leaves and debri outside of the leaf-separating-and-discharging rainwater gutters 126 in the directions of arrows 171a, 171b, and 171c
(see FIG. 1B, FIG. 1E, FIG. 3S, and FIG. 3T).

14) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having leaf-separating-and-discharging tubes 128. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
a) Can separate out leaves
to separate the water from leaves as it flows through the leaf-separating-and-discharging rainwater gutters 126 in the directions of arrows 170a, 170b, 170c, 171a, 171b, 171c, 172a, 172b, and 172c
(see FIG. 1B, FIG. 1E, FIG. 3S, and FIG. 3T);
b) Can filter rainwater
to flow through the leaf-separating- and discharging rainwater gutters 126 without clogging up the system with debris in the directions of arrows 170a, 170b, 170c, 171a, 171b, and 171c
(see FIG. 1E, FIG. 3S, and FIG. 3T);
c) Can direct rainwater to flow
to lead rainwater away from areas that would get occupants wet;
d) Can provide rainwater channels that are hidden
to be visually unseen inside of corner posts 132
(see FIG. 1E, FIG. 3S, and FIG. 3T);
e) Can provide channels for rainwater
to guide rainwater in a specific flow pattern within rainwater-channeling-and-collecting and leaf-separating-and-discharging gutter-beam system 122 as to not create mineral stains or discoloration on the outer, exposed surfaces; and
f) Can provide channels for rainwater
to exit at the lowest point of rainwater-channeling-and-collecting and leaf-separating-and-discharging gutter-beam system 122 as to be externally manageable for rainwater flow out of the pergola area.

15) It is an object of the new invention to provide a multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola, having height-and-angle-adjustable internally-externally-threaded tube screws 138a. Therefore, the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola:
a) Can screw through corner-post base plates 137
(see FIG. 4A, FIG. 4B, and FIG. 4C);
b) Can secure each corner-post base plates 137 to corner posts 132;
c) Can provide independent vertical adjustment to each corner of each corner-post base plates 137
to compensate for uneven surfaces; and
d) Can provide vertical adjustment for each corner-post base plate 137 to level out each corner of the multi-function wind-directing leaf-separating-and-discharging rainwater-sealing automatic-multi-screen-raising-and-lowering multi-screen-securing fruit-drying-and-sorting truck-tonneau-covering rainwater-channeling-and-collecting leaf-filtering height-and-angle-adjustable louvered pergola
(see FIG. 4A, FIG. 4B, and FIG. 4C).

The invention claimed is:
1. A pergola, comprising:
four corner posts, each having a top and a bottom, wherein the top of each corner post includes at least one internal beam securing slot, and further wherein each corner post includes an internal conduit through the corner post, the bottom of each corner post configured to be securely attached to a ground surface, and further wherein a lower portion of each corner post includes an aperture in fluid communication with said internal conduit for water drainage;

four beams, each having a length and an internal gutter defined along the length of a beam, each beam having two ends,
- wherein each end of each beam includes at least one securing bar,
- further wherein each end of each beam is attached to the top of a corner post by slidably attaching the at least one securing bar of the beam into the at least one internal beam securing slot of the corner post,
- further wherein two beams connected to a corner post define a corner of the pergola,
- further wherein the four beams, when connected to the four corner posts, define an internal gutter system comprising (a) the internal gutters defined along the length of each beam, and (b) the internal conduit running through each of the corner posts, wherein the internal gutters are in fluid communications with the internal conduit running through each of the four corner posts, such that captured rain water flows down through said internal gutter system and releases at the aperture of a corner post, and
- further wherein each corner post and each beam have an outer surface that faces outward of the pergola and that is opposite the internal gutter system, and further wherein the outer surface of the beam is offset with the outer surface of each corner post; and a plurality of louvres connected across the four beams to define a cover for the pergola.

2. The pergola of claim 1, wherein the plurality of louvres are rotatable enabling the cover to open and close in between the louvres.

3. The pergola of claim 1, further comprising an upright cover attached over the top of each corner of the pergola.

4. A pergola, comprising:
four corner posts, each having a top and a bottom, wherein the top of each corner post includes at least one internal beam securing mechanism, and further wherein each corner post includes an internal conduit through the corner post, and further wherein the bottom of each corner post is configured to be securely attached to a ground surface, and further wherein a lower portion of each corner post further includes an aperture in fluid communication with said internal conduit for water drainage;

four beams, each having a length and an internal gutter defined along the length of each beam, and each beam having two ends,
- wherein each end of each beam includes at least one corner post securing mechanism,
- further wherein each end of each beam is attached to the top of a corner post by slidably attaching the at least one corner post securing mechanism of the beam to the at least one internal beam securing mechanism of the corner post,
- further wherein two beams connected to a corner post define a corner of the pergola,
- further wherein the four beams, when connected to the four corner posts, define an internal gutter system comprising (a) the internal gutters defined along the length of each beam, and (b) the internal conduit running through each of the corner posts, wherein the internal gutters are in fluid communication with the internal conduit running through each of the four corner posts, such that captured rain water flows through said internal gutter system and releases at the aperture of a corner post,
- further wherein each corner post and each beam has an outer surface that faces outward of the pergola and that is opposite the internal gutter system, and further wherein the outer surface of each beam is offset with the outer surface of each corner post when connected; and a plurality of louvres connected across the beams to define a cover for the pergola.

5. The pergola of claim 4, further comprising an upright cover attached on top of each corner post.

6. The pergola of claim 4, wherein the at least one internal beam securing mechanism of each corner post is a receptacle and the at least one internal corner post securing mechanism of each beam is a securing bar configured to be slidably placed in the receptacle.

* * * * *